United States Patent [19]
Ohga et al.

[11] Patent Number: 5,479,502
[45] Date of Patent: Dec. 26, 1995

[54] SPEAKING APPARATUS HAVING HANDFREE CONVERSATION FUNCTION

[75] Inventors: Juro Ohga, Kamakura; Hiroyuki Masuda, Sano; Kensaku Fujii, Yamato; Yoshihiro Sakai, Yokohama, all of Japan

[73] Assignee: Fujitsu Limited, Kawasaki, Japan

[21] Appl. No.: 243,518

[22] Filed: May 16, 1994

Related U.S. Application Data

[63] Continuation of Ser. No. 761,968, filed as PCT/JP91/00192 Feb. 16, 1991, abandoned.

[30] Foreign Application Priority Data

Feb. 16, 1990 [JP] Japan .................................. 2-035660
Feb. 19, 1990 [JP] Japan .................................. 2-037853

[51] Int. Cl.⁶ .................................................... H04M 9/08
[52] U.S. Cl. ........................... 379/389; 379/406; 379/410; 379/411; 379/388
[58] Field of Search .................................. 379/392, 406, 379/410, 411, 407, 388, 389; 370/32.1

[56] References Cited

U.S. PATENT DOCUMENTS

| | | |
|---|---|---|
| 4,636,586 | 1/1987 | Schiff . |
| 4,912,758 | 3/1990 | Arbel ..................................... 379/388 |
| 4,947,425 | 8/1990 | Grizmala et al. ....................... 379/410 |

FOREIGN PATENT DOCUMENTS

| | | |
|---|---|---|
| 0333581 | 9/1989 | European Pat. Off. . |
| 0366584 | 5/1990 | European Pat. Off. . |
| 56-01649 | 1/1981 | Japan . |
| 61-206354 | 2/1987 | Japan . |
| 1-24657 | 1/1989 | Japan . |
| 2220546 | 1/1990 | United Kingdom . |
| 88/02582 | 4/1988 | WIPO . |
| WO89/05068 | 6/1989 | WIPO . |

OTHER PUBLICATIONS

Hsu et al., "Acoustic Echo Cancellation for Loudspeaker Telephones", IEEE/IEICE–Global Telecommunications Conference, vol. 3/3, Nov. 1987, pp. 1955–1959, XP94127.

Proceedings of Eusipco–88 Fourth European Signal Processing Conference, "High Quality Hands–Free Telephony Using Voice Switching Optimized with Echo Cancellation", pp. 495–498, Sep., vol. 11, 1988.

Proceedings of Eusipco–88 Fourth European Signal Processing Conference, "Achieving the Control of the Acoustic Echo in Audio Terminals", pp. 491–494, Sep., vol. 11, 1988.

*Primary Examiner*—Jeffery A. Hofsass
*Assistant Examiner*—Scott Wolinsky
*Attorney, Agent, or Firm*—Staas & Halsey

[57] ABSTRACT

A speaking apparatus having a handfree conversation function, provided with an echo canceler which can cancel the echo caused by direct acoustic coupling between a speaker and a microphone positioned in a system having a casing, a ground surface and a speech switching circuit. In the apparatus, the amount of insertion attenuation of the transmitted and received signal is set with an upper limit of the amount of attenuation sufficient for cancelling the echo caused by the indirect acoustic coupling determined by the location where the speaking apparatus is used. In addition, the echo canceler and the speech switching circuit share optimum functions to obtain an excellent speaking quality apparatus with an inexpensive and small sized processing circuit.

16 Claims, 139 Drawing Sheets

$aj = 1 - KXj^2(m)/\Sigma Xj^2(i)$
$Qj(m) = \{Sj + Nj + \Sigma mhj(i)Xj(i) - \Sigma mHj(i)Xj(i)\}/Xj(m)$

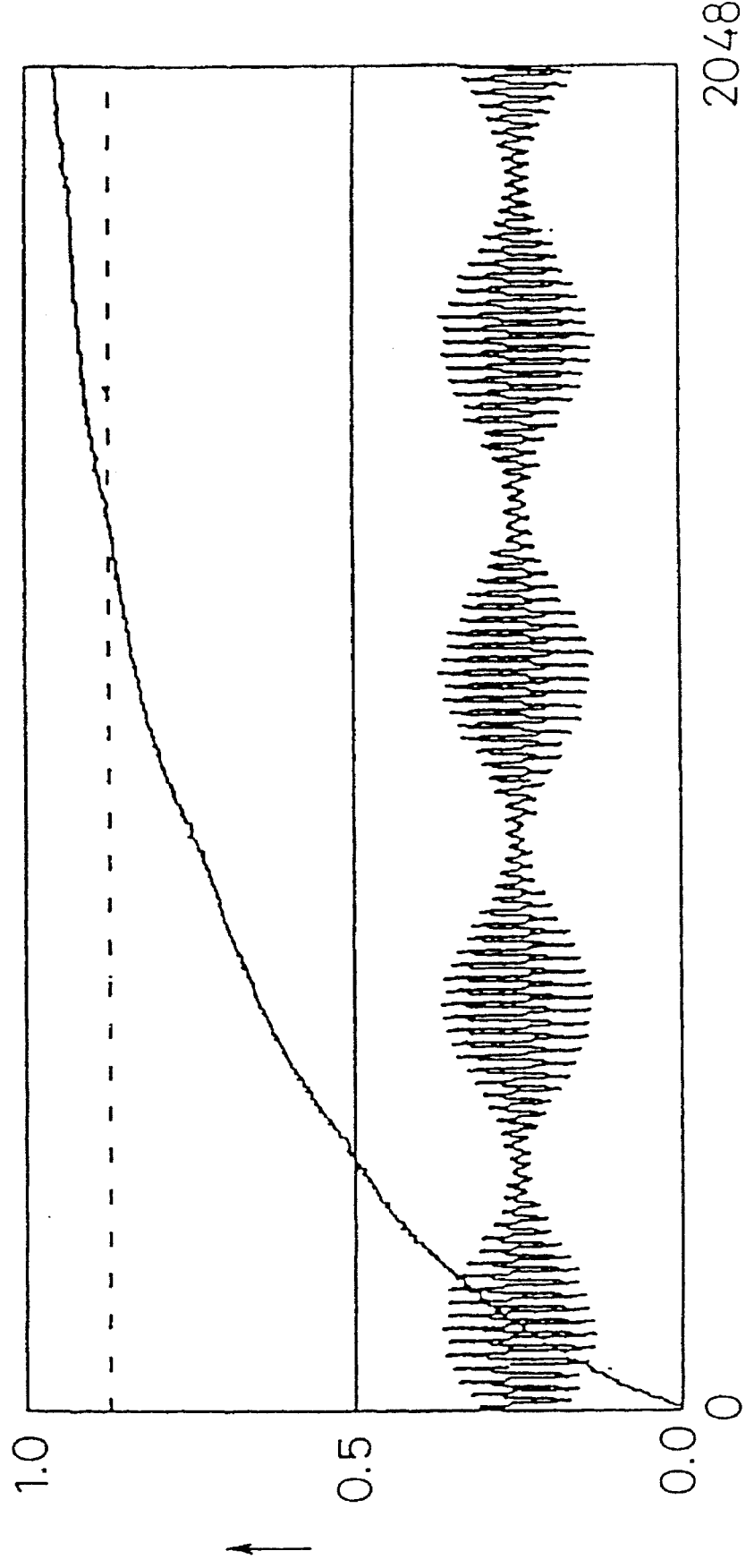
Fig. 21A  Calling tone (K=0.01)

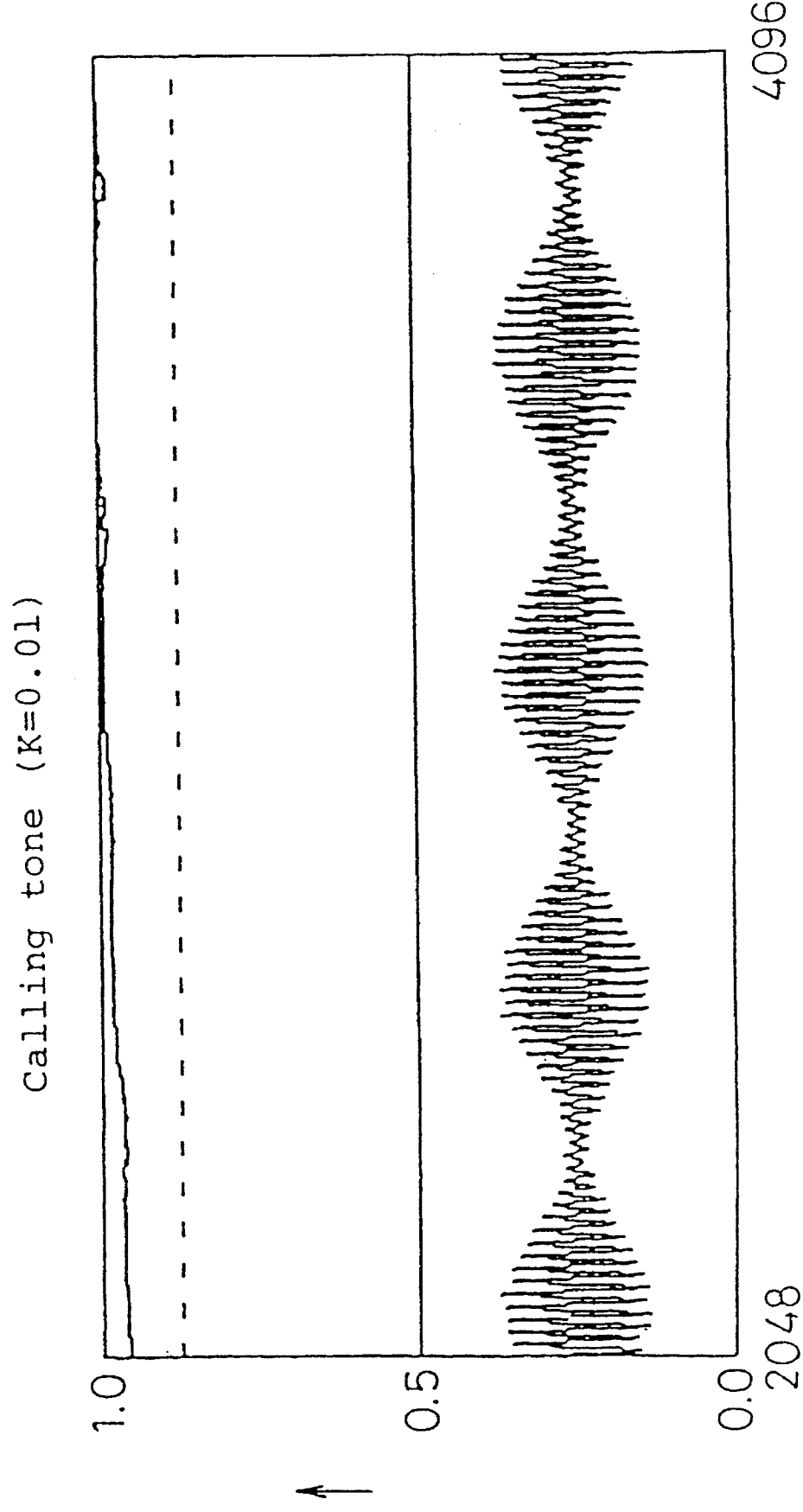
Fig. 21B Calling tone (K=0.01)

(K=1.0)

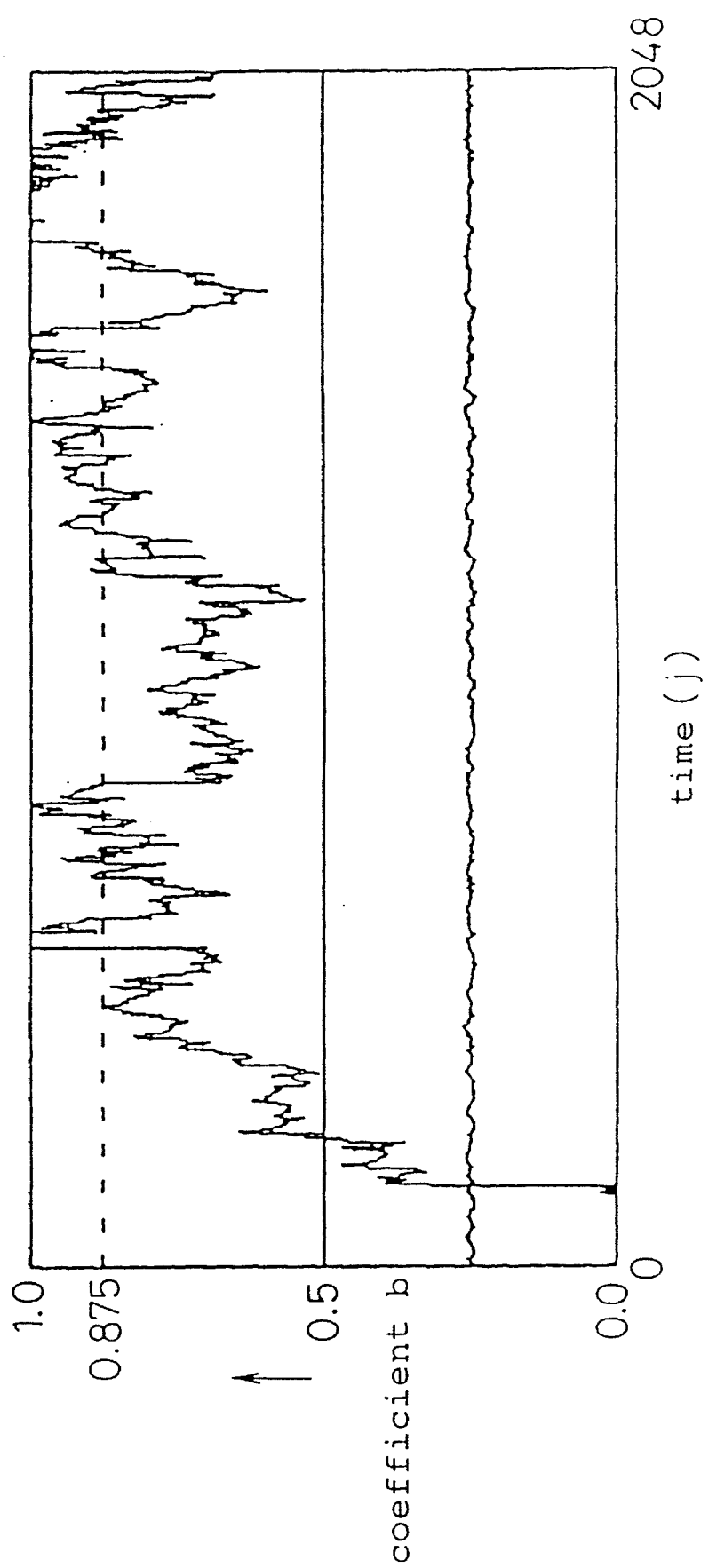
Fig. 23 (K=0.05)

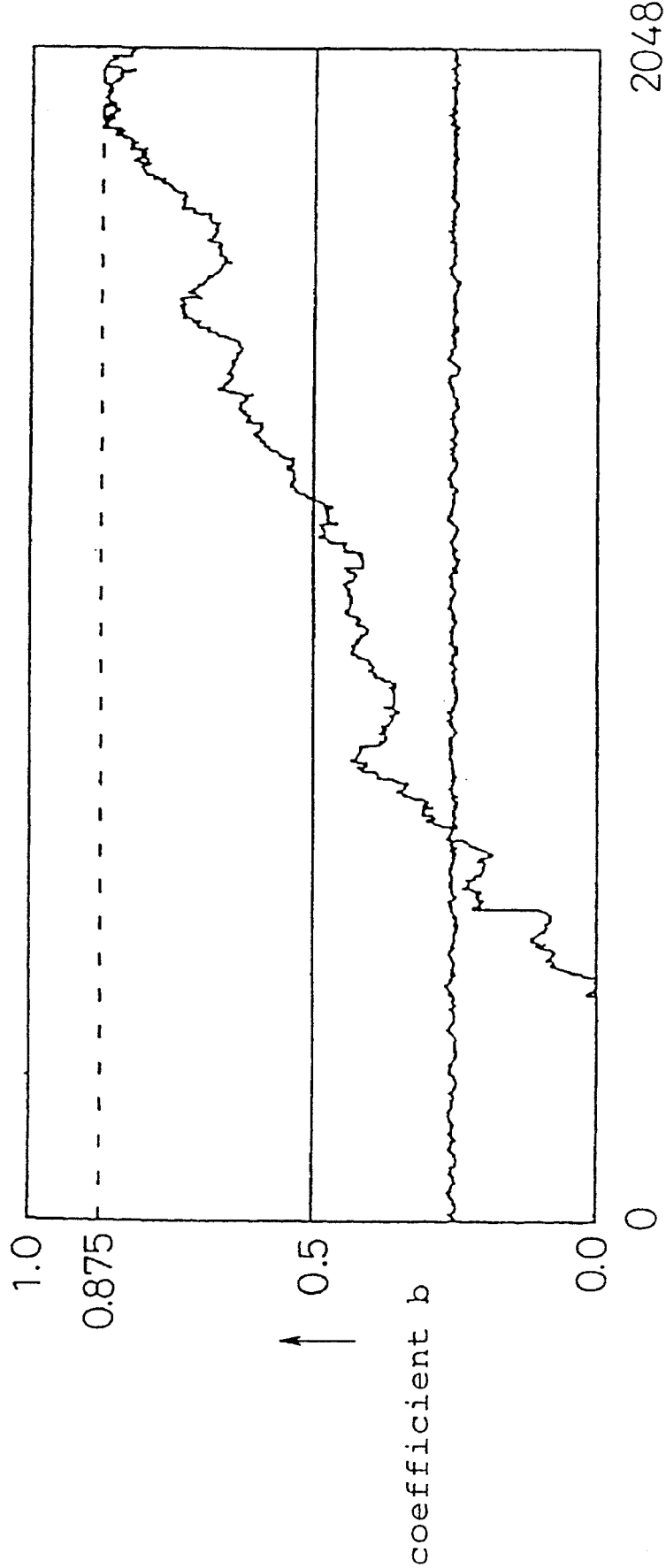

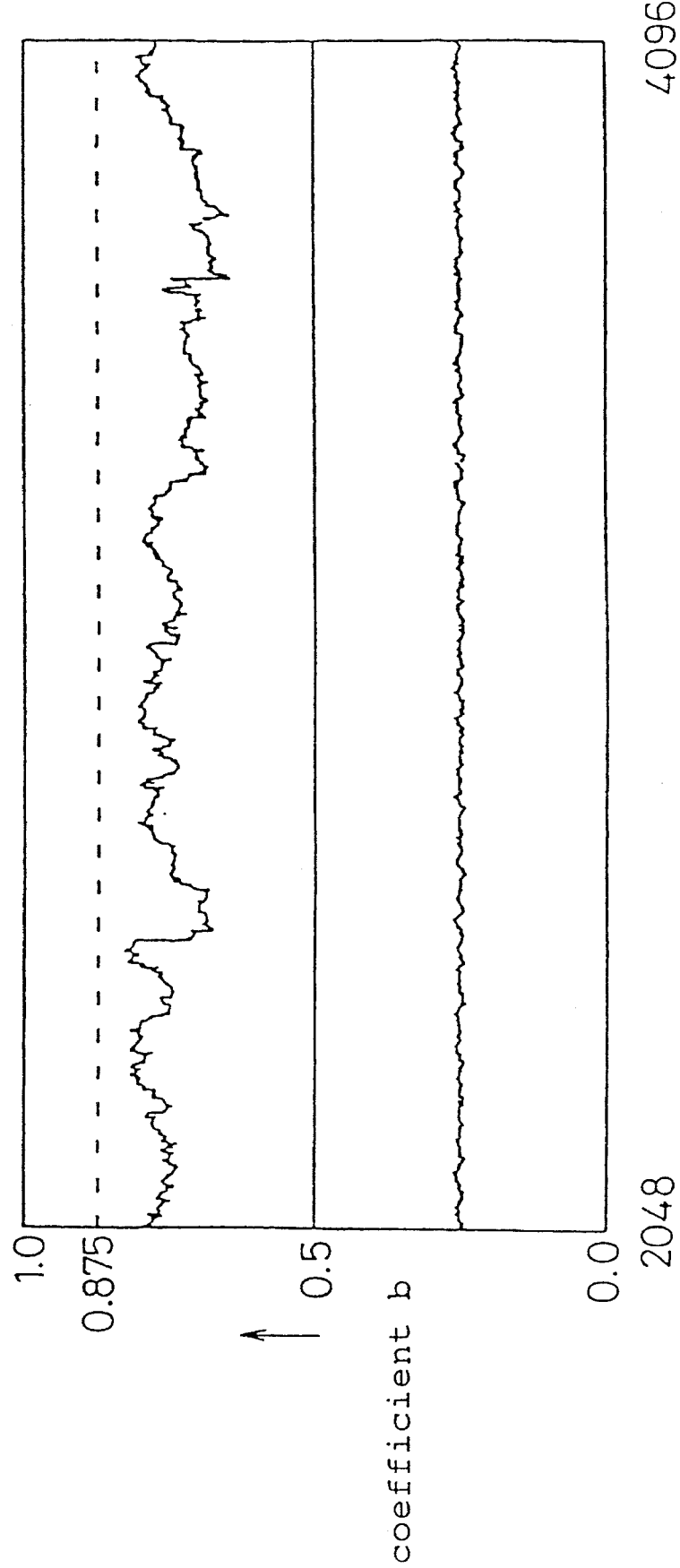

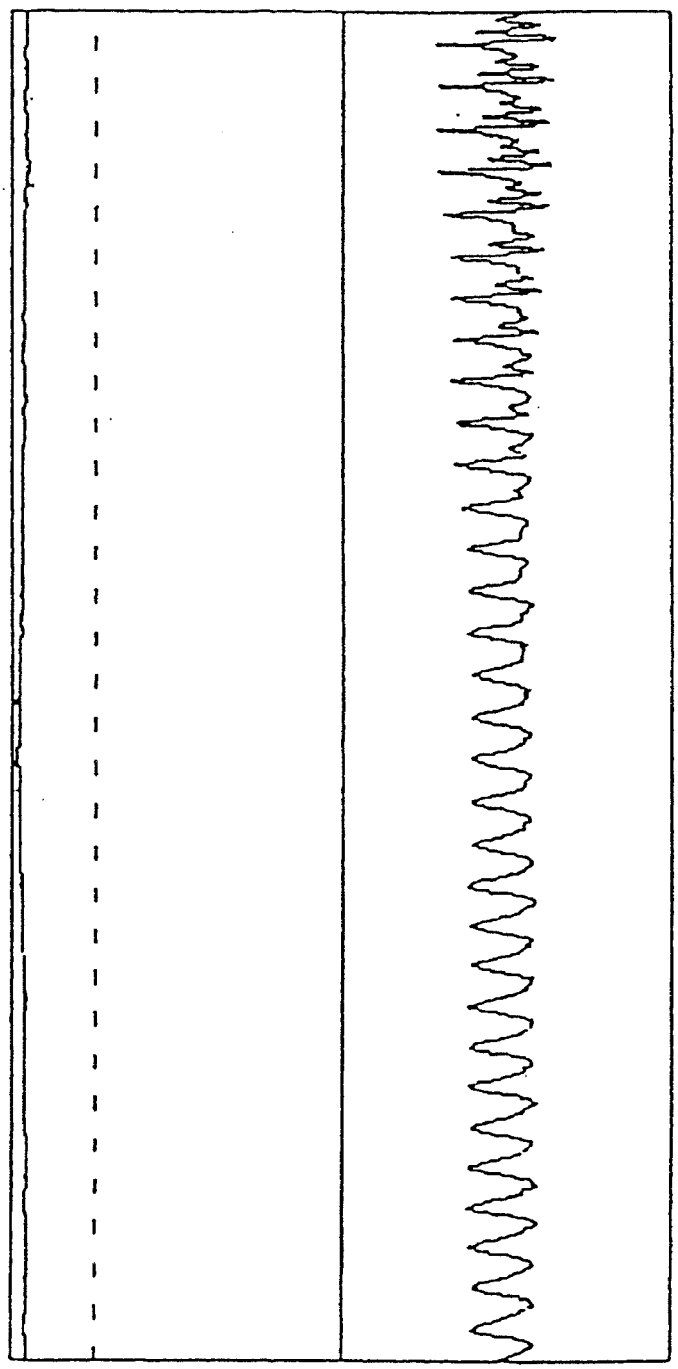
Fig. 25 Female voice (K=0.01)

Female voice

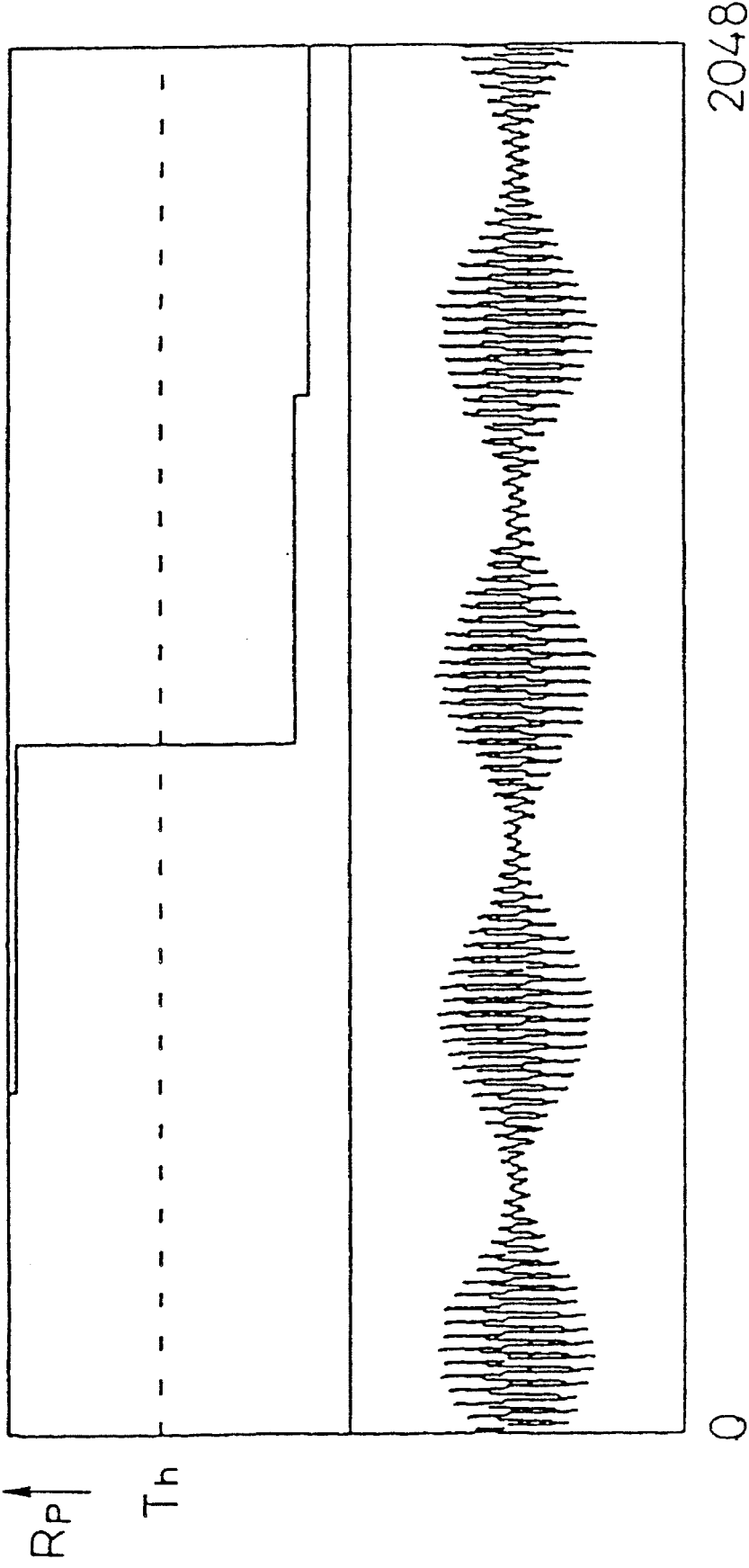
Fig. 33A (K=0.05, No of integrations 512, b=1)

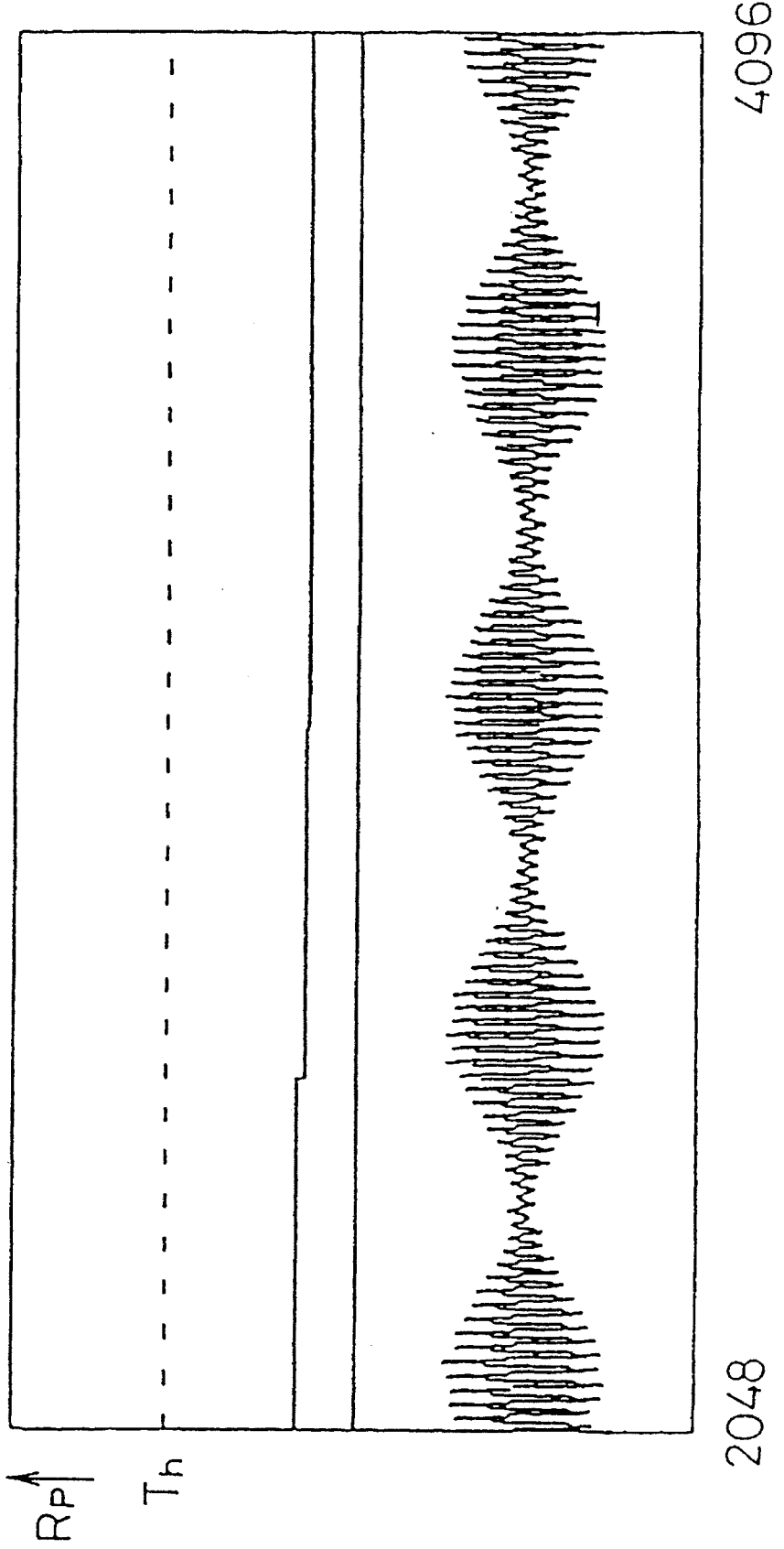

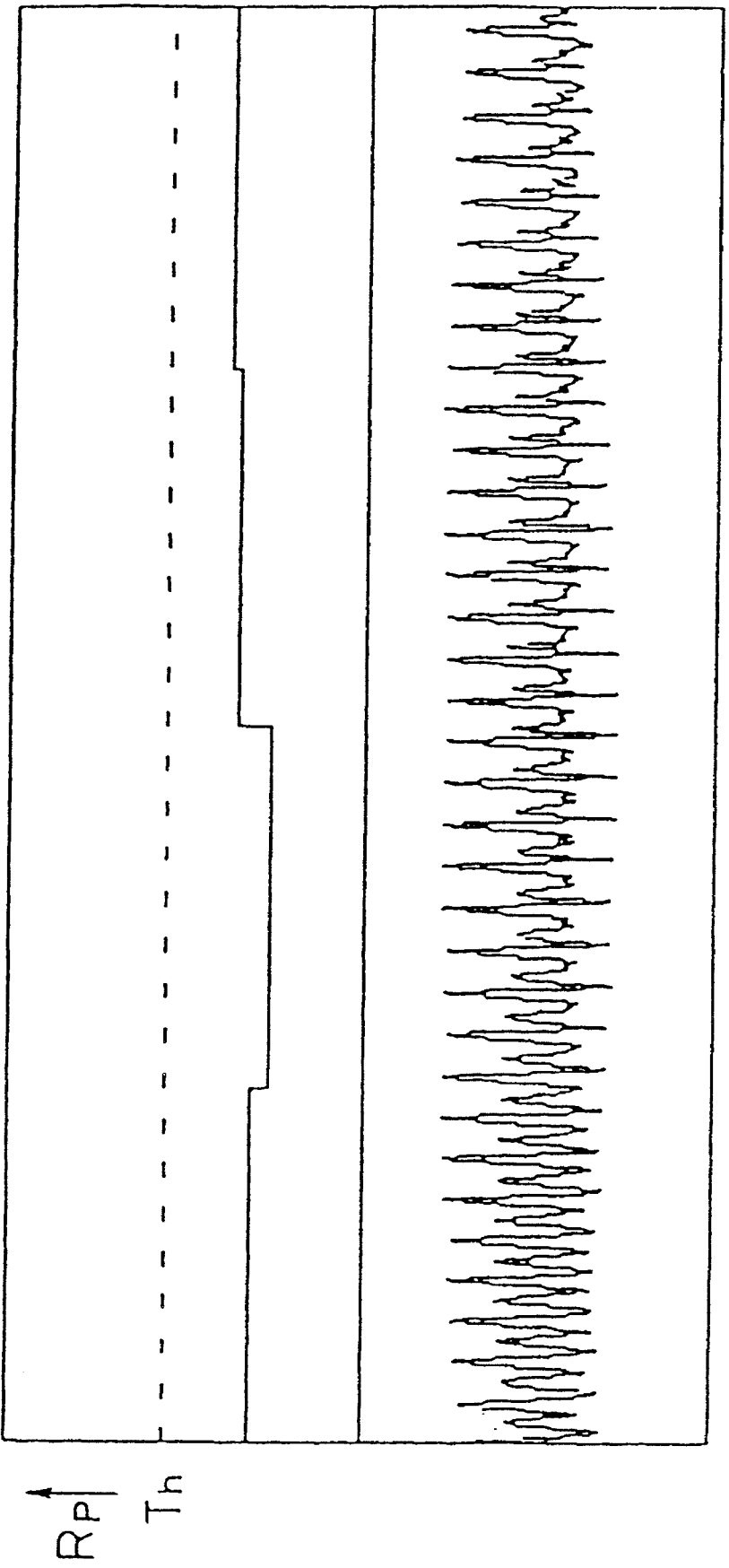
Fig. 34A (K=0.05, No of integrations 512, b=1)

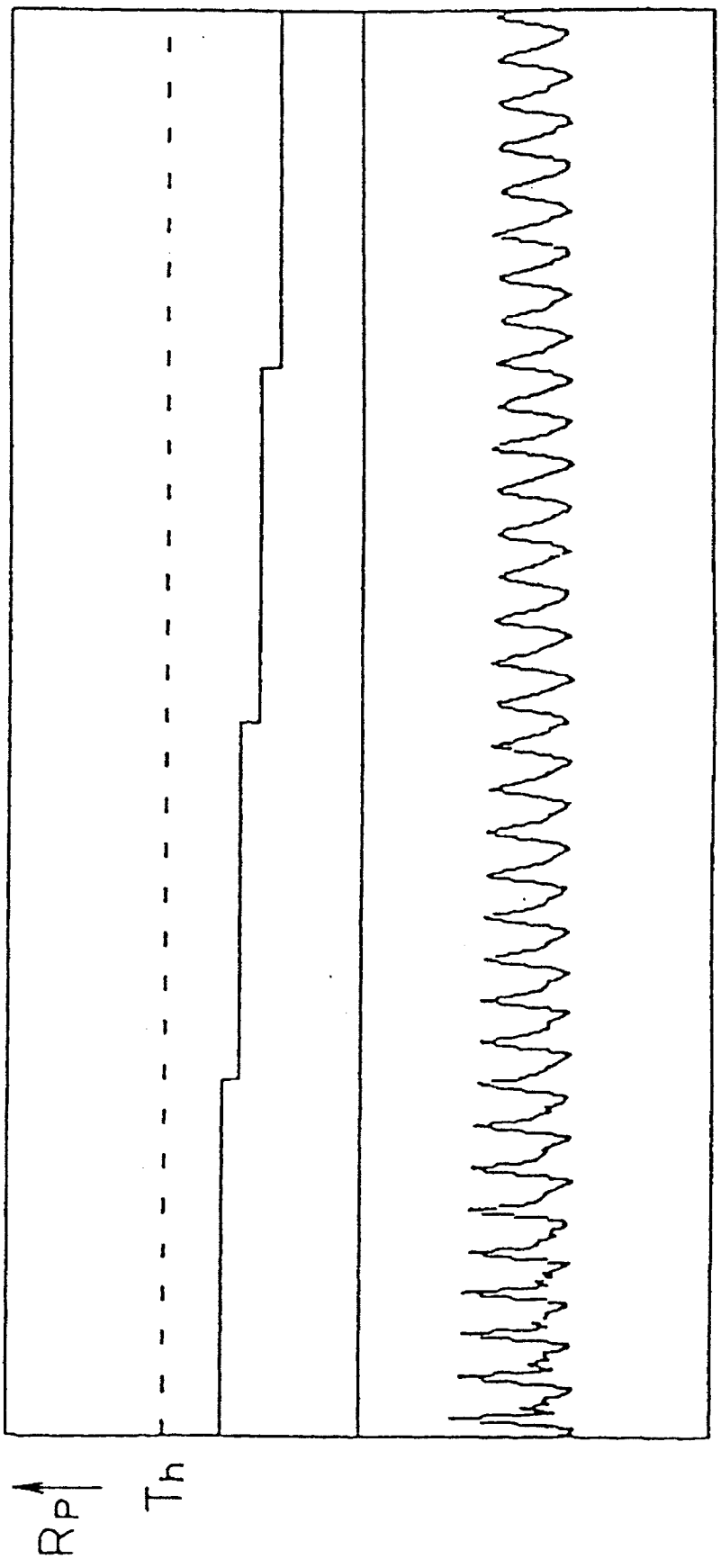
Fig. 34B (K=0.05, No of integrations 512, b=1)

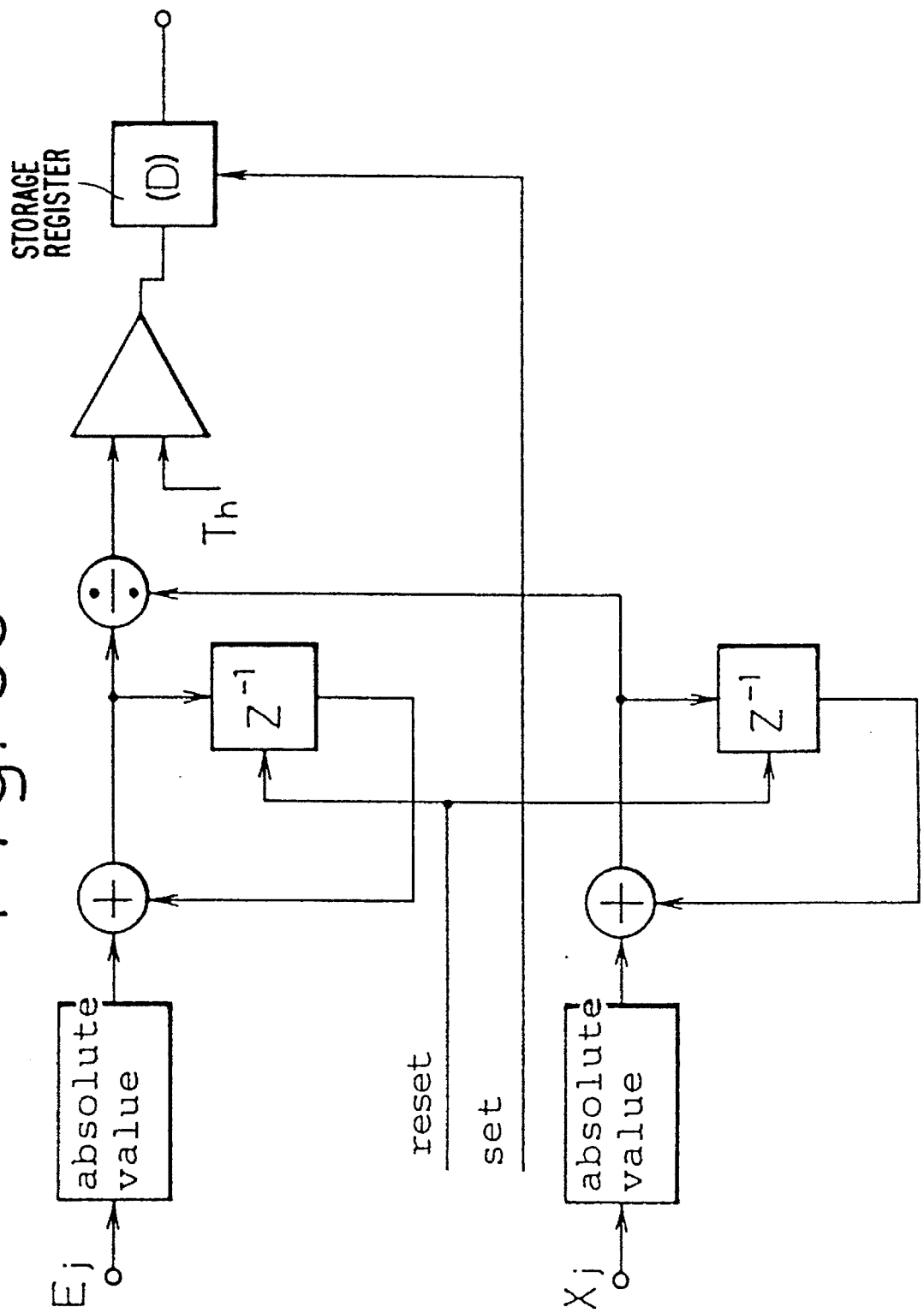

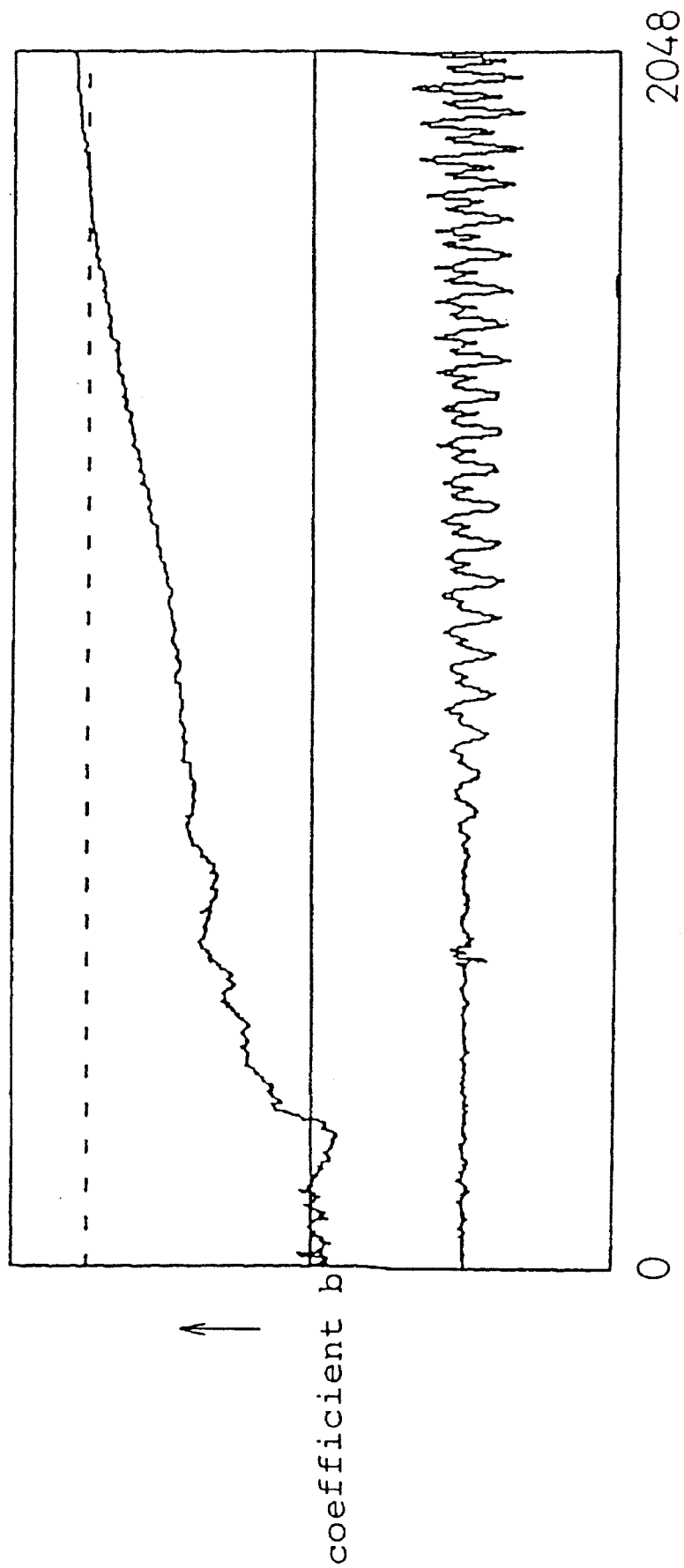

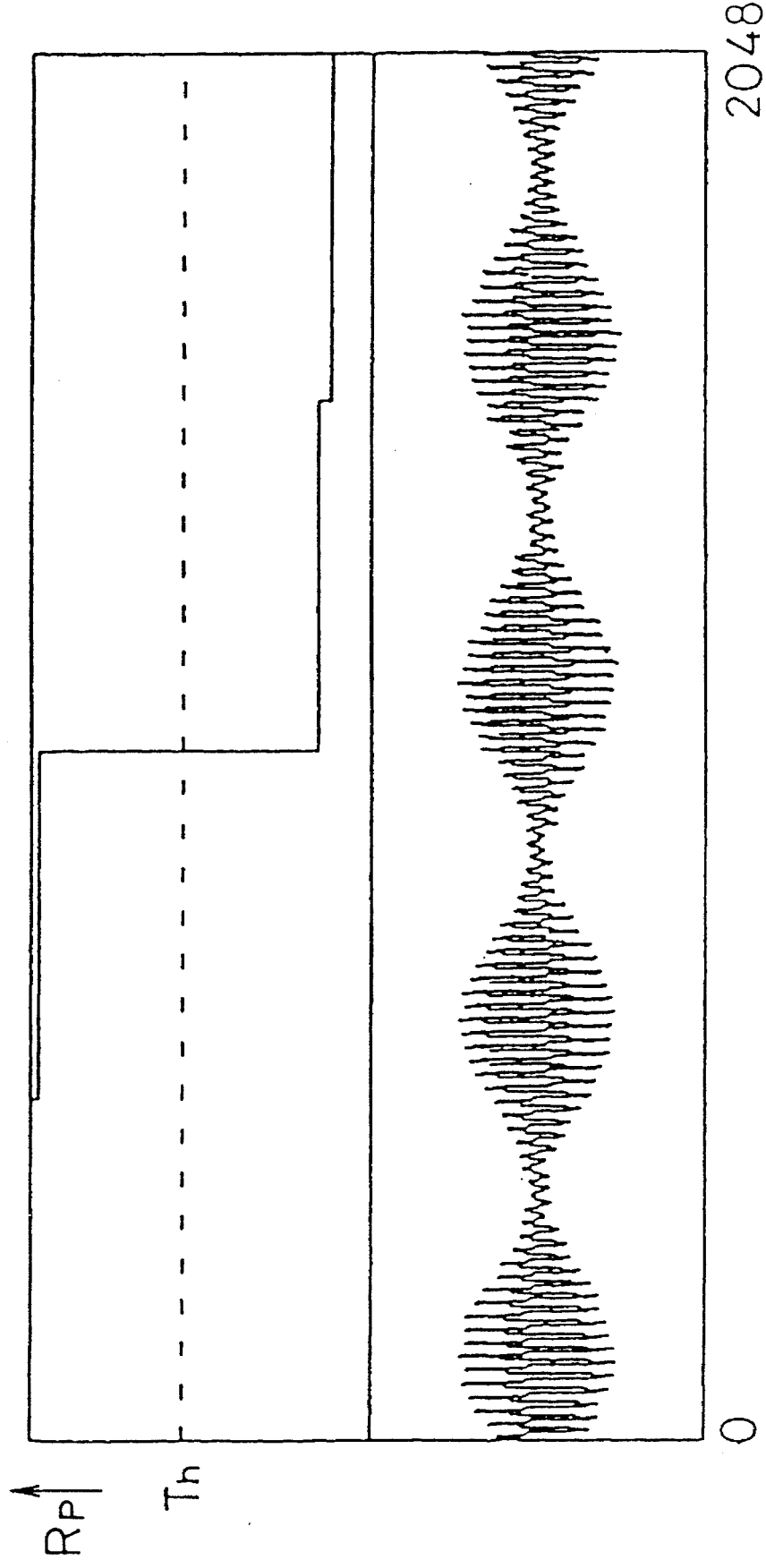
Fig. 37A (k=0.05, integration section 512, b=1)

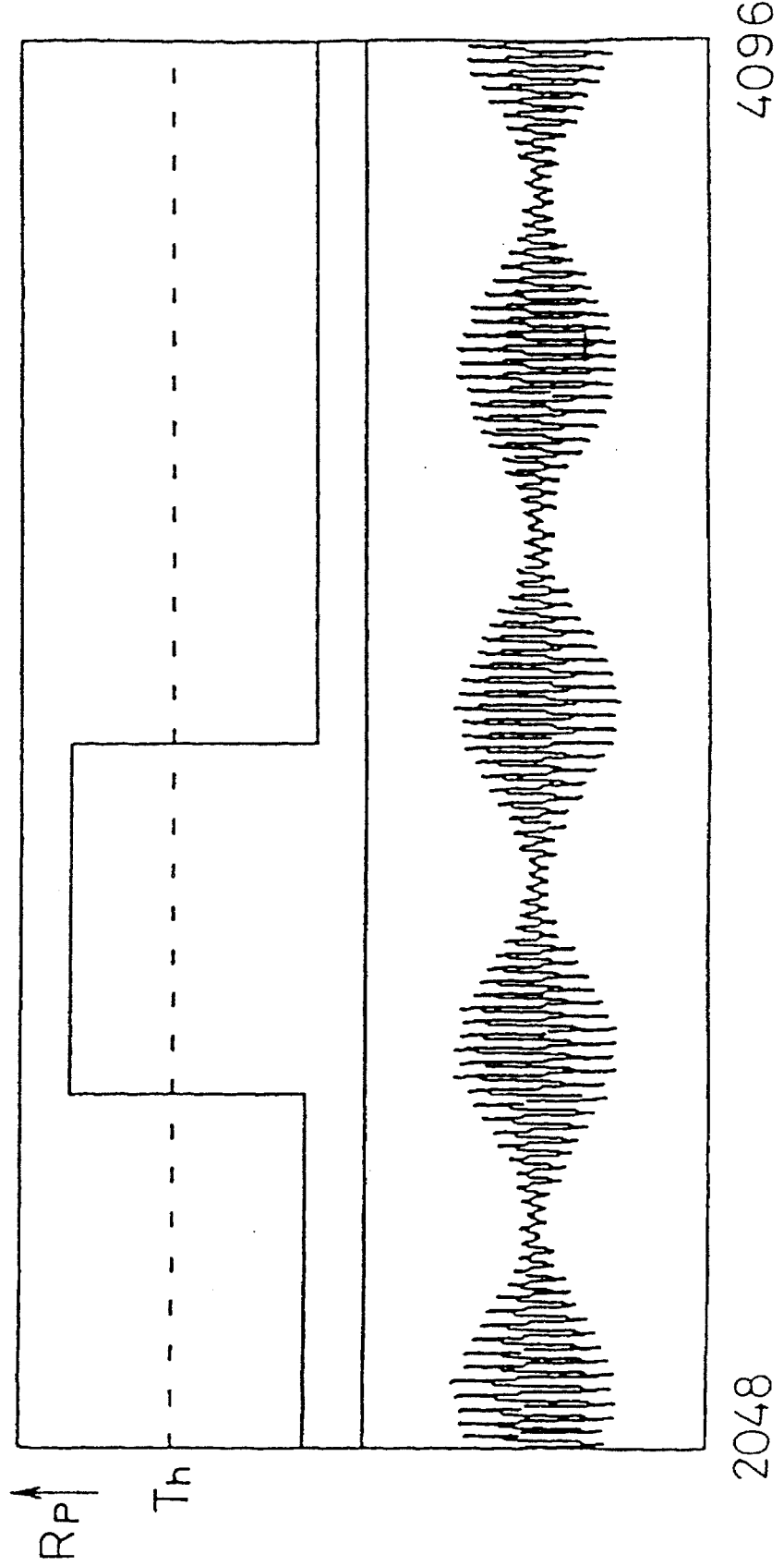
Fig. 37B (k=0.05, integration section 512, b=1)

(K=0.05, integration section 512, b=1)

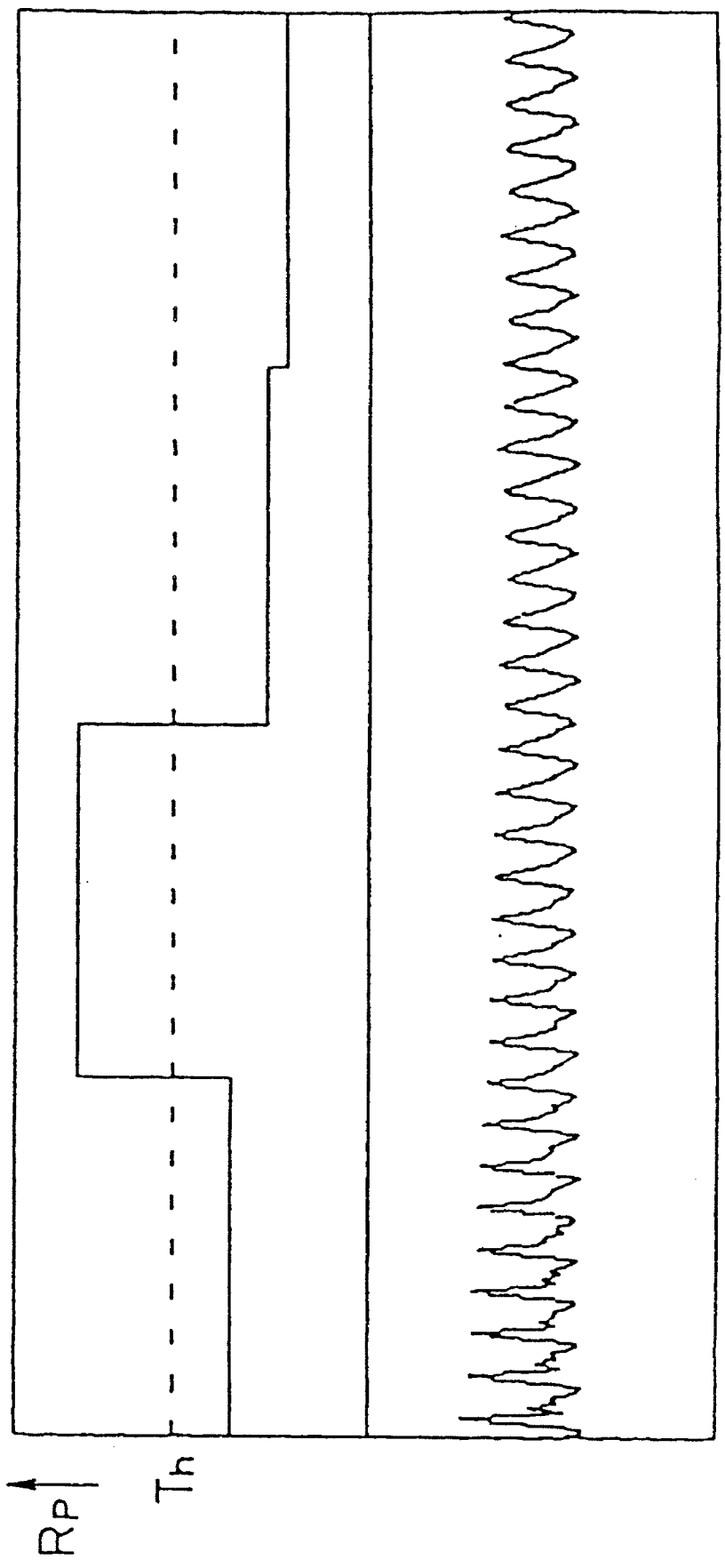
Fig. 38B (K=0.05, integration section 512, b=1)

(K = 1.0)

(K = 1.0)

(K = 0.1)

(K = 0.1)

(K = 0.1)

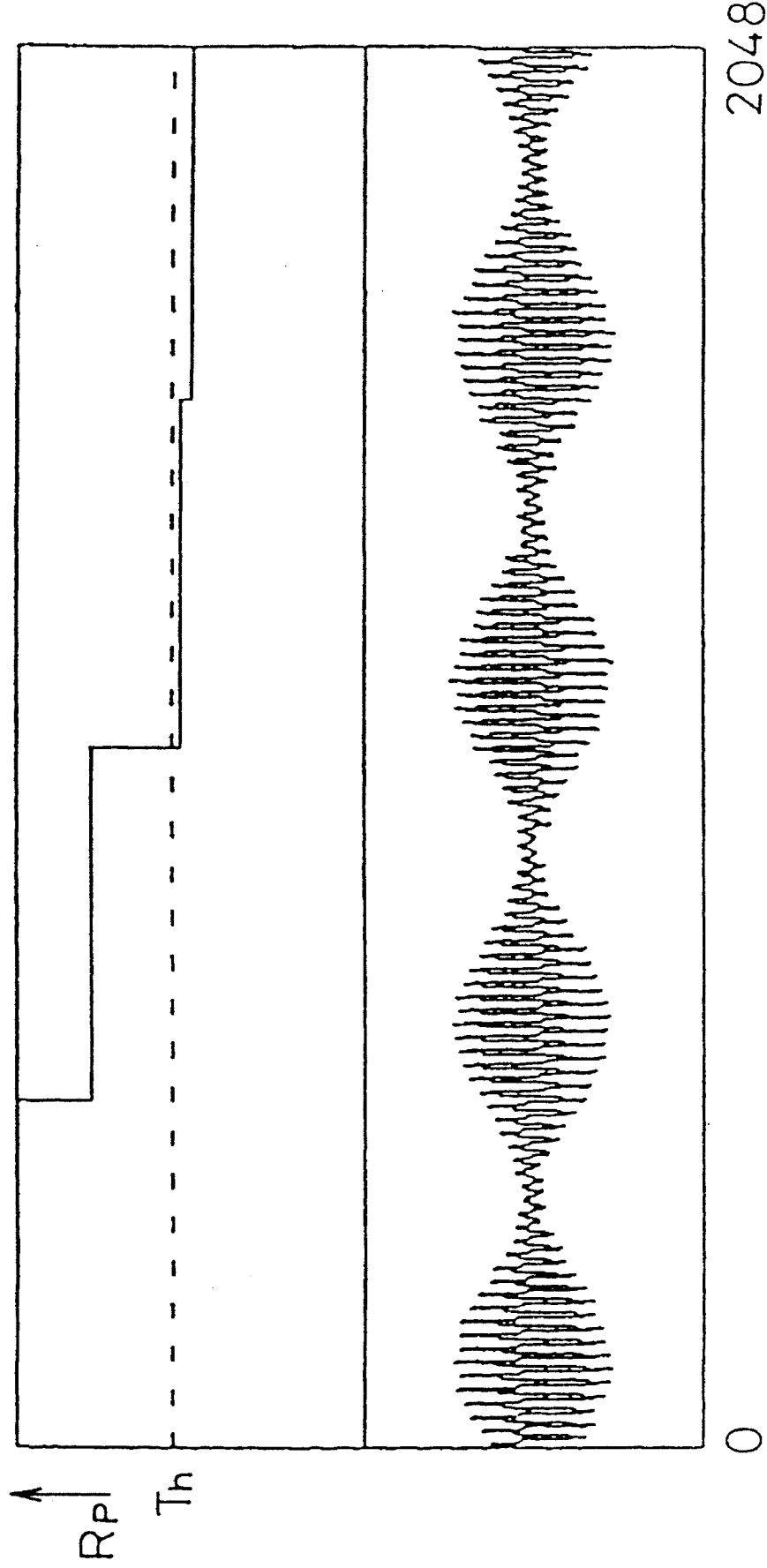
Fig.47A Renewal every 8, k=1.0, b=1, integration section 512 k=1, reset every certain time

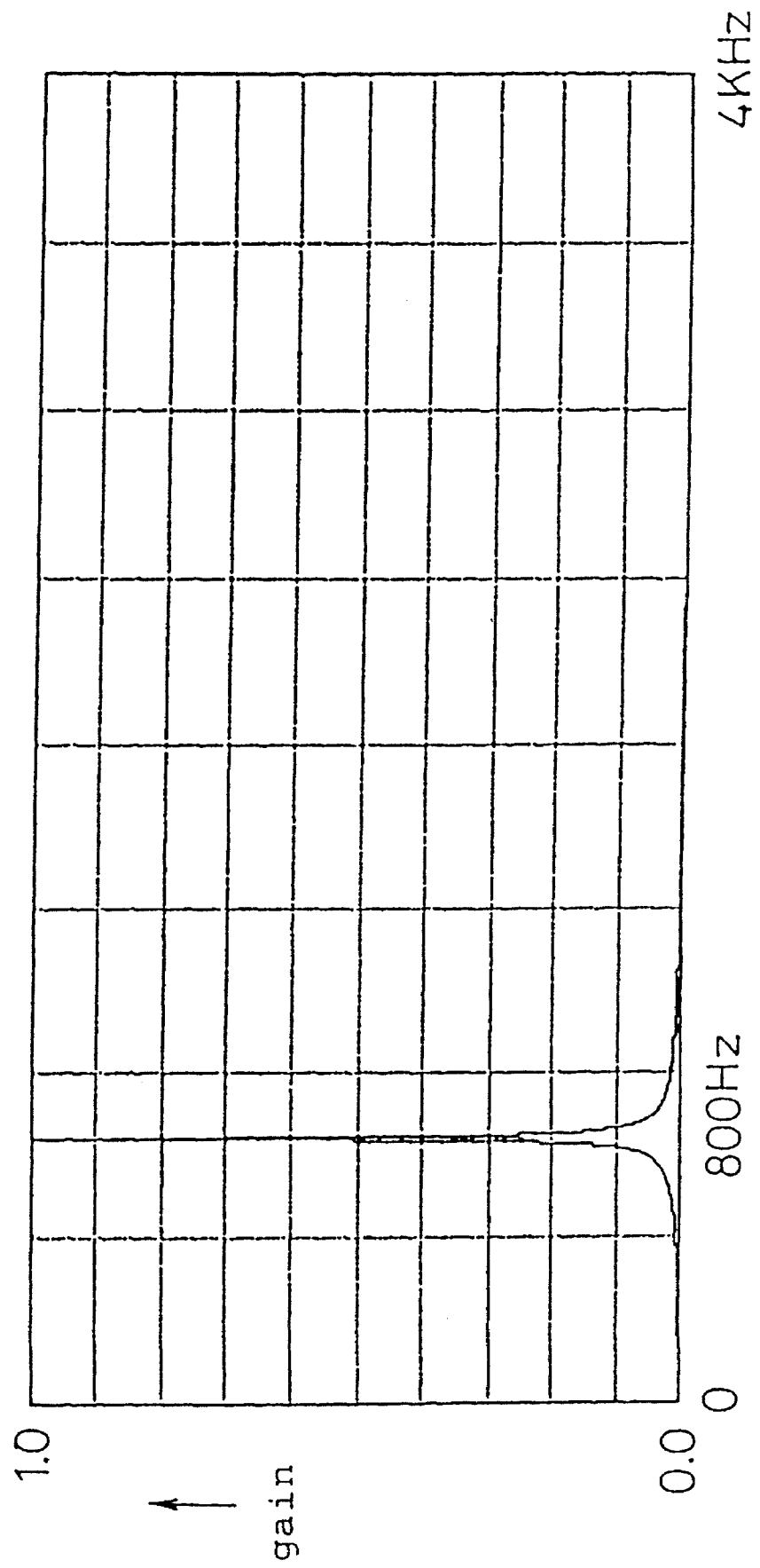
Fig. 52 (time constant 128 ms q=0.997753)

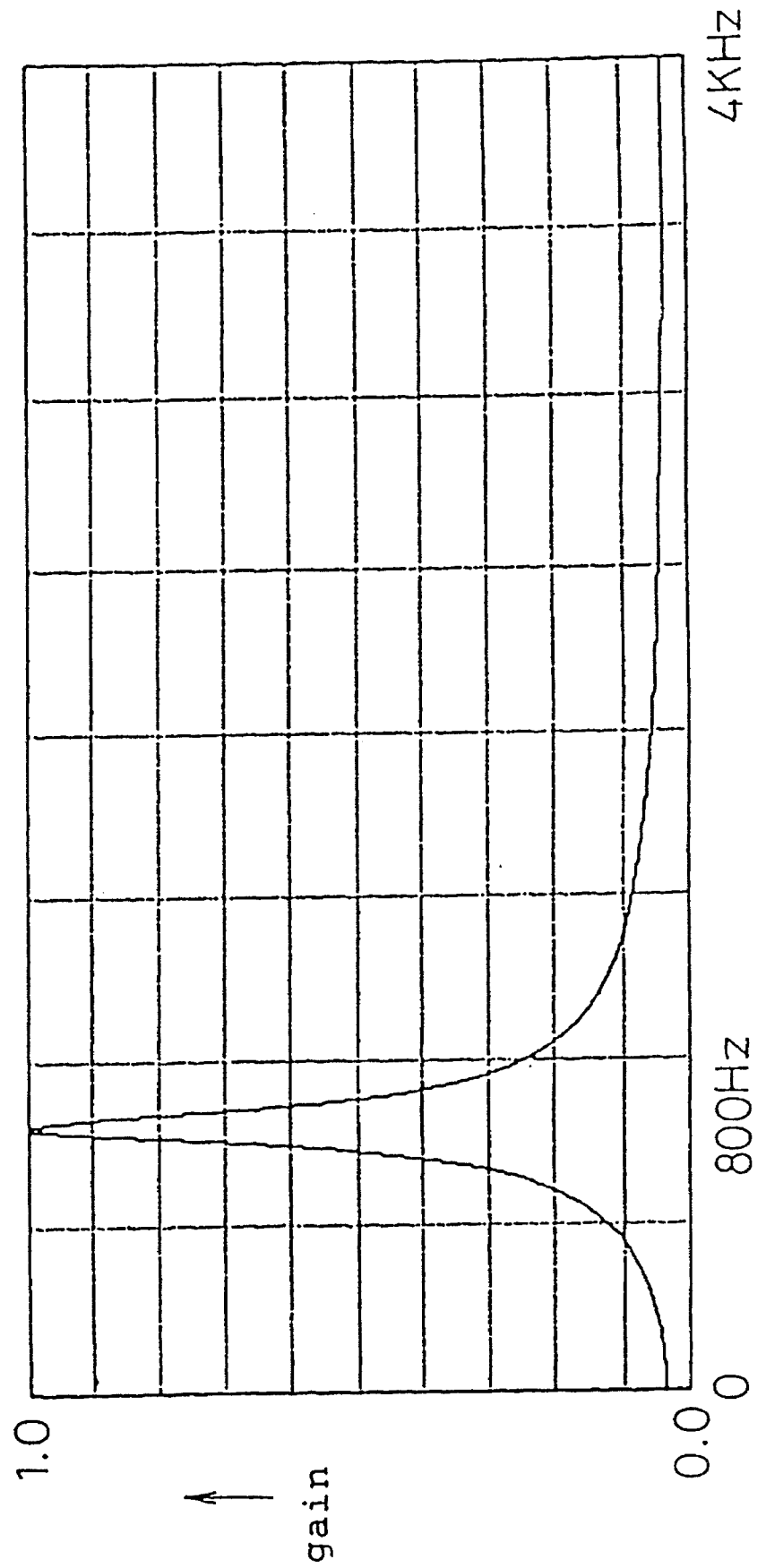
Fig. 53 time constant 8 ms q=0.964661

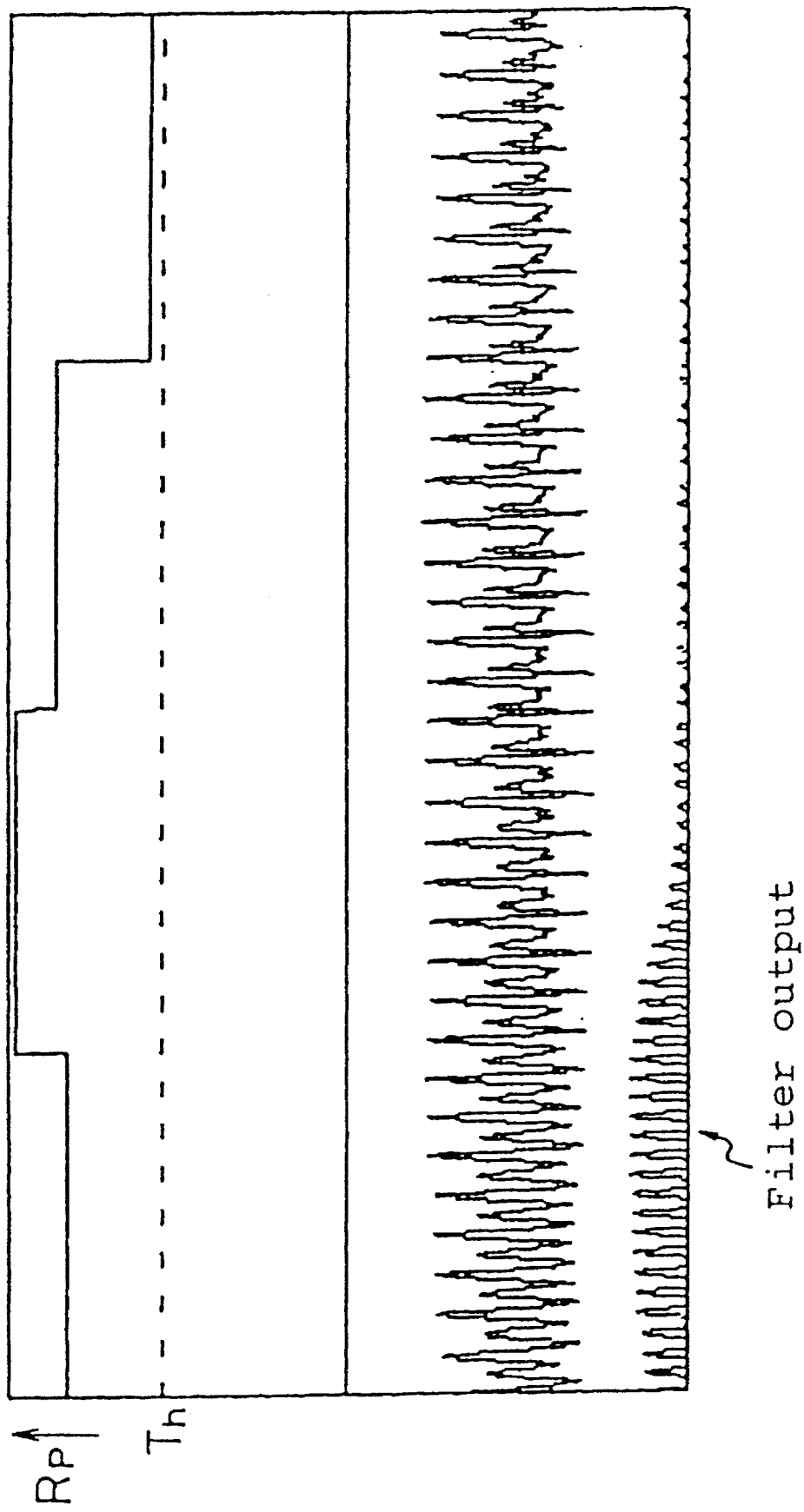

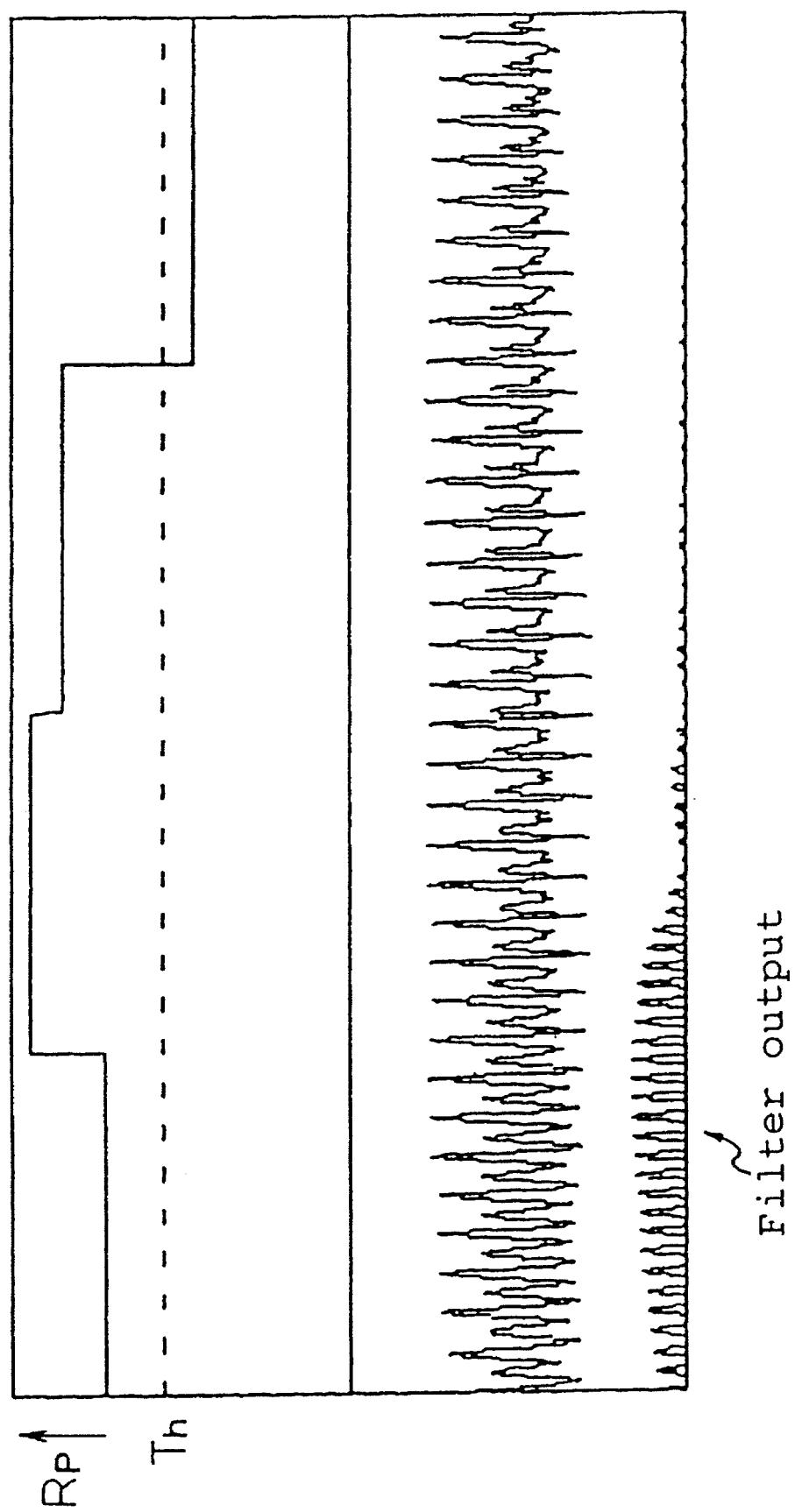
Fig.55A Speech (time constant 64 ms)

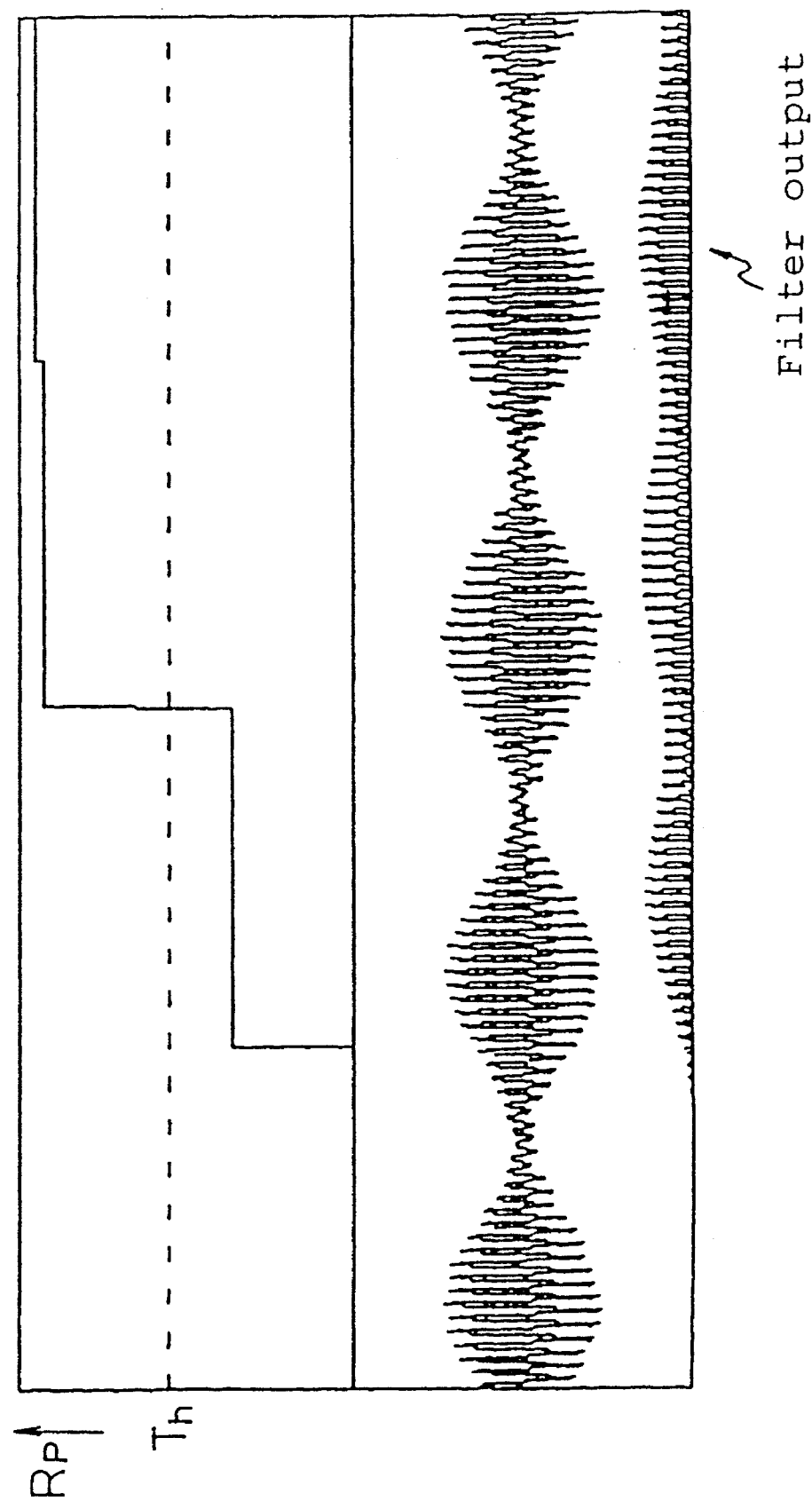

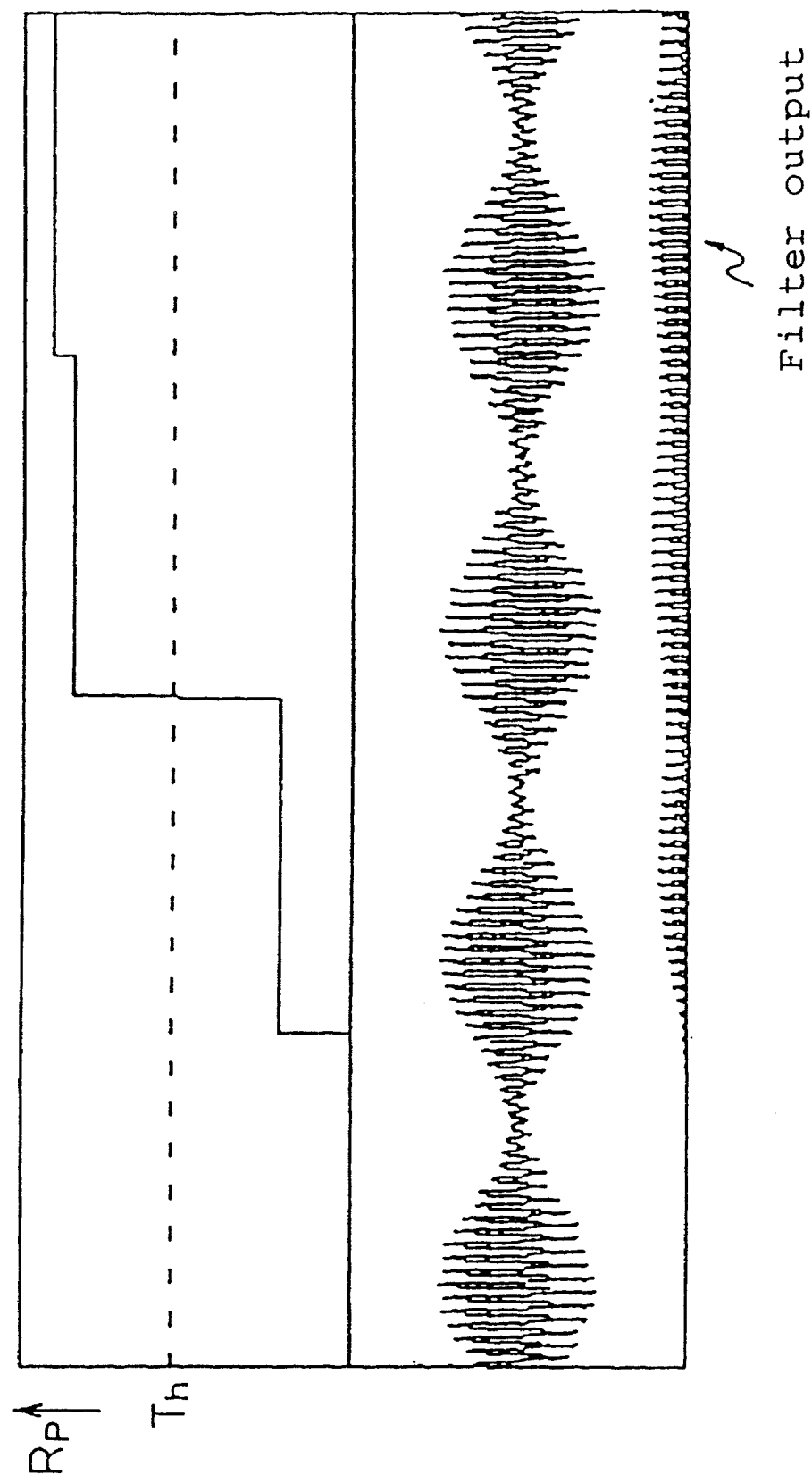

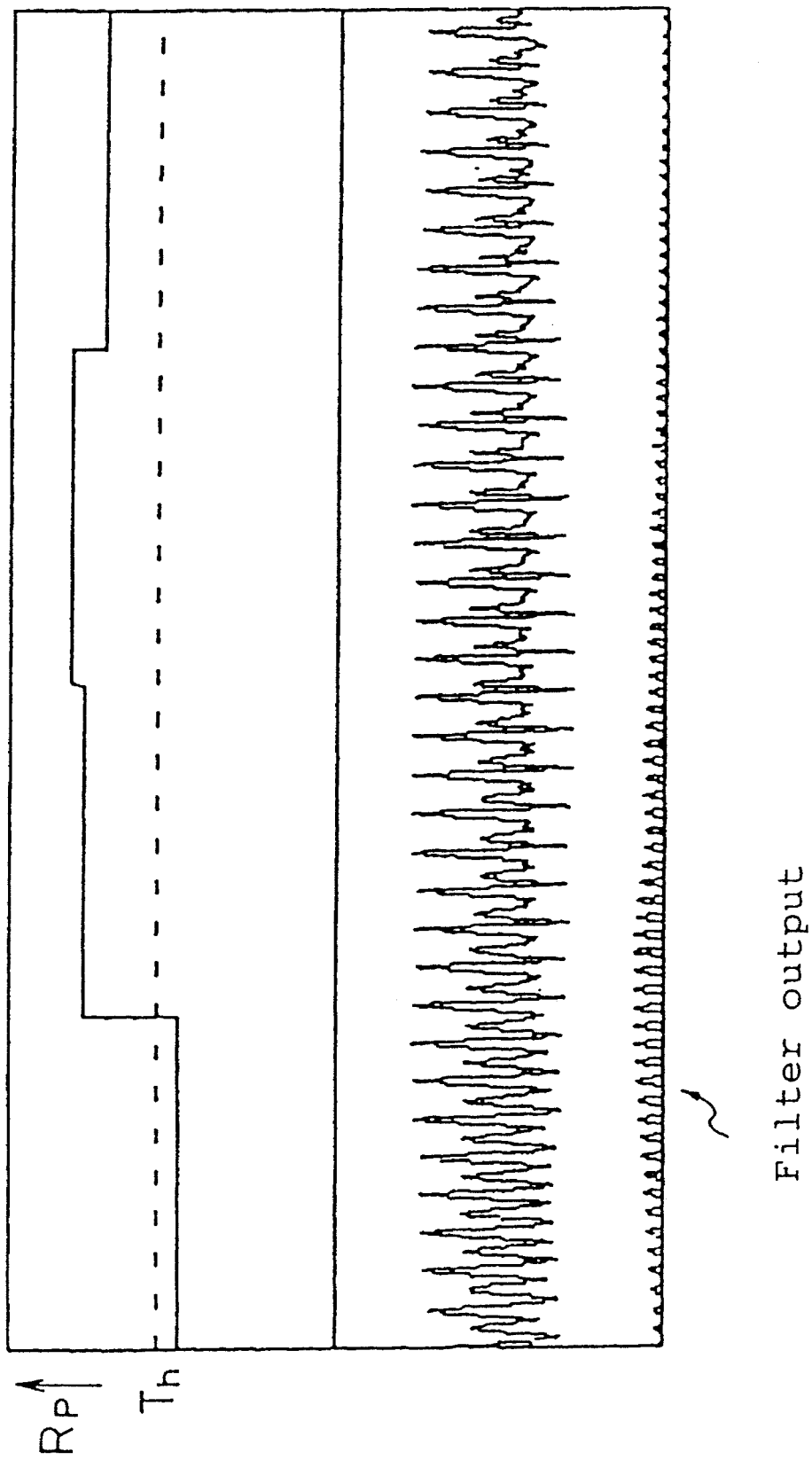
Fig.57A Speech (time constant 256 ms)

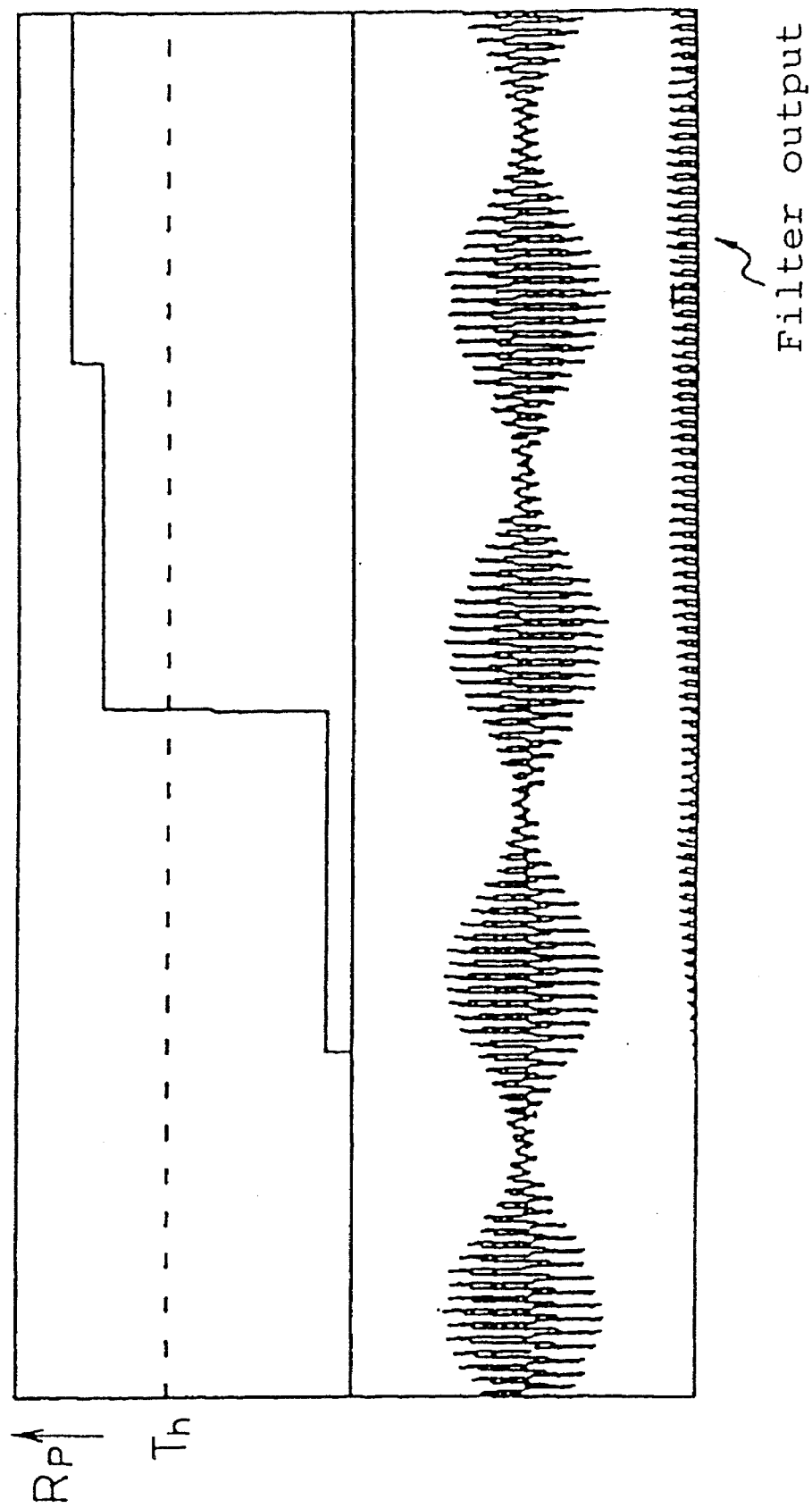
Fig. 57B Calling tone (time constant 256 ms)

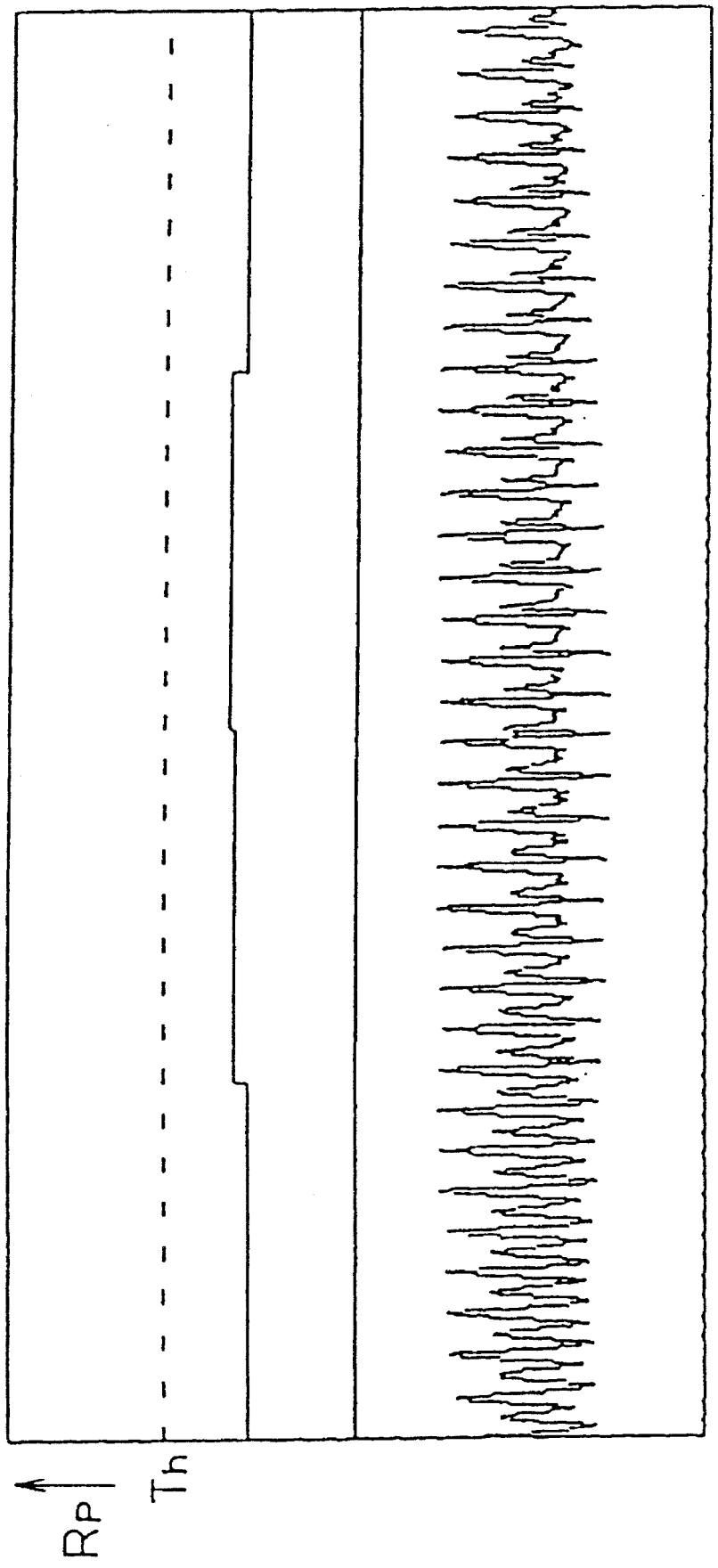

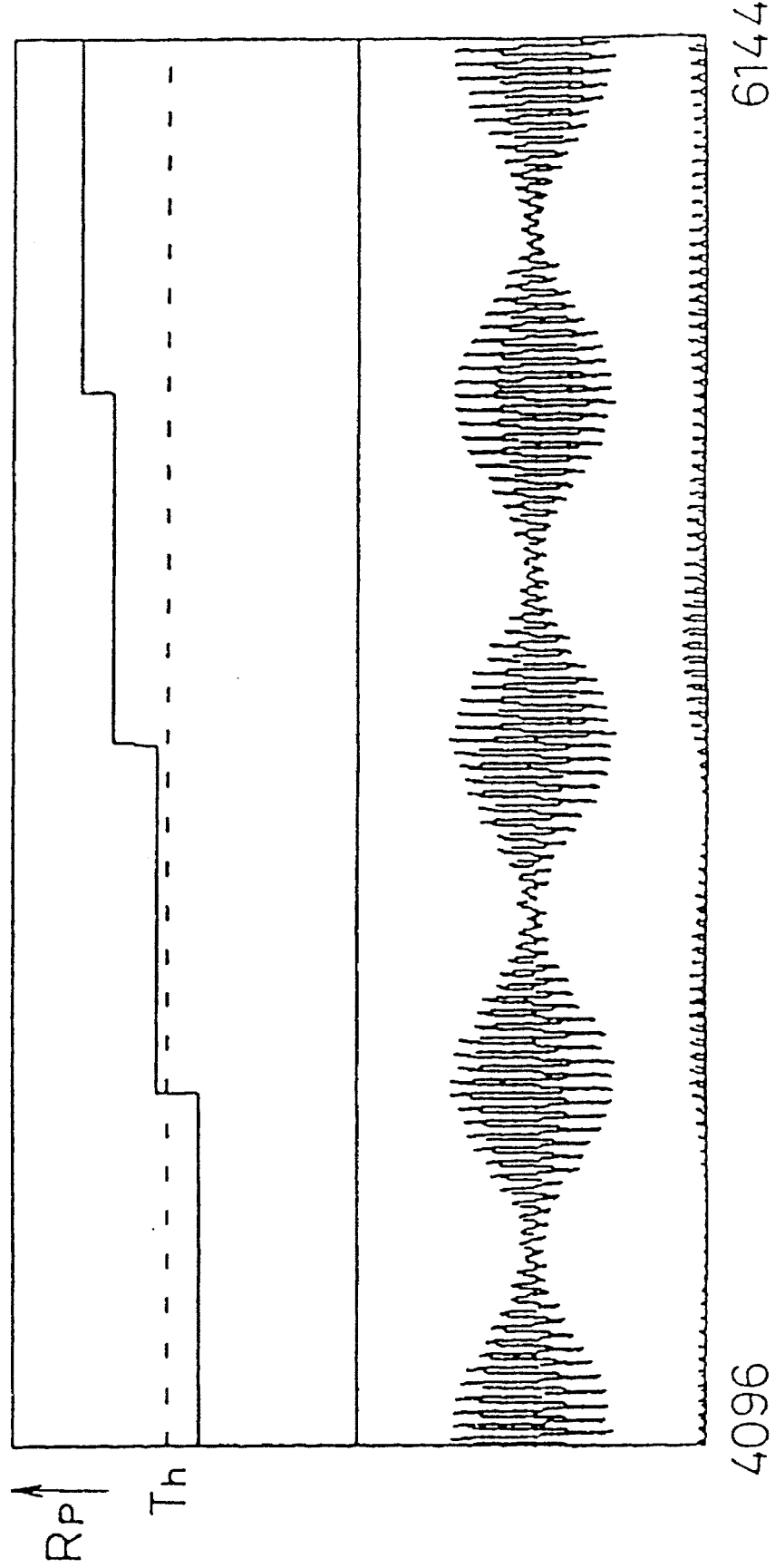
Fig. 58B Calling tone (time constant 64 ms, k=0.01)

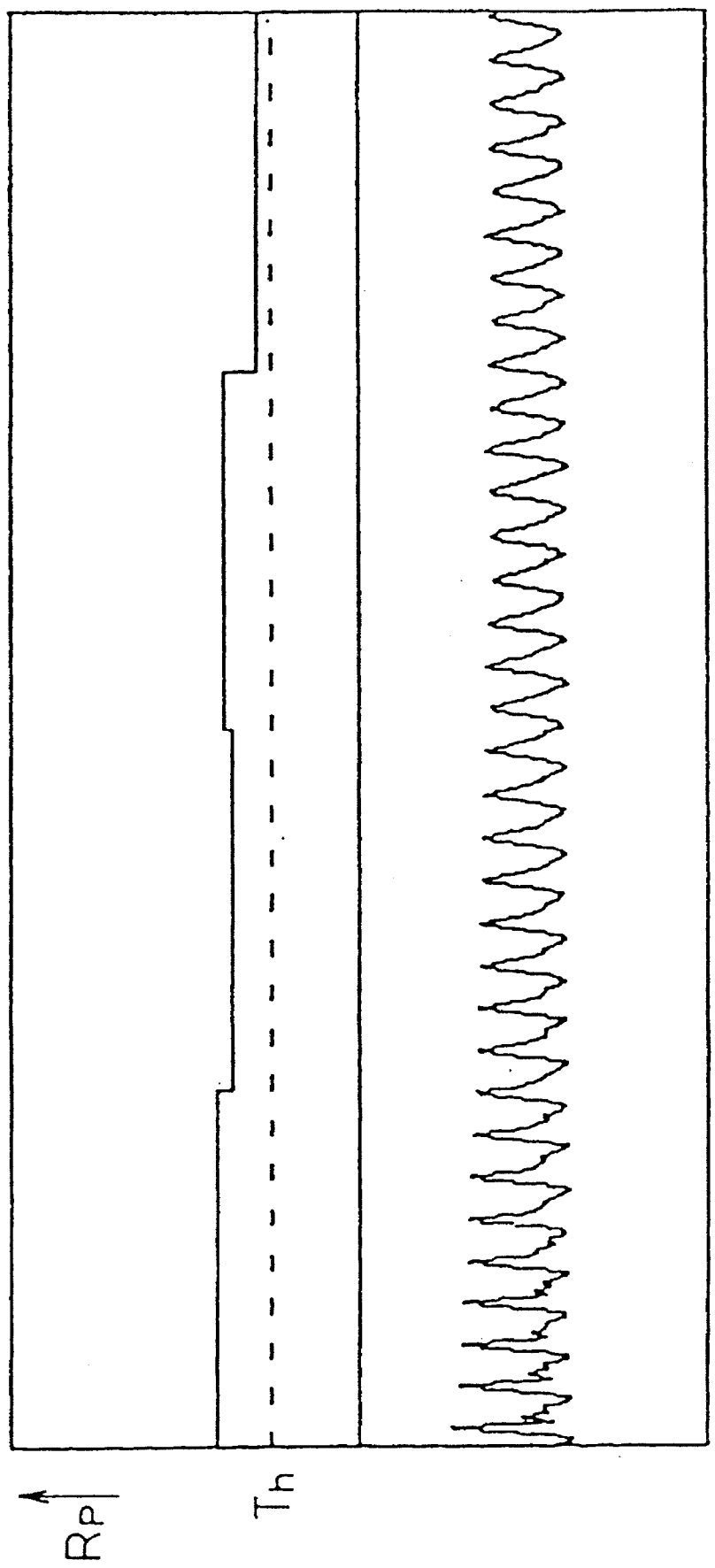
Fig.59A (K=1.0) 4 time average

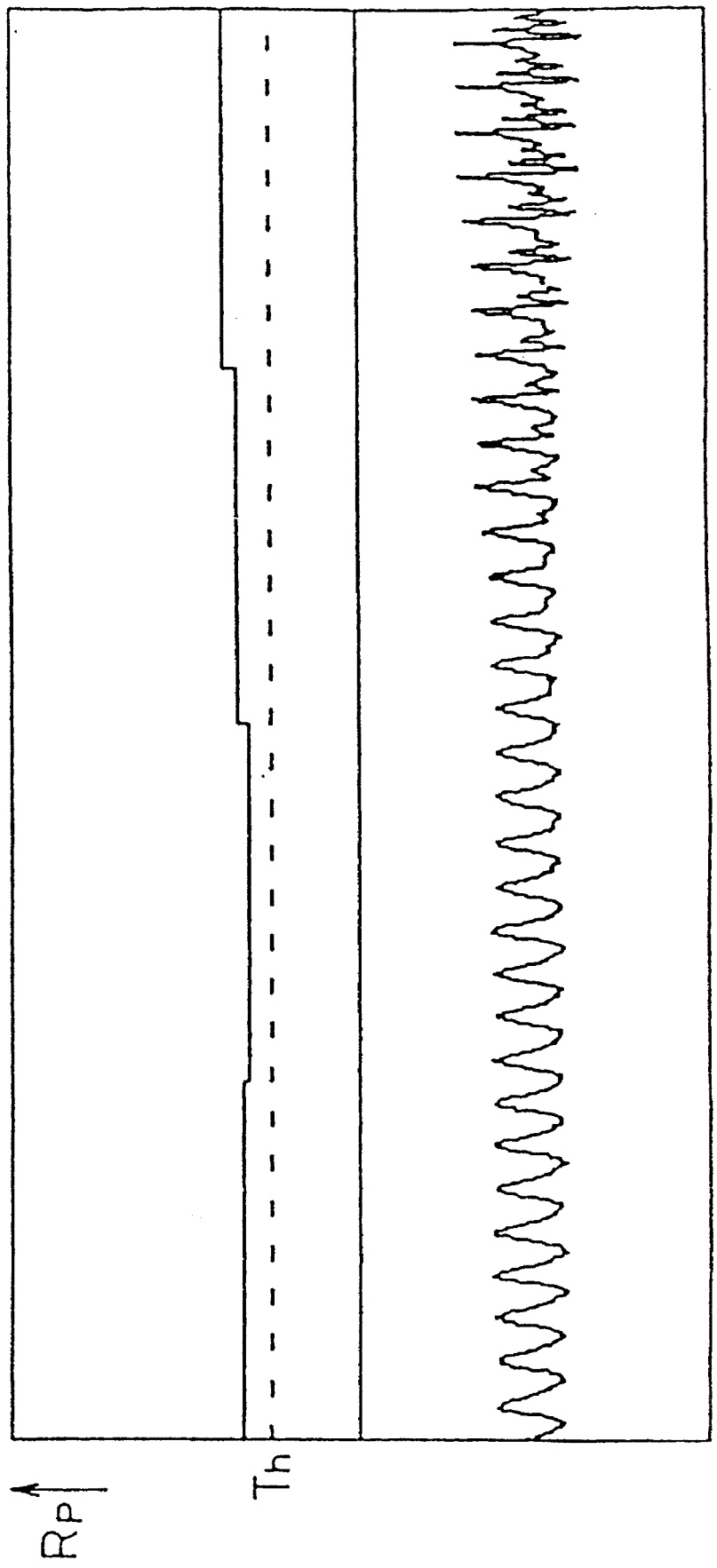
Fig. 59B (K=1.0) 4 time average

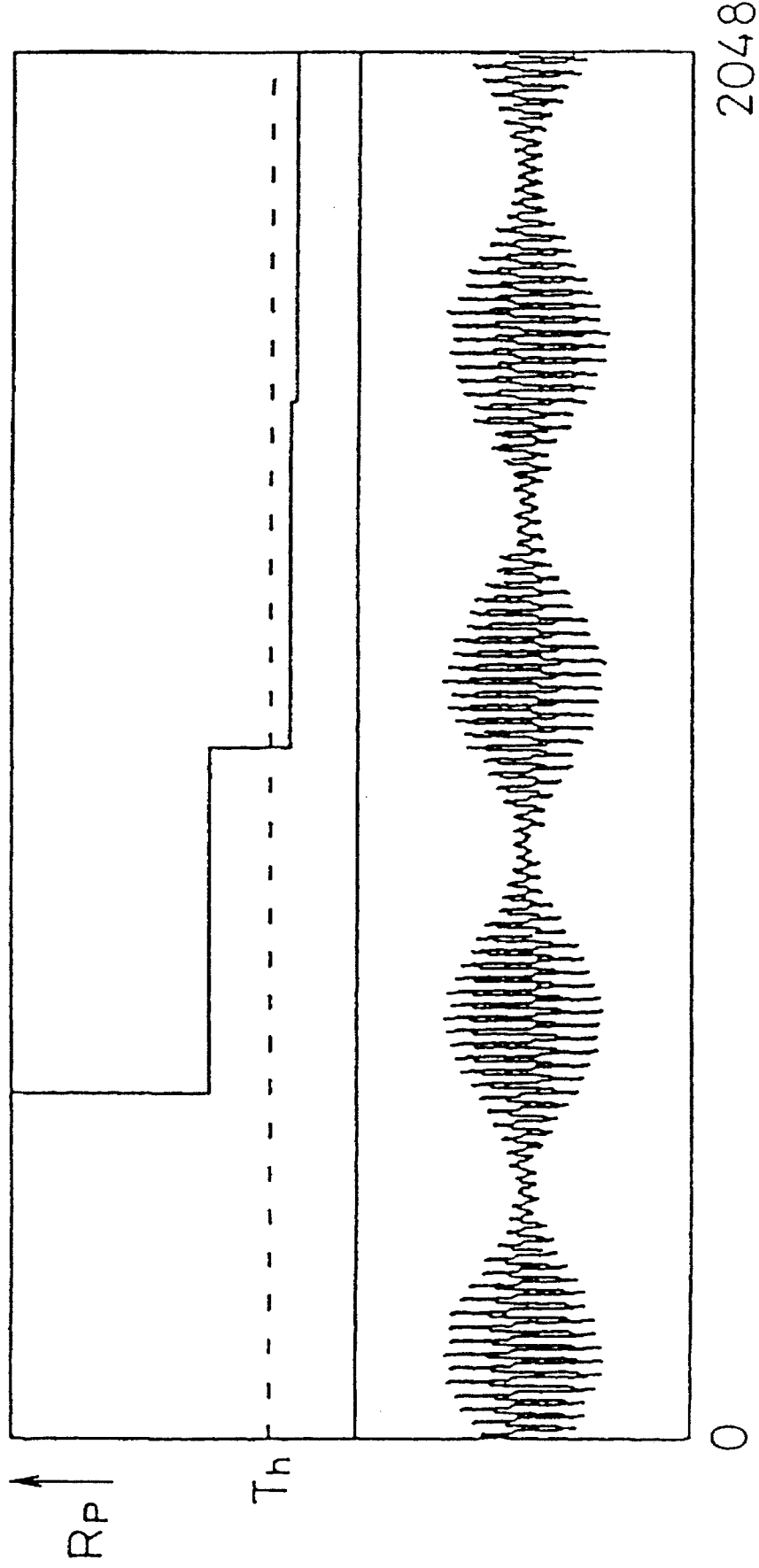
Fig. 59C (k=1.0) 4 time average

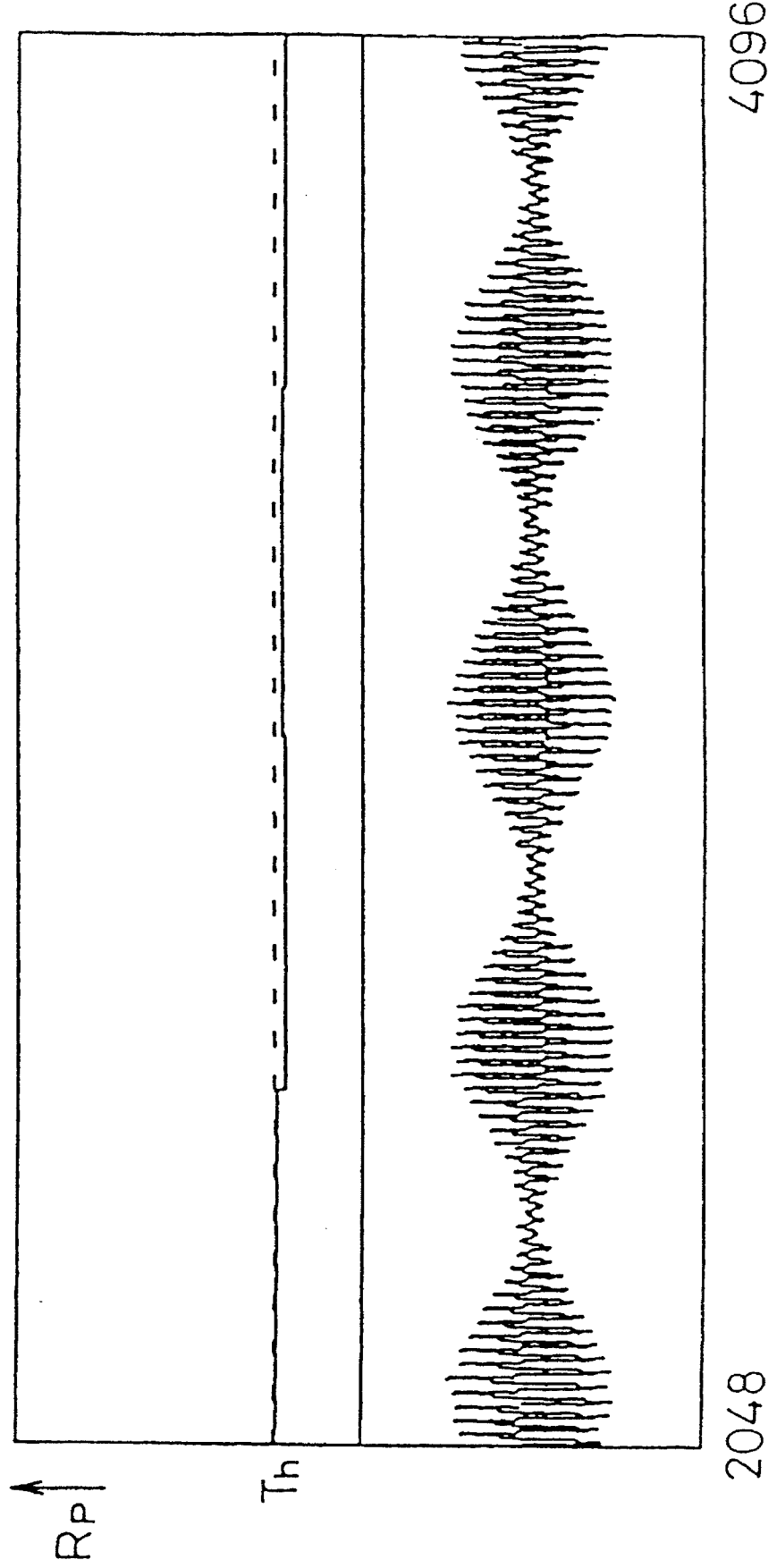
Fig. 59D (k=1.0) 4 time average

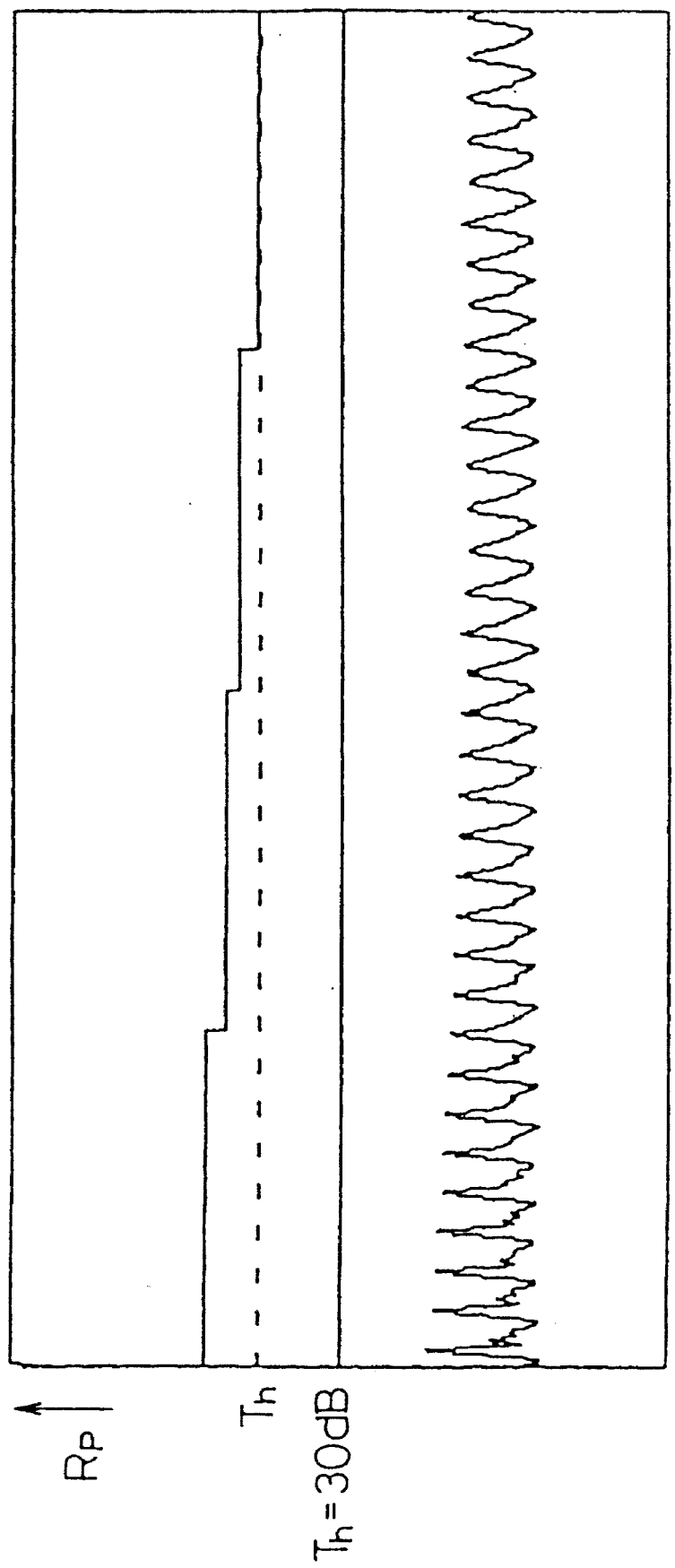

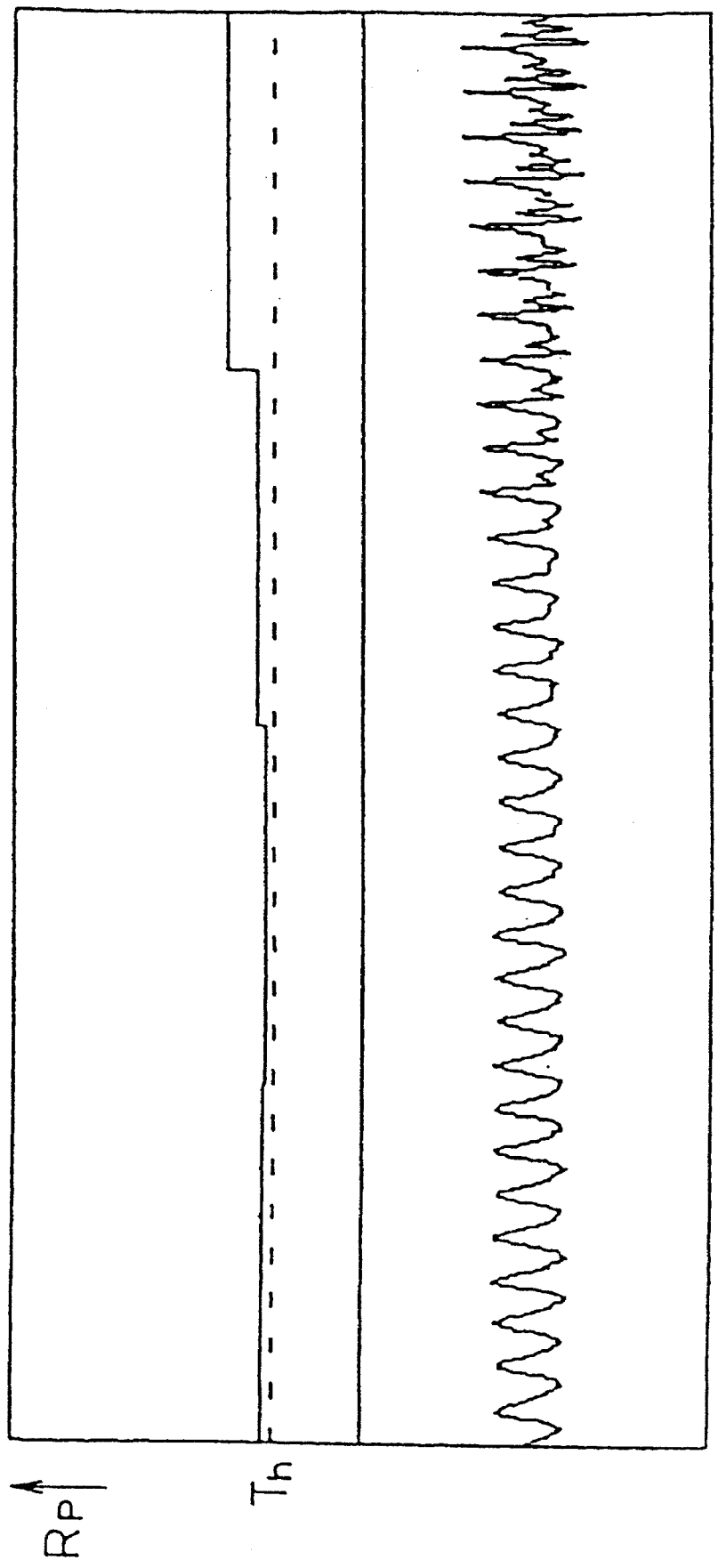
Fig. 60B (K=1.0) 8 time average

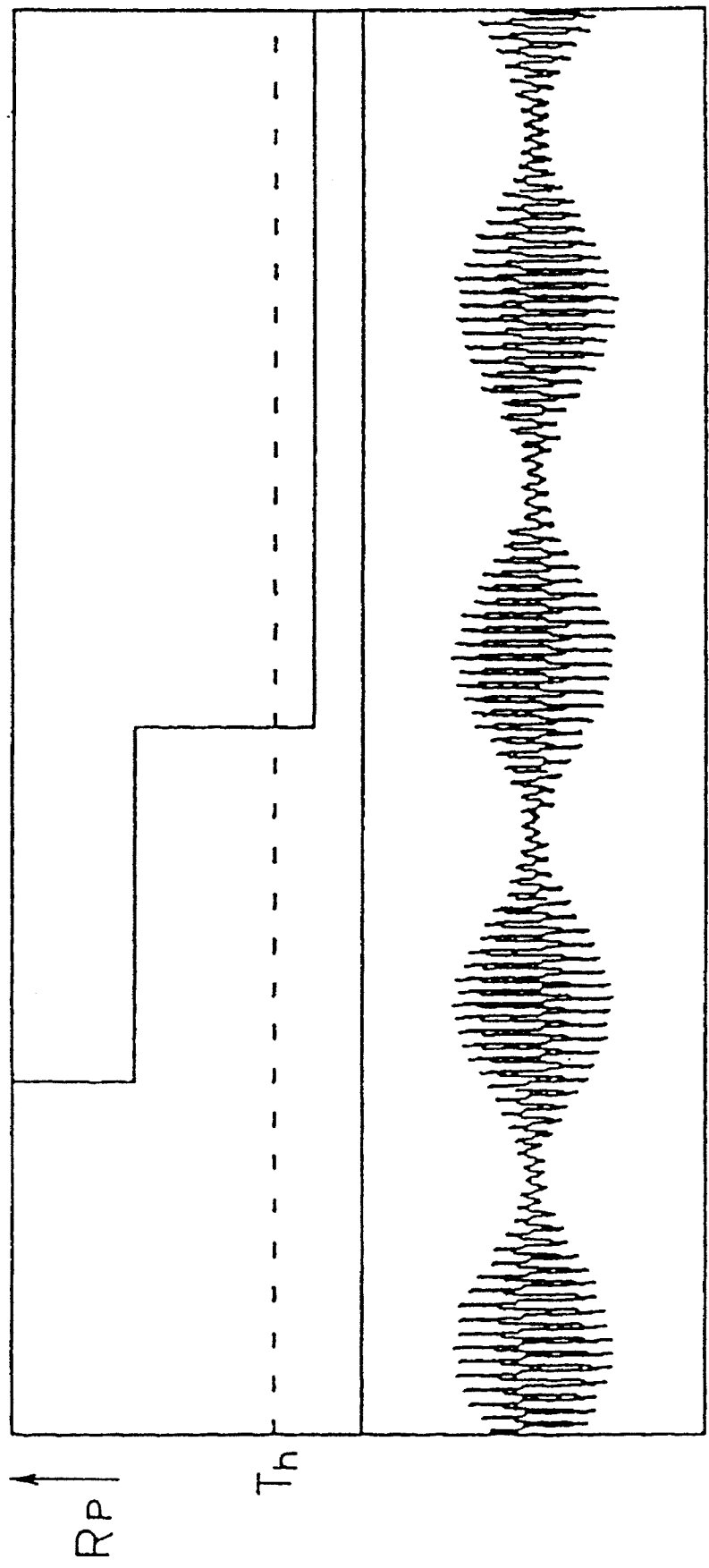

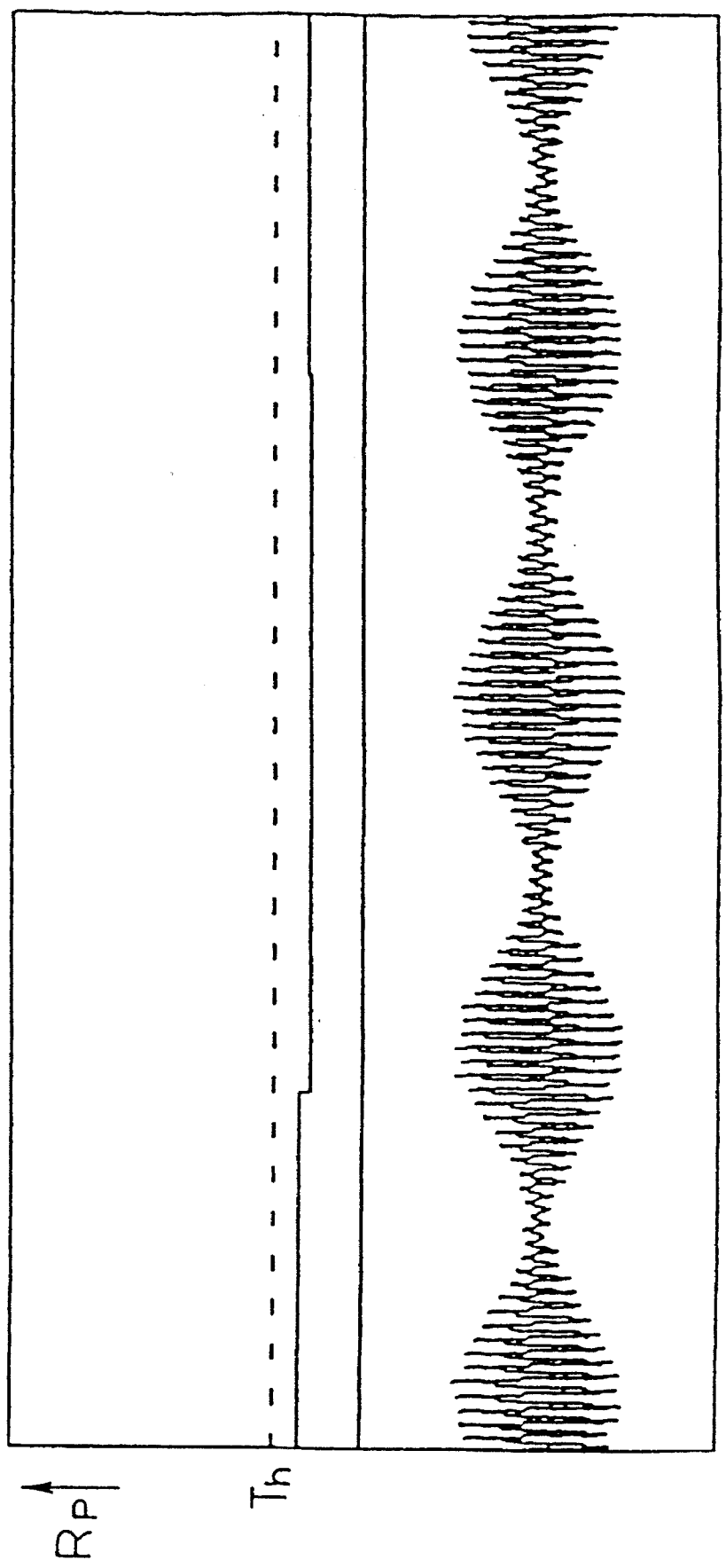
Fig. 60D (k=1.0) 8 time average

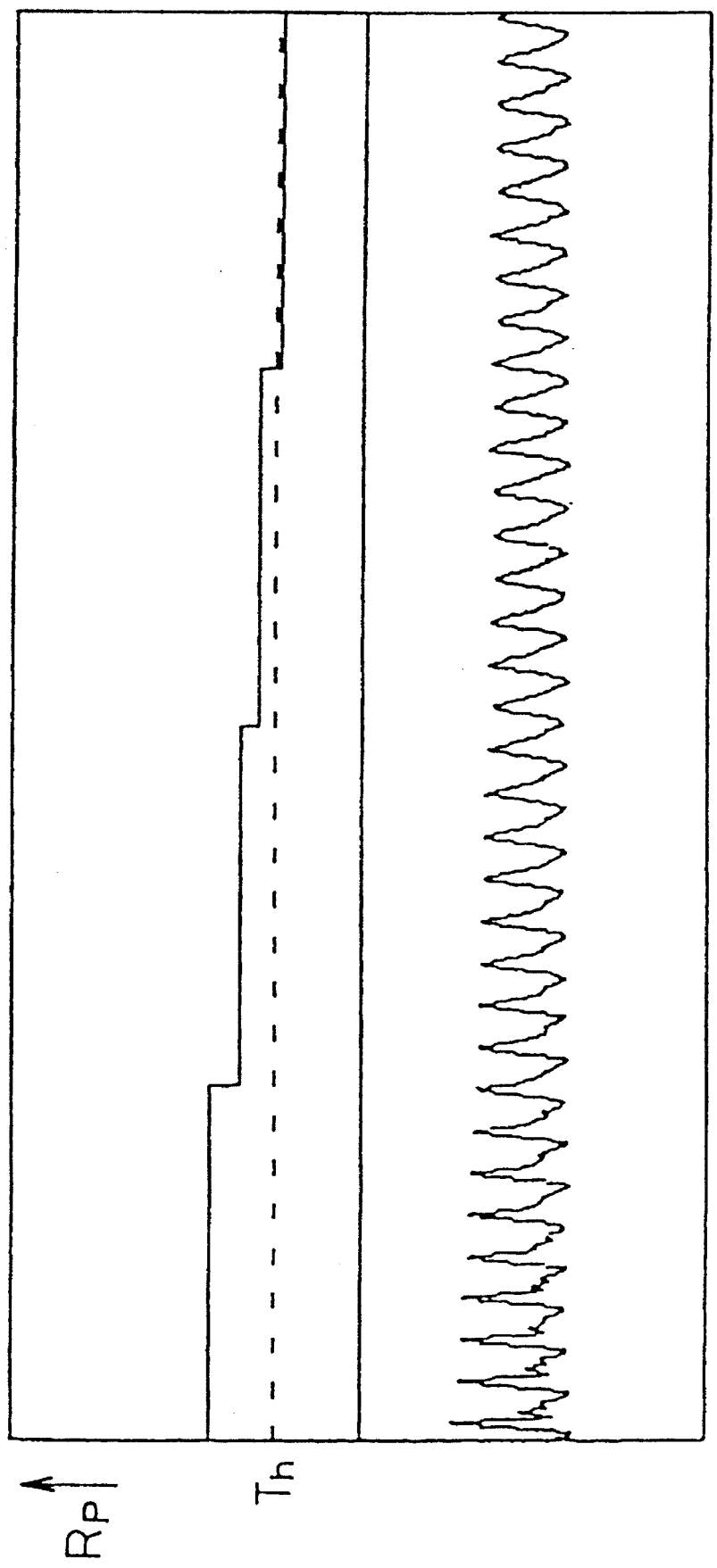

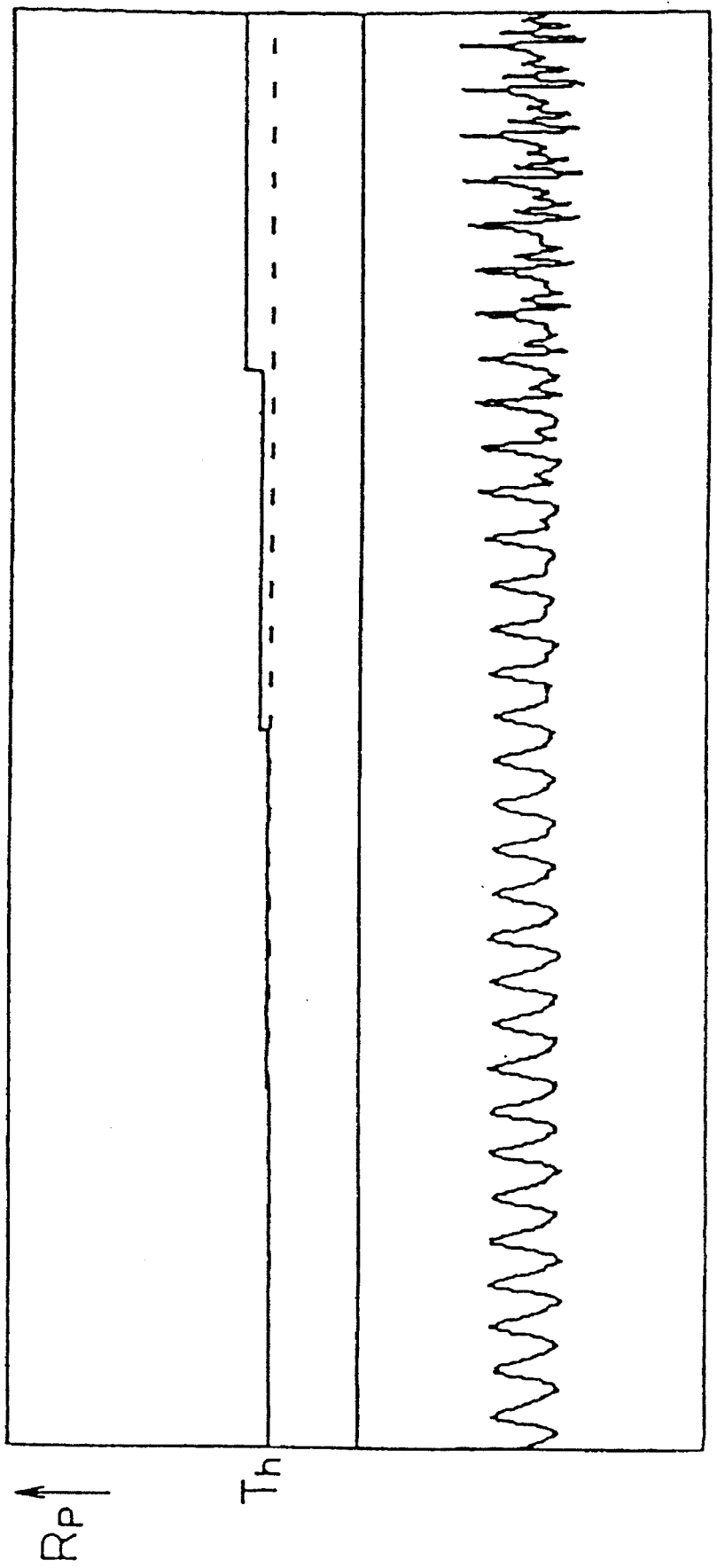
Fig.61B (k=1.0) 16 time average

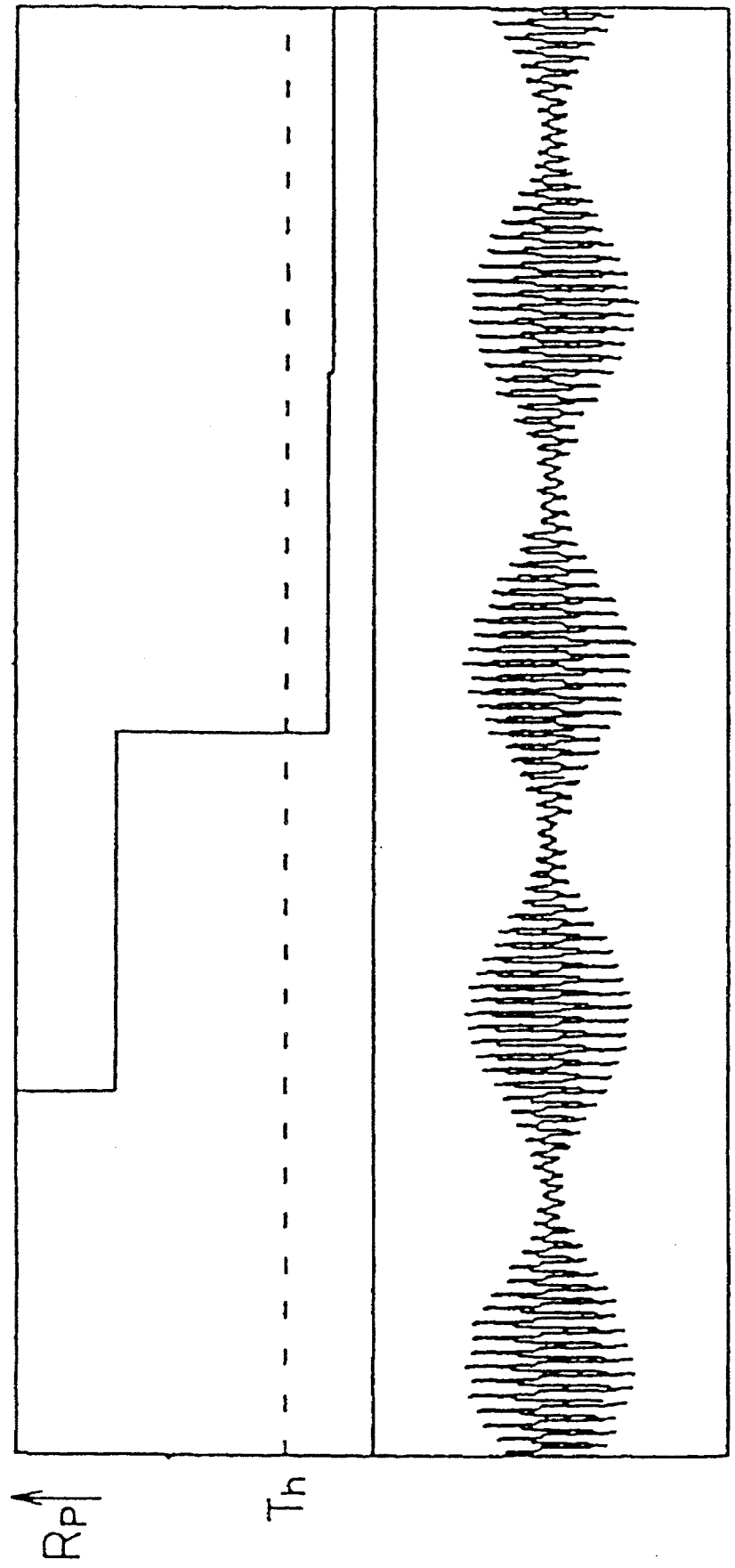
Fig. 61C (k=1.0) 16 time average

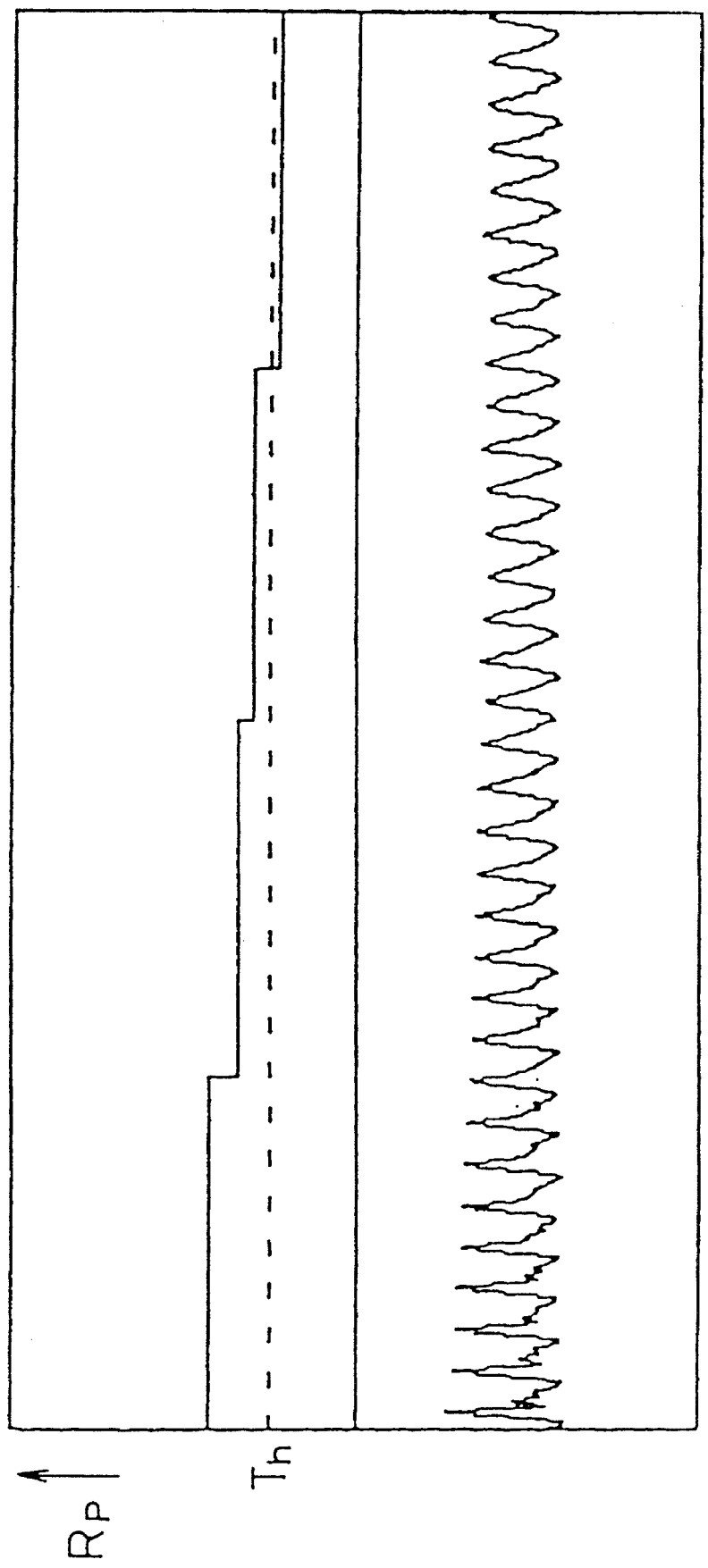
Fig. 62A (k=1.0) 32 time average

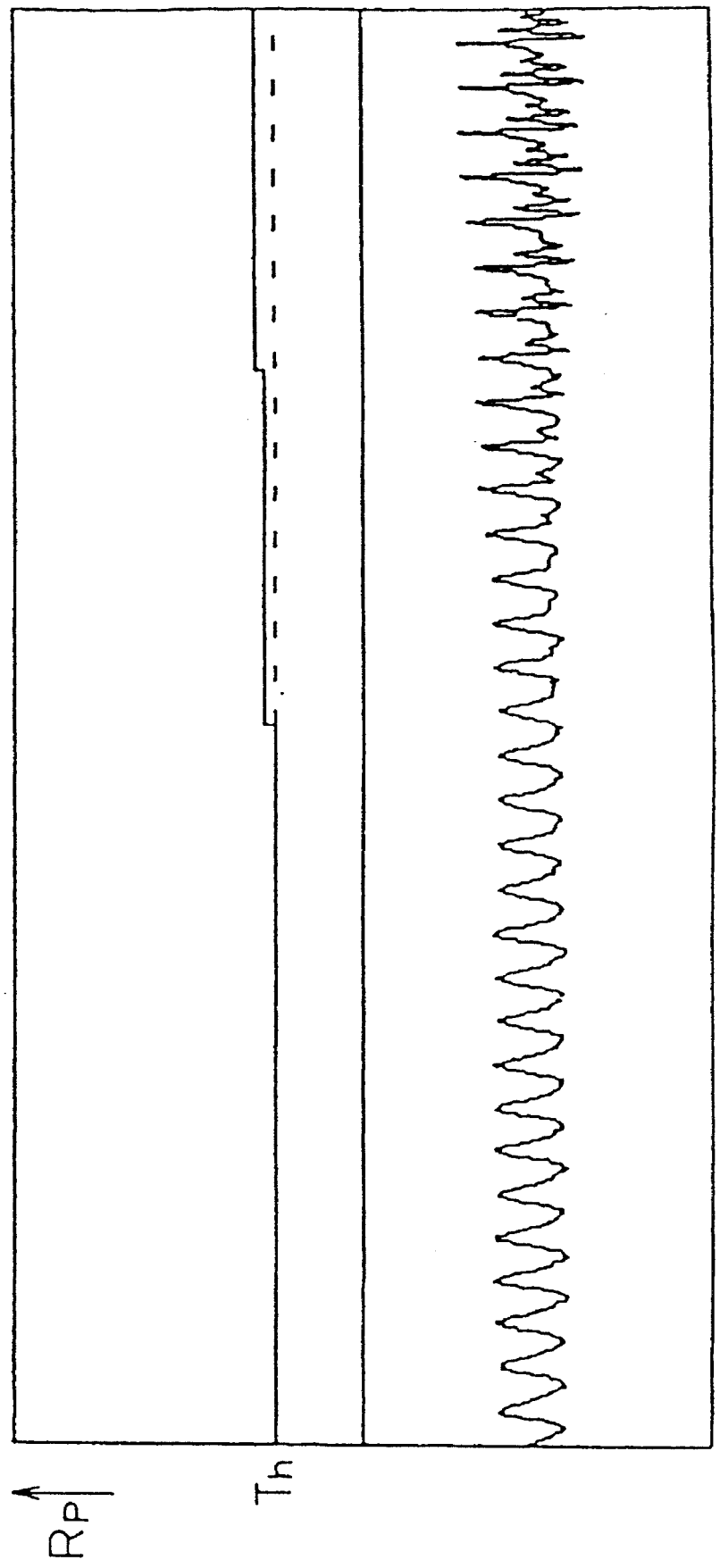
Fig. 62B (k=1.0) 32 time average

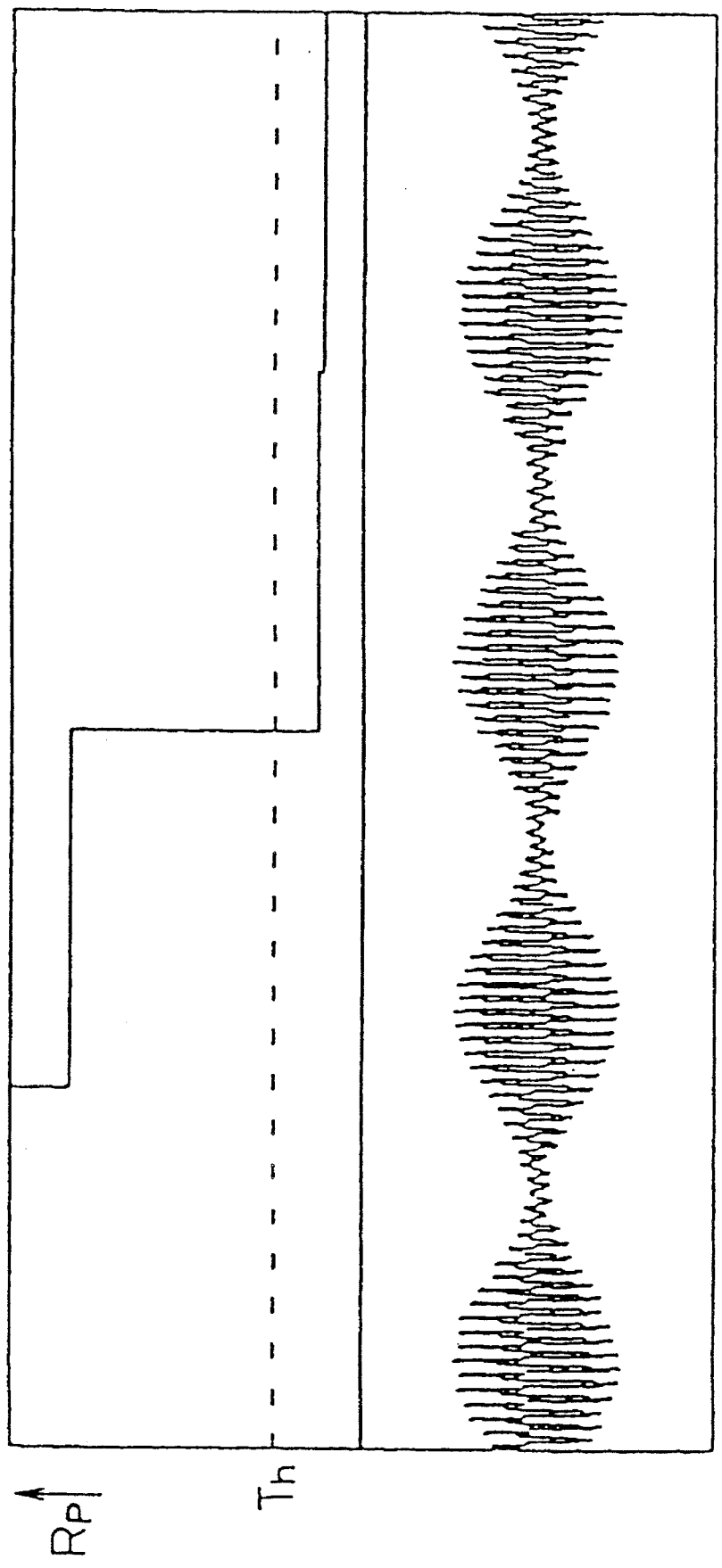
Fig. 62C (k=1.0) 32 time average

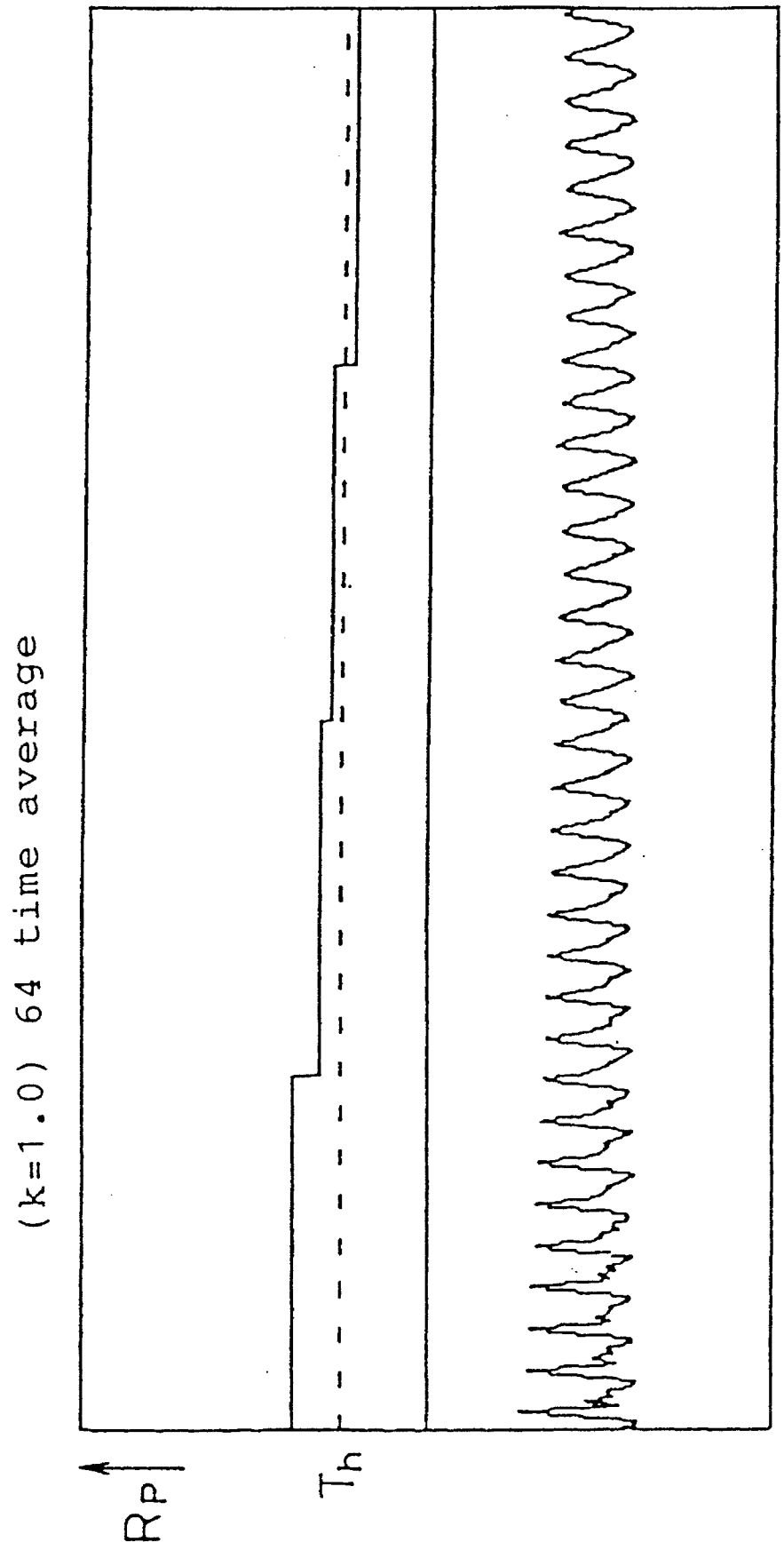
Fig. 63A  (k=1.0) 64 time average

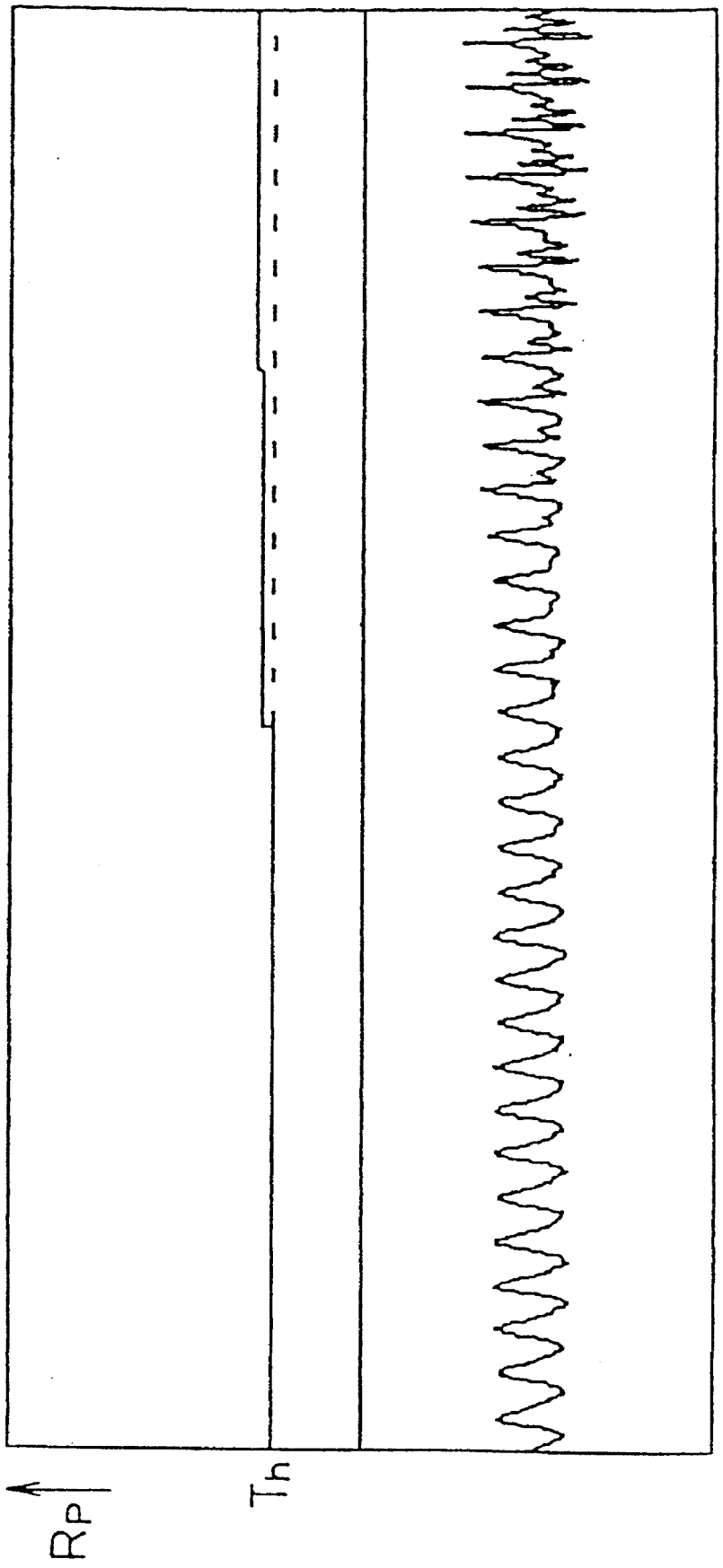

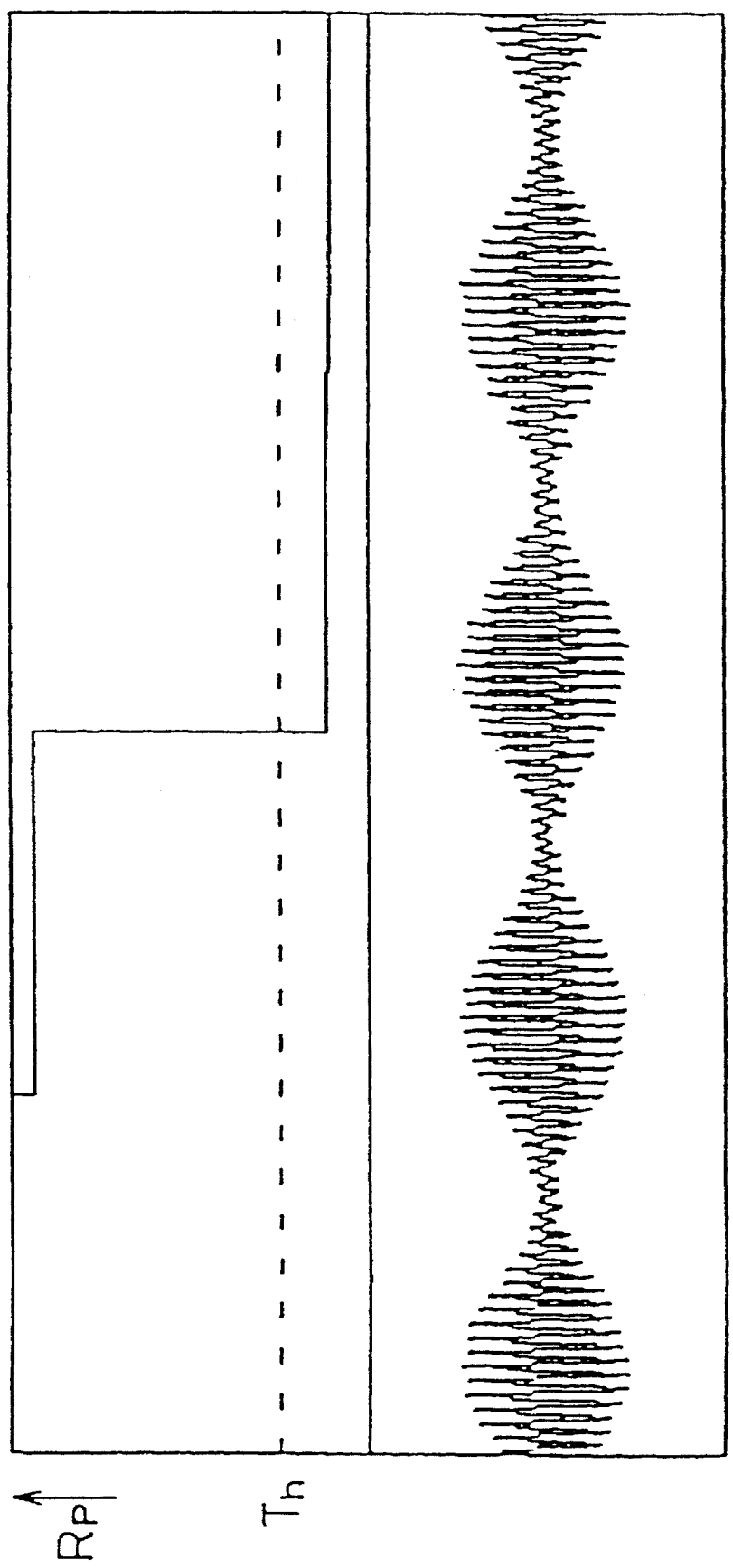
Fig. 63C  (k=1.0) 64 time average

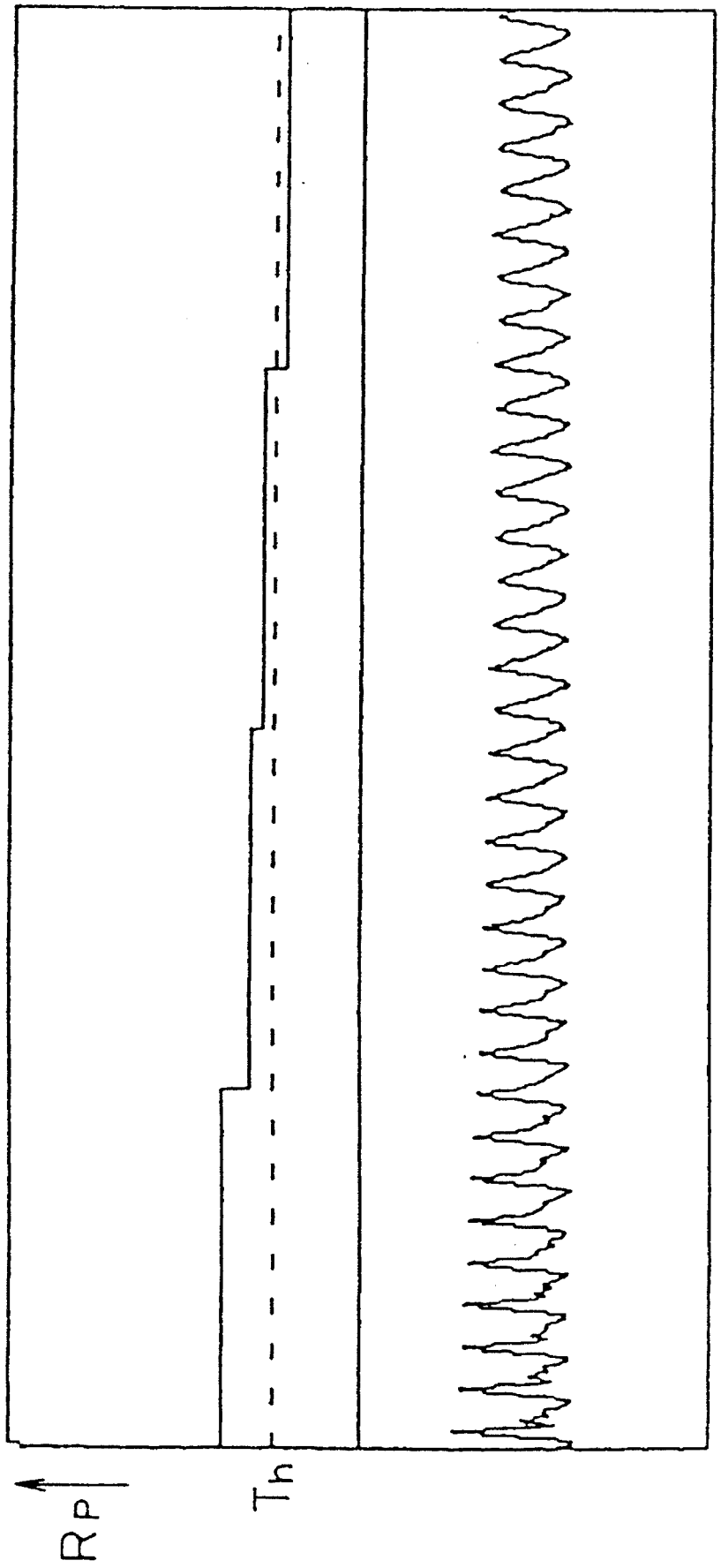

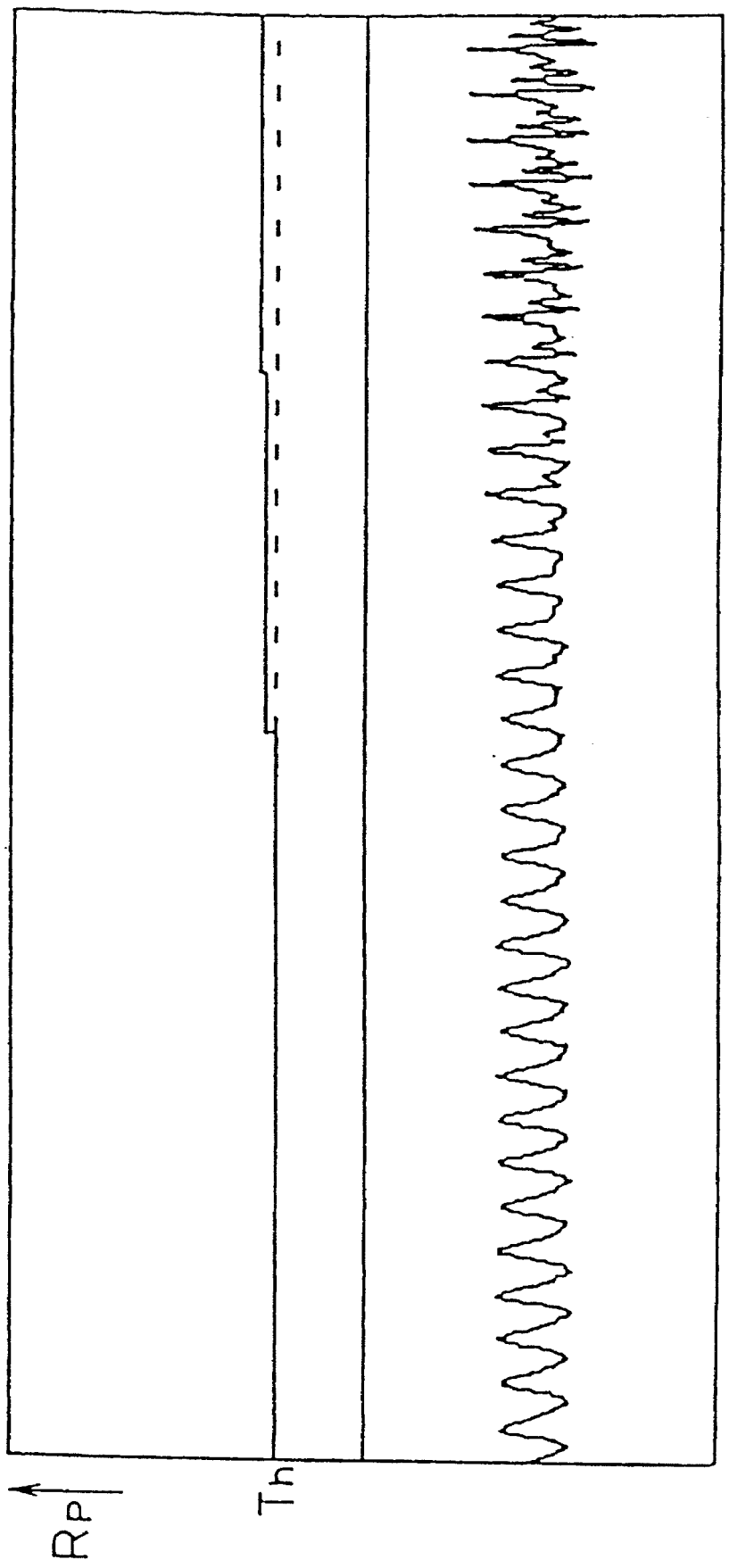
Fig.64B (K=1.0) 128 time average (K=1.0) 128 time average

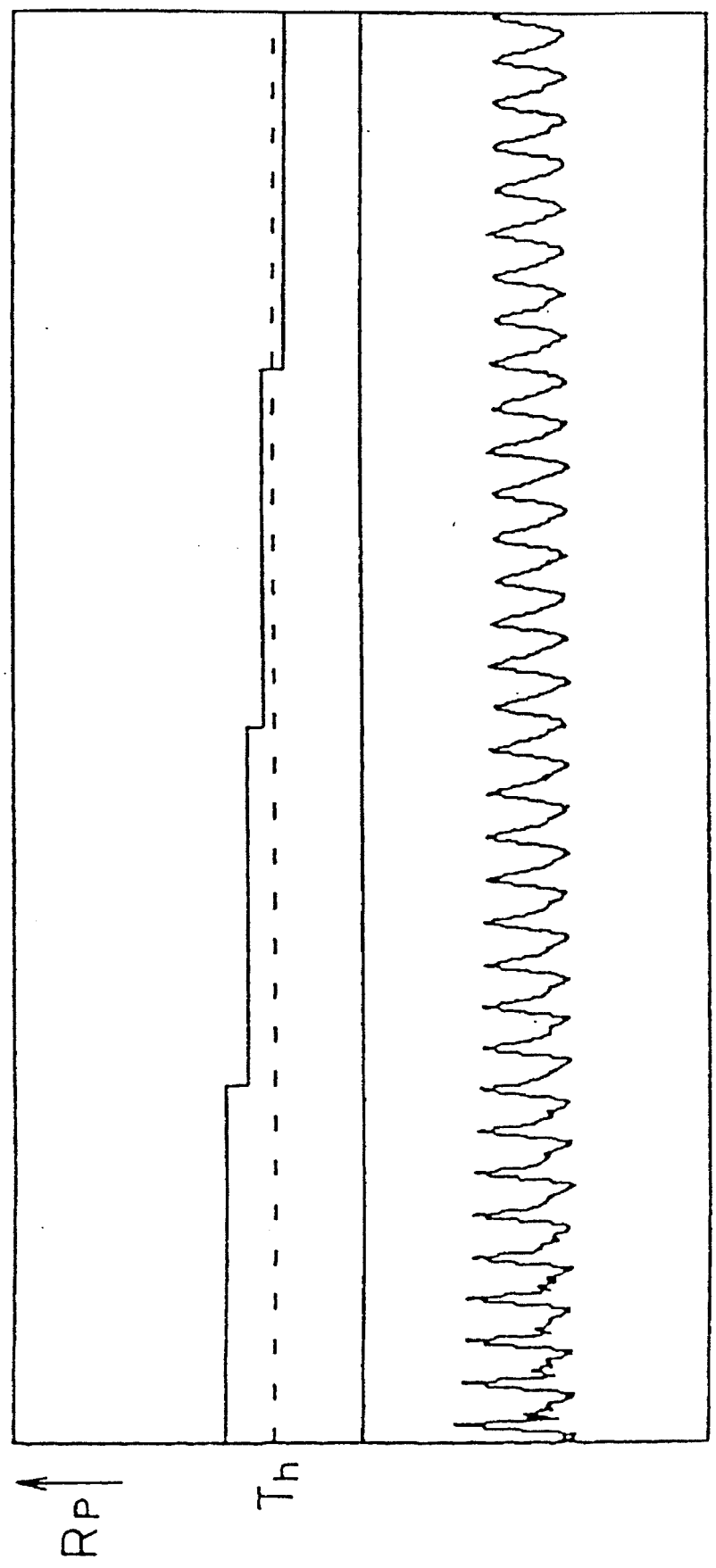

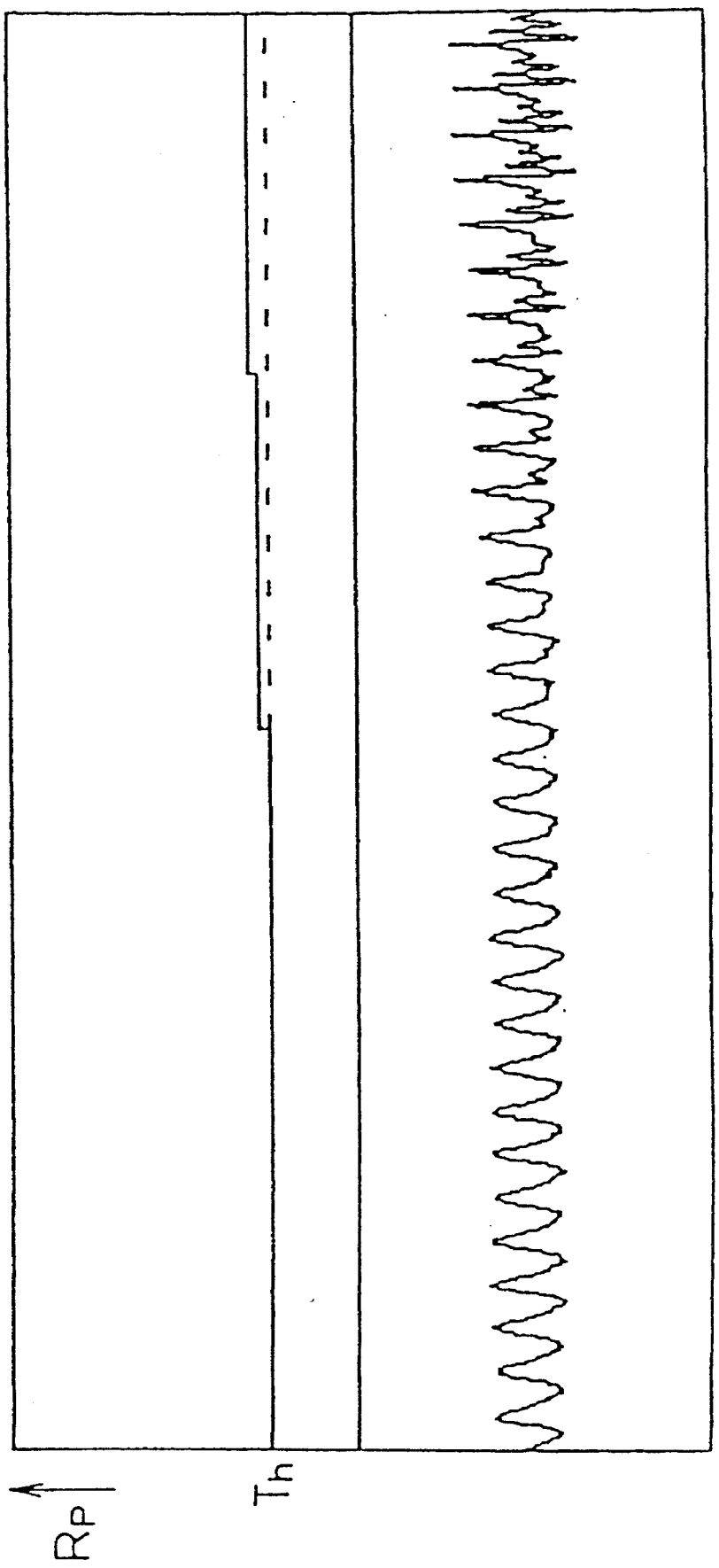
Fig. 65B (K=1.0) 256 time average

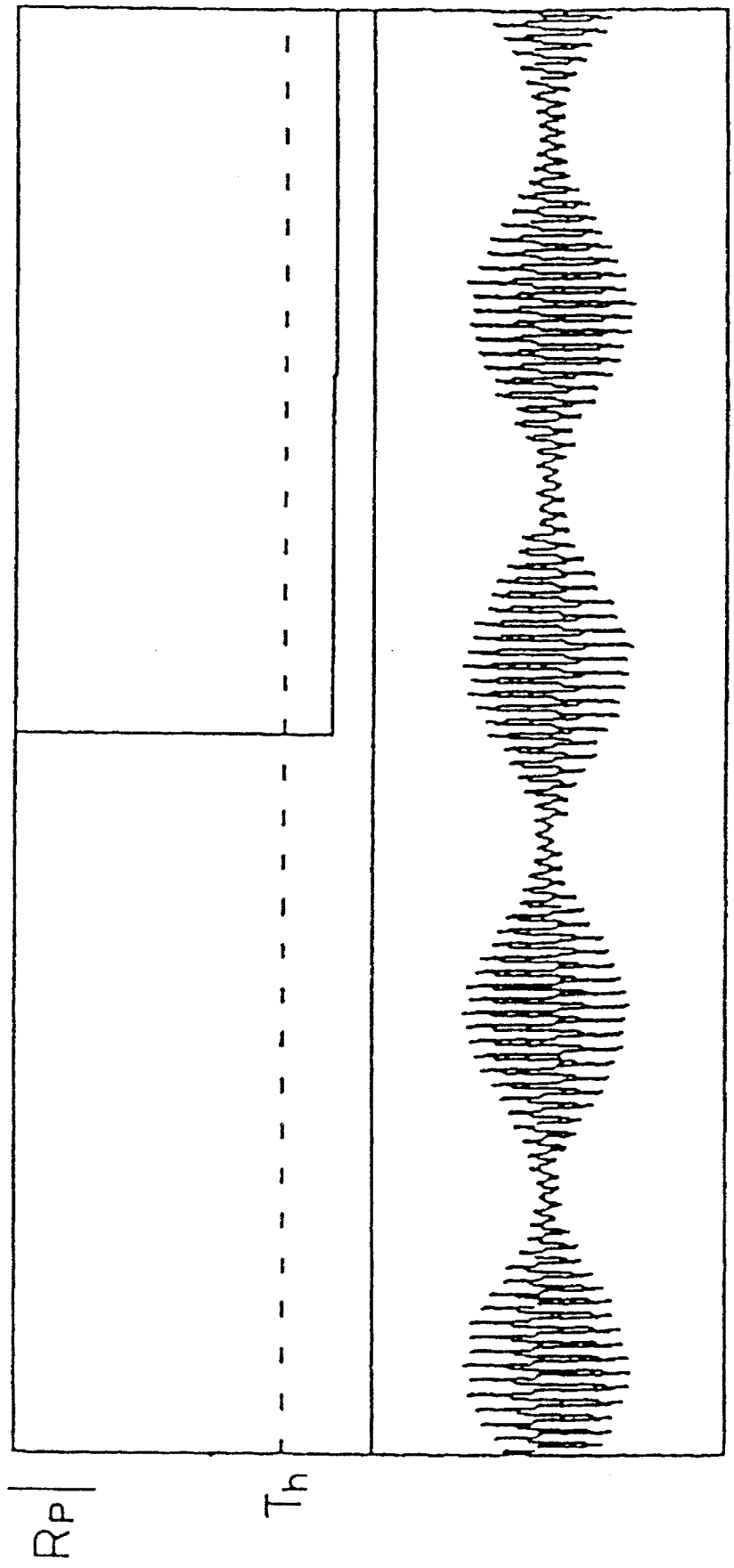
Fig. 65C (K=1.0) 256 time average

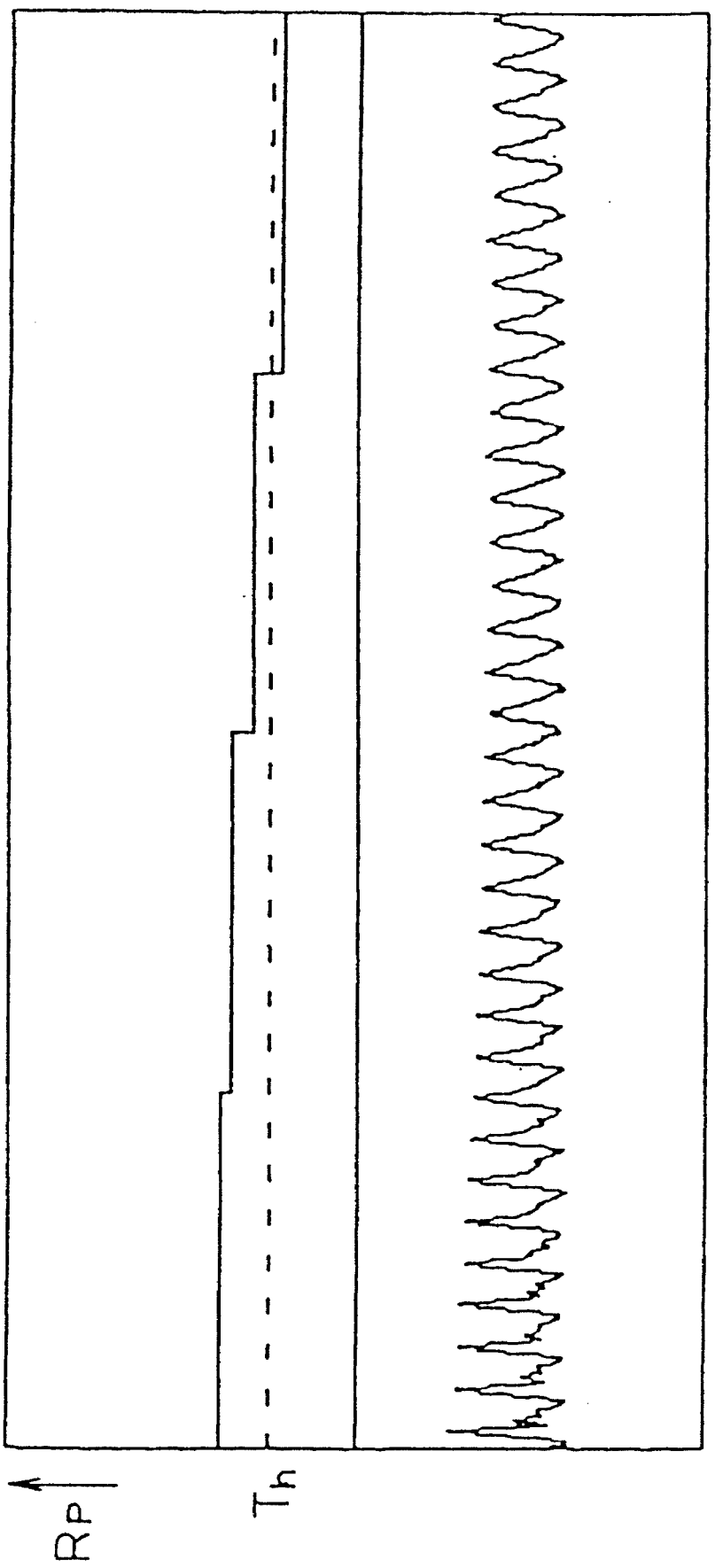
Fig. 66A (K=1.0) 512 time average (K=1.0) 512 time average

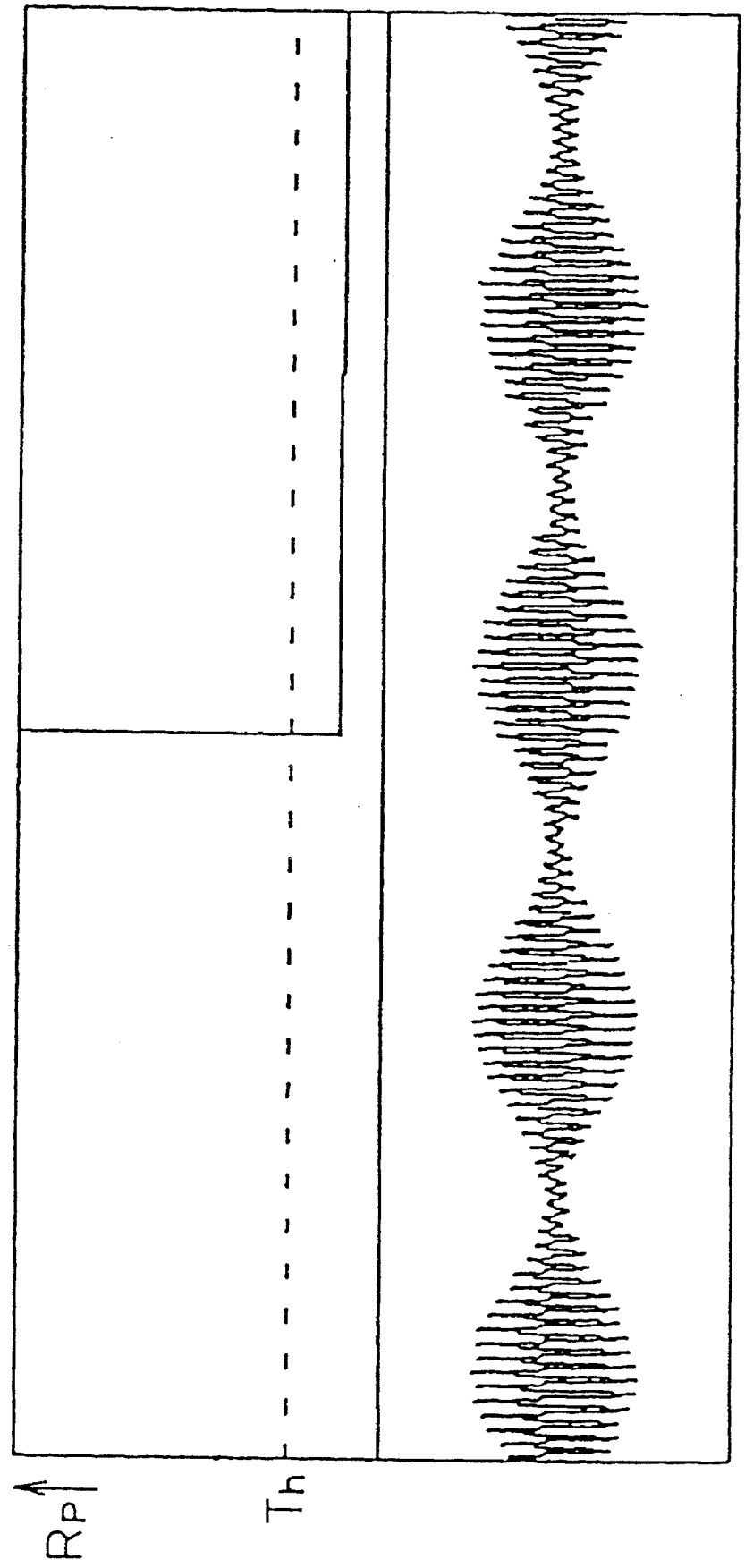
Fig. 66C (K=1.0) 512 time average (K=0.1) 8 time average (K=0.1) 8 time average

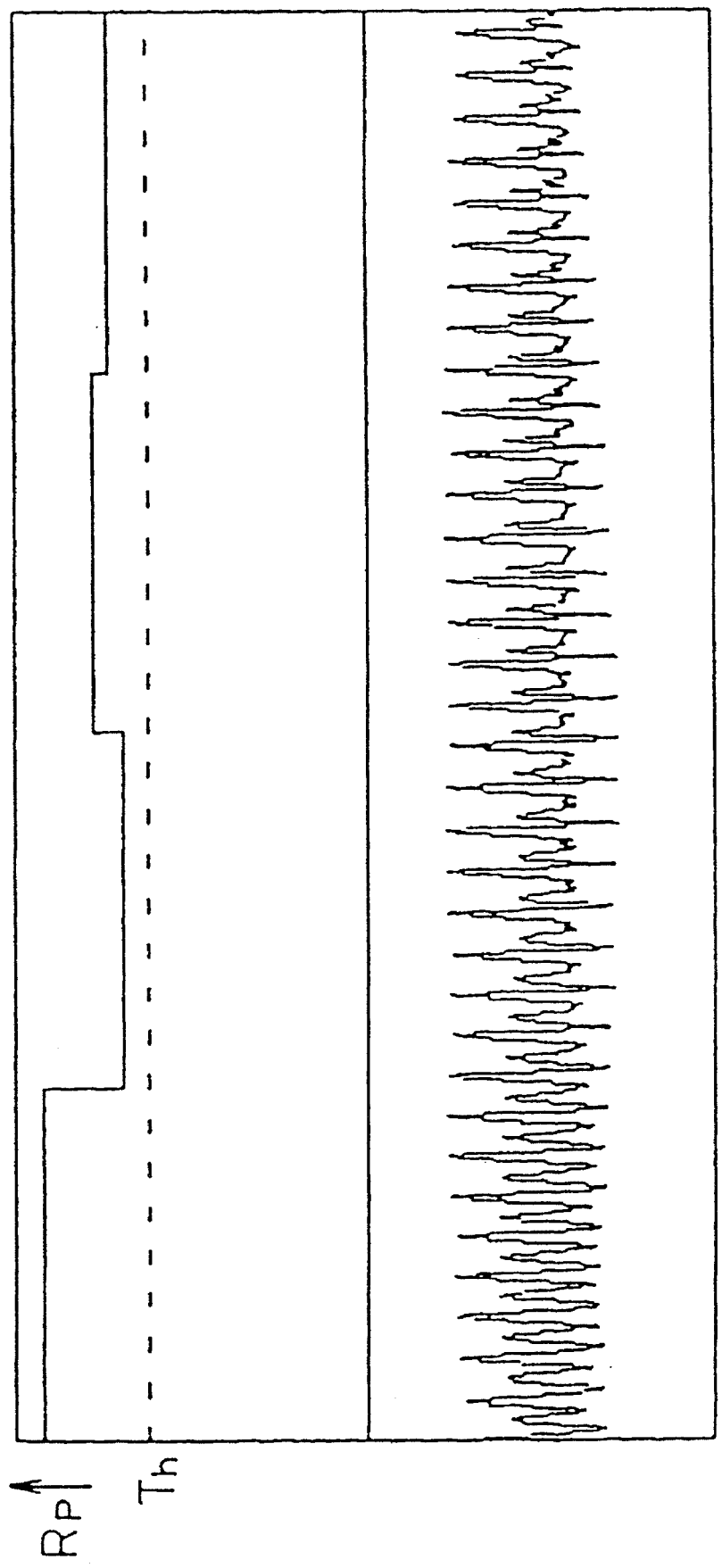
Fig. 68A (K=1.0) 8 time average

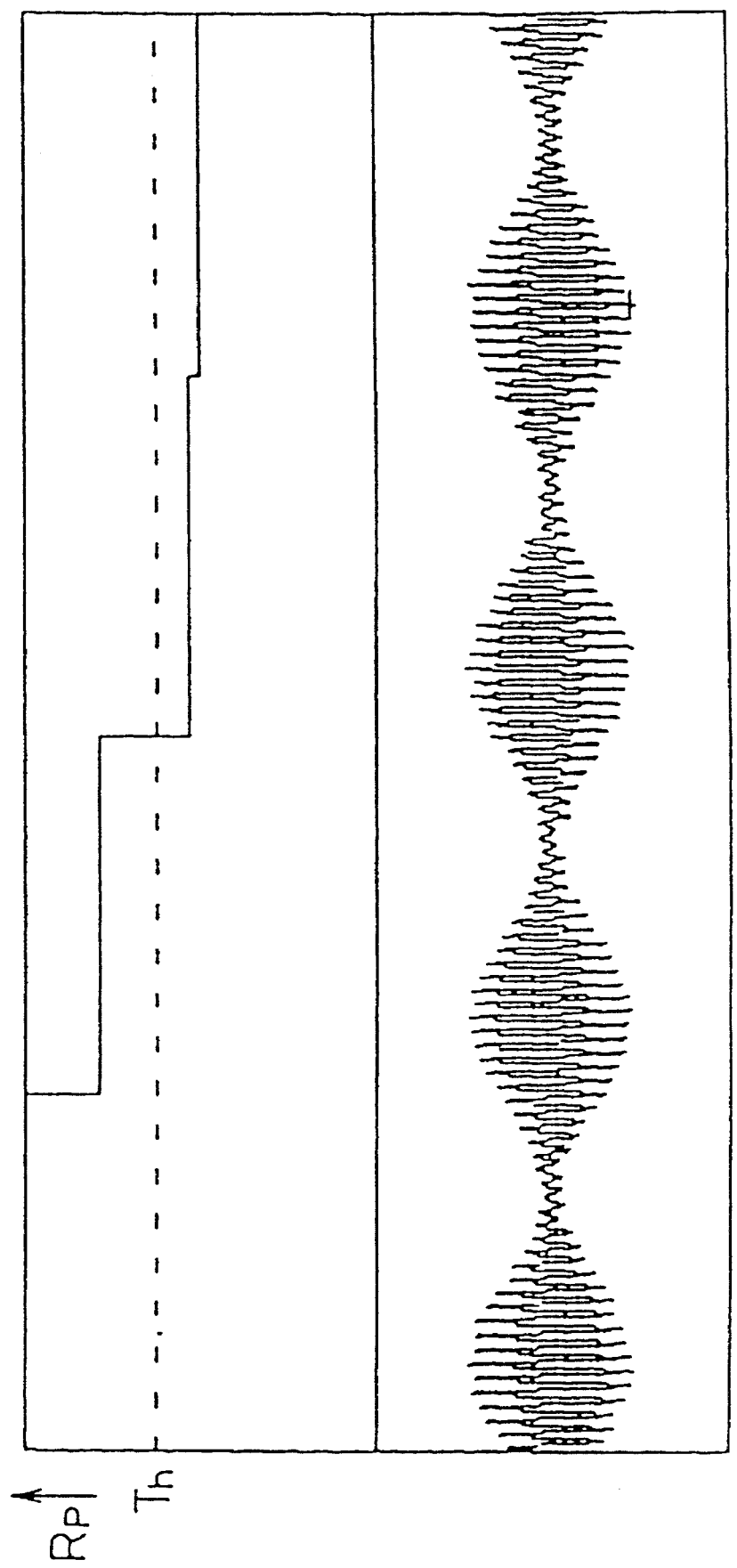
Fig. 68B (K=1.0) 8 time average

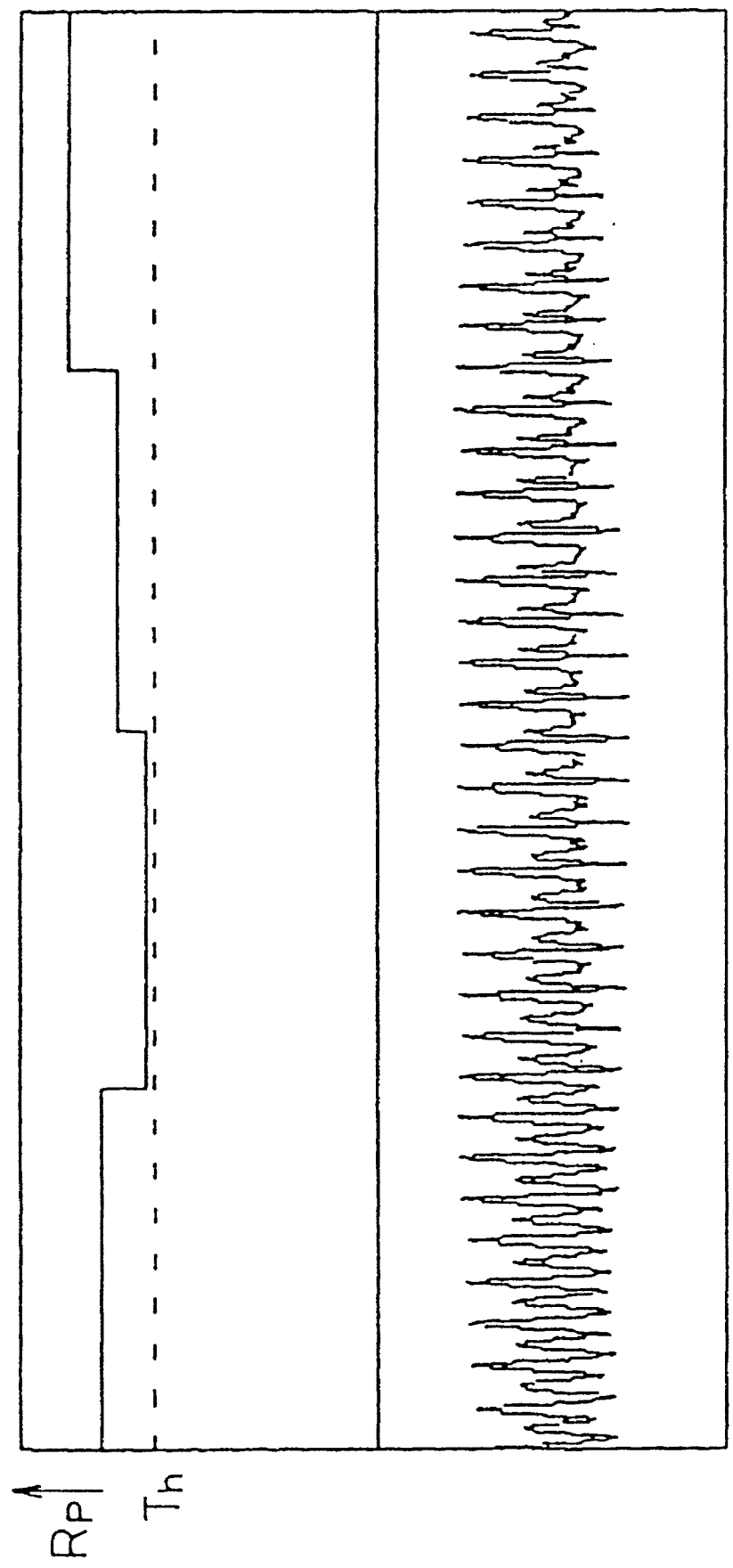

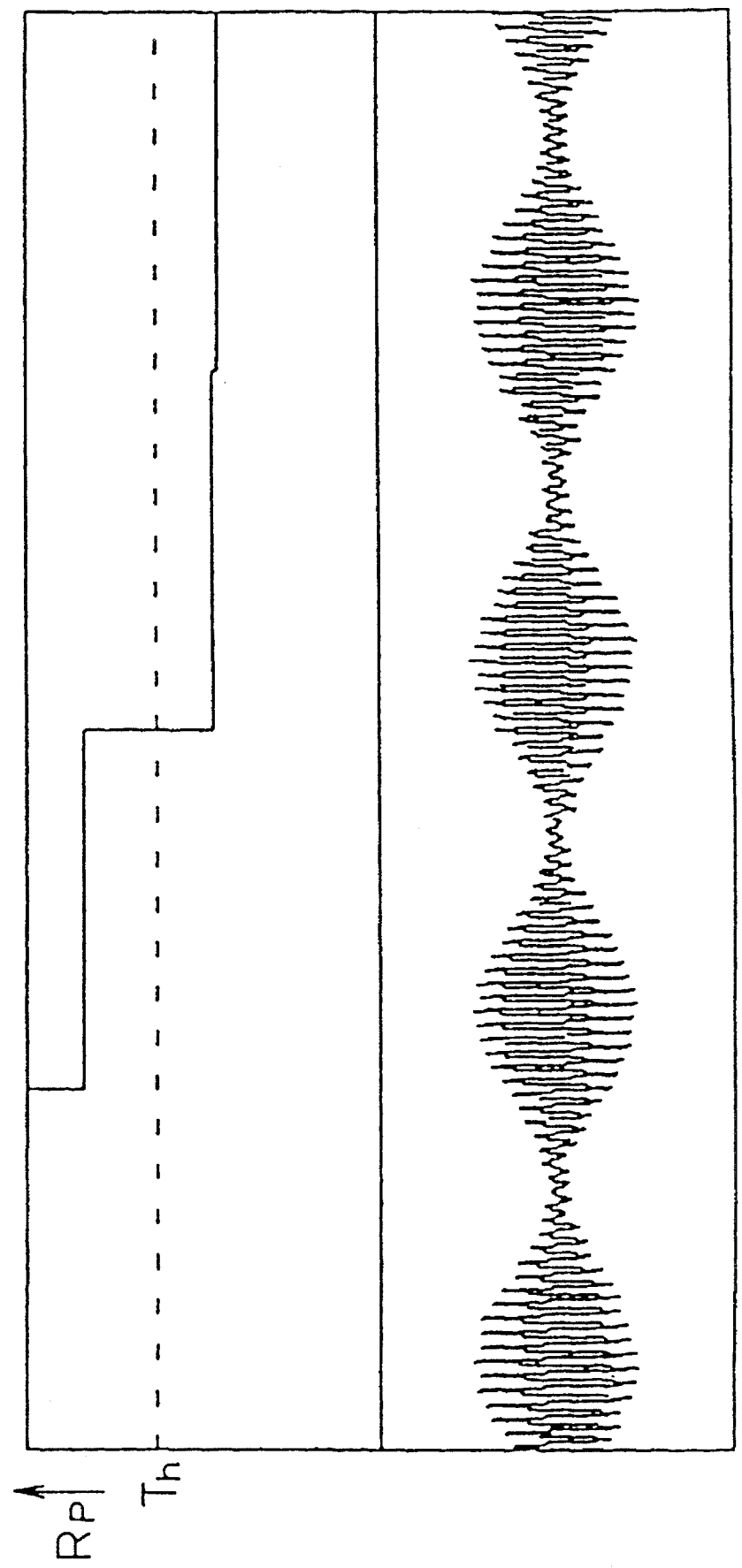
Fig. 69B (K=1.0) 16 time average (K=1.0) 32 time average

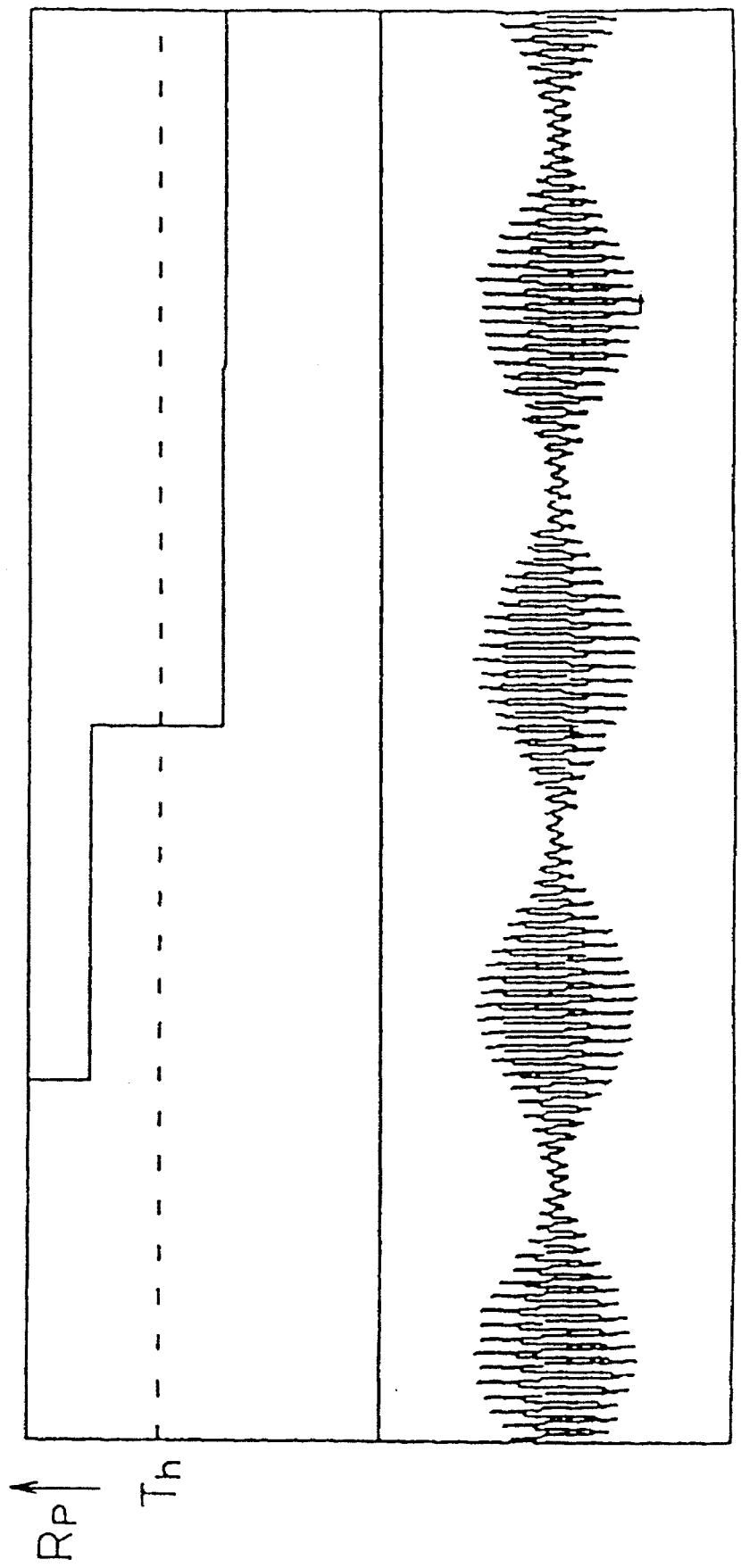
Fig. 70B (K=1.0) 32 time average

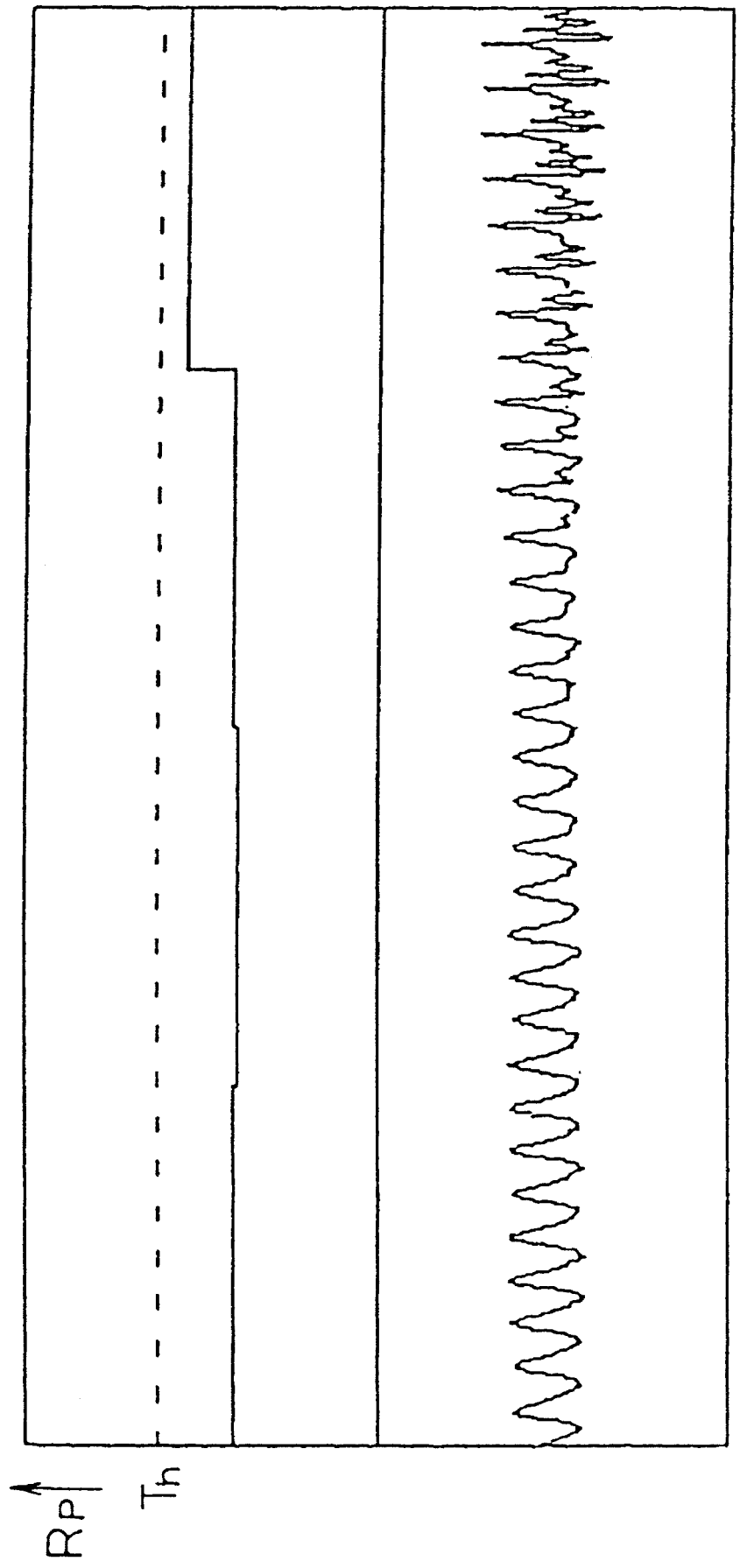

(K=1.0) 64 time average (K=1.0) 128 time average (K=1.0) 128 time average

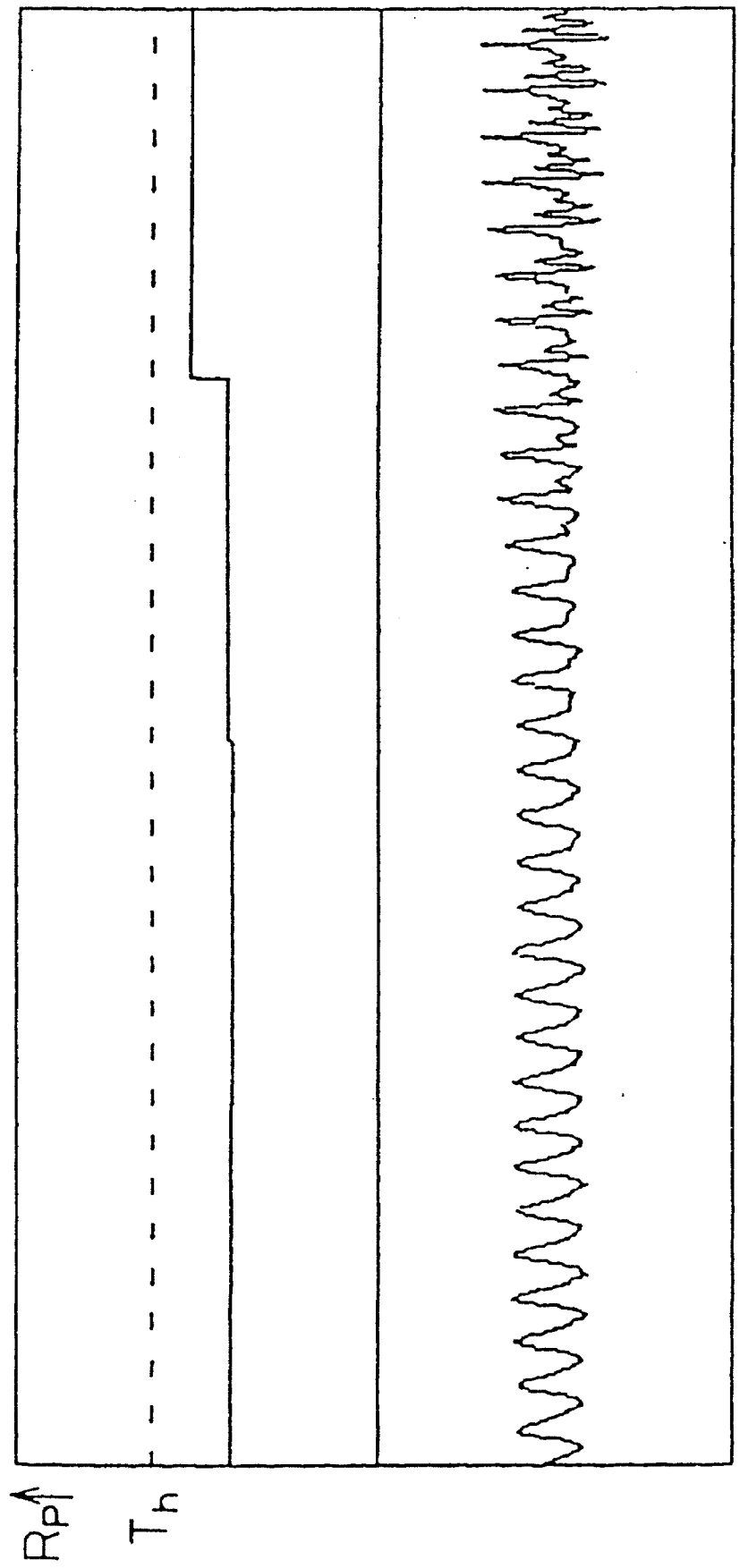
Fig. 73A (K=1.0) 256 time average (K=1.0) 256 time average

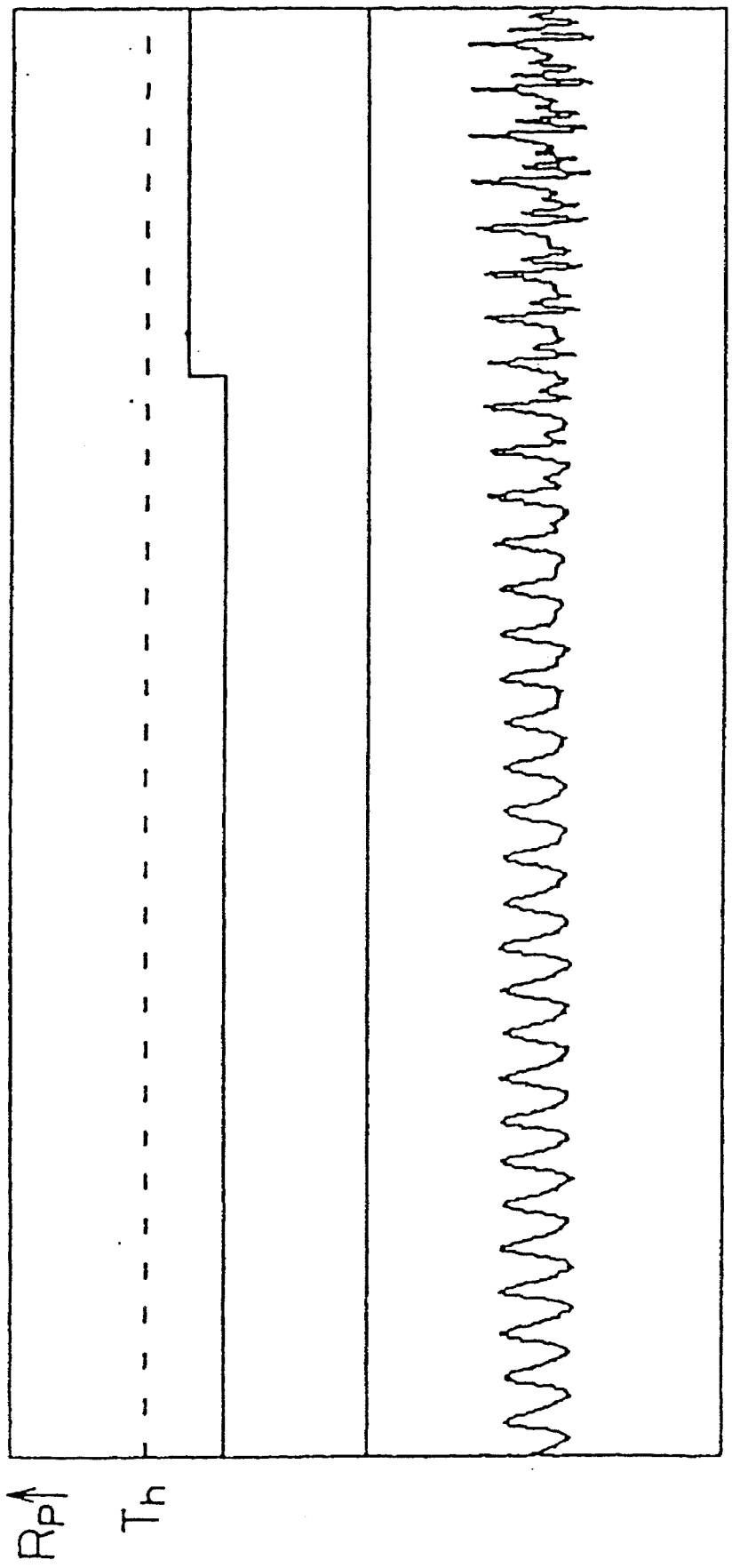

(K=1.0) 512 time average

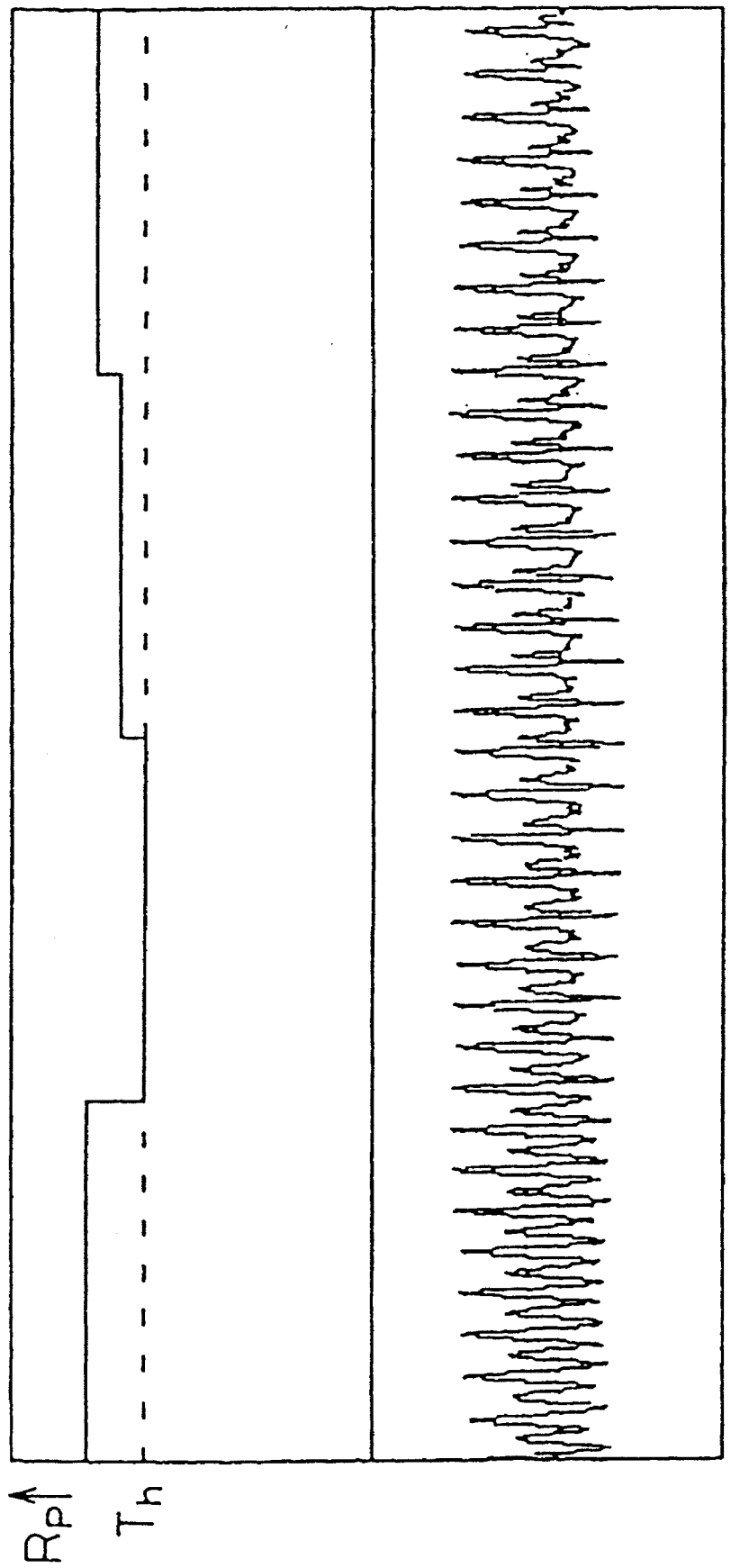
Fig. 75 (K=0.5) 8 time average

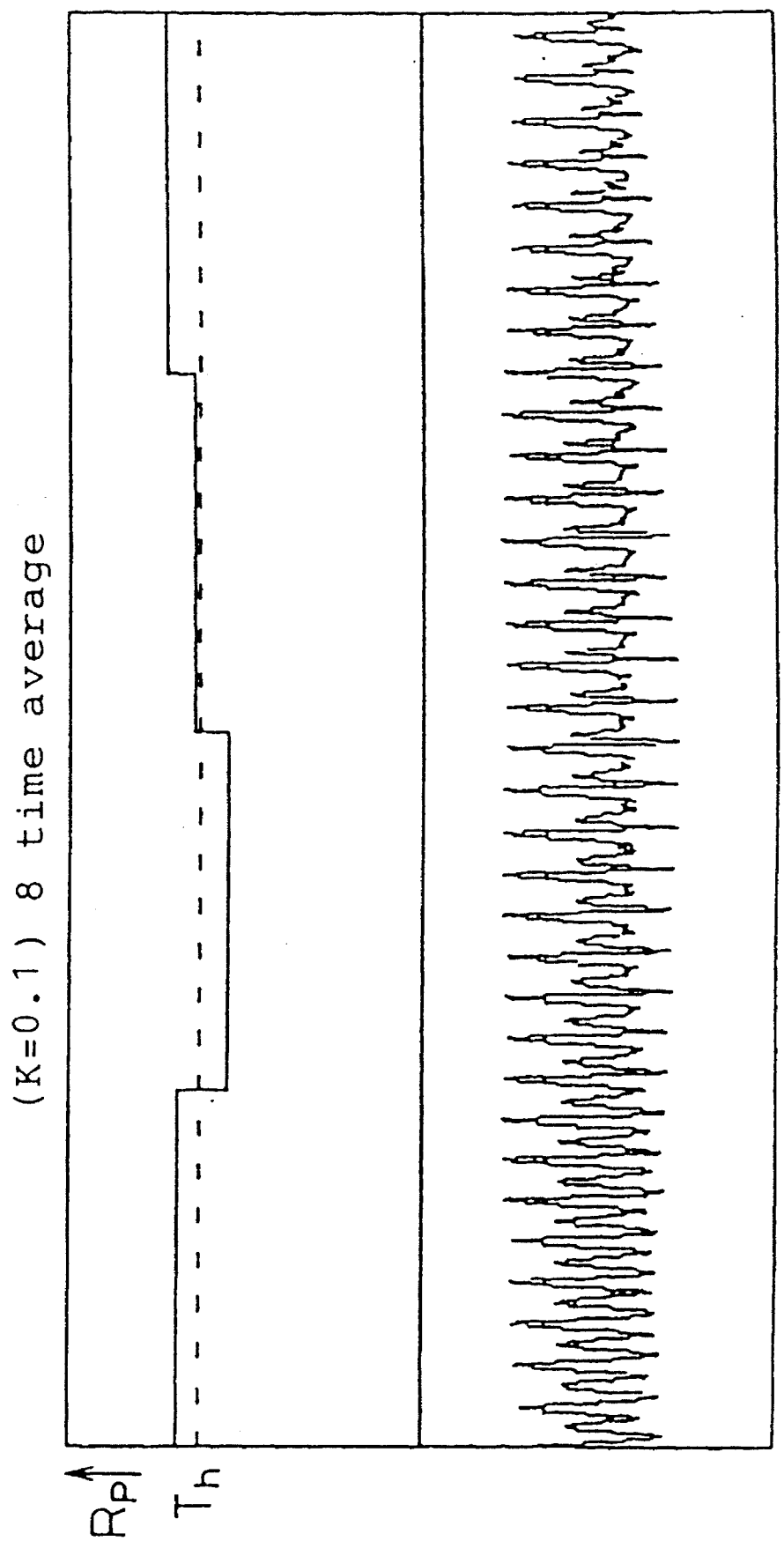
Fig. 76 (K=0.1) 8 time average (K=1.0, time constant 128 ms) 16 time average (K=1.0, time constant 128 ms) 16 time average

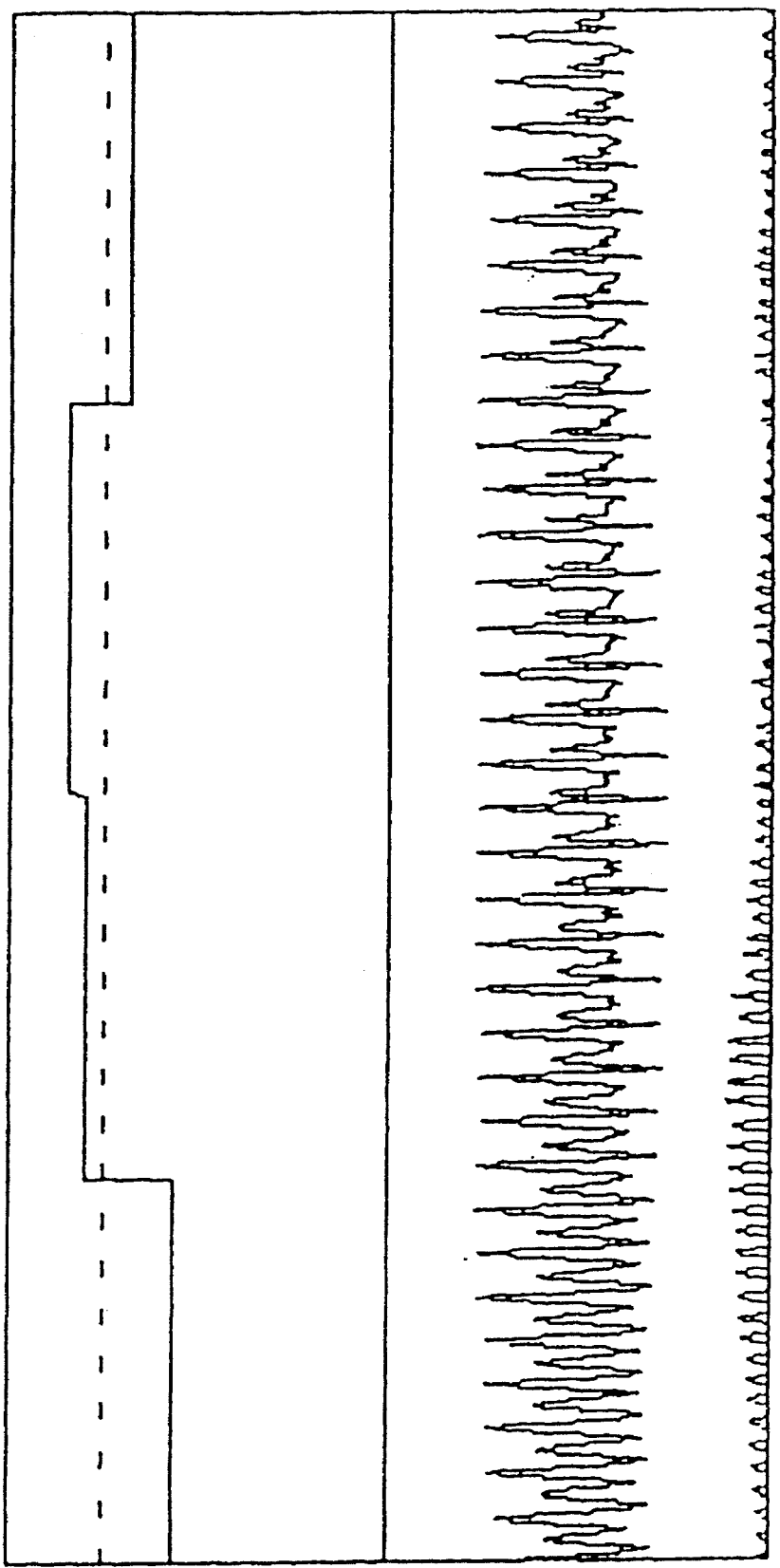

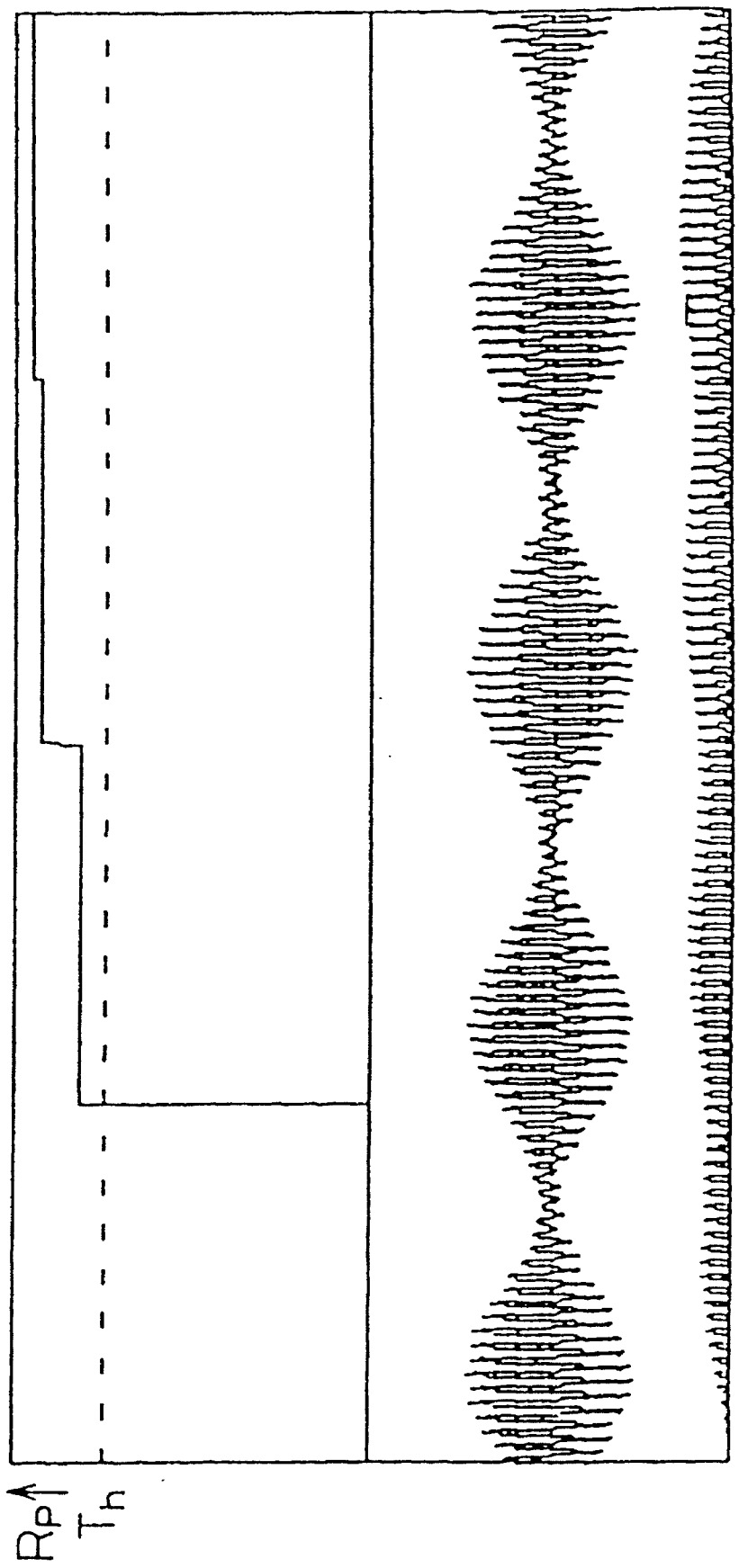
Fig.78B K=1, time constant 128 ms, 32 time average

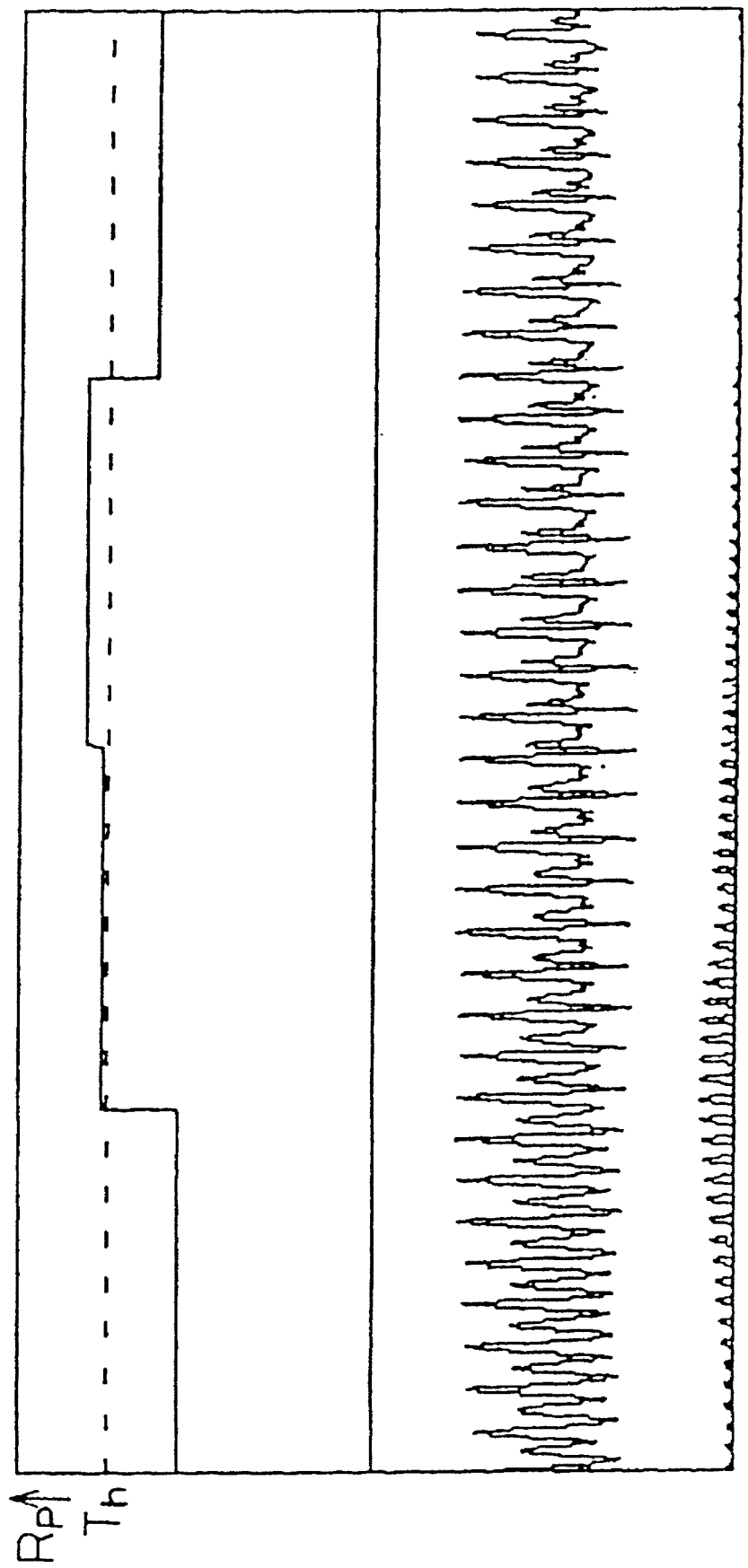
Fig.79A  K=1, time constant 128 ms, 64 time average

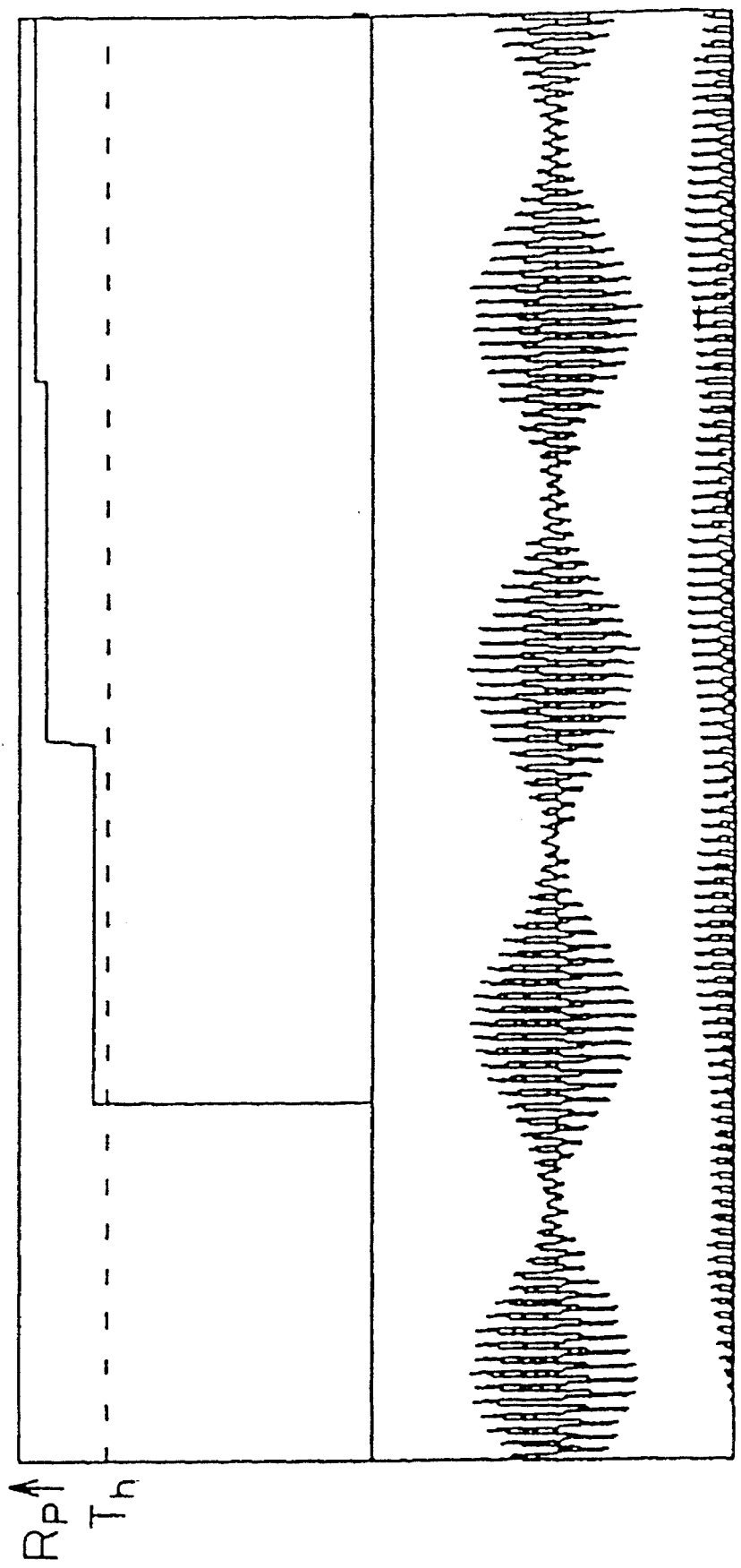
Fig. 79B  K=1, time constant 128 ms, 64 time average

K=1.0, time constant 128 ms, 128 time average

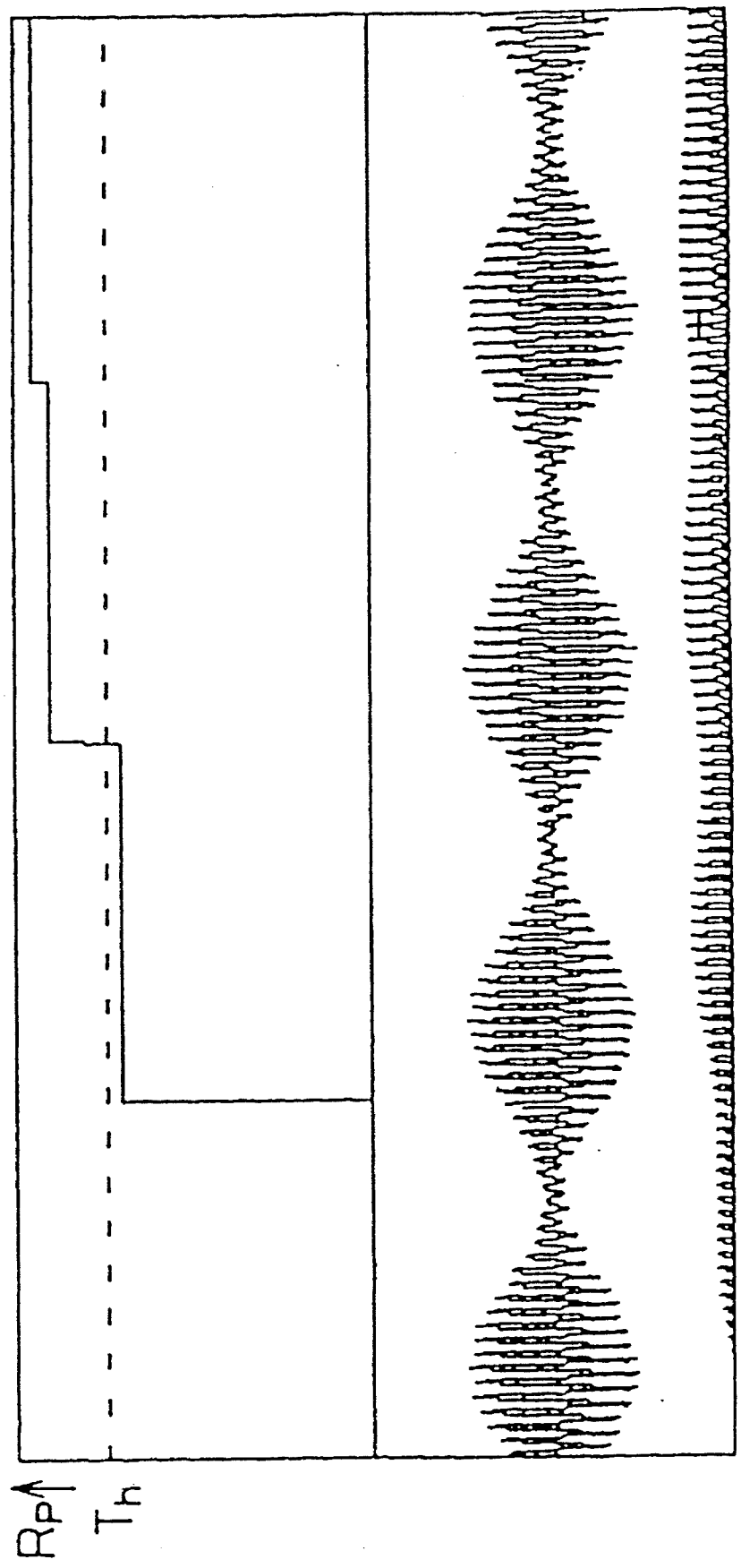
Fig. 80B  K=1.0, time constant 128 ms, 128 time average

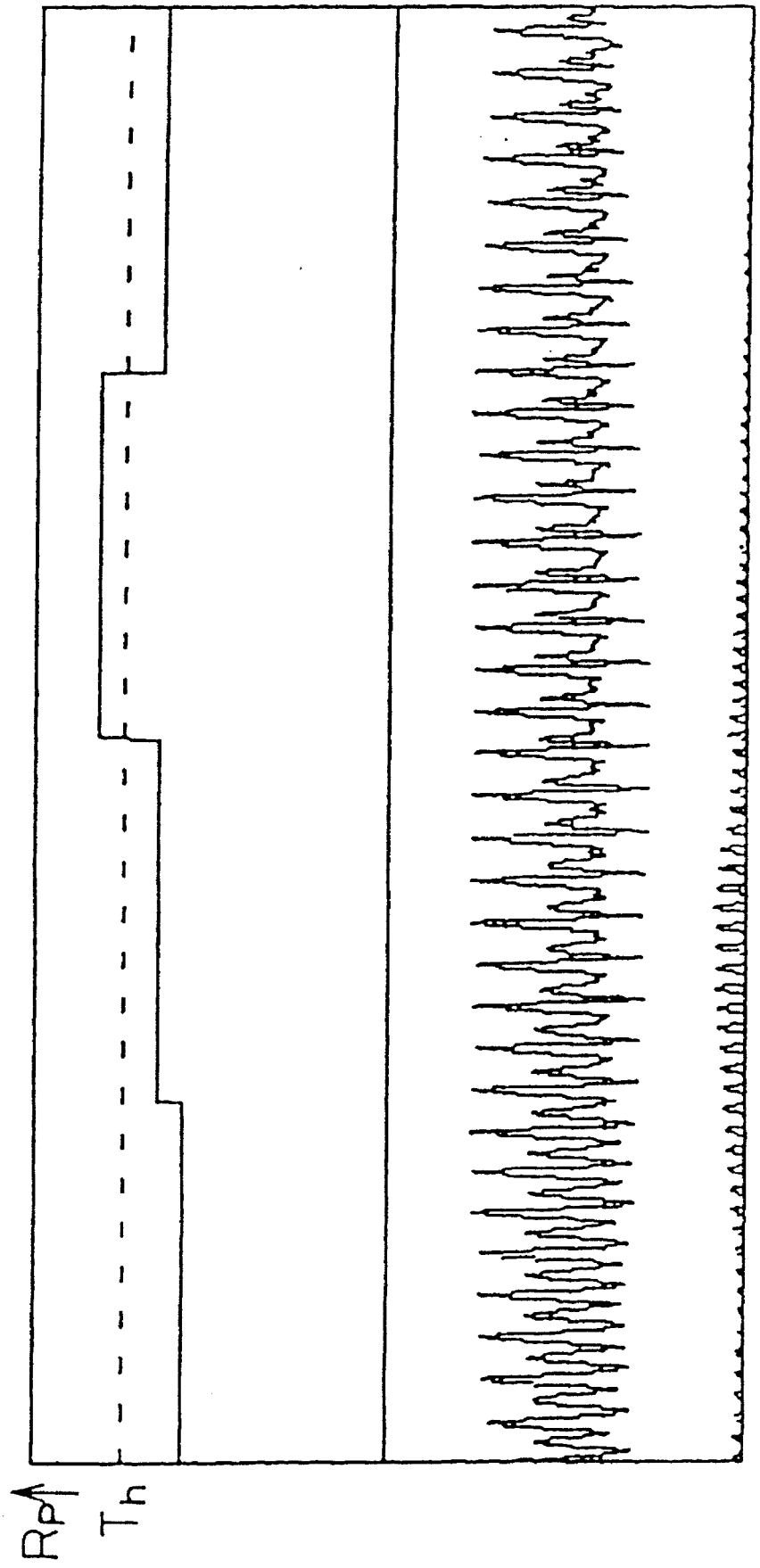
Fig.81A  K=1.0, time constant 128 ms, 256 time average

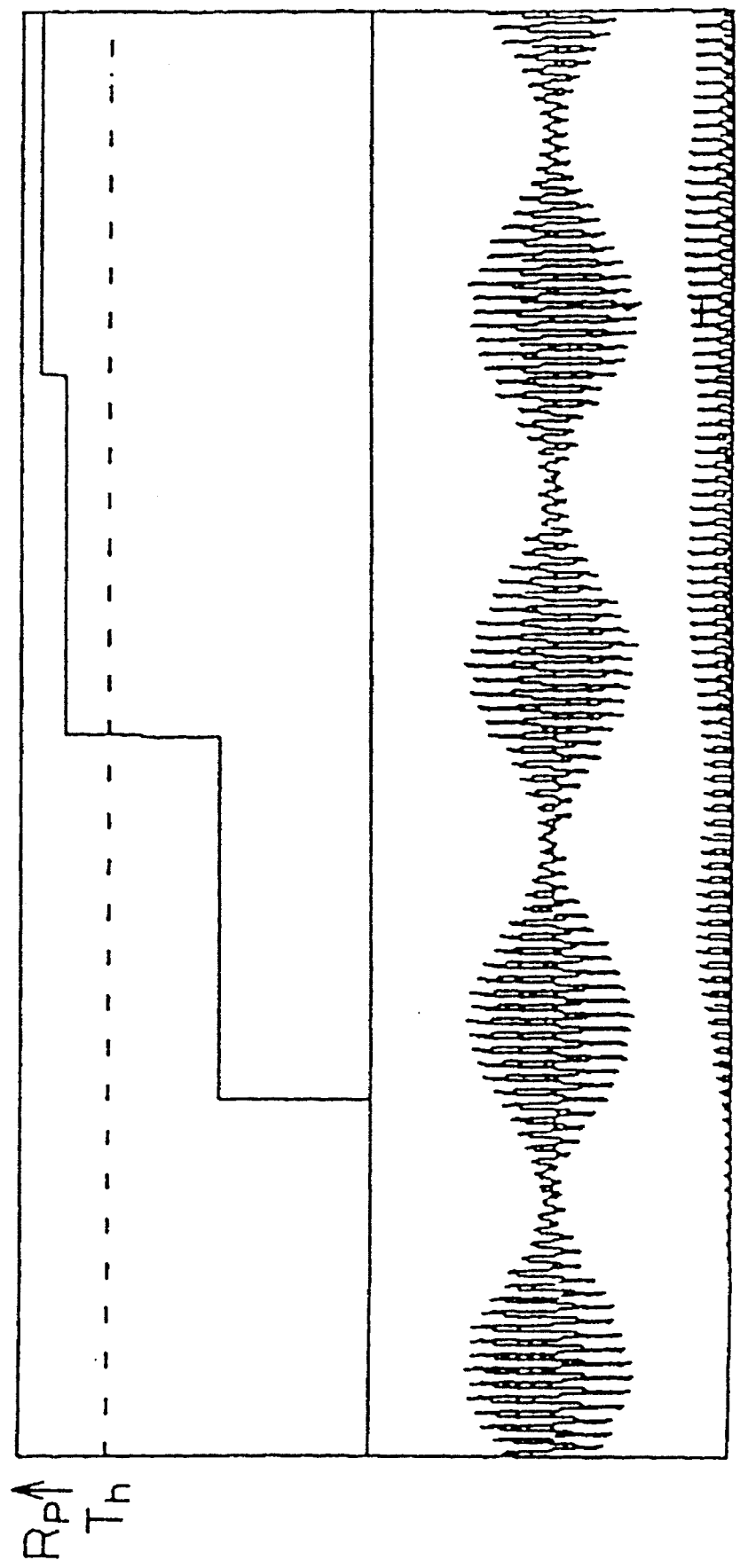
Fig. 81B  K=1.0, time constant 128 ms, 256 time average

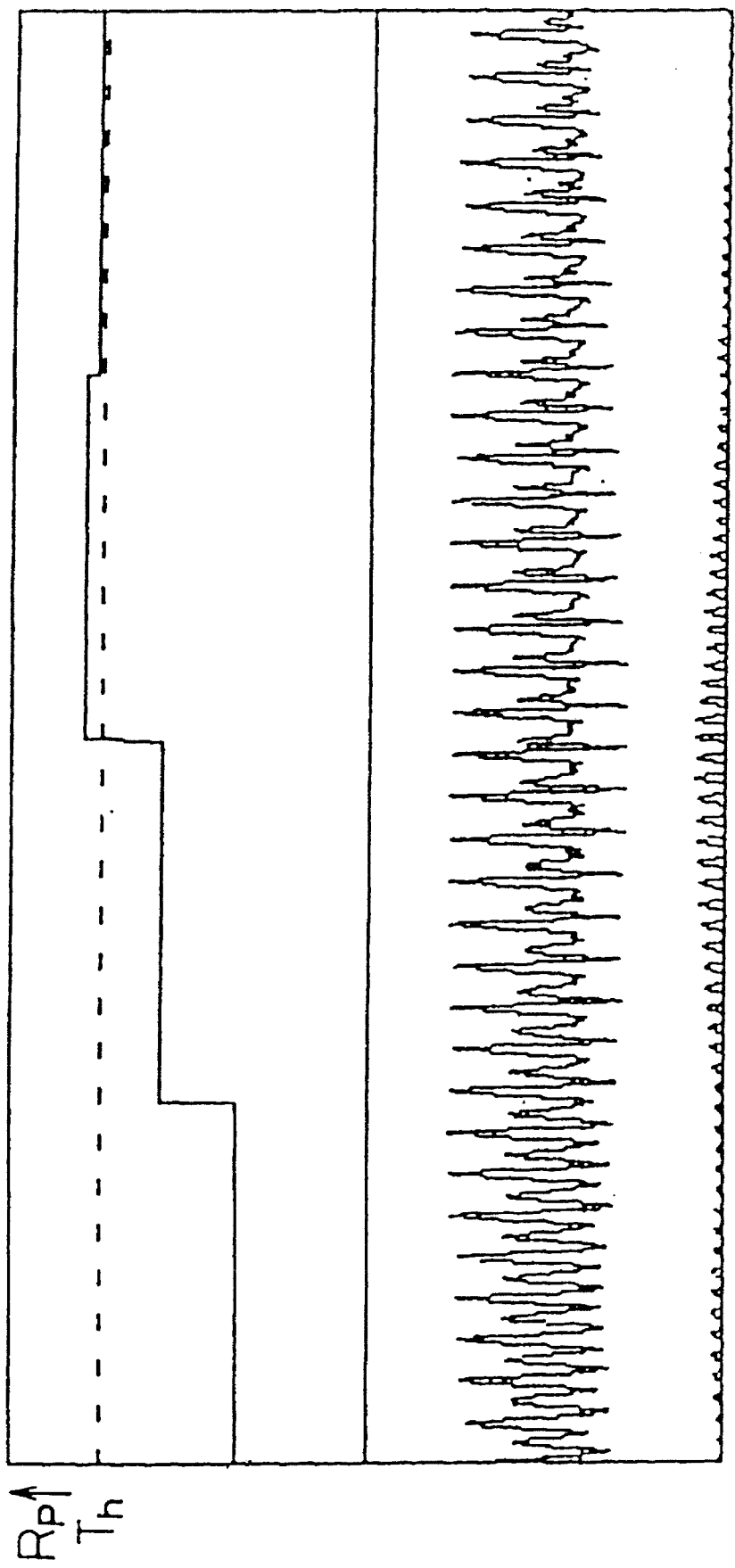

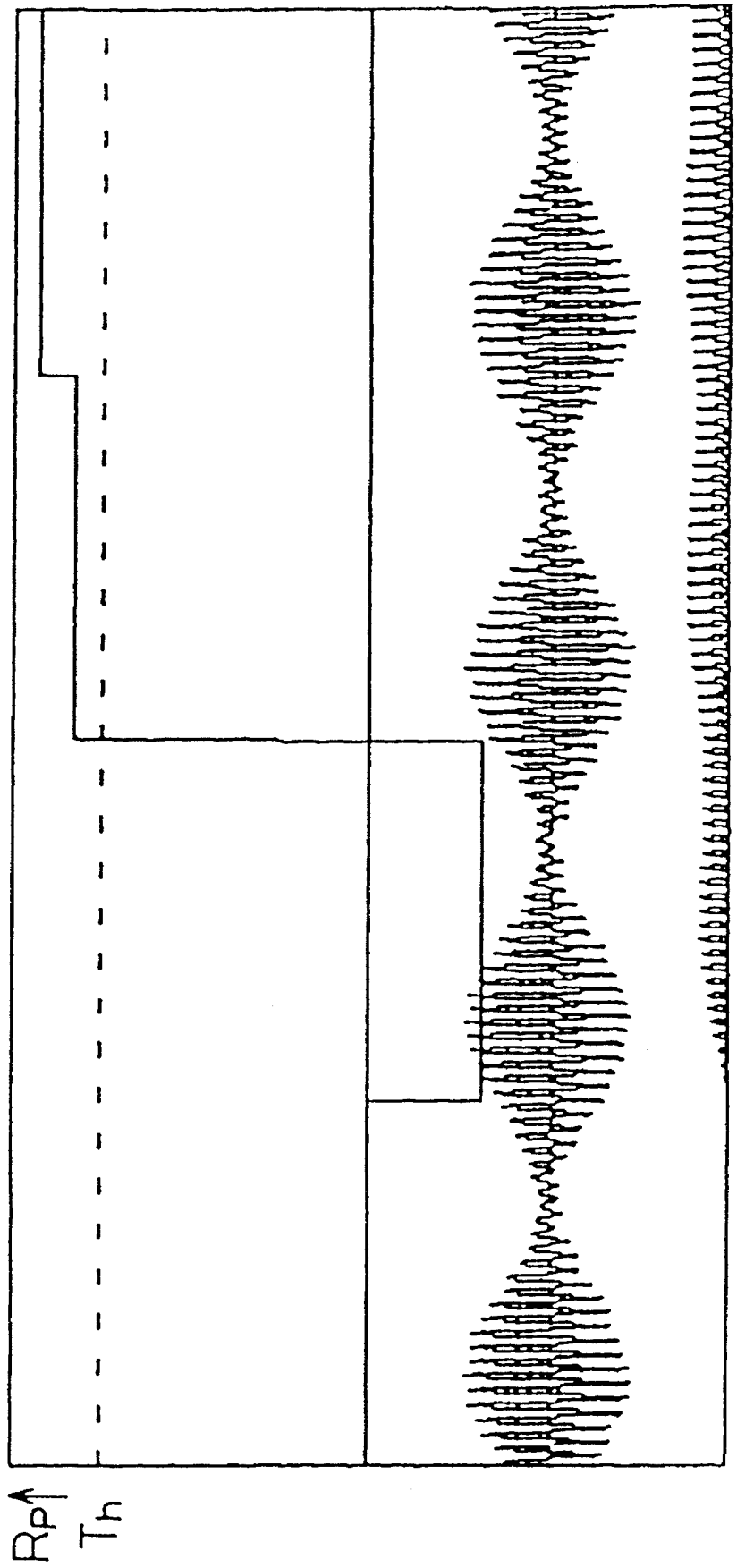
Fig.82B  K=1.0, time constant 128 ms, 512 time average

K=1.0, time constant 32 ms, 128 time average

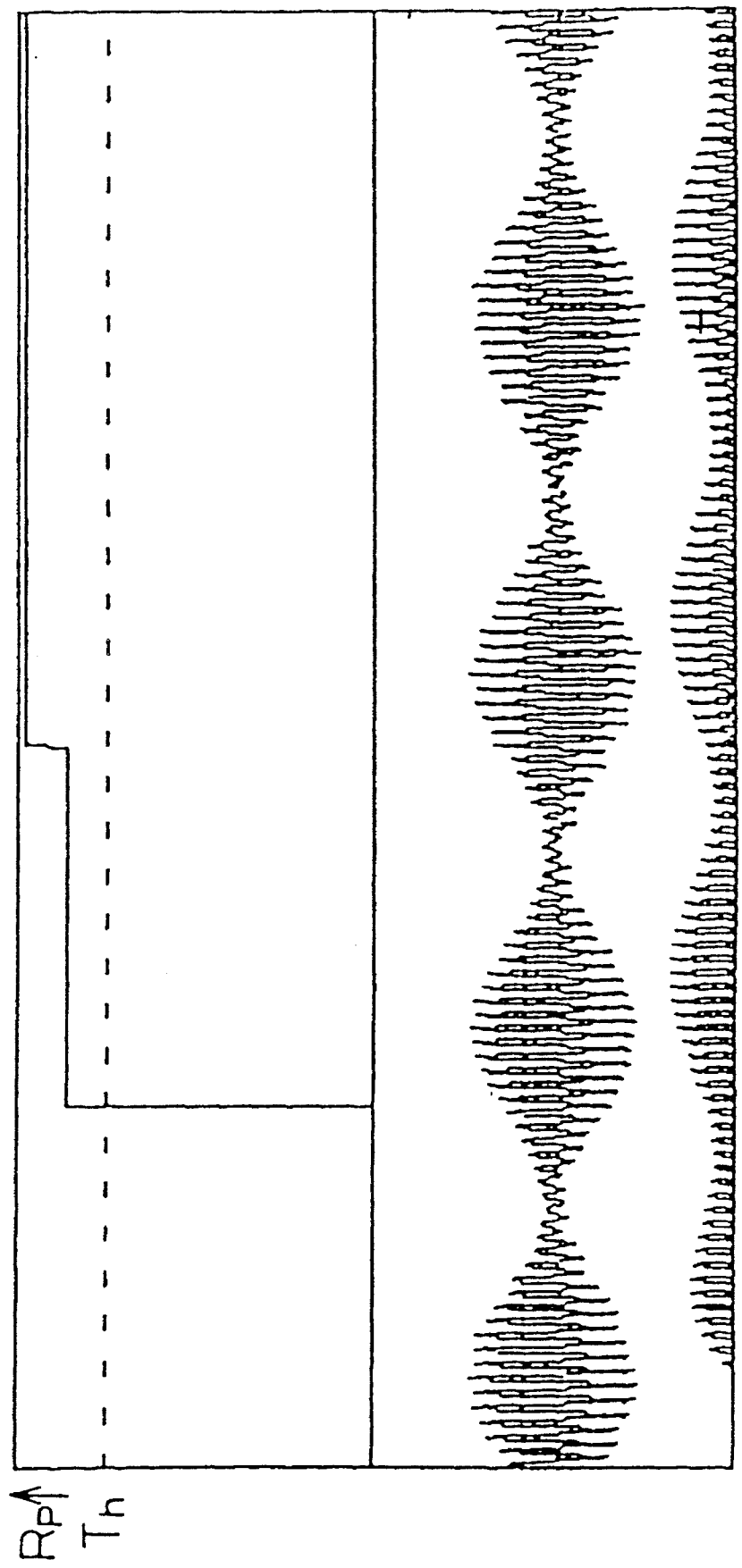
Fig.83B  F=1.0, time constant 32 ms, 128 time average

K=1.0, time constant 64 ms, 128 time average

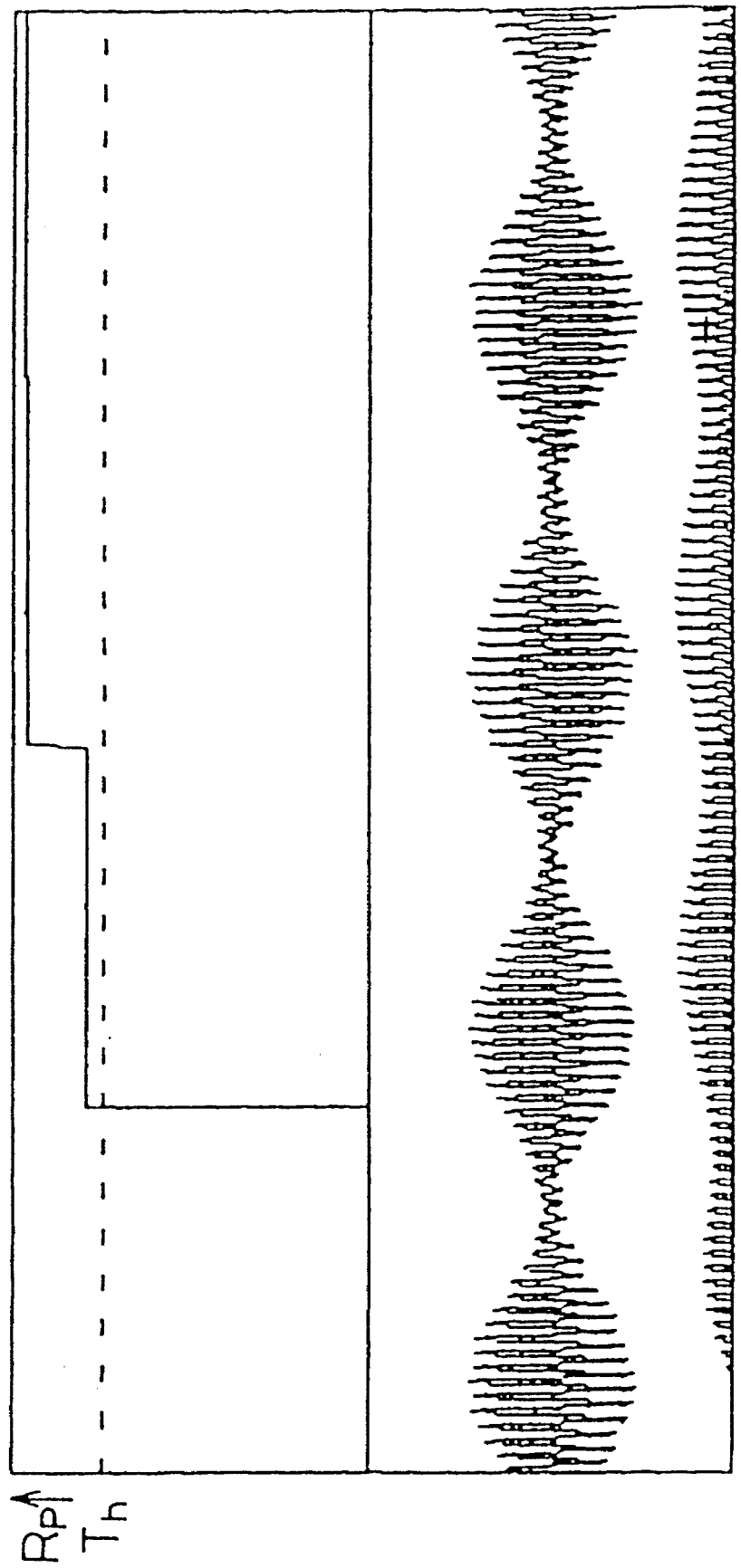
Fig. 84B  K=1.0, time constant 64 ms, 128 time average

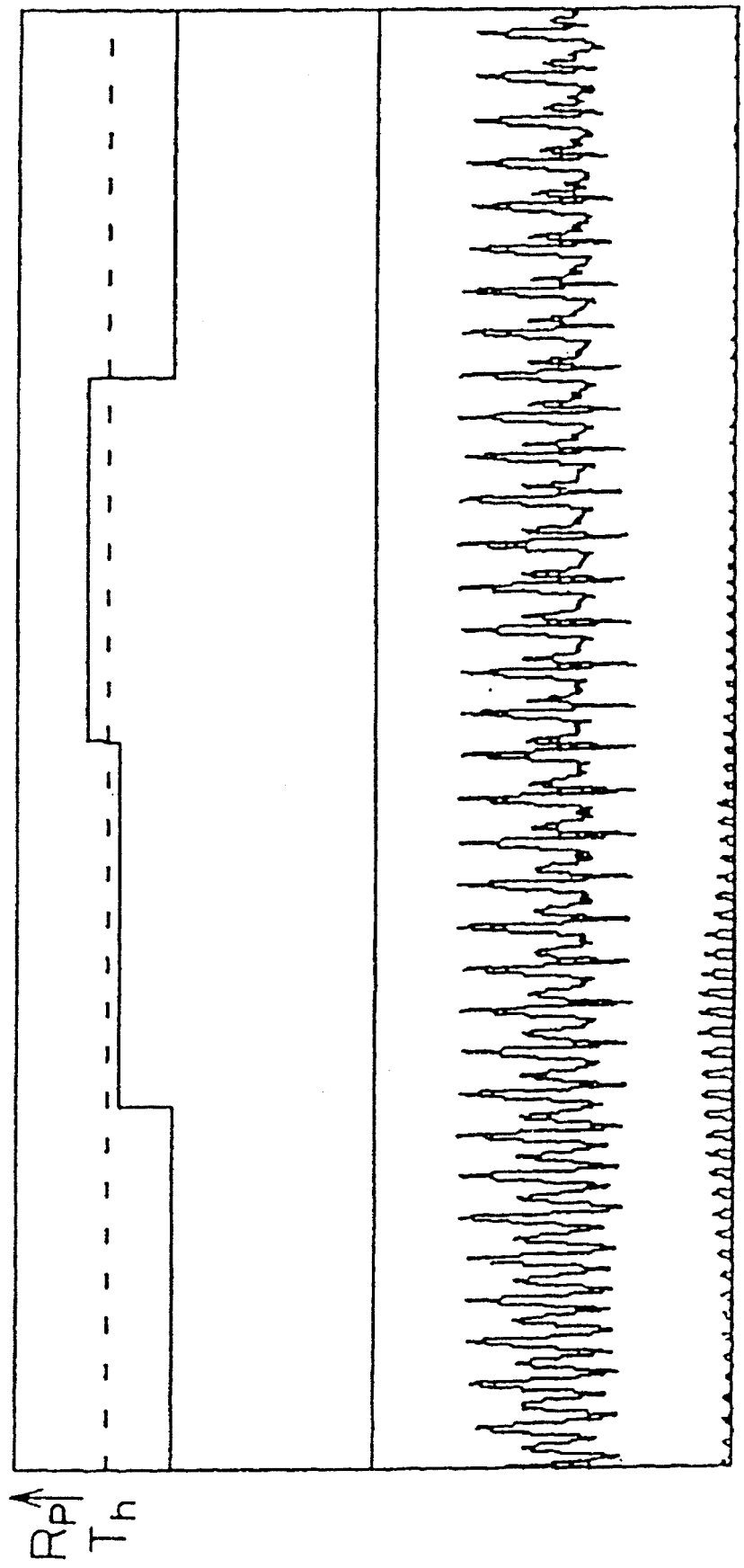
Fig.85A  K=1.0, time constant 128 ms, 128 time average

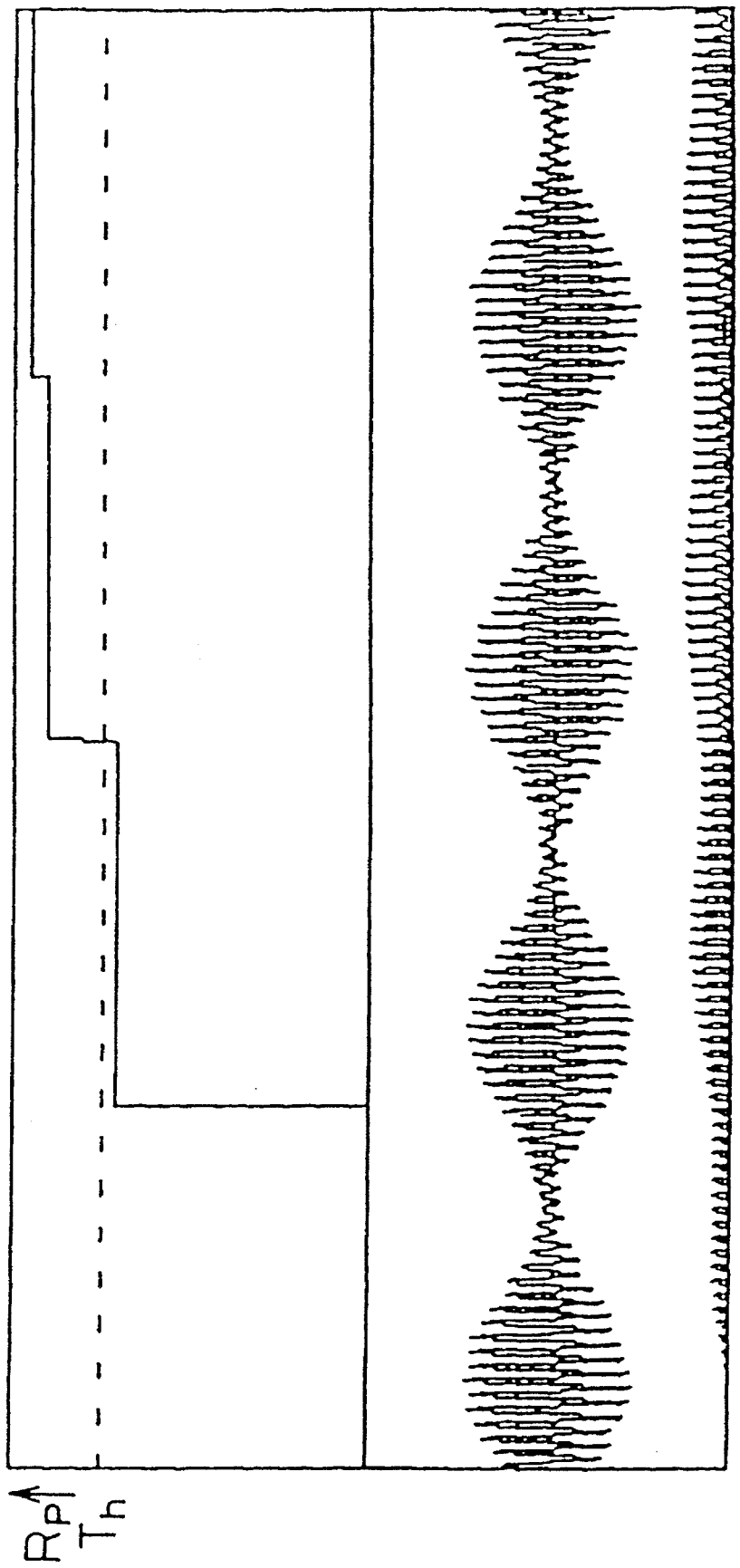
Fig.85B  K=1.0, time constant 128 ms, 128 time average

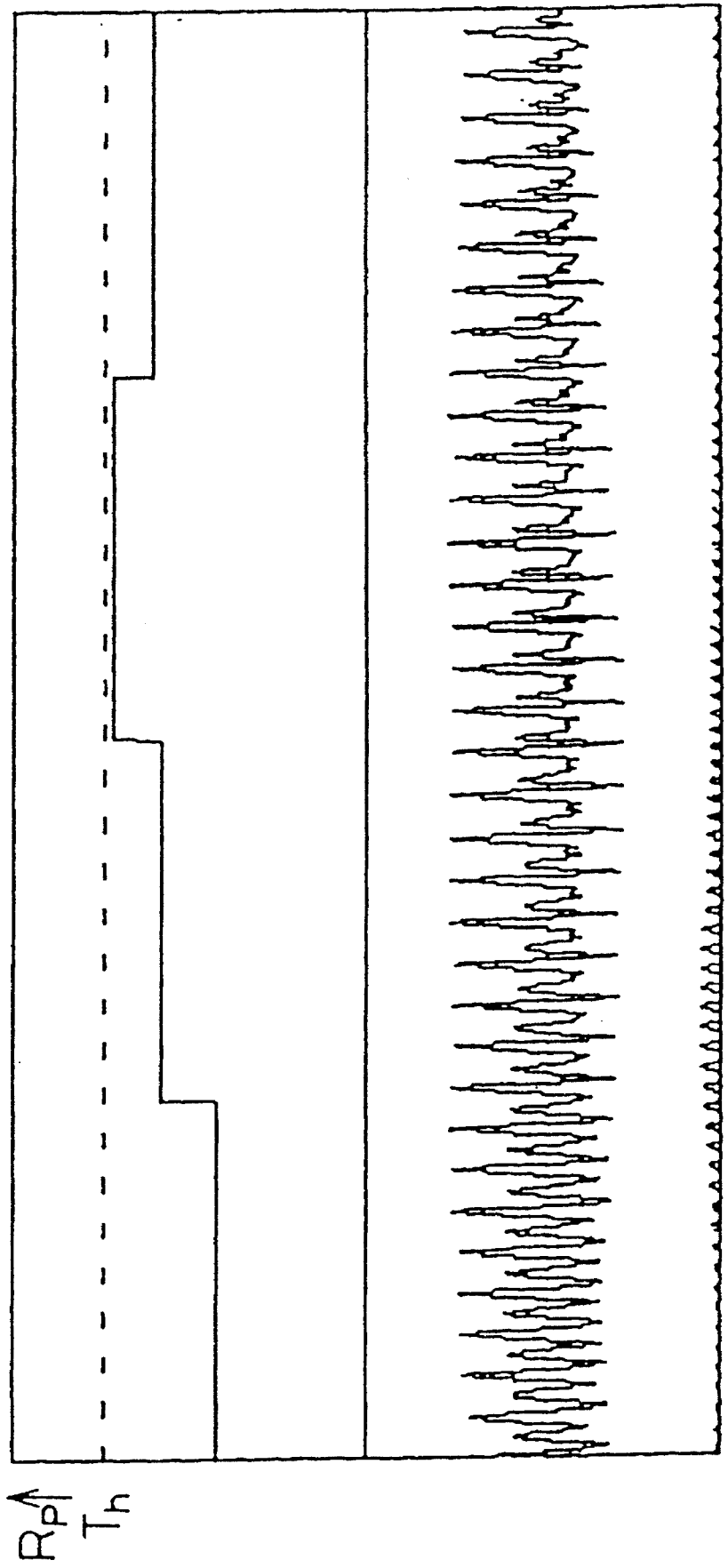
Fig. 86A  K=1.0, time constant 256 ms, 128 time average

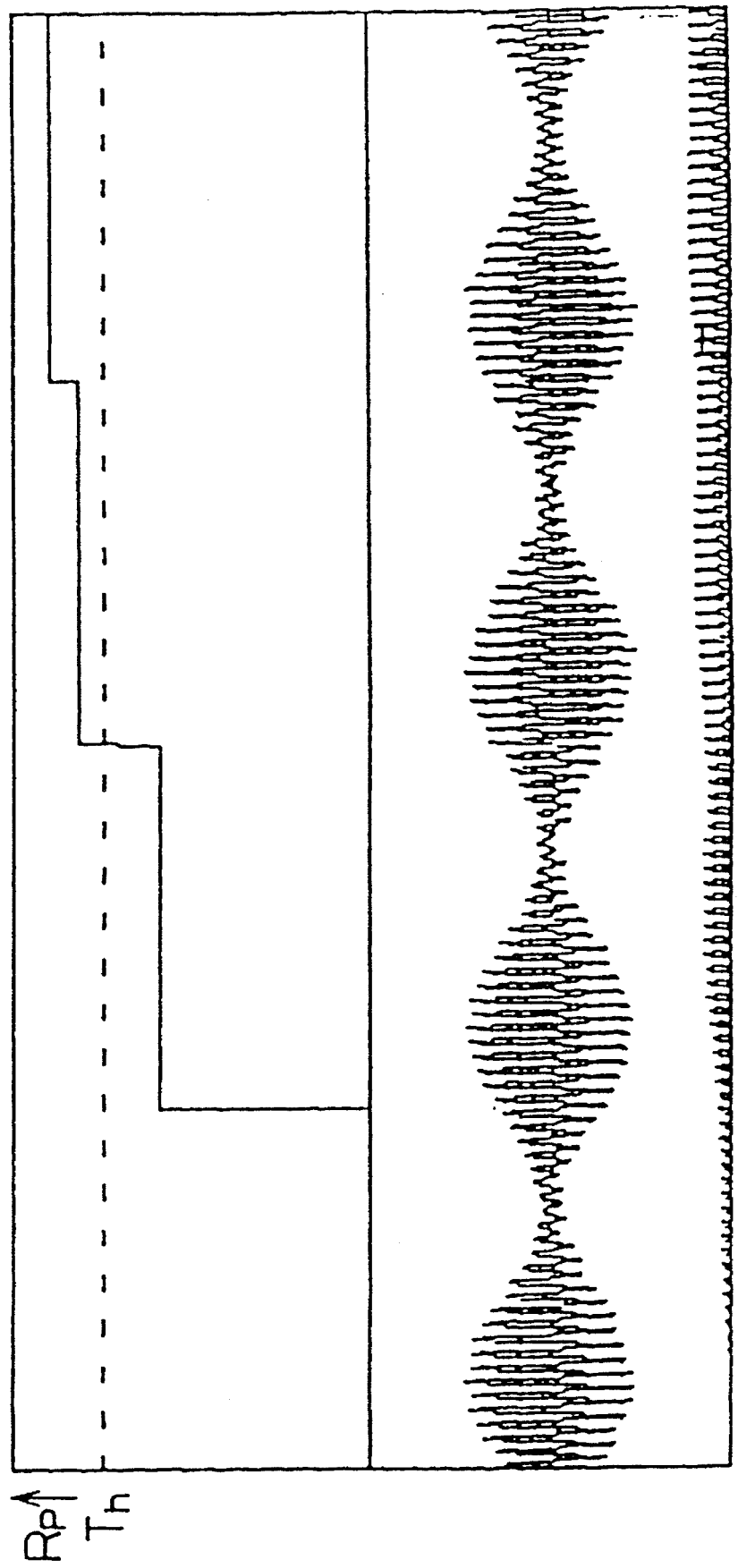
Fig.86B  K=1.0, time constant 256 ms, 128 time average

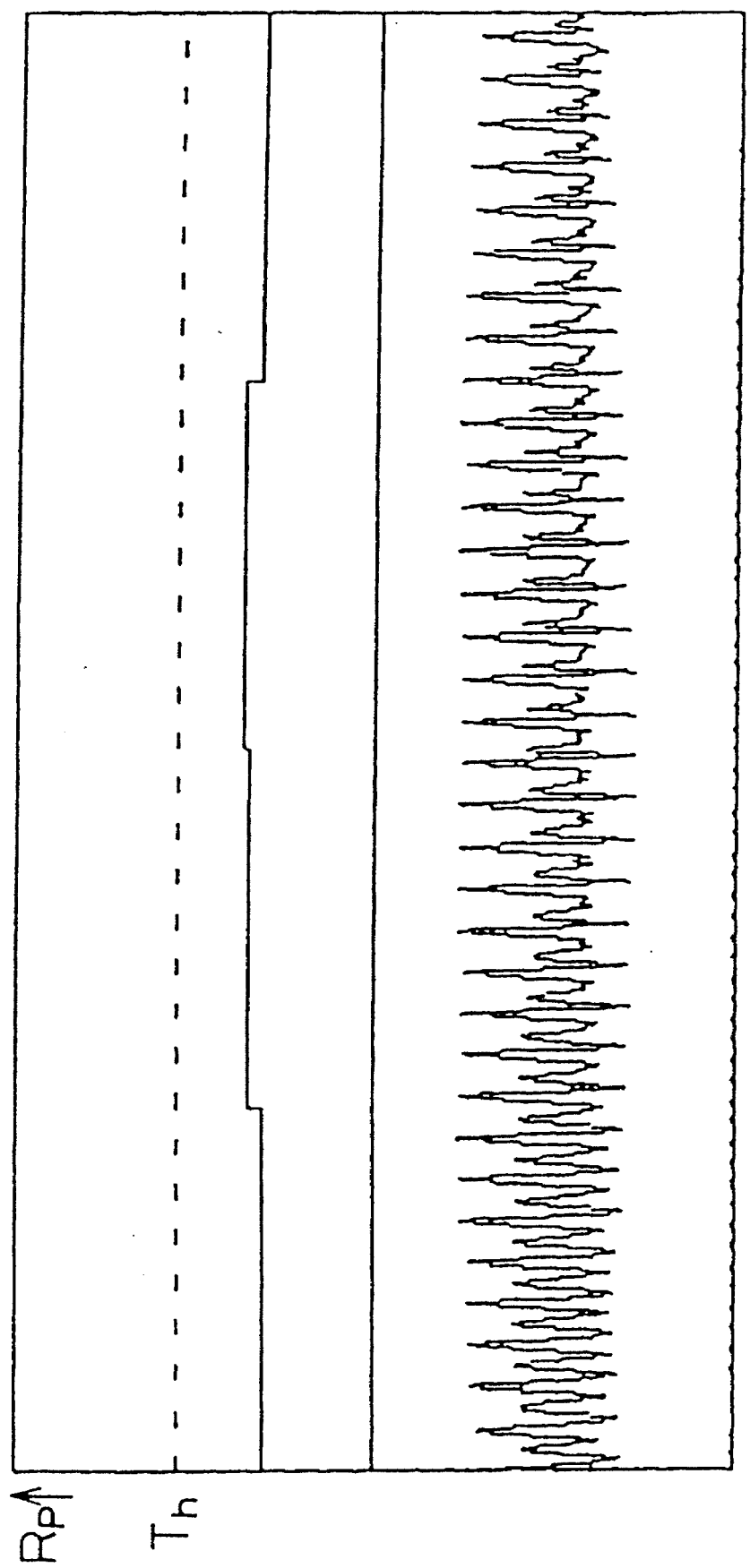
Fig.87A  K=0.01, time constant 64 ms, 8 time average

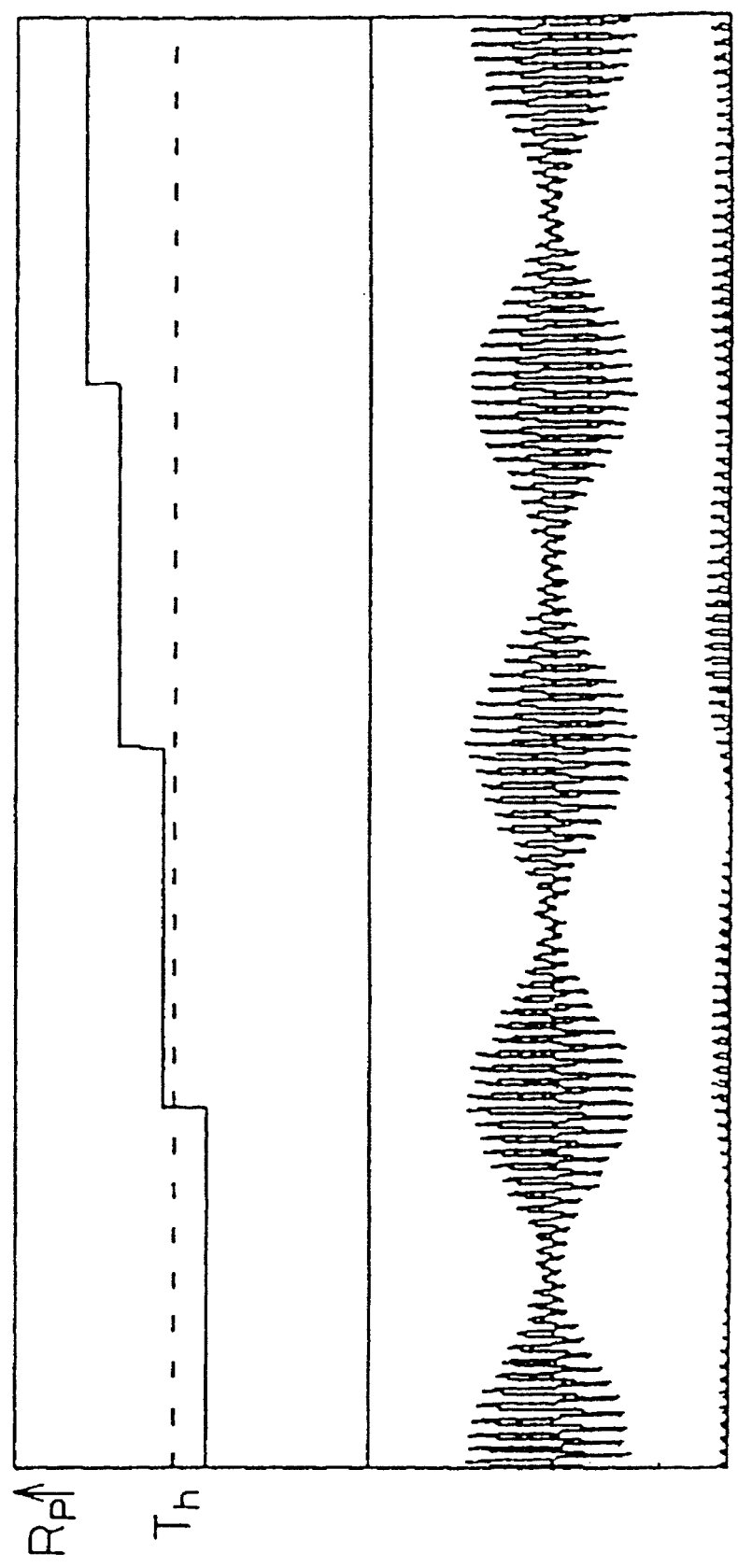
Fig.87B K=0.01, time constant 64 ms, 8 time average

Fig.89 (K=1, 16 time average)

(K=1, 16 time average)

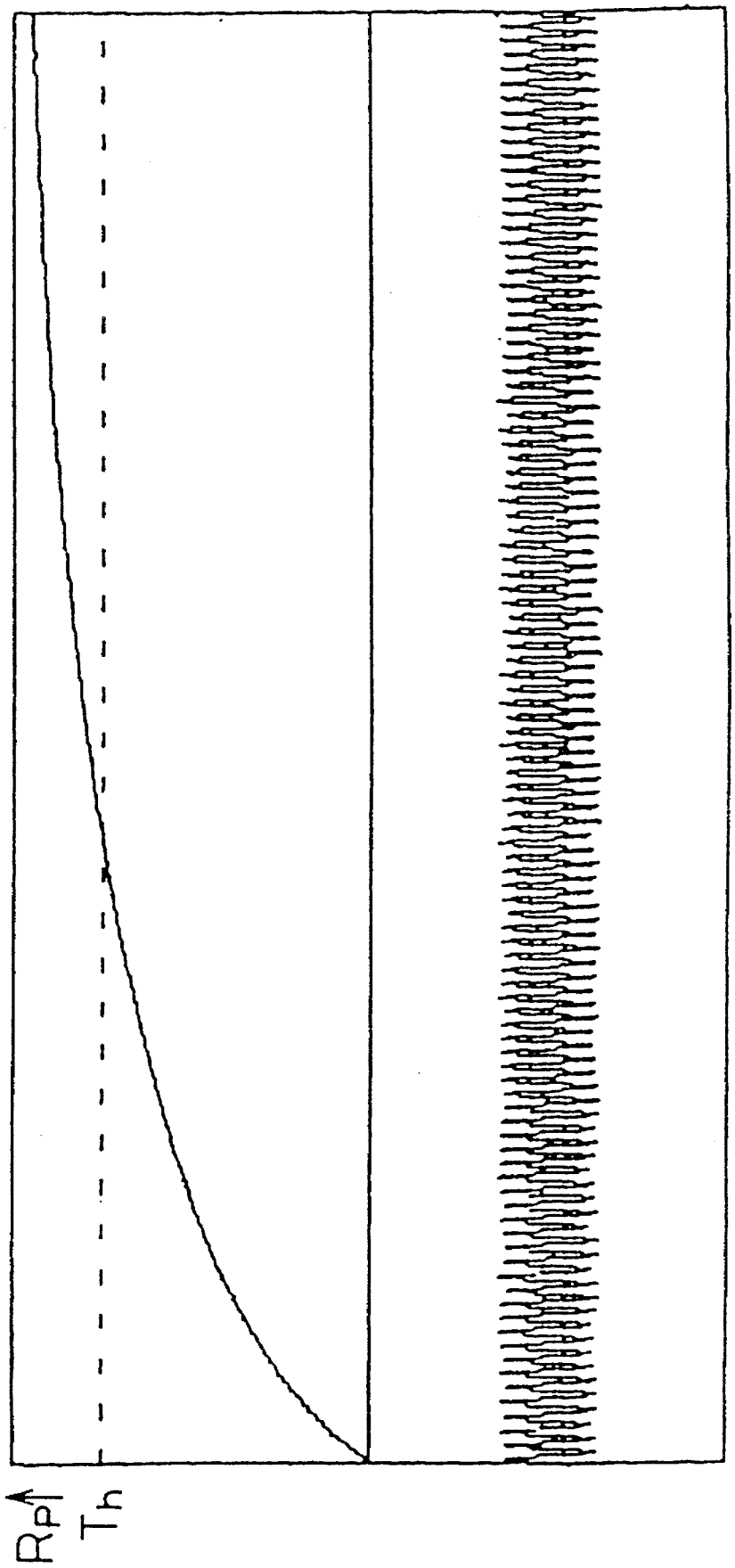

5,479,502

SPEAKING APPARATUS HAVING HANDFREE CONVERSATION FUNCTION

This application is a continuation of application Ser. No. 07/761,968, filed as PCT/JP91/00192 Feb. 16, 1991, now abandoned.

TECHNICAL FIELD

The present invention relates to a speaking apparatus (including televisions, telephones, etc.) having a handfree conversation function enabling conversation without holding a receiver by provision of using a microphone and a speaker (hereinafter referred to as a handfree telephone).

In general, in such handfree telephones, howling tends to occur due to the acoustic coupling of the microphone and the speaker and the run-in of an anti-side noise circuit used in the handfree telephone, so it is necessary to prevent the same.

BACKGROUND ART

Therefore, in handfree telephones provided with microphones and speakers mounted close to each other, a technique for realizing two-way simultaneous speaking without causing howling, generally involves the use of speech switching circuits and echo cancelers. Echo cancelers are usually comprised of digital hardware and software using a digital signal processor (DSP). The algorithms used in echo cancelers are already established and technically speaking realization or use of these algorithms is of no great difficulty. The problem, however, is the production costs in commercialization and the physical size of the hardware and software. The component accounting for the majority of the cost of the echo canceler is the digital signal processor. If the processing performance of digital signal processors were the same, then the cost of the DSP would be proportional to the echo continuation time to be canceled out. In other words, the cost and size of the DSP may be said to be determined by the echo cancelable time. Therefore, the proper setting of the echo cancelable time is important and has a decisive effect on the price competition at the time of marketing the handfree telephones.

However, the superiority or inferiority (echo canceling ability) of a handfree telephone with a built-in echo canceler is determined by the length of the set reverberation time when comparing echo cancelers with the same coefficient correcting algorithms. The longer the reverberation time, naturally the more the apparatus can be used in rooms with different and longer reverberation times and a higher or better performance of the handfree telephone.

Therefore, the policy in design tends to be to work to lengthen the set reverberation time as much as possible which substantially increases the cost and size of the echo canceler. For this reason, handfree telephones with built-in echo cancelers have become high in price and large in size and the ones in development or on the market have ended up limited for use in conference telephones or car telephones where high prices are tolerated by the consumer. Of course, the price cannot be set exorbitantly high and therefore in many cases a reverberation time of several tens of milliseconds (msec) to a hundred odd msec is selected to be used as the set echo cancelable time.

In addition, the set echo cancelable time in the echo canceler may be shortened so as to shorten the convergence time of the adaptive filter constituting the echo canceler.

The following conventional methods of shortening the convergence time of the adaptive filter are known:

(1) Japanese Unexamined Patent Publication (Kokai) No. 62-291223 "Adaptive Filter Adaptation Method and Apparatus" (laid open Dec. 18, 1987), (2) Japanese Unexamined Patent Publication (Kokai) No. 63-248218 "Adaptive Control Filter" (laid open Oct. 14, 1988), and (3) Japanese Unexamined Patent Publication (Kokai) No. 1-233826 "Adaptive Filter" (laid open Sep. 19, 1989).

The reference of the above-mentioned (1) No. 62-291223 discloses a method using a correlator to shorten the convergence time of the adaptive filter.

The reference of the above-mentioned (2) No. 63-248218 discloses a method of shortening the convergence time by providing a tap number determining circuit for controlling and changing the number of taps.

The reference of the above-mentioned (3) No. 1-233826 also discloses an adaptive filter which shortens the convergence time by changing the number of taps.

The problem, however, is that there is little evidence to determine if the convergence time of the adaptive filter is sufficient or insufficient or excessive and to determine if the convergence time is deficient with the time setting method of the prior art. The echo cancelable time in handfree telephones previously announced seem to have been already judged on the basis of "the longer the better, but to an extent considering the rise in price". Judgements based on such scanty evidence lead to the problems of rising prices when the convergence time setting is excessive and unnecessary and the occurrence of howling when the time set is too short.

Regarding the reduction of the amount of arithmetic operations in the echo canceler, there are known the following methods:

(4) "A Study on Echo Cancelers Using the Learning Identification Method" (B-2-3, 4th *Digital Signal-Processing Symposium* (December 1989)), and (5) "Thoughts on Echo Cancelers Using the Learning Identification Method" (3-6-6, Fiscal 1989 *Japan Acoustical Society* Autumn National Congress (October 1989)).

Further, the fact that the echo path gain displays an attenuation characteristic is shown in the following articles:

(6) *Institute of Electronics, Information and Communication Engineers Technical Reports* EA89-3 "Regarding Improvement of Adaptive Characteristic of Echo Cancelers in Room Sound Fields", Makino et al., and (7) *Institute of Electronics Information and Communication Engineers* Spring National Congress B-557 "Examination of Echo Cancelers Using Weighted Adaptive Control", Maruyama.

Further, prior art on the detection of a narrow band signal by the linear prediction method is described in the following articles:

(8) "Examination of Single Tone Detectors Using Adaptive Filters" (1990 *Institute of Electronics, Information and Communication Engineers* Spring National Congress B-738), (9) "Examination of Narrow Band Signal Detection Method in Echo Canceler Type Handfree Circuit" (1988 *Institute of Electronics, Information and Communication Engineers* Autumn National Congress B300), and

(10) "Narrow Band Signal Detection Apparatus", Japanese Examined Patent Publication (Kokoku) No. 2-65325.

Further, even if the echo cancellation time is suitably set, the handfree telephone components should desirably be made on one chip since the handfree telephone components are carried in the handfree telephone. On the other hand, the size of the echo canceler apparatus becomes larger along with the amount of arithmetic operations handled when increasing the set reverberation time. Therefore, to make the echo canceler fit on one chip, it is desirable to reduce the amount of arithmetic operations handled.

Also, even if the echo cancelable time is suitably set and the amount of arithmetic operations in the echo canceler is slashed or reduced, the coefficient estimation operation of the echo canceler based on the narrow band signal of the ring back tone, time information, etc. input to the handfree telephone results in the estimated narrow band signal deviating from the narrow band signal of the next input speech signal. The amount of echo cancellation with respect to the input of the speech signal directly after the distorted or incorrectly estimated narrow band signal is incorrect and howling occurs. In addition, a distorted narrow band signal is output from the speaker, which makes commercialization of the handfree telephone impossible. This problem has been dealt with or handled in the past by detecting the distorted narrow band signal and removing the unwanted or distorted signal. However, there are problems such as the possibility of incorrectly determining female voices, etc., as a narrow band signal, the long delay time occurring in the detection of a narrow band signal, and the erroneous identification of howling as a narrow band signal.

DISCLOSURE OF THE INVENTION

The object of the present invention is to provide a speaking apparatus having a handfree conversation function wherein the optimum or most important functions are shared between the echo canceler and the speech switching circuit so as to inexpensively and optimally set the echo cancelable time.

Another object of the present invention is to provide a speaking apparatus having a handfree conversation function wherein no correction or modification is made to the algorithm. In addition, deterioration of the estimation performance is prevented from occurring while enabling reduction of the amount of arithmetic operations in the echo canceler.

Still another object of the present invention is to provide a speaking apparatus having a handfree conversation function wherein there is little possibility of mistaken judgement of a female voice, etc., as a narrow band signal, which the delay time of the detection of the narrow band signal is short. In addition, when it is not desirable to judge howling as a narrow band signal, provision is made for a narrow band signal detector functioning to eliminate howling.

To achieve the above-mentioned objects, the present invention provides a speaking apparatus which has a handfree conversation function enabling speaking without holding a receiver in the hand by providing a microphone and a speaker in the casing. The speaking apparatus in addition has a handfree conversation function characterized by being provided with a first echo canceler which gives to the speaker a signal obtained by canceling from the output signal of the microphone the echo given by direct acoustic coupling through the space between the speaker and microphone caused by a system comprised of a casing and a surface on which the casing is emplaced and by acoustic coupling inside the casing. In addition, a speech switching circuit is provided which has as an upper limit of the amount of insertion attenuation of the transmitted and received signal the amount of attenuation sufficient to cancel the echo given by indirect acoustic coupling determined from the state of the space or location where the speaking apparatus having the handfree conversion function is used. The speech switching circuit attenuates the output signal of the microphone and gives the result to the speaker.

A second echo canceler able to cancel the echo derived from the anti-side noise circuit is preferably further provided.

The cancelable reverberation time of the first echo canceler is preferably set to less than 20 msec.

In addition, the cancelable reverberation time of the first echo canceler is also preferably set to about the reverberation time actually measured in an anechoic room, anechoic chamber, etc.

The cancelable reverberation time of the second echo canceler is preferably set to a continuous time of equal to or less than that of the first echo canceler.

The upper limit of the insertion attenuation of the speech switching circuit is preferably set to a degree enabling two-way speaking.

In addition, the upper limit of the insertion attenuation of the speech switching circuit is preferably set to 20 dB.

The first echo canceler or the second echo canceler preferably is provided with a coefficient correcting means which transmits a signal to a system with unknown characteristics and estimates, based on the difference between the echo with respect to that signal obtained at an input terminal receiving the reply and a pseudo echo synthesized from that signal using an adaptive filter provided in the apparatus, the coefficient of that adaptive filter. In addition, a coefficient selecting means which suspends the coefficient correction processing for the adaptive filter at a frequency in accordance with a predetermined rule so as to reduce the amount of processing performed for each sampling period.

The coefficient selecting means is preferably provided with a means for suspending the coefficient correction processing for each tap of the adaptive filter.

The coefficient selecting means is also preferably provided with a means for suspending the coefficient correction processing in units of sets of several taps of the adaptive filter.

The suspending means for suspending the coefficient correction processing for each tap is provided with an assumption means which assumes that the amplitude characteristic of the impulse response falls exponentially with respect to the predicted reverberation time of the unknown system. In addition, when step input is given to a low pass filter having a filter coefficient giving the desired ability to suppress an external disturbance, the suspending means suspends the estimation operation for each tap of the adaptive filter for those which have a small response.

The suspending means for suspending operation in units of sets of several taps is also provided with an assumption means which assumes the amplitude characteristic of the impulse response falls exponentially with respect to a predicted reverberation time of an unknown system. In addition, the suspension means gives as a stepped input to a low pass filter having a filter coefficient giving a desired ability to suppress external disturbances the average value of the set of taps of the adaptive filter or one of the values in that set as the amplitude value, and suspends the estimation operation for those with the small response at that time.

The coefficient selecting means has a transmitting means provided in an apparatus which sends a signal to a system with unknown characteristics, estimates the transmission function which the system gives from the response, and forms a transmission function equivalent to the same, detecting that the signal transmitted to the system is a narrow band signal for which the estimation is to be suspended. In addition, a coefficient calculating means is provided which calculates the value of the coefficient to give a minimum difference between the output of a secondary noncyclic type filter, comprised of a shift register giving a delay of one sampling period and a multiplier which multiplies a separately determined coefficient, by a filter input. The coefficient correcting means uses as the correction constant in the coefficient calculating means & value corresponding to the detection delay allowable in narrow band signal detection.

The coefficient calculating means may be one using the fact that the ratio between the level of the difference and the level of the filter input becomes less than a fixed value determined in advance and gives in a fixed manner a secondary coefficient of the secondary noncyclic type filter of 1 or −1.

The coefficient calculating means preferably uses the fact that the ratio of the level of the difference and the level of the filter input becomes less than a fixed value determined in advance and performs the calculation of the signal level of the narrow band signal by cumulative addition dividing the same into sections.

The coefficient calculating means may be made to reset the coefficient value at every fixed interval.

The coefficient calculating means also preferably uses the fact that the ratio of the level of the difference and the level of the filter input becomes less than a fixed value determined in advance and resets the coefficient value at every fixed interval.

The coefficient selecting means has a transmitter means provided in an apparatus which sends a signal to a system with unknown characteristics, estimates the transmission function which the system gives from the response, and forms a transmission function equivalent to the same, detecting that the signal transmitted to the system is a narrow band signal for which the estimation is to be suspended. In addition, a narrow band signal detecting means is provided using a secondary noncyclic type filter comprised of a shift register giving a delay of one sampling period and a multiplier which multiplies with a separately determined coefficient, which narrow band signal detecting means inserts into the speaking circuit a filter equivalent to the secondary noncyclic type filter when it judges a signal is a narrow band signal.

The coefficient calculating means uses the fact that the ratio of the level of the difference and the level of the filter input becomes less than a fixed value determined separately, adds to the difference output a primary cyclic filter having as a coefficient ½ of the primary coefficient of the secondary noncyclic type filter which is extracted, and uses the output for the calculation of the level ratio.

The narrow band signal detecting means preferably performs in block units the coefficient renewal processing during the arithmetic operations for estimating the coefficient.

The coefficient calculating means also uses the fact that the ratio of the level of difference and the level of the filter input becomes less than a fixed value determined separately, and constitutes or forms a secondary cyclic type filter from a separately determined constant determining the bandwidth. In addition, the coefficient calculating means connects the input of the secondary noncyclic type filter to the filter input, and uses the resultant output for the calculation of the level ratio.

The narrow band signal detecting means may be made to insert into the speaking circuit the secondary noncyclic type filter only after the detection results continue or are repeated a number of times.

BRIEF DESCRIPTION OF THE DRAWINGS

FIG. 21A and FIG. 21B are views showing an example of a response of the coefficient b with respect to a calling tone in the conventional method (a);

FIG. 22 to FIG. 24B are views showing the locus of the coefficient b with respect to noise in the conventional method (a) in the case of K=1, K=0.05, and K=0.01, respectively;

FIG. 25 is a view showing the locus of the coefficient b with respect to a female voice in the conventional method (a);

FIG. 33A and FIG. 33B are views showing the locus of the power ratio with respect to the calling tone by cumulative addition divided into sections in the third embodiment of the present invention;

FIG. 34A and FIG. 34B are views showing the locus of the power ratio with respect to a voice by cumulative addition divided into sections in the third embodiment of the present invention;

FIG. 35 is a view showing a power detection circuit in the third embodiment of the present invention;

FIG. 36A to FIG. 36C are views showing the locus of the coefficient b in the case of resetting the coefficient b for each fixed time in the third embodiment of the present invention;

FIG. 37A and FIG. 37B are views showing the locus of the power ratio with respect to the calling tone in the case of using sectional integration and resetting the coefficient b every fixed time in the third embodiment of the present invention;

FIG. 38A and FIG. 38B are views showing the locus of the power ratio with respect to speech in the case of using sectional integration and resetting the coefficient b every fixed time in the third embodiment of the present invention;

FIG. 47A and FIG. 47B are views showing the power ratio with respect to a calling tone in the case of a block unit of 8 in the third embodiment of the present invention;

FIG. 52 and FIG. 53 are views showing the frequency characteristic of the band pass filter in FIG. 51;

FIG. 54A and FIG. 54B are views showing the locus of the power ratio with respect to speech and the calling tone in the case of a time constant of 32 msec in the circuit of FIG. 51;

FIG. 55A and FIG. 55B are views showing the locus of the power ratio with respect to speech and the calling tone in the case of a time constant of 64 msec in the circuit of FIG. 51;

FIG. 56A and FIG. 56B are views showing the locus of the power ratio with respect to speech and the calling tone in the case of a time constant of 128 msec in the circuit of FIG. 51;

FIG. 57A and FIG. 57B are views showing the locus of the power ratio with respect to speech and the calling tone in the case of a time constant of 256 msec in the circuit of FIG. 51;

FIG. 58A and FIG. 58B are views showing the locus of the power ratio with respect to speech and the calling tone in the case of K=0.01 in the circuit of FIG. 51;

FIG. 59A and FIG. 59B are views showing the locus of the power ratio with respect to speech in the case of a coefficient renewal block unit of 4 in the circuit of FIG. 51;

FIG. 59C and FIG. 59D are views showing the locus of the power ratio with respect to the calling tone in the case of a coefficient renewal block unit of 4 in the circuit of FIG. 51;

FIG. 60A and FIG. 60B are views showing the locus of the power ratio with respect to speech in the case of a coefficient renewal block unit of 8 in the circuit of FIG. 51;

FIG. 60C and FIG. 60D are views showing the locus of the power ratio with respect to the calling tone in the case of a coefficient renewal block unit of 8 in the circuit of FIG. 51;

FIG. 61A and FIG. 61B are views showing the locus of the power ratio with respect to speech in the case of a coefficient renewal block unit of 16 in the circuit of FIG. 51;

FIG. 61C is a view showing the locus of the power ratio with respect to the calling tone in the case of a coefficient renewal block unit of 16 in the circuit of FIG. 51;

FIG. 62A and FIG. 62B are views showing the locus of the power ratio with respect to speech in the case of a coefficient renewal block unit of 32 in the circuit of FIG. 51;

FIG. 62C is a view showing the locus of the power ratio with respect to the calling tone in the case of a coefficient renewing block unit of 32 in the circuit of FIG. 51;

FIG. 63A and FIG. 63B are views showing the locus of the power ratio with respect to speech in the case of a coefficient renewal block unit of 64 in the circuit of FIG. 51;

FIG. 63C is a view showing the locus of the power ratio with respect to the calling tone in the case of a coefficient renewal block unit of 64 in the circuit of FIG. 51;

FIG. 64A and FIG. 64B are views showing the locus of the power ratio with respect to speech in the case of a coefficient renewal block unit of 128 in the circuit of FIG. 51;

FIG. 65A and FIG. 65B are views showing the locus of the power ratio with respect to speech in the case of a coefficient renewal block unit of 256 in the circuit of FIG. 51;

FIG. 65C is a view showing the locus of the power ratio with respect to the calling tone in the case of a coefficient renewal block unit of 256 in the circuit of FIG. 51;

FIG. 66A and FIG. 66B are views showing the locus of the power ratio with respect to speech in the case of a coefficient renewing block unit of 512 in the circuit of FIG. 51;

FIG. 66C is a view showing the locus of the power ratio with respect to the calling tone in the case of a coefficient renewal block unit of 512 in the circuit of FIG. 51;

FIG. 68A and FIG. 68B are views showing the locus of the power ratio with respect to speech and the calling tone in the case of a coefficient renewal block unit of 8 in the echo canceler with an additional primary cyclic type filter of FIG. 41;

FIG. 69A and FIG. 69B are views showing the locus of the power ratio with respect to speech and the calling tone in the case of a coefficient renewal block unit of 16 in the echo canceler with an additional primary cyclic type filter of FIG. 41;

FIG. 70A and FIG. 70B are views showing the locus of the power ratio with respect to speech and the calling tone in the case of a coefficient renewal block unit of 32 in the echo canceler with an additional primary cyclic type filter of FIG. 41;

FIG. 71A and FIG. 71B are views showing the locus of the power ratio with respect to speech and the calling tone in the case of a coefficient renewal block unit of 64 in the echo canceler with an additional primary cyclic type filter of FIG. 41;

FIG. 73A and FIG. 73B are views showing the locus of the power ratio with respect to speech and the calling tone in the case of a coefficient renewal block unit of 256 in the echo canceler with an additional primary cyclic type filter of FIG. 41;

FIG. 74A and FIG. 74B are views showing the locus of the power ratio with respect to speech and the calling tone in the case of a coefficient renewal block unit of 512 in the echo canceler with an additional primary cyclic type filter of FIG. 41;

FIG. 75 is a view showing the locus of the power ratio with respect to speech in the case of $K=0.5$ and a coefficient renewal block unit of 8 in the echo canceler with an additional primary cyclic type filter of FIG. 41;

FIG. 76 is a view showing the locus of the power ratio with respect to speech in the case of $K=0.1$ and a coefficient renewal block unit of 8 in the echo canceler with an additional primary cyclic type filter of FIG. 41;

FIG. 78A and FIG. 78B are views showing the locus of the power ratio with respect to speech and the calling tone in the case of a time constant of 128 msec and a coefficient renewal block unit of 32 in the echo canceler with an additional secondary cyclic type filter of FIG. 51;

FIG. 79A and FIG. 79B are views showing the locus of the power ratio with respect to speech and the calling tone in the case of a time constant of 128 msec and a coefficient renewal block unit of 64 in the echo canceler with an additional secondary cyclic type filter of FIG. 51;

FIG. 80A and FIG. 80B are views showing the locus of the power ratio with respect to speech and the calling tone in the case of a time constant of 128 msec and a coefficient renewal block unit of 128 in the echo canceler with an additional secondary cyclic type filter of FIG. 51;

FIG. 81A and FIG. 81B are views showing the locus of the power ratio with respect to speech and the calling tone in the case of a time constant of 128 msec and a coefficient renewal block unit of 256 in the echo canceler with an additional secondary cyclic type filter of FIG. 51;

FIG. 82A and FIG. 82B are views showing the locus of the power ratio with respect to speech and the calling tone in the case of a time constant of 128 msec and a coefficient renewal block unit of 512 in the echo canceler with an additional secondary cyclic type filter of FIG. 51;

FIG. 83A to FIG. 86B are views showing the locus of the power ratio with respect to speech and the calling tone in the case of a coefficient renewal block unit of 128 and time constants changed to 32 msec, 64 msec, 128 msec, and 256 msec in the echo canceler with an additional secondary cyclic type filter of FIG. 51;

FIG. 87A and FIG. 87B are views showing the locus of the power ratio with respect to the calling tone in the case of a time constant of 64 msec and a coefficient renewal block unit of 8 in the echo canceler with an additional secondary cyclic type filter of FIG. 51;

FIG. 91 is a view showing the locus of the power ratio in the conventional method (a).

DESCRIPTION OF THE PREFERRED EMBODIMENTS

Figure 1:
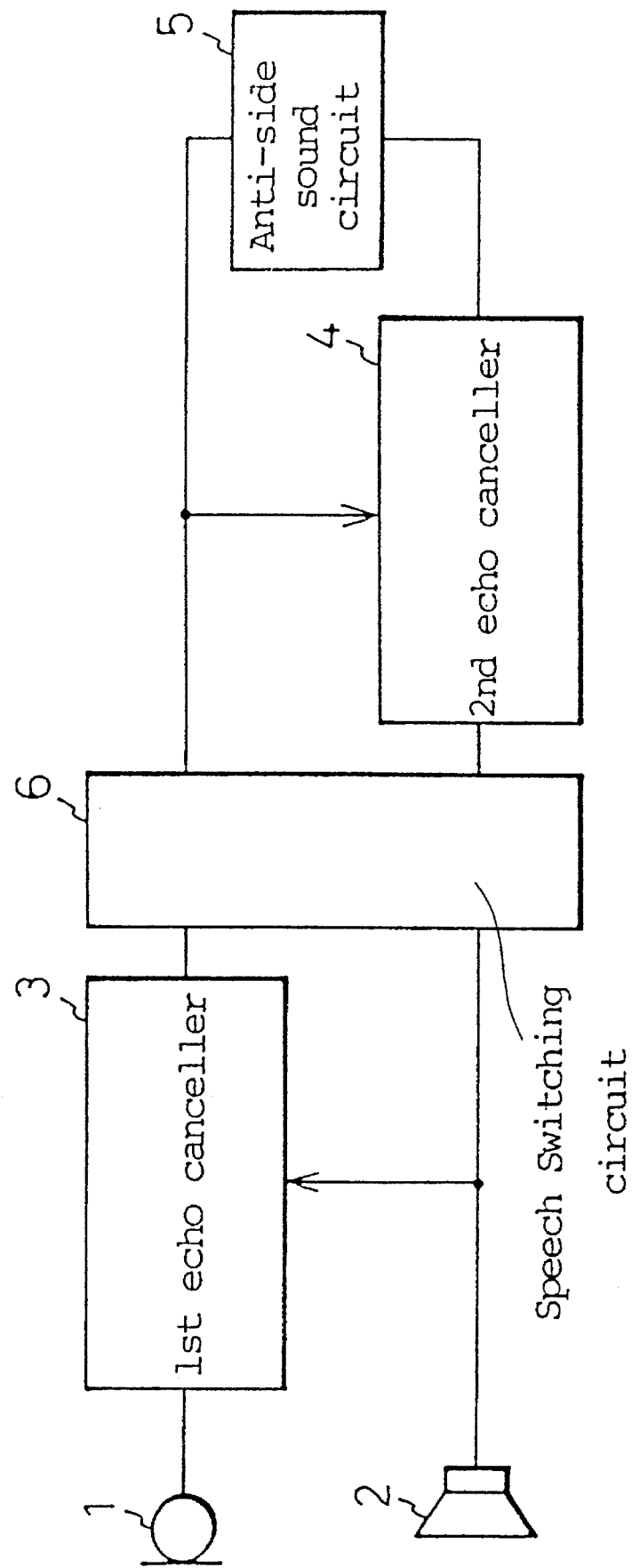
FIG. 1 is a basic block diagram of the present invention.

FIG. 1 is a basic block diagram of the present invention.

In FIG. 1, 1 represents a microphone and 2 is a speaker.

Reference numeral 3 is a first echo canceler, which first echo canceler is able to cancel the echo given by direct acoustic coupling between the speaker 2 and the microphone 1 caused by the system. The system is comprised of the casing of the handfree telephone and the surface on which the casing is emplaced.

Reference numeral 4 is a second echo canceler, which second echo canceler is required only for two-wire type telephones and can cancel the echo derived or projected from an anti-side sound circuit 5.

Reference numeral 6 is a speech switching circuit, which is disposed between the first echo canceler 3 and the second echo canceler 4 and attenuates the transmitted and received signals by a predetermined amount. An insertion attenuation is set having as its upper limit the amount of attenuation sufficient for canceling the echo given by the indirect acoustic coupling determined by the state of the space or location where the handfree telephone is used.

In the present invention, the majority of the echo created occurs due to direct acoustic coupling and not due to the state of the space. Taking note of this, the echo caused by the direct acoustic coupling is canceled by the first echo canceler 3, and the remaining echo component, that is, the echo caused by the indirect acoustic coupling not determined by the state of the space, is attenuated by the speech switching circuit 6.

By this method, the tap length of the first echo canceler 3 can be suitably set without being made too long or too short as in the past or prior art.

Further, the cancelable reverberation time of the first echo canceler 3 is desirably set to be less than 20 msec or set to be about the reverberation time actually measured in an anechoic room, anechoic chamber, etc.

Further, the cancelable reverberation time of the second echo canceler 4 is desirably set to be a continuous time of equal to or less than that of the first echo canceler 3.

Also, the upper limit of the insertion attenuation of the speech switching circuit 6 is desirably set to 20 dB.

In the above-mentioned handfree telephone of the present invention, the provision of the microphone 1 and the speaker 2 enables speaking without holding a receiver. The first echo canceler 3 cancels the echo given by the direct acoustic coupling between the speaker 2 and the microphone 1 caused by the system comprised of the casing of the handfree telephone and the surface on which the casing is emplaced. In addition, the second echo canceler cancels the echo derived from the anti-side sound circuit 5.

At this time, if the cancelable reverberation time of the first echo canceler 3 is set to be less than 20 msec or set to about the reverberation time actually measured in an anechoic room, anechoic chamber, etc. and the cancelable reverberation time of the second echo canceler 4 is set to a continuous time equal to or less than that of the first echo canceler 3, effective echo cancellation becomes possible.

The speech switching circuit 6 suppresses the acoustic coupling which cannot be canceled by the echo cancelers 3 and 4. At this time, the upper limit of the insertion attenuation of the speech switching circuit 6 is sufficient if set to 20 dB.

Figure 2:
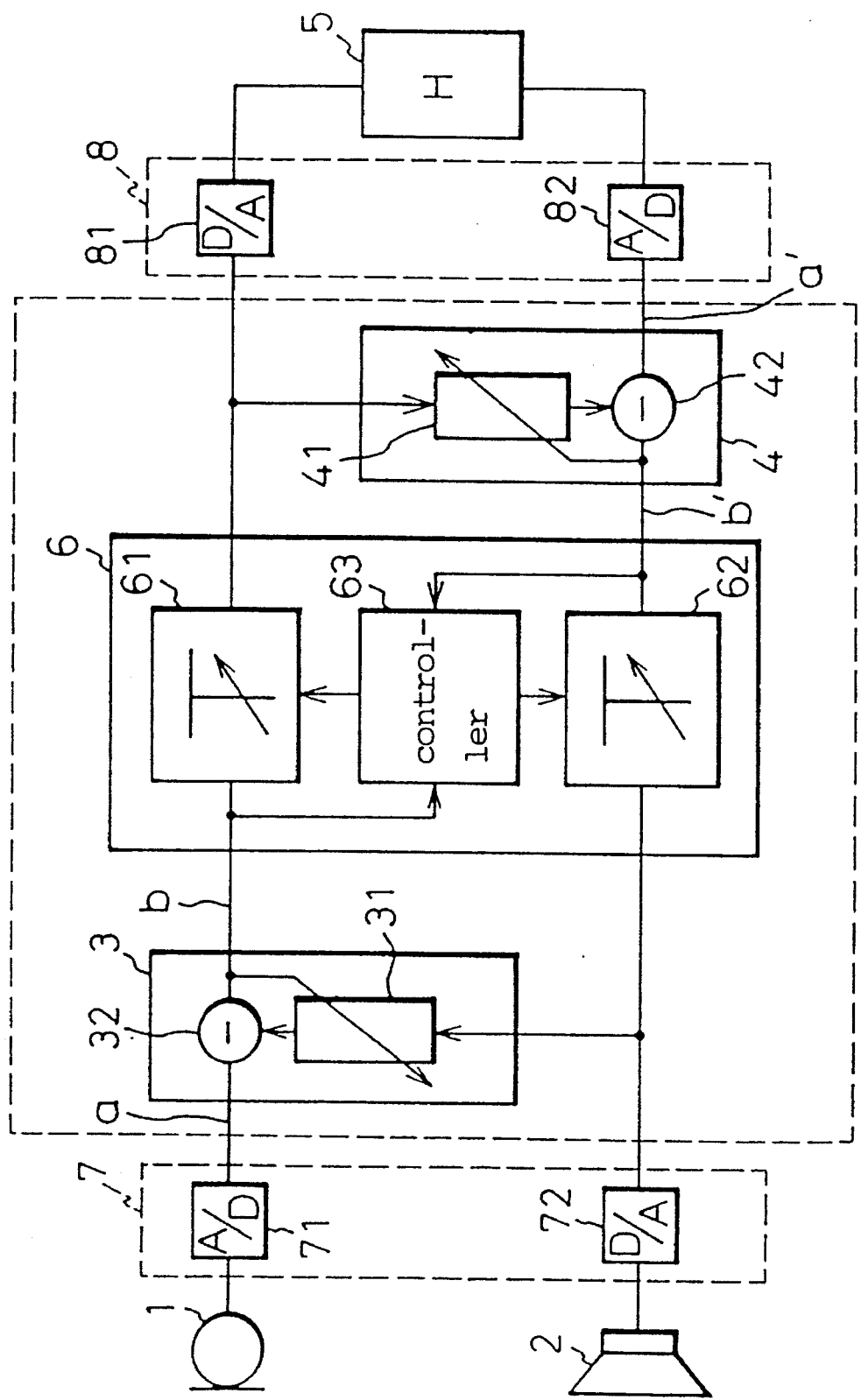
FIG. 2 is a block diagram showing an embodiment of the present invention.

FIG. 2 is a block diagram showing an embodiment of the present invention. The handfree telephone shown in FIG. 2 is comprised of a microphone 1, speaker 2, first echo canceler 3, second echo canceler 4, anti-side sound circuit 5, speech switching circuit 6, and CODEC circuits 7 and 8.

Figure 3:
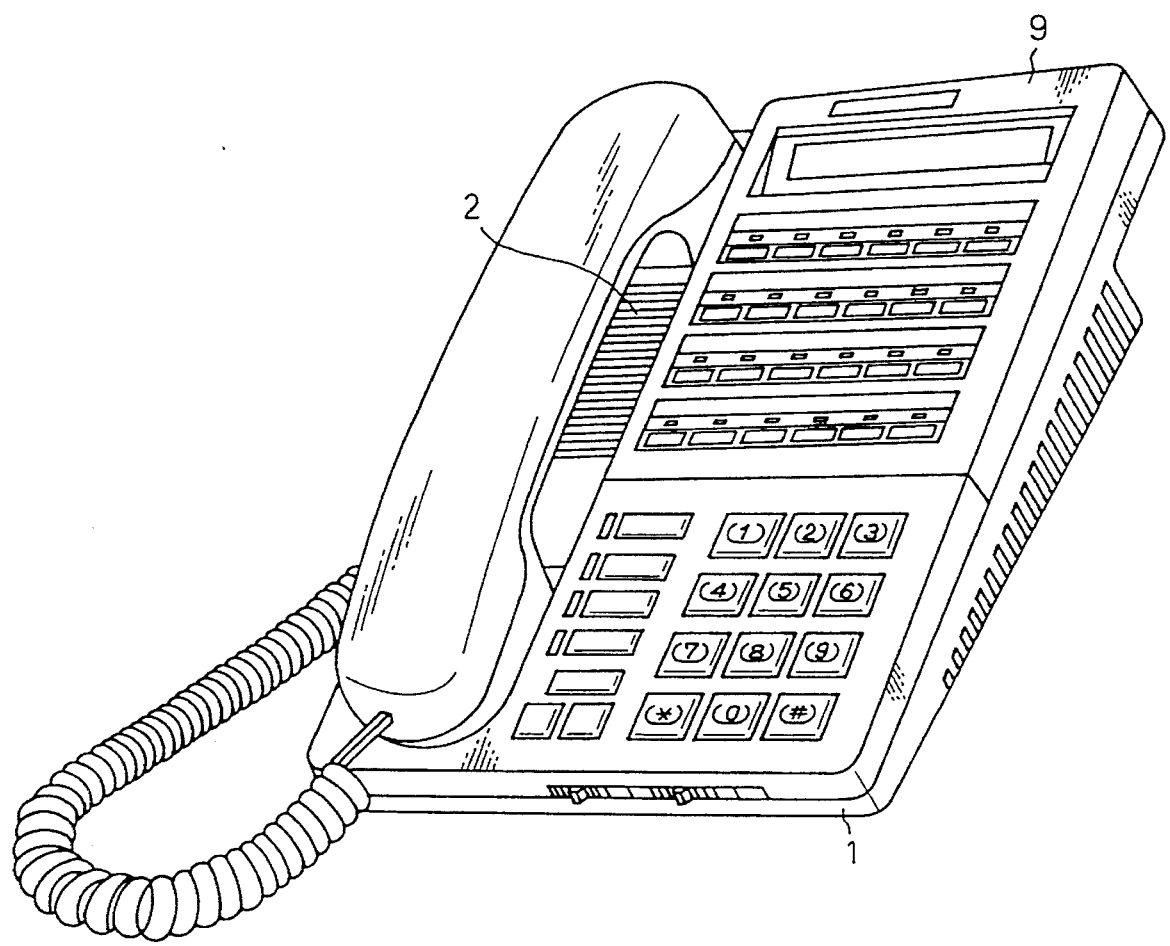
FIG. 3 is a perspective view of a handfree telephone.

Here, the microphone 1 and the speaker 2 are provided at positions close to each other. In practice, for example as shown in FIG. 3, they are provided in the casing 9 of the handfree telephone.

The first echo canceler 3 can cancel the echo given by the direct acoustic coupling between the speaker 2 and the microphone 1 caused by the system comprising the casing 9 of the handfree telephone and the surface on which the casing 9 is emplaced (for example, a tabletop surface). The first echo canceler 3, for example, is comprised of an adaptive filter 31 equipped with a coefficient correcting circuit, a residual echo processor 32, etc. The cancelable reverberation time of the first echo canceler 3 is set by the tap length to be less than 20 msec, for example, 16 msec, but may be set to about the reverberation time actually measured in an anechoic room, anechoic chamber, etc. (for example, about 12 to 13 msec).

The second echo canceler 4 can cancel the echo derived from the anti-side sound circuit 5, and like the first echo canceler 3 is comprised of an adaptive filter 41 equipped with a coefficient correcting circuit, a residual echo processor 42, etc. The cancelable reverberation time of the second echo canceler 4 is set to a continuous time (for example, 8 msec) equal to or less than that of the first echo canceler 3. The second echo canceler is provided or needed only in two-wire type telephones having an anti-side sound circuit 5.

The anti-side sound or tone circuit 5 prevents sound or tone, and is comprised of a hybrid circuit of a two-wire type telephone.

The speech switching circuit 6 is disposed between the first echo canceler 3 and the second echo canceler 4 and performs the required attenuation on the transmitted and received signals. The speech switching circuit 6 is comprised of variable attenuators 61 and 62 and a controller 63 for controlling the attenuation of the variable attenuators 61 and 62. The insertion attenuation is set using as an upper limit the amount of attenuation (for example, 20 dB) determined from the state (size etc.) of the space (room) where the handfree telephone is used. Usually, the upper limit is set to about 4.5 dB.

The CODEC circuit 7 is comprised of an A/D (analog-to-digital) converter 71 which converts the analog signal from the microphone 1 to a digital signal, and a D/A (digital-to-analog) converter 72 which converts the digital signal to an analog signal sent to the speaker 2. The CODEC circuit 8 is comprised of a D/A converter 81 which converts digital signals to analog signals sent to the anti-side sound circuit 5 and an A/D converter 82 which converts analog signals received from the anti-side sound circuit 5 to digital signals. These CODEC circuits 7 and 8 are provided as interfaces with the analog circuits of the speaker 2, microphone 1 and the anti-sound circuits, since it is advantageous in the point of processing precision to realize or construct the first echo canceler 3, the second echo canceler 4, and the speech switching circuit 6 as a digital signal processing system.

Figure 4:
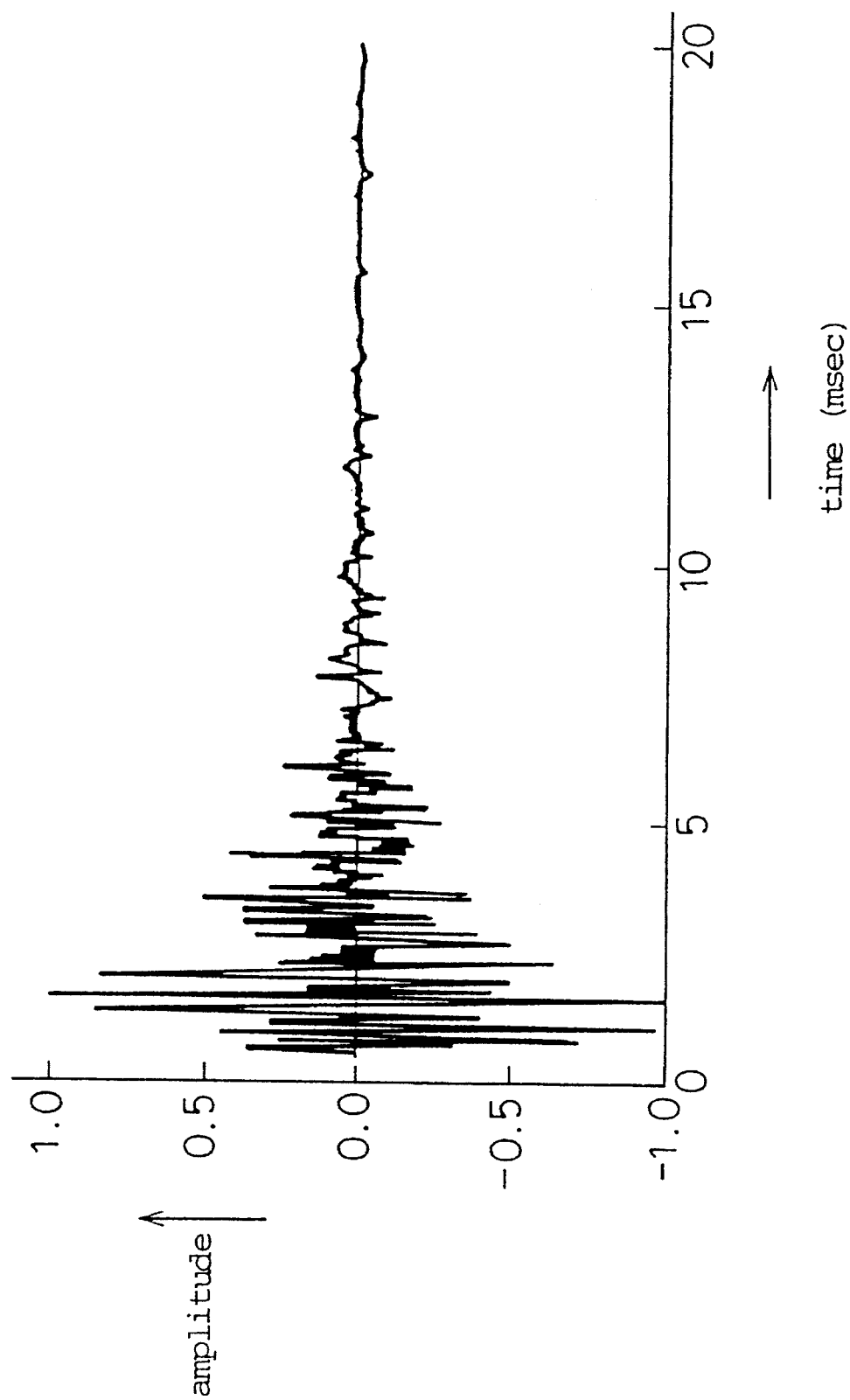
FIG. 4 is a graph showing an example of acoustic coupling between a speaker and microphone in a handfree telephone measured in an anechoic room.

FIG. 4 shows an example of acoustic coupling between the speaker 2 and microphone 1 of the handfree telephone shown in FIG. 3 measured in an anechoic room. The majority of the power of the acoustic coupling is within 15 msec. This is comprised of direct sound from the speaker 2 to the microphone 1, primary reflectance or echo caused by the table on which the handfree telephone is emplaced for measurement or operating purposes, sound transmitted inside the telephone casing, and substantially direct sound such as resonance, mechanical vibration, etc. Naturally, this direct coupling component is not affected by the environment in which the handfree telephone is used and does not change.

Further, if the handfree telephone is brought into an actual room, there is the added reverberation effect caused by the reflection or echoing of sound in the room.

The level of the sound pressure P at the position of the microphone of the coupling or linking of the direct acoustic coupling component and the reverberation effect is defined as the following:

$$20 \cdot \log_{10}|P| = C + 10 \cdot \log_{10}[D(\theta, \phi)/4\pi r^2 + 4/R] \quad (1)$$

being the sound pressure level ignoring the presence of the casing 9 (reference material: "Acoustics", Leo L. Beranek, Chapter 10, Section 14, page 313-4).

Here, in the above-mentioned equation (1), C is a constant determined by selection of a reference value, $D(\theta, \phi)$ is a directional characteristic of the speaker 2 and the microphone 1, r is the distance between the microphone 1 and speaker 2, and R is the room constant (unit: $m^2$) calculated from the average sound absorption rate of the room and the total surface area.

The first term in the logarithm in the above equation (1) shows the direct coupling component of the speaker-microphone and the second term shows the coupling component caused by reverberation in the room.

Therefore, from the above equation (1), it is possible to calculate the amount of acoustic coupling in the handfree telephone after eliminating the direct coupling component by the echo canceler.

Assuming now that an average room where the handfree telephone is used has a room constant R= 20 $m^2$, and the distance between the microphone and speaker in the handfree telephone is 20 cm, the amount of acoustic coupling at the handfree telephone falls from $C+10 \cdot \log_{10}[1/4\pi r^2+4/R]$ to $C+10 \cdot \log_{10}[4/R]$. Therefore, the difference becomes as follows:

$$\begin{aligned} &C + 10 \cdot \log_{10}[1/4\pi r^2 + 4/R] - C - 10 \cdot \log_{10}[4/R] \quad (2)\\ &= 10 \cdot \log_{10}(1.9894368 + 0.2) - 10 \cdot \log_{10}(0.2)\\ &= 9.977 \text{ (dB)} \end{aligned}$$

Further, this difference is the amount of reduction of coupling obtained in the case of designing the system so as to eliminate just the direct coupling component using the echo canceler. Thus, from the results, the indirect coupling caused by the reverberation in the room, converted to power, becomes about 1/10 of the direct coupling. That is, the efficiency of reduction in the case of reducing the coupling due to the reverberation in the room is expressed as 1/10 of that of the direct coupling. From this, it may be said that the effort to make the echo cancellation time slightly longer than the continuous time of the direct coupling has little effect in proportion to the rise in price.

On the other hand, the technology for acoustic echo cancelers designed for reduction of acoustic coupling has been studied with the aim or object of application to apparatuses, as typified by telephone conferences, where the distance between the microphone and the speaker is sufficiently large and it is difficult to consider that the two components could be accommodated in the same casing. In such an apparatus, almost all of the acoustic coupling caused is due to room reverberation. It may be said that there is a large difference with the acoustic coupling in a handfree telephone where the distance between the microphone 1 and the speaker 2, shown by the above analysis, is extremely small when the microphone 1 and the speaker 2 are accommodated in the same casing. In considering conventional handfree telephones equipped with echo cancelers, no consideration has been given to this difference and effort has been directed only to lengthening the echo cancelable time.

In this embodiment of the present invention, however, note or consideration has been taken of this difference and use is made of the echo canceler to reduce the acoustic coupling with a stable echo continuation time so as to keep the efficiency of introduction of the handfree telephone high and have the speech switching circuit properly handle or reduce the coupling component due to room reverberation, which fluctuates according to the environment of use. This use of the echo canceler enables realization of a compact, low price handfree telephone.

Figure 5:
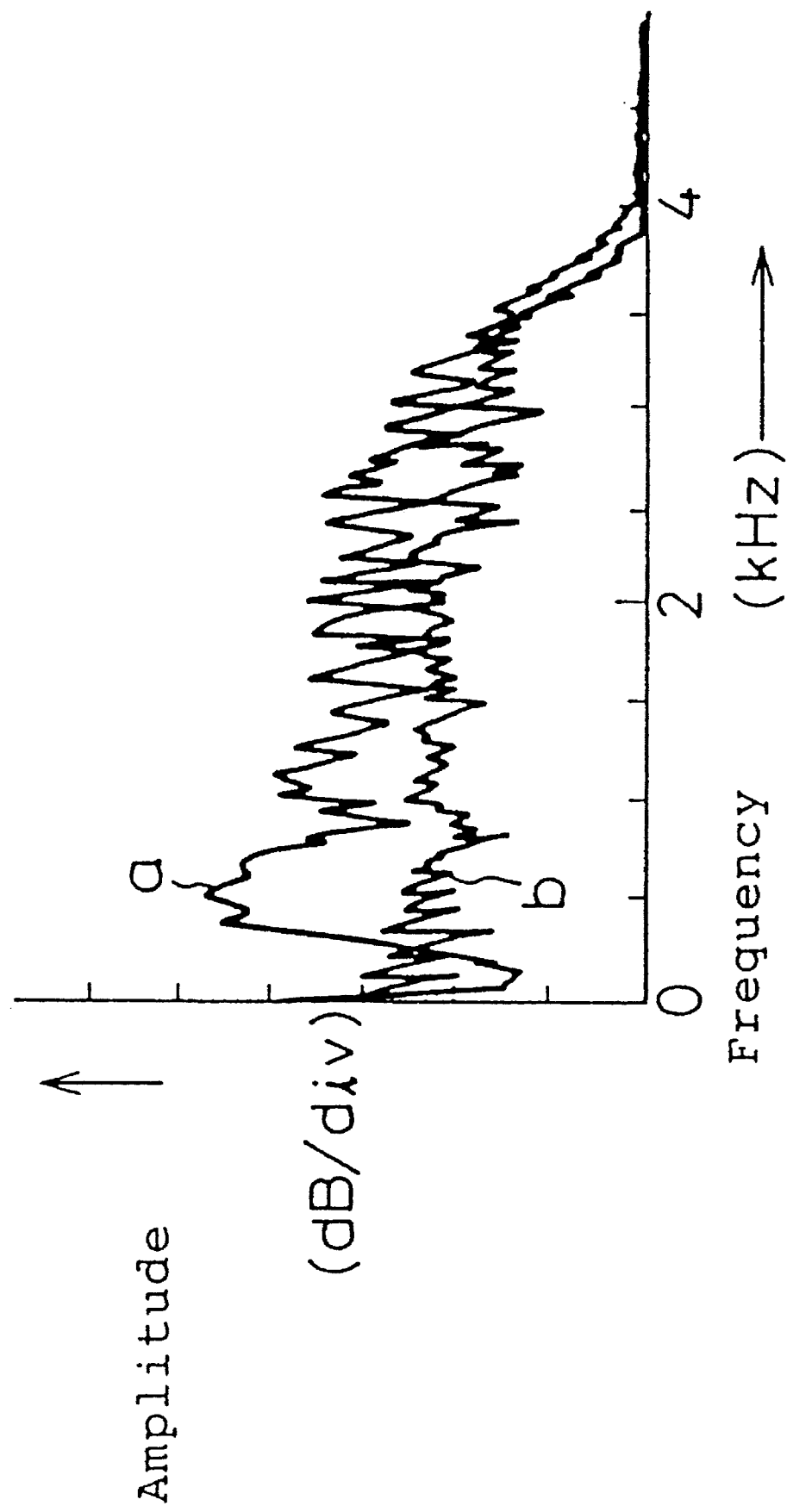
FIG. 5 is a characteristic graph of the echo cancellation of the first echo canceler.
Figure 6:
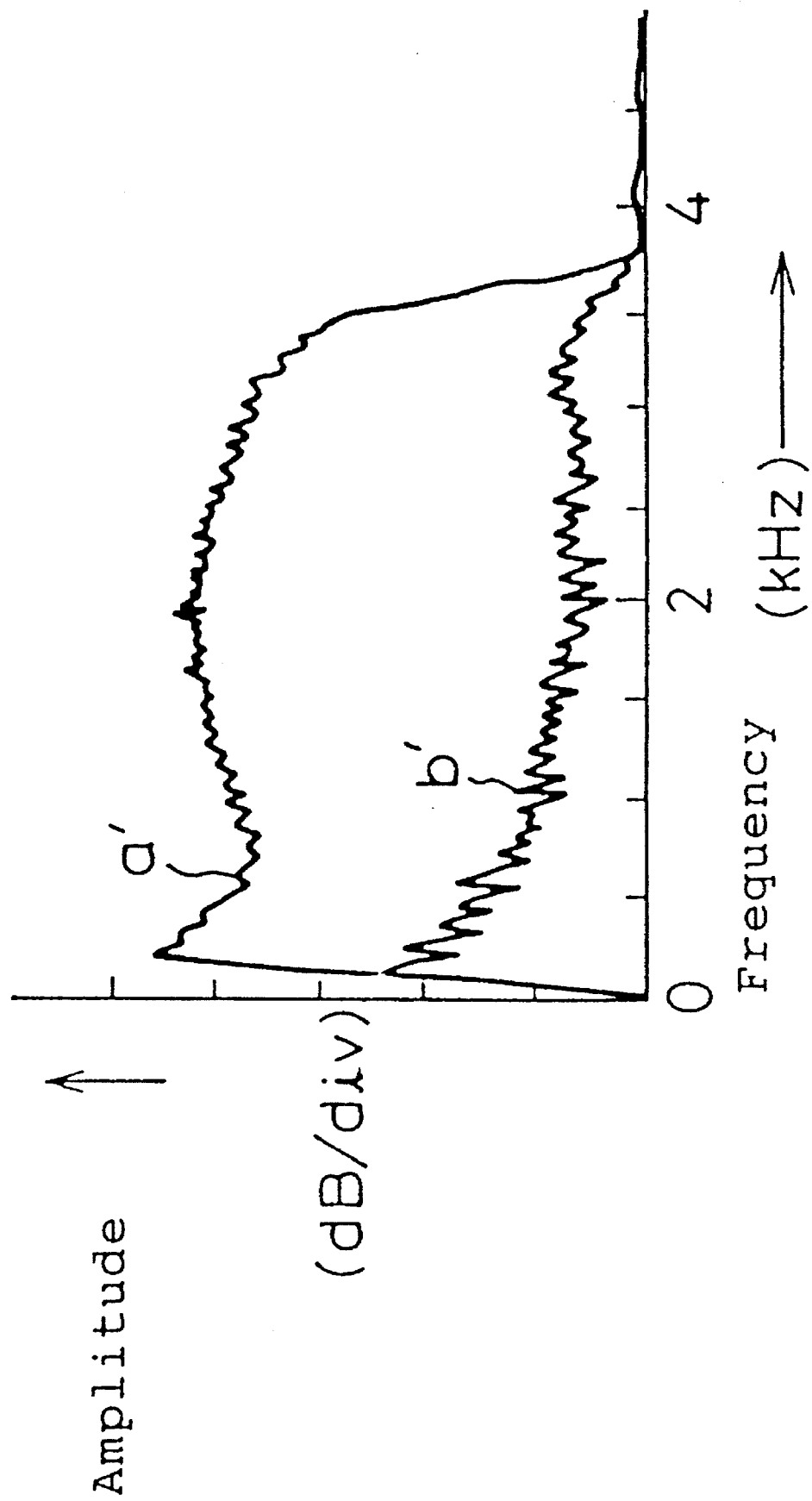
FIG. 6 is a characteristic graph of the echo cancellation of the second echo canceler.

Note that FIG. 5 judges or determines the setting cancellation time of the first echo canceler 3 from the results of FIG. 4 and shows the echo cancellation characteristic obtained assuming it is 16 msec. FIG. 6 shows the echo cancellation characteristic of the second echo canceler 4 when the setting cancellation time is 8 msec and with connection to an artificial transmissions line with a line diameter of 0.4 mm and a loss of 7 dB. Note that in FIG. 5, characteristic a is the characteristic of point a in FIG. 2, while characteristic b is the characteristic of the point b of FIG. 2. In FIG. 6, the characteristic a' is the characteristic of the point a' of FIG. 2, while the characteristic b' is the characteristic of the point b' of FIG. 2. In FIGS. 5 and 6, the longitudinal axis shows the amplitude, with each graduation being 10 dB/div. Further, all characteristics are actually measured for the handfree telephone shown in FIG. 3. Looking at the results, it is learned or exhibited that about 10 dB (FIG. 5) of echo cancellation is obtained between a and b on the sound side, and about 30 dB (FIG. 6) is obtained between a' and b' at the line side, which is substantially according to theory.

On the other hand, in a speech switch type handfree telephone, it is considered necessary to insert an attenuation of 40 dB in the loop comprised of the speaker, microphone, and anti-side sound circuit for proper operation. If an attenuation of 40 dB is obtained by the amount of echo cancellation of the above-mentioned two echo cancelers 3 and 4, the amount of attenuation required by the above-mentioned speech switching circuit 6 may be reduced to several dB. Therefore, in the embodiment, the amount of attenuation by the speech switching circuit 6 is made 4.5 dB and thereby both prevention of the occurrence of howling and two-way simultaneous speaking are realized. Further, if the amount of attenuation of the speech switching circuit 6 is too large, the received speech is cut or blocked and two-way speaking becomes impossible.

Therefore, the upper limit of the amount of insertion attenuation of the speech switching circuit 6 should be a maximum of 20 dB to enable all cases to be dealt with and preventing the received speech from being blocked. This upper limit of 20 dB gives consideration to the size of the room in which the apparatus is used, the distance between the microphone 1 and the speaker 2, etc.

The size of the casing 9 of the handfree telephone may be considered to be about that of the telephone shown in FIG. 3 for almost all cases. The echo continuation time of the direct coupling given by the size of the casing may be considered to be about 16 msec in almost all telephones. Therefore, the set echo cancellation time in the first echo canceler 3 does not have to be over 20 msec.

Further, when using a casing smaller than that of the telephone shown in FIG. 3, by setting the echo cancellation time from the results of the measurement of the direct coupling in an anechoic room or anechoic chamber, it becomes possible to further reduce the price. In this case, as mentioned above, the time is set to about 12 to 13 msec.

In this way, the echo cancelable time of the first echo canceler 3 is made to be about the echo continuation time arising due to the system comprised of the handfree telephone casing 9 and the surface of the table on which the casing 9 is emplaced. In addition, the cancelable time of the second echo canceler 4 is made the same or less than the echo cancelable time of the first echo canceler, and the upper limit of the amount of attenuation of the speech switching circuit 6 is 20 dB in this construction embodiment. In this embodiment, the suppression of the component considered to be substantially the direct acoustic coupling between speaker 2 and microphone 1 is left to the first echo canceler 3, and the suppression of the remaining coupling component is left to the speech switching circuit 6. thus, there is provided a simultaneous speaking type handfree telephone speaking system using an echo canceler, which in the past caused extreme difficulties when incorporating the echo canceler inside a telephone, having a size and price of a usual tabletop telephone, by using a much smaller sized echo canceler than was possible in past. That is, using the present invention it is possible to provide a small sized and low priced handfree telephone which enables simultaneous speaking.

As explained above in detail, according to the handfree telephone of the above first embodiment of the present invention, by combining an echo canceler and speech switching circuit and further by dividing the functions optimally among these circuits, there is the advantage that an excellent speaking quality can be obtained by an inexpensive and small sized processing circuit.

To mount the above first or second echo canceler in a handfree telephone, however, it is desired or necessary to make the echo canceler small in size so that it may fit on one chip.

An explanation will now be made of a second embodiment of the present invention where the echo canceler is made small in size, using FIG. 9 to FIG. 18.

The second embodiment of the present invention relates to a coefficient estimation method of an adaptive filter which sends out a signal to a system with unknown characteristics, estimates the transmission function (impulse response) given by the system from the response, and synthesizes an equivalent replica response inside the apparatus.

In general, when constructing a system for sending a signal to an unknown system with unknown characteristics, it is necessary in many cases to estimate the transmission characteristics of the unknown system from the response of the unknown system.

As one example, there is an echo canceler which realizes two-way simultaneous transmission by sharing a single upward and downward communication line.

In such an echo canceler, an echo replica (corresponding to the response of the above unknown system) equivalent to the echo formed by part of the signal sent from the output terminal to the communication channel traveling into the input terminal due to reflection must be synthesized in the apparatus. This synthesis requires an estimate of the echo path gain of the unknown system, that is, the transmission function, and construction of an adaptive filter having a transmission function equivalent to this estimated transmission function.

As a method for estimation of this adaptive filter-coefficient, there has been proposed a "Learning Identification Method and a Modified Method of the Same" involving the repeated correction of an adaptive filter coefficient by exactly a fine value. The fine value is obtained as the product of the difference between the echo obtained at an input terminal and the pseudo echo synthesized by the adaptive filter and a separately determined correction constant K, which gradually approaches the desired true value. This method is superior in regard to the convergence speed and the finally obtained estimation error.

However, when this method is made or incorporated into a circuit for a final product to a consumer, the amount of arithmetic operations corresponds to the number of signal processors, which is directly related to the production costs. Thus, slashing or reducing the amount of arithmetic operations reduced the signal processors and costs, and is becoming one of the most important issues for consideration to reduce product costs. In particular, to mount an echo canceler in a handfree telephone, it is important to reduce the circuit size of the echo canceler to enable mounting the echo canceler inside the telephone and to lower the price of the apparatus.

The above-mentioned learning identification method will be explained referring to the example of the learning identification method for the echo canceler shown in FIG. 7.

Figure 7:
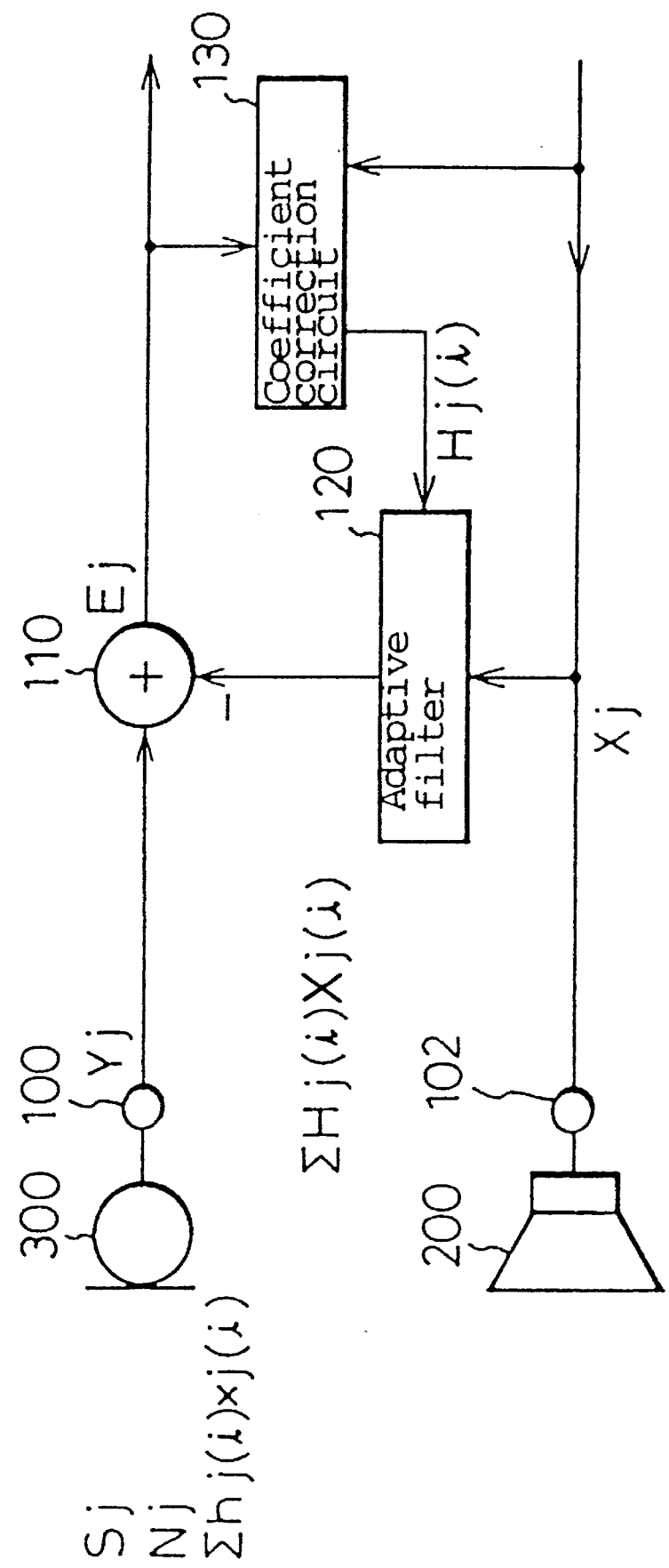
FIG. 7 is a block diagram showing an example of the construction of a conventional echo canceler.

First, the echo canceler shown in FIG. 7 is provided with a residual echo processor 110, an adaptive filter 120 having a plurality of taps m (m=1 to I), and a coefficient correction circuit 130. To the receiving output terminal 102 is connected a speaker 200 and to the transmitting input terminal 100 is connected a microphone 300.

The system between the speaker 200 and the microphone 300 is constituted or considered speaker as an unknown system.

Here, the residual echo processor 110 receives the input signal $Y_j$ and the pseudo echo $\Sigma H_j(i)X_j(i)$ and computes the residual echo $E_j$, so the adaptive filter 120 has a plurality of taps m (m=1 to I). In addition, adaptive filter 120 receives the output signal (received speech) $X_j$ and the filter coefficient $H_j(i)$ from the coefficient correction circuit 130 to find the pseudo echo $\Sigma H_j(i)X_j(i)$. Further, the coefficient correction circuit 130 finds the filter coefficient $H_j(i)$ from the output signal (received speech) $X_j$ and the residual echo $E_j$.

Note that in FIG. 7, $S_j$ is the transmitted speech, NJ is the ambient noise, and $\Sigma h_j(i)x_j(i)$ is the echo. The signals with j characters appended to them are all at the time j.

The coefficient correction algorithm in the adaptive filter in the above echo canceler is expressed by the following equation as the estimation coefficient value $H_{j+1}(m)$ at the time j+1 with the number of adaptive filter taps of m (m=1 to I):

$$H_{j+1}(m)=H_j(m)+KE_jX_j(m)/\Sigma X_j^2(i) \quad (3)$$

where, K is the coefficient correction constant.

Below, a discussion will be made of the amount of reduction based on the amount of arithmetic operations given by this equation (3).

Now, regarding the above equation (3), a typical conventional method for slashing the amount of arithmetic operations without changing the algorithm is to simplify the above-mentioned arithmetic operations. That is, there is the method of making or deriving the following equation (4):

$$H_{j+1}(m)=H_j(m)+KSgn[E_jX_j(m)] \quad (4)$$

where, $Sgn[E_jX_j(m)]$ is the polarity of $E_jX_j(m)$.

By this simplification, the multiplication of the coefficient correction constant K and $E_j X_j(m)$ and the production of the norm $\Sigma X_j^2(i)$ and division of the same in equation (3) become unnecessary, so the amount of arithmetic operations is tremendously slashed.

There is, however, nothing wasted or unnecessary in the arithmetic operation shown in the above-mentioned equation (3). The simplification of it, only naturally, causes a deterioration of the estimation performance or accuracy.

Further, according to the estimation of the coefficient according to the above-mentioned equation (4), the processes of final estimation depend on the coefficient correction constant K. If the estimation coefficient value $H_{j+1}(m)$ is made equal to that before simplification, the rise of the convergence characteristic clearly becomes slower.

Figure 8:
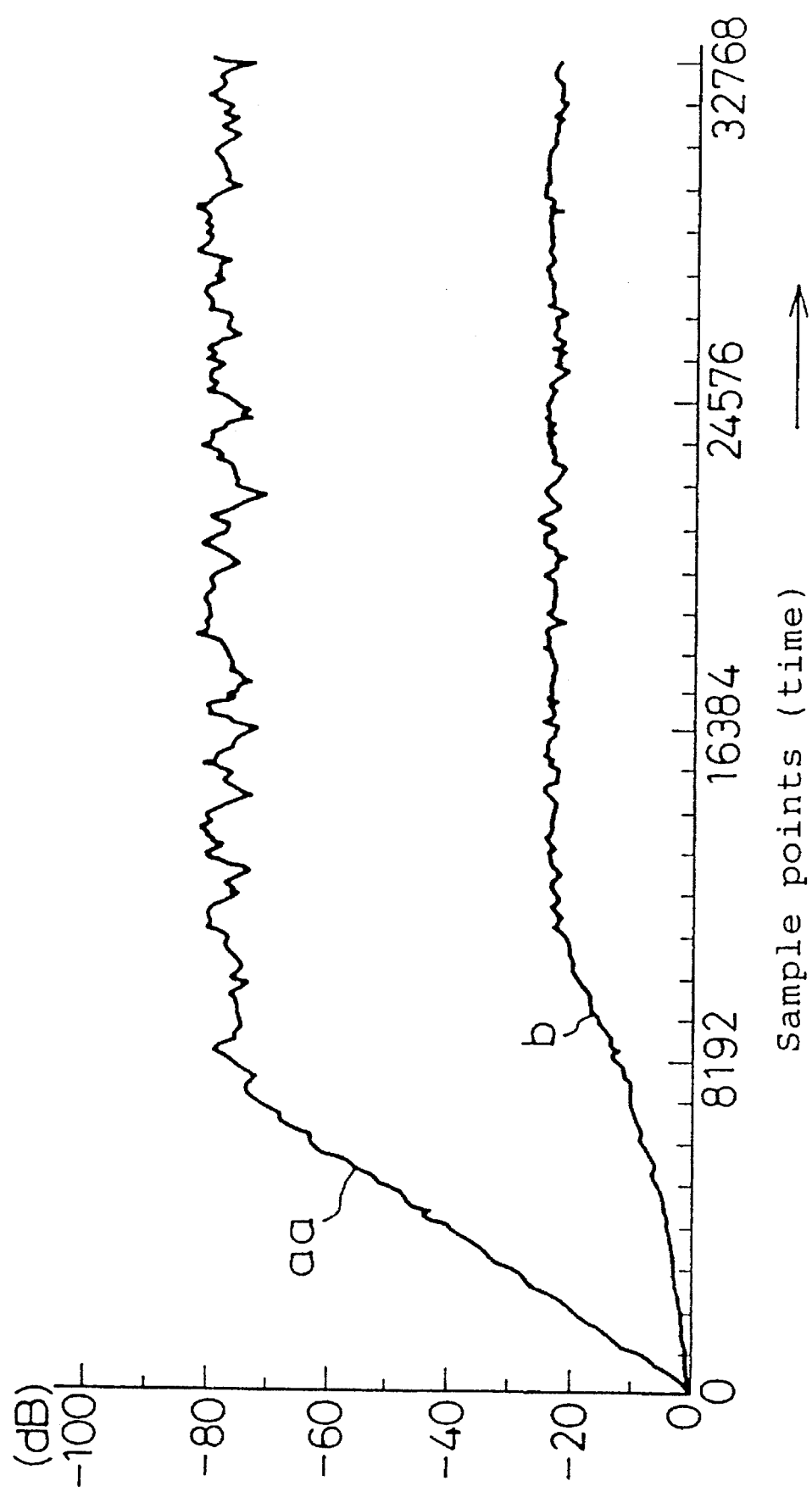
FIG. 8 is a view explaining the convergence characteristic based on the conventional simplified arithmetic operation method.

FIG. 8 shows the convergence characteristic aa in an unsimplified arithmetic operation and the convergence characteristic b with simplification (coefficient correction constant K=0.0005). The simulation in FIG. 8, however, is a result of the calculation of the amount of echo cancellation (dB) for the case of a reverberation time of 512 sample points and an output signal $X_j$ of O.

As the precision of estimation becomes higher or better the greater the amount of the echo cancellation, and as the convergence becomes faster the more acute the rise of the convergence curve.

From this example, it will be understood that simplification of the arithmetic operations causes deterioration of the convergence characteristic.

The second embodiment of the present invention was created in consideration of this fact and has as its object to provide an echo canceler which enables estimation of the adaptive filter coefficient of the type where the amount of processing is cut or reduced. Specifically, the amount of arithmetic operations can be cut without correcting the algorithm and while preventing occurrence of deterioration of the estimation performance.

Figure 9:
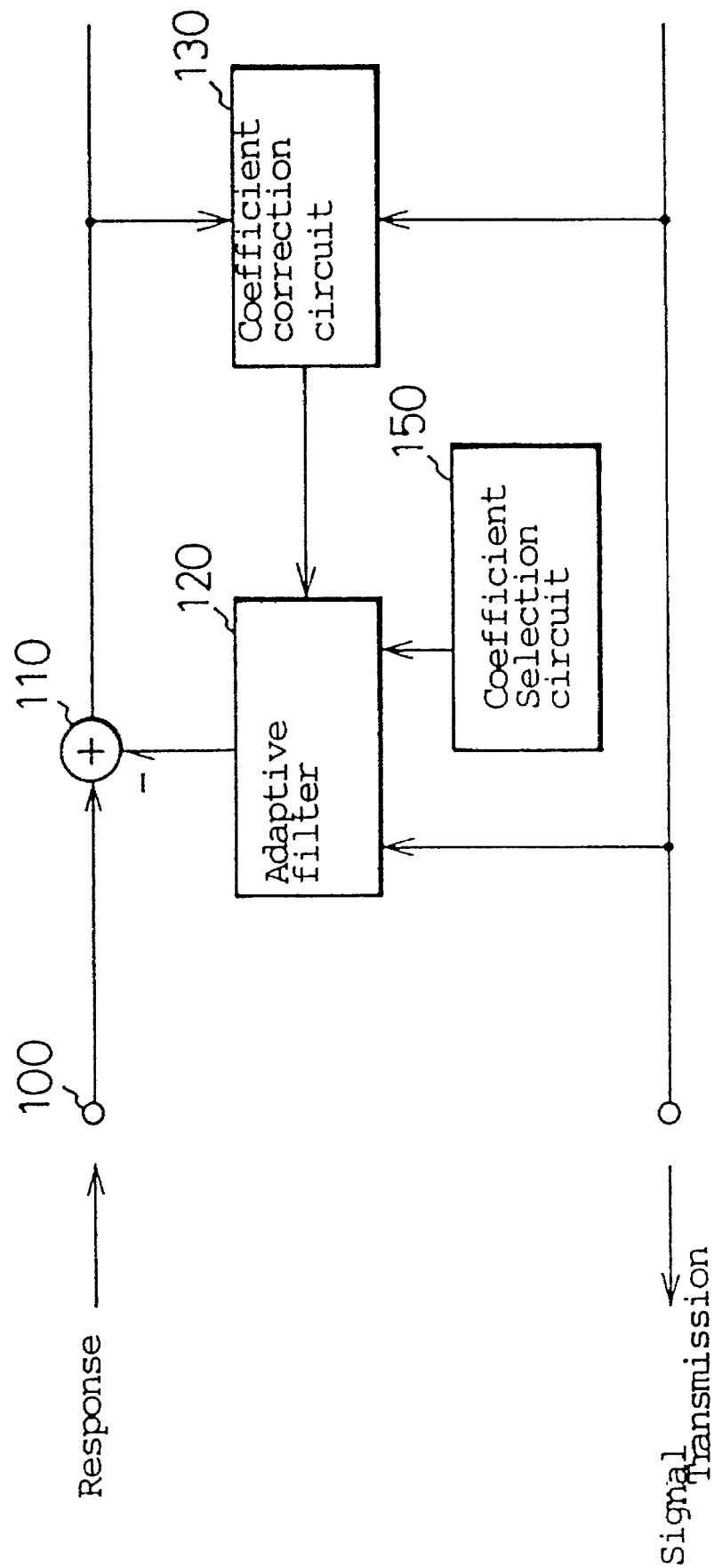
FIG. 9 is a basic block diagram of an echo canceler according to a second embodiment of the present invention.

FIG. 9 is a basic block diagram of the second embodiment of the present invention.

In FIG. 9, reference numeral 110 is a residual echo processor. Residual echo processor 110 sends a signal to a system with unknown characteristics and receives the signal obtained at an input terminal 100 receiving the response and a pseudo echo from an adaptive filter 120 to compute the residual echo.

Reference numeral 120 is the adaptive filter, which adaptive filter 120 has a plurality of taps m (m=1 to I) and receives the output signal sent to the system with unknown characteristics. In addition, adaptive filter 120 receives a filter coefficient from a coefficient correction circuit 130 to find the pseudo echo.

Reference numeral 130 is a coefficient correction circuit, which coefficient correction circuit 130 finds the filter coefficient from the output signal sent to the system with the unknown characteristics and the residual echo from the residual echo processor 110.

Reference numeral 150 is a coefficient selection circuit, which coefficient selection circuit 150 selects the coefficient for performing correction in accordance with a predetermined rule. The arithmetic operation of the coefficients not included in the selection of the coefficient selection circuit 150 is suspended or delayed.

It is possible to suspend the coefficient correction processing, which is carried out at a frequency in accordance with a predetermined rule, for each coefficient of the adaptive filter 120. However, in this case it is assumed that the amplitude characteristic of the impulse response falls exponentially with respect to the anticipated reverberation time of the unknown system. In addition, when a step input is given to the low pass filter having a filter coefficient giving the desired ability to suppress an external disturbance, the estimation operation is suspended for each tap of the adaptive filter 120 with a small response.

The suspension of the coefficient correction processing performed at a frequency based on a preset rule may be performed in units of sets of the adaptive filter coefficients. However, in this case, it is assumed that the amplitude characteristic of the impulse response falls exponentially with respect to the anticipated reverberation time of the unknown system. When the average value of a set of taps of the adaptive filter 120 or any one of the values of that set are given as the amplitude value as the step input to the low pass filter having a filter coefficient giving a desired ability to suppress external disturbance, the estimation operation is suspended for those taps with small responses.

The echo canceler according to the second embodiment of the present invention sends a signal to a system with unknown characteristics and estimates the coefficient of the adaptive filter 120 based on the difference between the echo with respect to the signal obtained at the input terminal 100 which receives the response and a pseudo echo synthesized from the signal using the adaptive filter 120 provided in the apparatus, at which time it sets the coefficient to be selected. By this, the coefficient correction processing can be suspended for the adaptive filter 120 at a frequency according to a preset rule. As a result, it is possible to reduce the amount of processing performed with each sampling period.

Further, the suspension of the coefficient correction processing performed at a frequency according to a preset rule may be performed with each tap of the adaptive filter 120. In this case, when a step input is given to the low pass filter having a filter coefficient giving the desired ability to suppress an external disturbance, the estimation operation is suspended for each tap of the adaptive filter 120 having a small response.

Also, the suspension of the coefficient correction processing performed at a frequency in accordance with a preset rule may be performed in units of sets of the adaptive filters. In this case, when the average value of a set of taps of the adaptive filter 120 or any one of the values in the set of taps is given as the amplitude value as a step input to a low pass filter having a filter coefficient giving a desired ability to suppress an external disturbance, the estimation operation is suspended for those taps with a small response.

Figure 10:
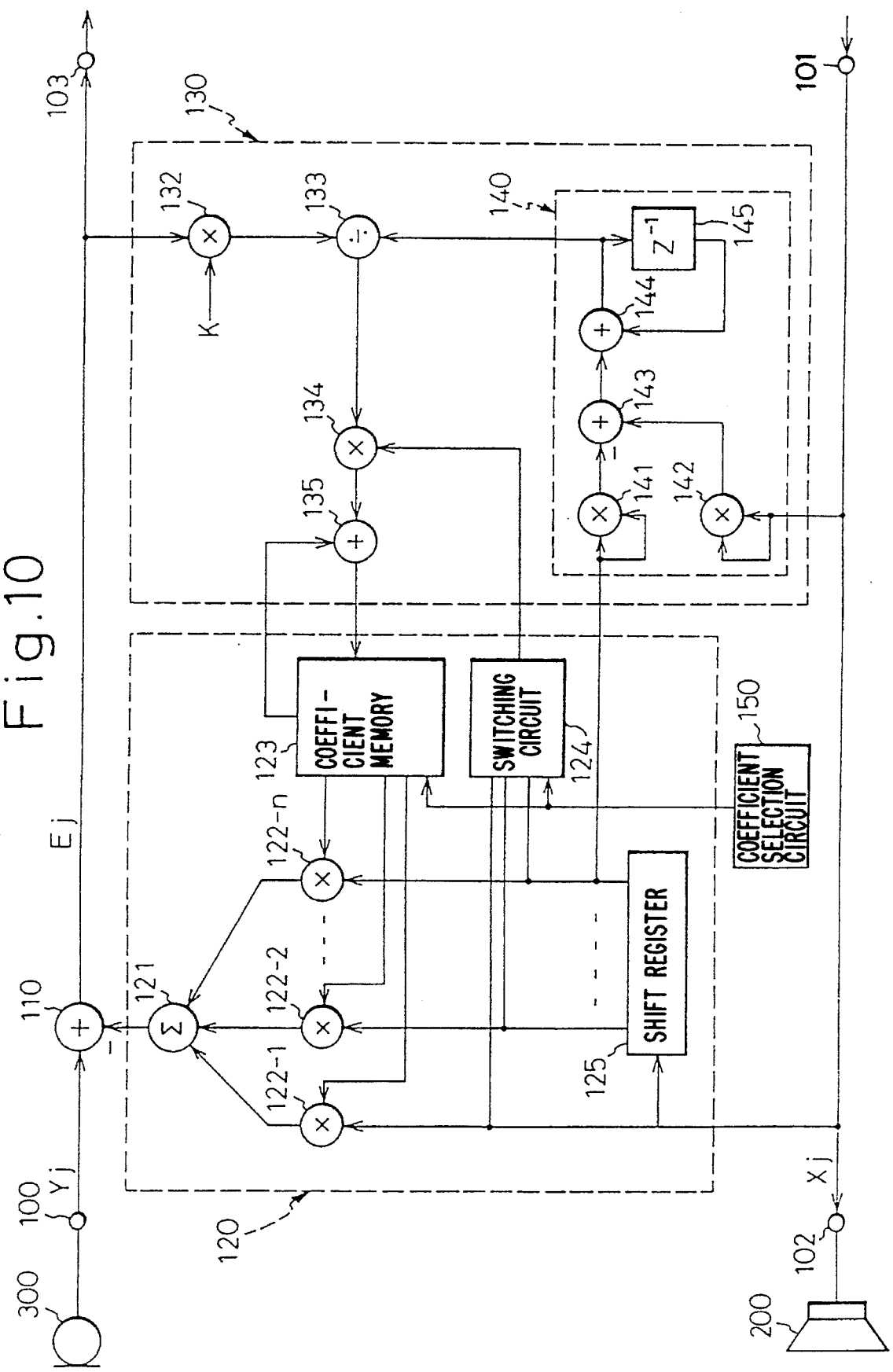
FIG. 10 is a block diagram showing details of the echo canceler of FIG. 9.

FIG. 10 is a block diagram showing details of the echo canceler of FIG. 9. In FIG. 10, 110 is a residual echo processor, which residual echo processor 110 sends a signal to a system with unknown characteristics (for example, a room or other space). The residual processor 110 sends the signal through an output terminal 102 from a speaker 200, receives the response at a microphone 300, and receives the signal $Y_j$ obtained from the input terminal 100. In addition, the residual echo processor receives the pseudo echo $\Sigma H_j(i) X_j(i)$ from the adaptive filter 120 to compute the residual echo.

Reference numeral 120 is the adaptive filter, which, by use of a noncyclic type digital filter having, for example, a plurality of taps m (m=1 to I), receives the output signal (received speech) $X_j$ and the filter coefficient $H_j(i)$ from the coefficient correction circuit 130 and finds the pseudo echo $\Sigma H_j(i) X_j(i)$. That is, the adaptive filter 120 is comprised of a cumulative adder 121, multipliers 122-1 to 122-n (where n is a natural number), a coefficient memory 123, a switching circuit 124, and a shift register 125.

Here, the cumulative adder 121 cumulatively adds the results of the multiplication operations from the multipliers 122-i (i=1 to n), which multipliers 122-i multiply the output signal (received speech) and filter coefficient $H_j(i)$ from the coefficient memory 123.

The coefficient memory 123 stores the filter coefficient $H_j(i)$ from the coefficient correction circuit 130 and selectively stores the filter coefficient $H_j(i)$ according to the instructions from a coefficient selection circuit 150.

The switching circuit 124 selectively outputs to the coefficient correction circuit 130 an output signal $X_j$ according to the instructions from the coefficient selection circuit 150. The shift register 125 successively shifts the output signal (received speech) $X_j$. By this, the shift register 125 stores the past n-1 parts of received speech and can simultaneously output the same to the corresponding multipliers 122-i.

Reference numeral 130 is a coefficient correction circuit, which coefficient correction circuit 130 finds or calculates the filter coefficient $H_j(i)$ from the residual echo $E_j$ from the residual echo processor 110 and the output signal (received speech) $X_j$. Therefore, the coefficient correction circuit 130 is provided with two multipliers 132 and 134, a divider 133, an adder 135, and a norm calculation circuit 140.

Here, the multiplier 132 multiplies the residual echo $E_j$ with a coefficient correction constant K. The divider 132 divides the result of the multiplication operation of the multiplier 132 by the output $\Sigma X_j^2(j)$ from the norm calculation circuit 140. The multiplier 134 multiplies the output of the divider 133 and the output signal $X_j(m)$ for the corresponding tap. The adder 135 adds the previous filter coefficient $H_j(m)$ of one time unit before to the output of the multiplier 134.

The norm calculation circuit 140 is a circuit for calculating the norm of the output signal $X_j$. Therefore, it has two multipliers 141 and 142, two adders 143 and 144, and a delay circuit (register) 145. Note that the delay circuit 145 gives a delay of one sampling period.

Reference numeral 150 is a coefficient selection circuit, which coefficient selection circuit 150 selects the coefficient for correction in accordance with a preset rule. Arithmetic operations on the coefficients not included in the selection of the coefficient selection circuit 150 are suspended.

For example, the suspension of the coefficient correction processing may be performed for every coefficient of the adaptive filter 120, but in this case, as mentioned later, it is assumed that the amplitude characteristic of the impulse response falls exponentially with respect to the anticipated reverberation time of the unknown system. In addition, when a step input is given to the low pass filter having a filter coefficient giving a desired ability to suppress an external disturbance, the estimation operation is suspended for each tap of the adaptive filter 120 for those taps with small responses.

The suspension of the coefficient correction processing may be performed in units of sets of the adaptive filter coefficients. In this case too, as mentioned later, it is assumed that the amplitude characteristic of the impulse response falls exponentially with respect to the anticipated reverberation time of the unknown system. In addition, when the average value of the set of taps of the adaptive filter 120 or one of the values in the set is given as the amplitude value as the step input to the low pass filter having a filter coefficient giving a desired ability to suppress an external disturbance, the estimation operation is suspended for those units of sets of adaptive filter coefficients with small responses.

Note that in FIG. 10, 101 is an input terminal for reception and 103 is an output terminal for transmission.

To understand the method of reducing the amount of processing in the estimation of the adaptive filter coefficient of the echo canceler in the second embodiment of the present invention, the low pass filter expression of the learning identification method is useful.

Details are shown in "A Study on Echo Cancelers Using the Learning Identification Method" (B-2-3, 4th *Digital Signal Processing Symposium* (December 1989)). The gist of this lies in the expression of this method by the low pass filter shown in FIG. 11 when the learning identification method is adopted as the coefficient correction algorithm of the echo canceler shown in FIG. 10 or FIG. 7. In these figures, however, j is the time, $\Sigma$ is the cumulative addition corresponding to the taps (i=1 to I) of the adaptive filter, and $\Sigma_m$ is the cumulative addition not including the taps m in the same cumulative addition.

Below, an explanation will be made of the method according to the second embodiment of the present invention, using FIG. 11. The same effect can be obtained even with a modification of this technique, for example, in the constant and coefficient type estimation arithmetic operation system shown in FIG. 4 described in the construction omitting the normalization norm in the low pass filter coefficient $\alpha_j$ (see reference "Thoughts on Echo Cancelers Using the Learning Identification Method" (3-6-6, Fiscal 1989 Japan Acoustical Society Autumn National Congress (October 1989)).

Further, in the above expression, the low pass filter coefficient $\alpha_j$ is supposed to be a function of the speaker output signal $X_j$ and a value different for each time, but to simplify the explanation, the method of the present invention will be explained by proceeding with the discussion assuming an average operation and giving the average of that operation $$\alpha_{av} = 1 - K/I \qquad (5)$$

to the low pass filter coefficient $\alpha_j$ in a fixed manner.

Figure 11:
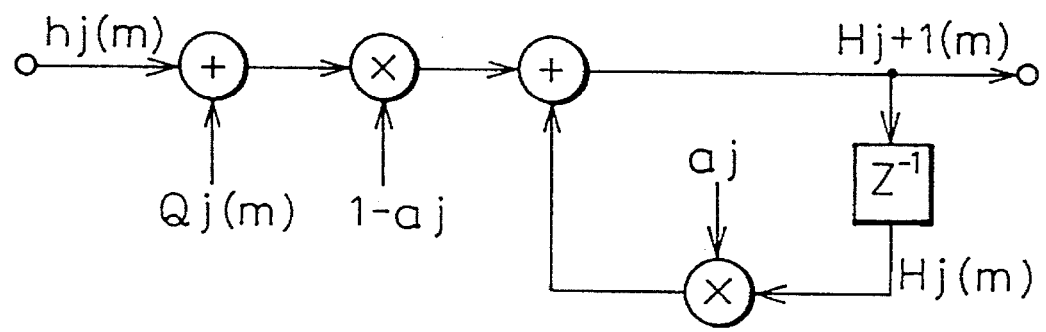
FIG. 11 is a block diagram explaining the low pass filter expression in the learning identification method.
Figure 12:
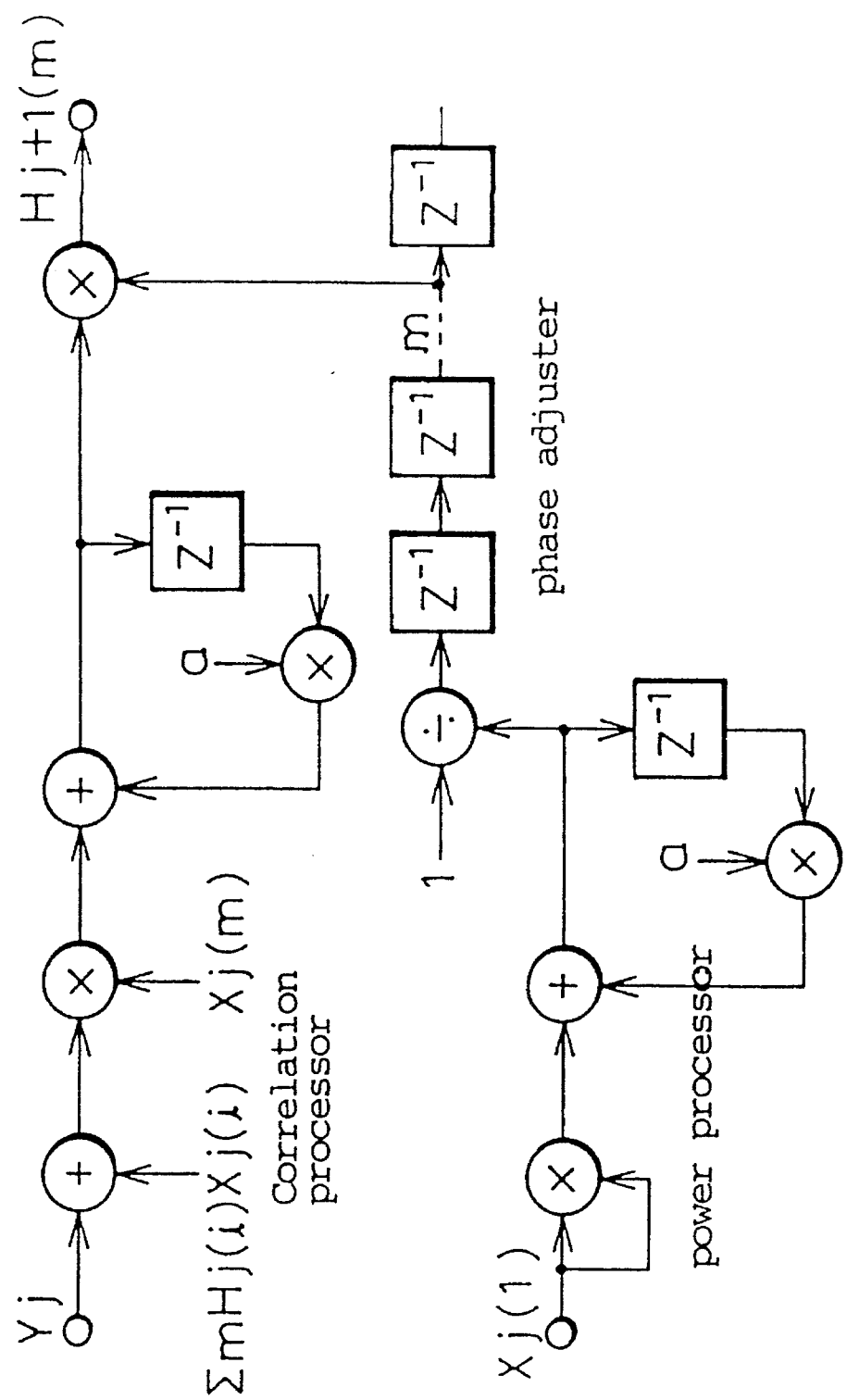
FIG. 12 is a block diagram showing a constant-coefficient type estimation processing system.

In the coefficient estimation system shown in FIG. 11, the estimation precision finally given is defined by the ability of the low pass filter to suppress an external disturbance. This external disturbance suppression ability is determined by the low pass filter coefficient $\alpha_{av}$ and, converted into power, is given by $(1-\alpha_{av})/(1+\alpha_{av})$.

To reduce the amount of arithmetic operations without changing the algorithm, as is accomplished in the construction of the low pass filter shown in FIG. 11, and maintaining the estimation precision, the only option, insofar as there is no waste in the computing structure, is to streamline the calculation in the time direction; that is, to thin out the calculation.

Figure 13:
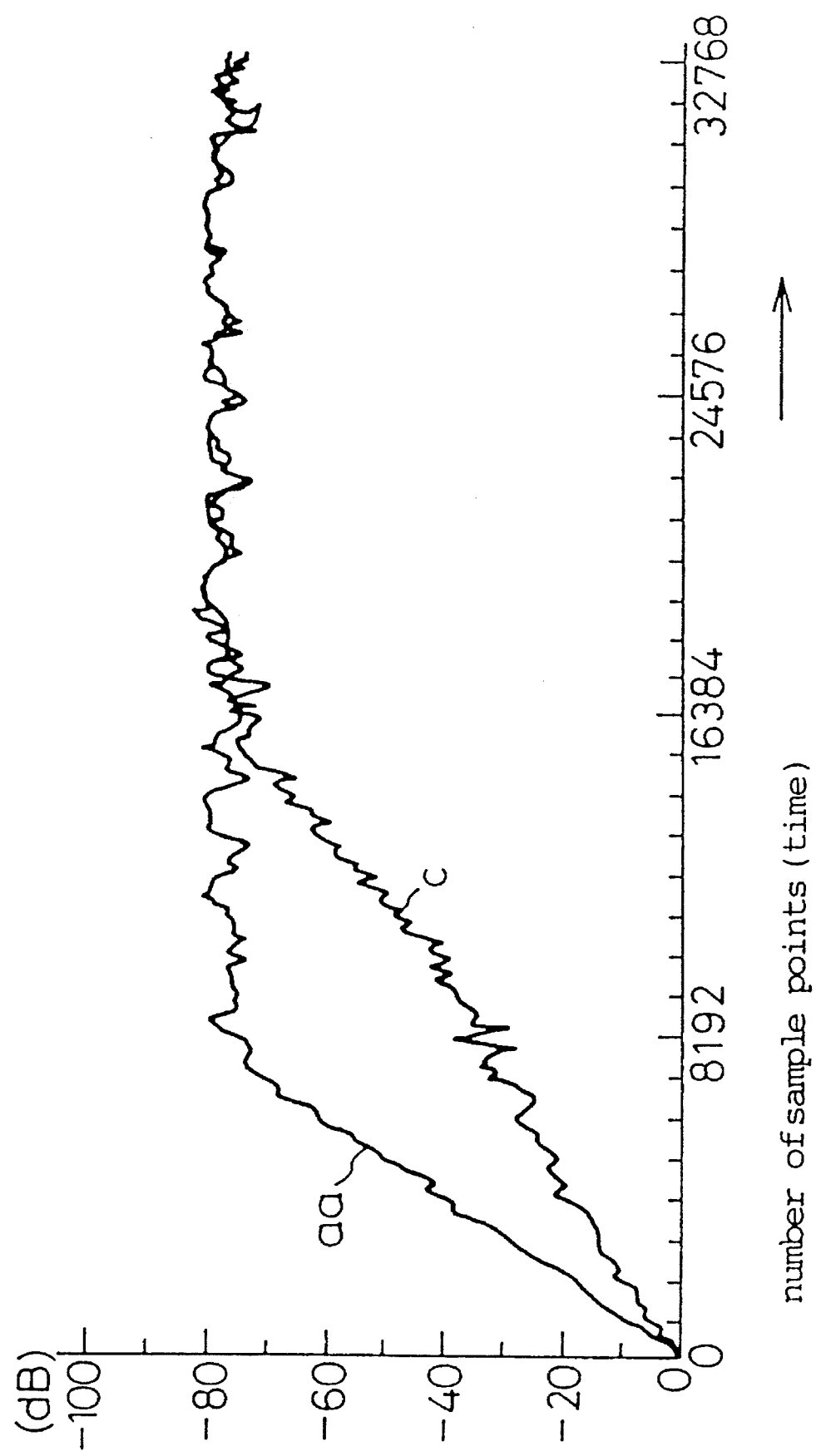
FIG. 13 is a graph explaining the convergence characteristic based on a division into two (odd/even numbers)
Figure 14:
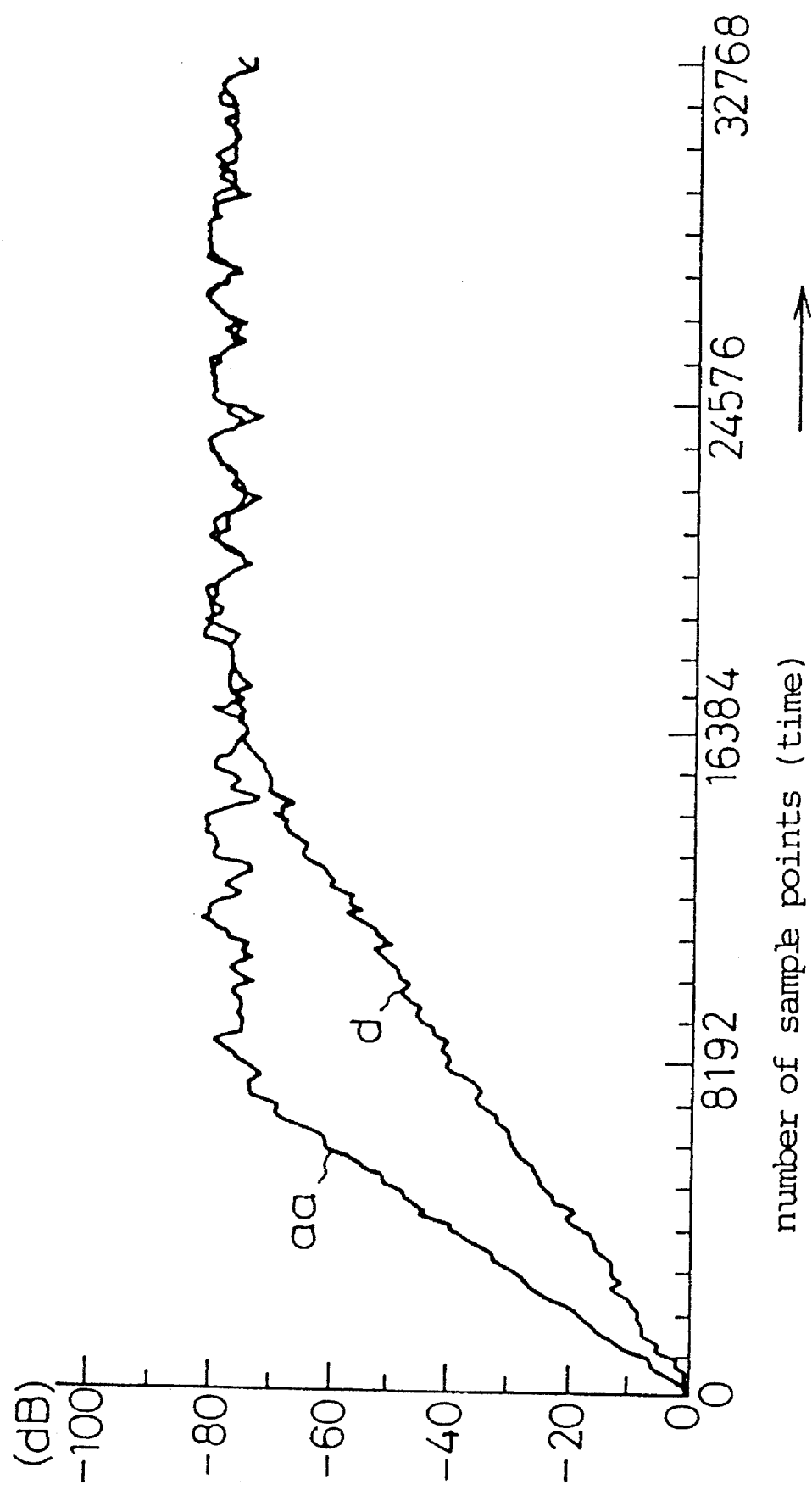
FIG. 14 is a view explaining the convergence characteristic based on a division into two (first half/second half)

The convergence characteristic c shown in FIG. 13 was obtained by dividing the taps of the adaptive filter 120 into odd number ones and even number ones and simulating the convergence characteristic of the estimation operation. The convergence characteristic d shown in FIG. 14 was obtained by dividing the taps of the adaptive filter 120 into a first half and a second half. Note that in FIG. 13 and FIG. 14, the convergence characteristic aa is that as shown with reference to the case of computation without simplification of the above-mentioned equation (3). In this case, the amounts of echo cancellation finally reached are the same in the three convergence characteristics aa, b, and c since the construction of the low pass filter is not changed. Here, a difference appears only in the reduction of about one-half of the convergence speed which occurs since the period of the calculation is double in the convergence characteristics b and c.

Here, it has been pointed out in the prior art that the echo path gain, that is, the shape of the impulse response of an unknown system, displays an attenuation characteristic [(1) Institute of Electronics, Information and Communication Engineers EA89-3 "Regarding Improvement of Adaptive Characteristics of Echo Cancelers in Room Sound Fields", Makino et al and (2) Institute of Electronics, Information and Communication Engineers Spring National Congress B-557 "Examination of Echo Cancelers Using Weighted Adaptive Control", Maruyama]. Using this information, it is expected that it would be possible to improve the convergence speed using a simplified equation (3).

To show that this is possible, an explanation will be made of the estimation error in the learning identification method.

According to the low pass filter expression of this method, the estimation error is given as a difference between a steady echo path gain $h_j$, which is the step input of the low pass filter, and the step adaptation $H_j$, which is the estimated value of the adaptive filter coefficient. In the input of the low pass filter (filter coefficient $\alpha_{av}$) corresponding to the estimation of the m-th tap coefficient of the adaptive filter at that time, if a step input of the amplitude $A_m$ (which $A_m$ corresponds to $h_j(m)$) is applied, the step response $S_m^j$ in the output of the same filter at the time j is given as the sum of geometric progressions. Considering the presence of the gain adjustment $(1-\alpha_{av})$ in the same filter input, if the external disturbance $Q_j(m)$ is ignored, then this step response is given by $$S_m^j = A_m(1-\alpha_{av}^{j+1}) \quad (6)$$

Therefore, the difference $$\Delta_m^j = A_m - S_m^j = A_m \alpha_{av}^{j+1} \quad (7)$$

gives the estimation error of the coefficient of the tap m at the time j.

Further, if the comprehensive estimation error for all taps at the time j is $\Delta^j$, this is given as the aggregate of I number of errors for the same low pass filters i=1 to I:

$$\Delta_m^j = Ai\alpha_{av}^{j+1} (i=1 \text{ to } I) \quad (8)$$

From the above equations (7) and (8), it is learned or observed that the effect of prolonging the calculation interval for reducing the amount of arithmetic operations becomes smaller as the step input $A_m$ becomes smaller.

Figure 15:
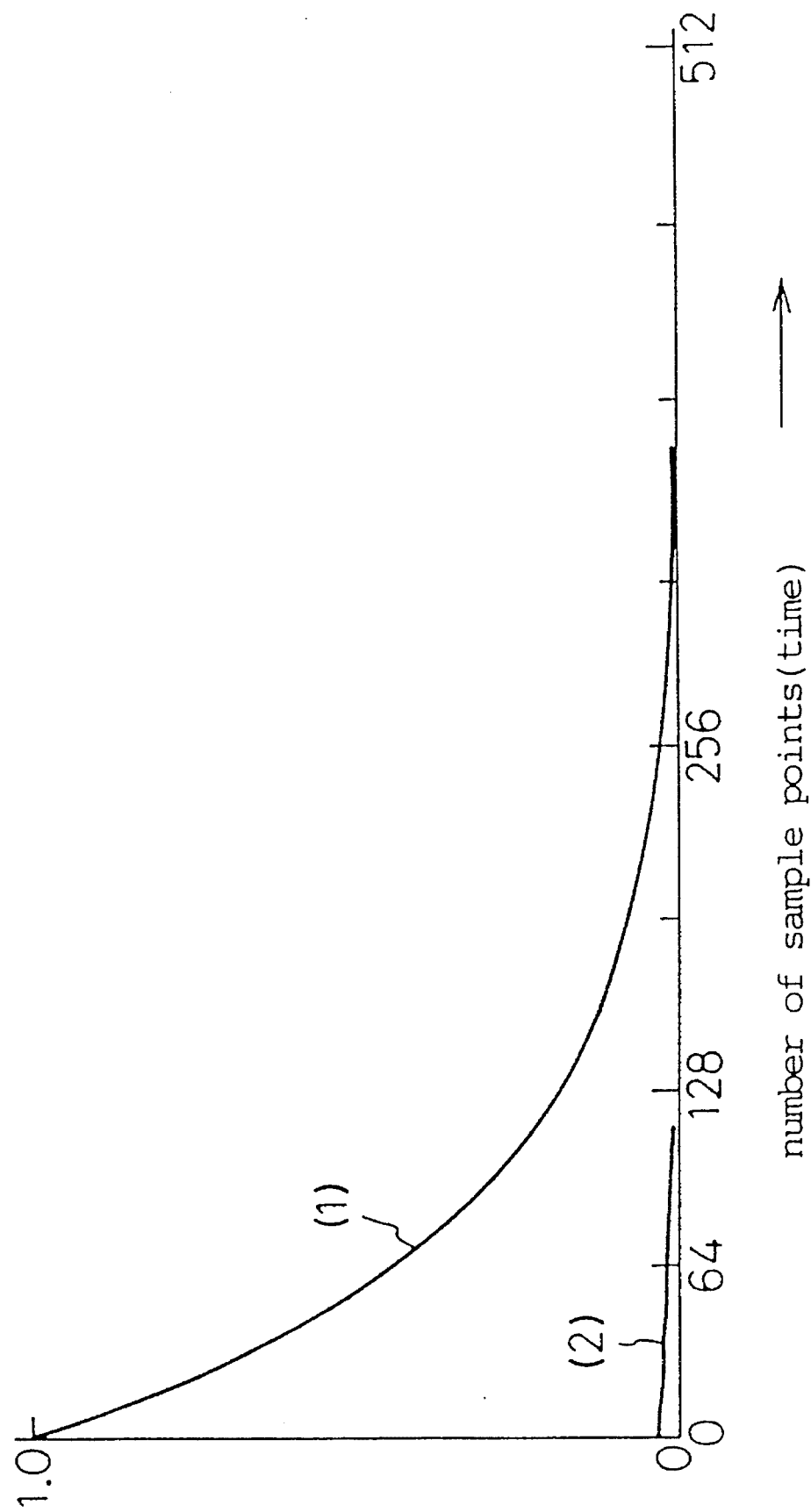
FIG. 15 is a graph explaining the amplitude characteristic of an assumed impulse response.

Therefore, considering the example of the characteristic (1) of FIG. 15 where the reverberation time is 512 sample points and the amplitude characteristic of the impulse response is $a^{i-1}$ (a= $0.001^{1/511}$) in accordance with the definition of the reverberation time. When dividing the renewal of the tap coefficients in the characteristic (1) into a first half and a second half, the sum of the estimation error of the first half of the taps becomes the characteristic shown in the characteristic (2) of FIG. 15. If the renewal of the tap coefficients until the time matching that of the second half is concentrated in the first half, it is expected that the convergence speed will be improved. This matching time, from equation (7), becomes:

$$a^{I-1}\alpha_{av}^{j+1} = a^{257-1}$$

$$\rightarrow \alpha_{av}^{j+1} = a^{256}$$

$$\rightarrow (j+1)\log(\alpha_{av}) = 256\log(a)$$

$$\rightarrow j = 256\log a/\log\alpha_{av} - 1$$

Here, if $a=0.001^{1/511}$ and $\alpha_{av}=1-1/512$ are inserted, the time may be found as j=1765 in sample points.

Figure 16:
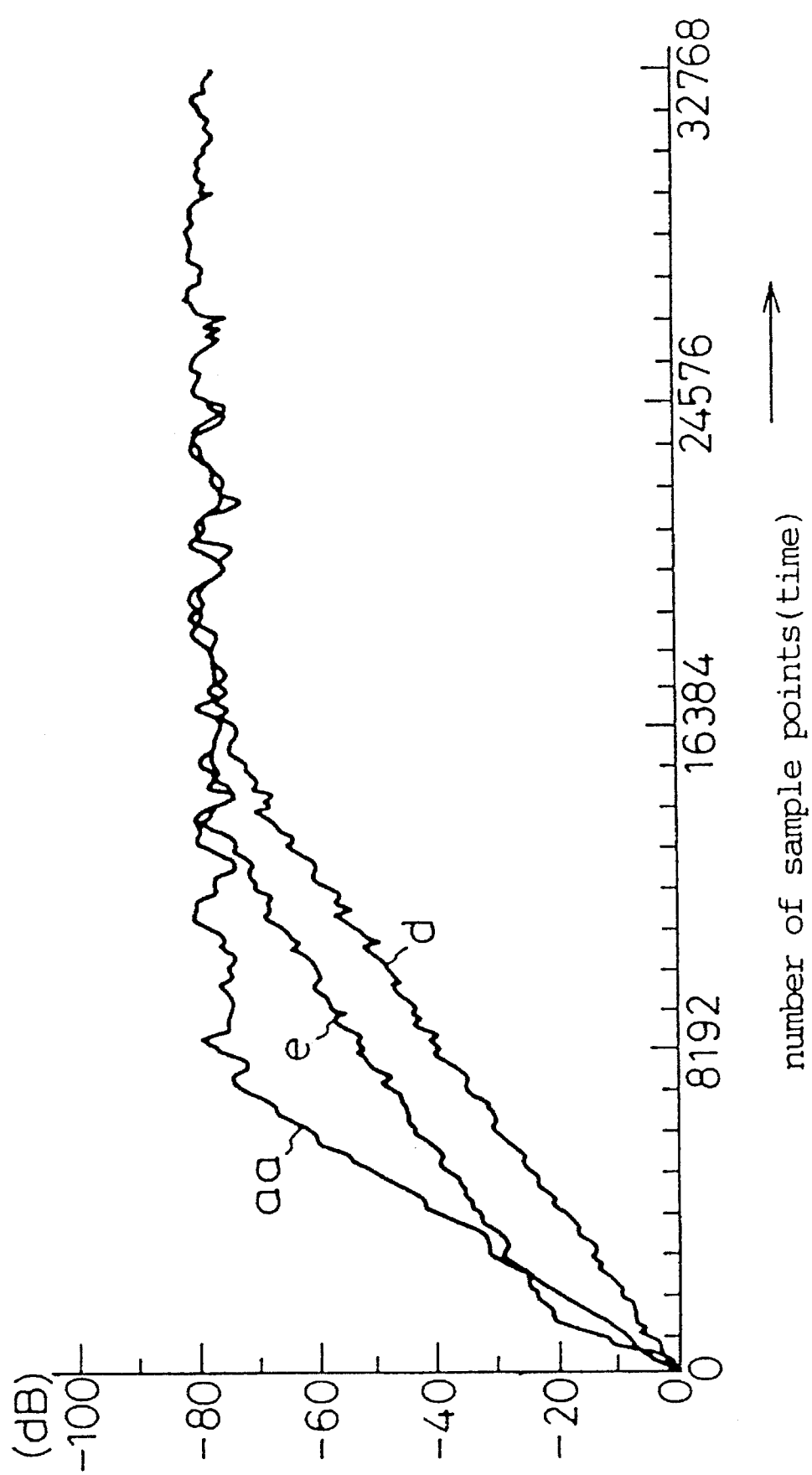
FIG. 16 is a graph explaining the improvement of the convergence speed in the case where the renewal of the front half tap coefficients is executed with priority until 2048 sample points.

FIG. 16 shows the convergence characteristic e in the case of a time of 2048 considering the delay of the convergence due to the estimation error. As a result, even compared with the convergence characteristic aa given by the conventional learning identification method, the convergence is shown to be fast until the time j=2048.

Here, reevaluating FIG. 15 once again, in the process from characteristic (1) to characteristic (2), taps where the estimation error given by the first half of the taps becomes lower than that of the second half successively appear starting around 256, it is learned. Judging from the fact that priority execution starting from taps with large estimation error would be effective in improving the convergence speed, if the estimation operation is performed without waiting until the characteristic (2) is reached, but by selecting taps with large errors for each sampling period, then a further improvement of the convergence speed could be expected.

Figure 17:
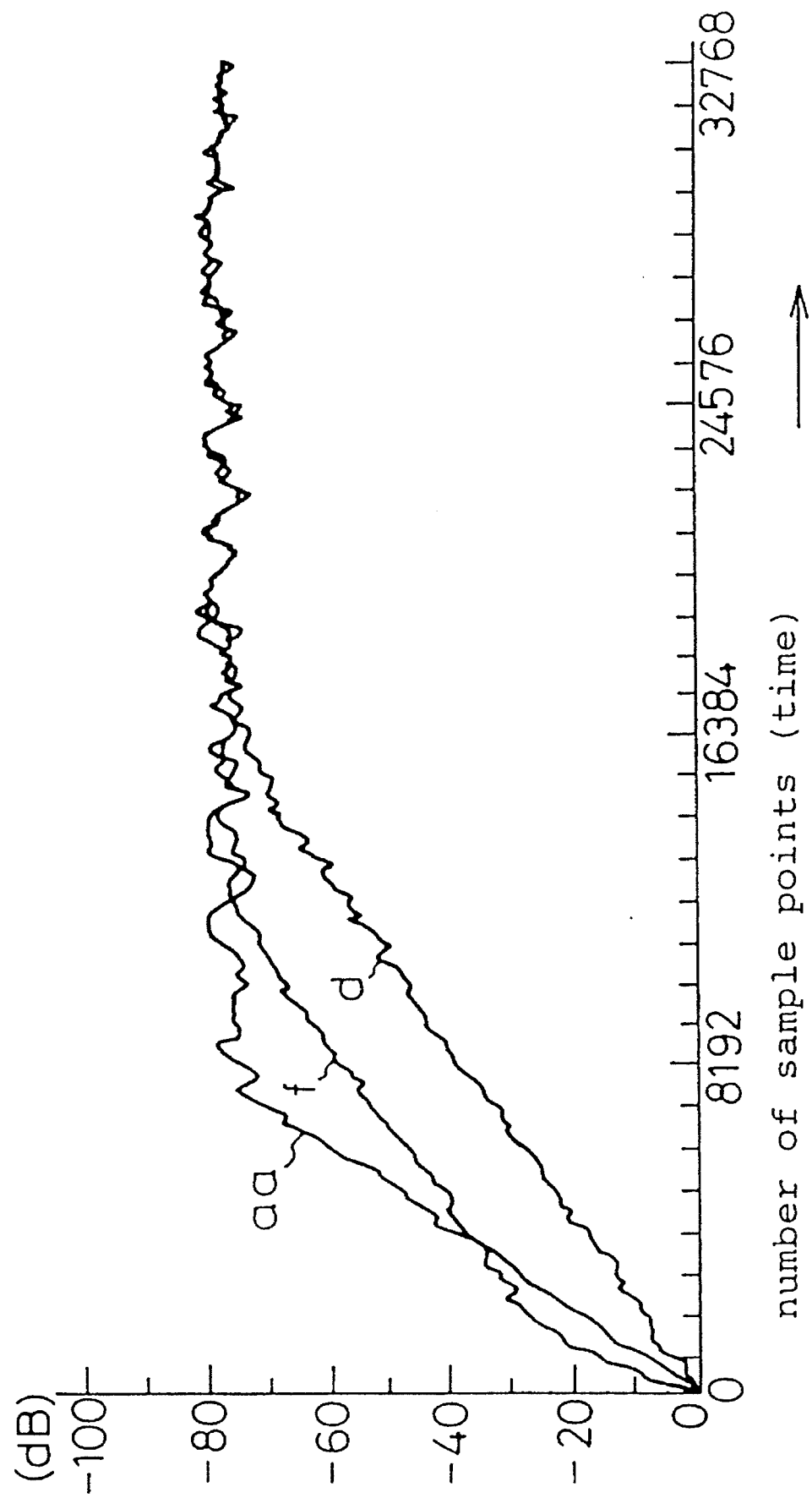
FIG. 17 is a graph explaining the improvement of the convergence speed in the case where the taps with the large estimation error are executed with priority.

The convergence characteristic f of FIG. 17 shows the result. The convergence characteristic f is faster in the convergence speed than the convergence characteristic aa given by the conventional learning identification method until the time j=4096.

Note that in FIG. 16 and FIG. 17, the convergence characteristic d is the convergence characteristic due to the aforementioned two groups of divided taps. The characteristic d is drawn for comparison with the convergence characteristics e and f.

From the results of FIG. 16 and FIG. 17 it is expected that there might be a way to select an arithmetic operation period which would not reduce the convergence speed. Of course, as will be understood from the results of FIG. 16 and FIG. 17, the effects of this selection would appear in only a limited time and naturally reduction of the convergence speed after that would be unavoidable.

However, when it comes to an estimation error where it is desired that the estimation error obtained at a certain time be achieved, the reduction of the convergence speed after that may be said to be of no problem or consequence. This will be shown next.

Now, it is expected from the above results that the priority execution of the estimation of the coefficients of the taps with large estimation errors would improve the convergence speed. However, conversely speaking, this shows that the point when the estimation errors of all taps become equal is the point where the method of suspension of the estimation operation given by the present invention loses its effect in improving the convergence speed. Further, the estimation errors for all taps become equal faster when the estimation operation for the tap I is suspended and the estimation error for the remaining taps become equal to the step input of the tap I. The time when the estimation error of the tap i becomes equal to the step input of the tap I is:

$$a^{i-1}\alpha_{av}^{Ni+1} = a^{I-1} \rightarrow \alpha_{av}^{Ni+1} = a^{I-1} \rightarrow (Ni+1)\log(\alpha_{av}) = (I-i)\log(a) \rightarrow$$
$$Ni = (I-i)\log(a)/\log(\alpha_{av}) - 1 \quad (9)$$

Therefore, in the case of tap 1, during this time, $\{(I-1)\log(a)/\log(\alpha_{av})-1\}$ number of estimation operations are executed and for the other taps, $N_i$ number of estimation operations are performed. Using this information, speaking in terms of the tap i, compared with the tap 1, it is possible to suspend the number of arithmetic operations found by equation (10):

$$[(I-1)\log(a)/\log(\alpha_{av})-1]-[(I-i)\log(a)/\log(\alpha_{av})-1] = (i-1)\log(a)/\log(\alpha_{av}) \quad (10)$$

In addition, looking at the total for all taps, it becomes possible to suspend the number of arithmetic operations found by equation (9).

$$\Sigma(i-1)\log(a)/\log(\alpha_{av}) = (I \times I/2)\log(a)/\log(\alpha_{av}) \quad (11)$$

Further, at this point, the convergence is faster than in the conventional learning identification method. During this time, the learning identification method is performed a number of times for all the taps equal to the number of times of execution for the tap 1, so the ratio of the same R becomes:

$$R=(IXI/2)\log(a)/\log(\alpha_{av})\div[I(I-1)\log(a)/\log(\alpha_{av})-1] \quad (12)$$

Now, if the number of taps I is sufficiently large and the ability to suppress an external disturbance is made sufficient (a filter coefficient $\alpha_{av}$ of close to 1), the arithmetic operation suspension method enables reduction of the amount of arithmetic operations to $R \approx \frac{1}{2}$.

Note that in the second embodiment of the present invention shown in FIG. 10, when the reverberation time is 512 sample points, $$a=0.001^{1/511}, \alpha_{av}=1-1/512$$

so the amount of arithmetic operations which can be cut becomes:

$$\log(a)/\log(\alpha_{av})$$
$$=(5.859373 \times 10^{-3})/(8.490608 \times 10^{-4})$$
$$=6.901$$

and from this $$(I \times I/2)\log(a)/\log(\alpha_{av})$$
$$\div [I(I-1)\log(a)/\log(\alpha_{av}) - I]$$
$$= (IXI/2)6.901 \div [I(I-1)6.901 - I]$$

If the number of taps I=512 is inserted into this equation, the amount of arithmetic operations becomes:

$$512 \times 256 \times 6.901 \div (512 \times 511 \times 6.901 - 512) = 904527.87 \div 18050110.4 = 0.501$$

i.e., it is learned that the amount of arithmetic operations can be reduced to about half.

The estimation speed can be maintained at the speed of the conventional learning identification method until the following sample points:

$$(I-1)\log(a)/\log(\alpha_{av})-1=511 \times 6.901 - 1 = 3525$$

The results of FIG. 17 attest to this.

Above, it was shown that it is possible to cut the amount of arithmetic operations without deterioration of the convergence speed. However, various modifications become possible even with the same ability to suppress an external disturbance if deterioration of the convergence speed is allowed. For example, it is possible not to set the frequency of suspension of arithmetic operation for each tap, but to group several taps into a set and to set the frequency of suspension of the arithmetic operations in units of sets. FIGS. 13, 14, 16, and 17 are examples of suspending operations of two sets.

Figure 18:
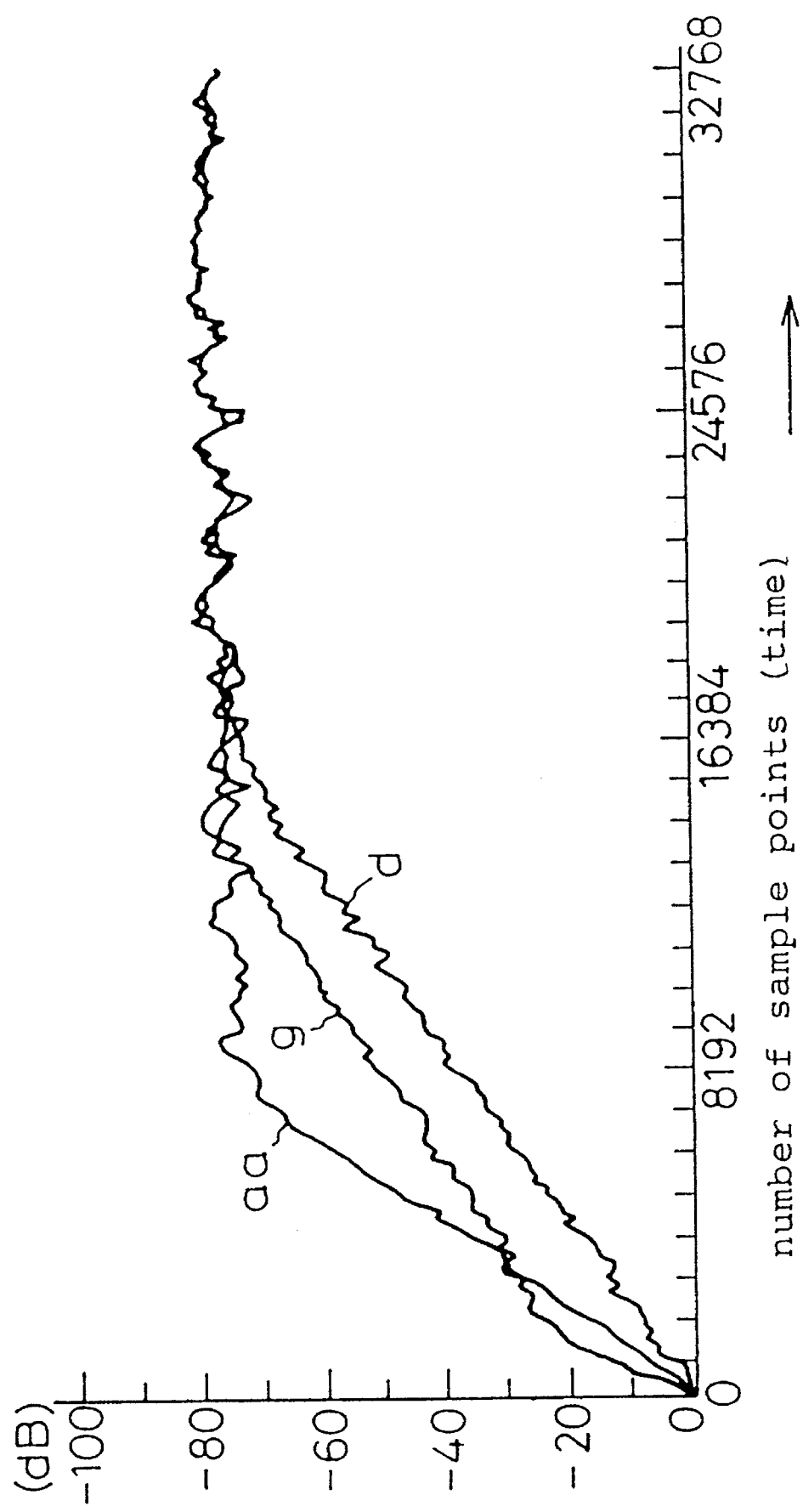
FIG. 18 is a graph explaining the improvement of the convergence speed in the case of division into blocks.

FIG. 18 shows an example (see convergence characteristic g) of the case where the number of divisions is successively increased such as 2, 4, 8, . . . , 256 at the point of time when the estimation errors at the divided sets match.

Note that the allocation of the arithmetic operation processing on the taps in the present method may be any one desired so long as the convergence speed is allowed to deteriorate.

By suspending the coefficient estimation processing at a frequency in accordance with a preset rule in this way, it is possible to cut the amount of arithmetic operation processing while maintaining the ability to suppress external disturbances.

As explained in detail above, according to the second embodiment of the present invention, by suspending the coefficient estimation processing of the echo canceler at a frequency in accordance with a preset rule, there is the advantage that it is possible to effectively cut the amount of arithmetic operation processing.

Further, the suspension of the coefficient correction processing performed at a frequency according to a preset rule may be performed for every coefficient of the adaptive filter 120, or performed in units of sets of the adaptive filter coefficients. The average value of a set of the taps of the adaptive filter 120 or one of the values in the set is given as the amplitude value to the low pass filter having the filter coefficient giving the desired ability to suppress an external disturbance as a step input for each adaptive filter 120. The estimation operations for those taps with small responses are then suspended. Thus, there is the advantage of effectively cutting the amount of arithmetic operation processing. This enables the echo canceler to be made small in size and be fit on a single chip and enables a major reduction in price as well.

Next, an explanation will be made of the detection and elimination of narrow band signals and howling in the echo canceler according to a third embodiment of the present invention.

The third embodiment of the present invention relates to a method and apparatus in a handfree telephone, conference telephone apparatus, or other telephone apparatus which realizes simultaneous two-way speaking using an echo canceler. Specifically, the occurrence of a narrow band signal disturbing the estimation of the coefficient of the adaptive filter making up the echo canceler and the occurrence of howling are detected and eliminated.

In a telephone apparatus which suppresses the occurrence of howling and realizes two-way speaking using an echo canceler such as in a handfree telephone, it is necessary that the estimation of the coefficient in the adaptive filter making up the echo canceler be correctly executed at all times. The estimation of the coefficient is equivalent to the estimation of the transmission function of the echo path system based on the echo occurring due to the transmission signal from the telephone. Therefore, if the transmission signal is a narrow band such as a ring back tone or time information, the estimation is limited to near that band and the estimation for other band sections is greatly disturbed by the noise (static) added in the echo path system. This disturbance is harmful to the estimation near the narrow band signal as well and the amount of cancellation of the narrow band signal is reduced. If a speech signal is again sent in this state, the overall amount of cancellation will no longer be sufficient and the situation of howling occurring will arise. A direct measure to prevent this is to detect the occurrence of narrow band signals and suspend the coefficient estimation operation at the time of the detection. When howling occurs due to a disturbed estimation operation, processing for stopping the same is necessary.

Conventional art for detecting the narrow band signals include:

(1) The zero intersection method.
(2) The filter bank method.
(3) The line prediction method.

The third embodiment of the present invention relates to an improvement method and apparatus of method (3) among these, and thus, only the latter will be explained. Typical examples are given in (a) "Examination of Single Tone Detectors Using Adaptive Filters" (1990 Electronic Data Communications Society Spring National Congress B-738), and (b) "Examination of Narrow Band Signal Detection Method in Echo Canceler Type Handfree Circuit" (1988 Electronic Data Communications Society Autumn National Congress B-300).

The present invention relates to improvements of the methods described in the above references (a) and (b).

Figure 19:
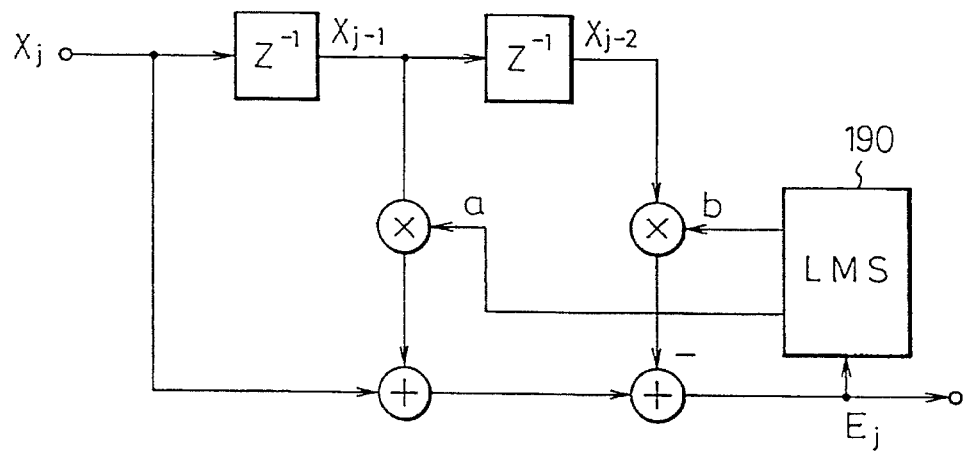
FIG. 19 is a block diagram showing a narrow band signal-detection apparatus by the conventional method (a) for use before explaining a third embodiment of the present invention.
Figure 20:
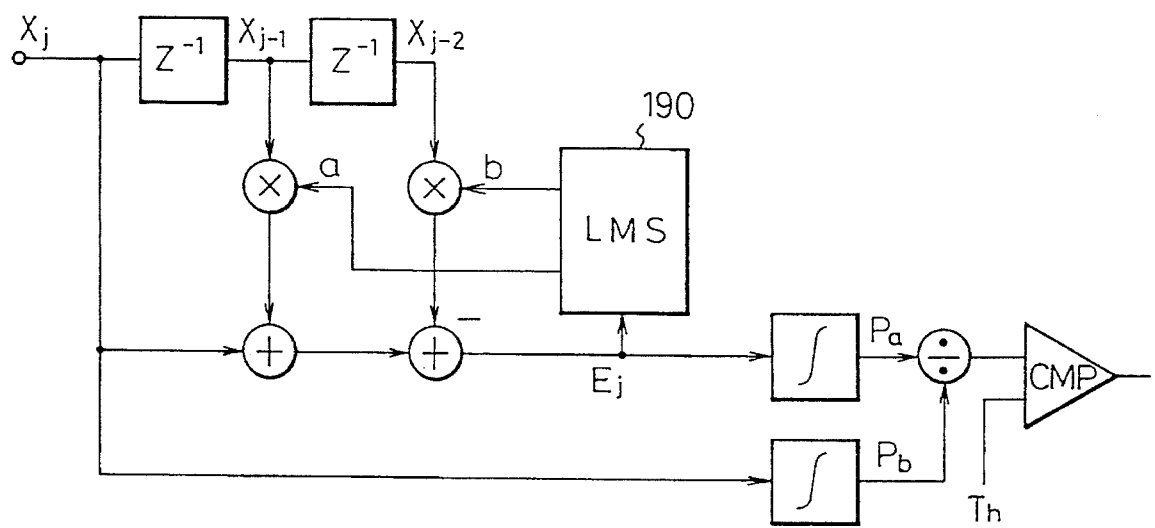
FIG. 20 is a block diagram showing a narrow band signal detection apparatus by the conventional method (b) for use before explaining a third embodiment of the present invention.
Figure 22:
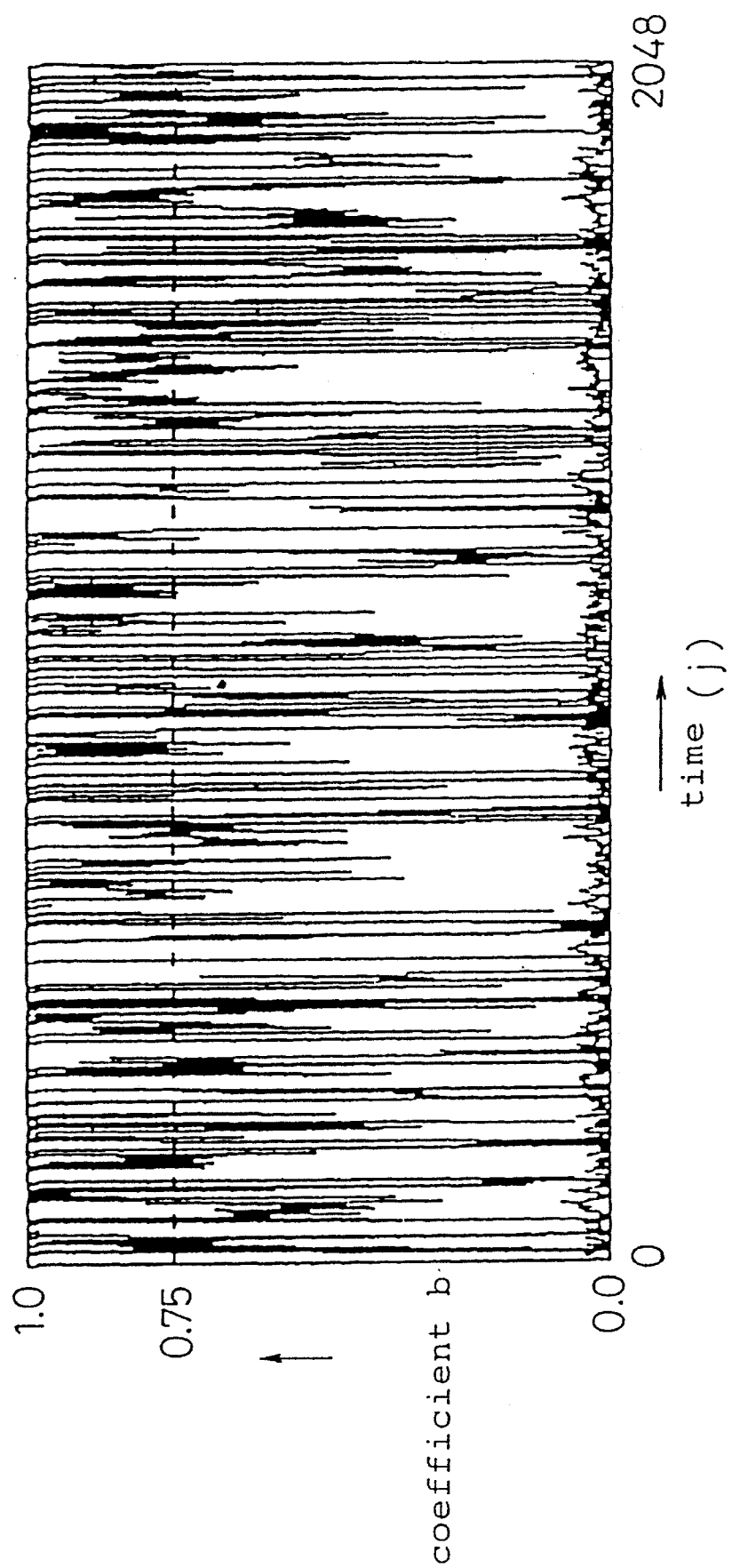

FIG. 19 shows the constitution or construction of the conventional method (a) and FIG. 20 shows the constitution of the conventional method (b). In the constitutions of FIG. 19 and FIG. 20, the LMS circuit is a circuit for controlling the coefficients a and b of the adaptive filter to minimize the signal Ej. The most typical coefficient estimation algorithm used in the LMS (least-means-square) circuit is the learning identification method. The coefficient estimation rules are given as follows:

$$a = a + KE_j X_{j-1}/(X_{j-1}^2 + X_{j-2}^2) \quad (13)$$

$$b = b + KE_j X_{j-2}/(X_{j-1}^2 + X_{j-2}^2) \quad (14)$$

In the third embodiment of the present invention, the explanation is made assuming the use of the above-mentioned learning identification method as the coefficient estimation algorithm.

Here, if the signal $X_j$ is a single frequency signal, the coefficient b converges toward 1. Using this principle, the conventional system (a) in FIG. 19 detects the narrow band signal using the fact that the coefficient b becomes close to or approaches 1. The conventional system (b) enables sufficient attenuation of the signal $X_j$ by the secondary noncyclic type filter. In the case where it is a wide band signal, use is made of the fact that sufficient attenuation cannot be obtained with the secondary noncyclic type filter and the narrow band signal is detected. That is, in the power $P_b$ of the signal $X_j$ and the power $P_a$ of the residual signal $E_j$, it is judged or determined that:

It is a narrow band signal if $R_p = P_a/P_b < T_b$, and
it is a wide band signal if $R_p = P_a/P_b > T_b$.

However, power integration is possible with a structure of approximation with $|X_j|, |E_j|$ instead of $X_j^2$, $E_j^2$.

First, an explanation will be made of the problems in the conventional system (a). The first is the large delay in detection. FIG. 21A and FIG. 21B are examples of the response of the coefficient b with respect to the calling tone in the conventional method (a). Here, the correction constant (step gain) K= 0.01, S/N=23 dB, and the sampling frequency is 8 kHz. In this example, it is observed that the time required until the coefficient b becomes 1 is about 440 msec. In a small sized system such as a handfree telephone, it is necessary that the convergence of the echo canceler be fast and the time required until the amount of echo cancellation reaches 20 dB be a mere 180 msec (K=0.25) ("Examination of Handfree Telephones Using Compact Echo Cancelers", 2-6-1, Japan Acoustical Society Fiscal 1990 Spring Research Reports). That is, a detection delay of 440 msec means a loss of meaning or purpose in attempting to provide a narrow band signal detector. Of course, it is also possible to make the convergence of the narrow band signal slower than this and to make the convergence speed slower to a degree where no howling occurs, for example, a time of about 350 msec (K=0.125) or a time of 700 msec (K 0.0629). However, it is preferable that the detection delay be as small as possible.

In the conventional system (a), the only way to enable the detection delay to be reduced without changing the principle is to bring the value K of the correction constant close to 1, where the convergence is the fastest. FIG. 22, FIG. 23, FIG. 24A and FIG. 25B show the locus of the coefficient b with respect to noise in the case of K=1, K=0.05, and 0.01. From the results, it is learned or observed that it is necessary that K be made less than 0.01 for noise not to be judged to be a narrow band signal. That is, in the conventional system (a), it is not possible make the detection delay less than at present.

The second problem in the conventional system (a) is the extremely high risk of judgement of speech as a narrow band signal. FIG. 25 shows the locus of the coefficient b with respect to certain female voices. To prevent this from being judged or determined as a narrow band signal, the judgement threshold must be made almost "1". A rise in the threshold increases the risk of not judging a narrow band signal as a narrow band signal.

Figure 26:
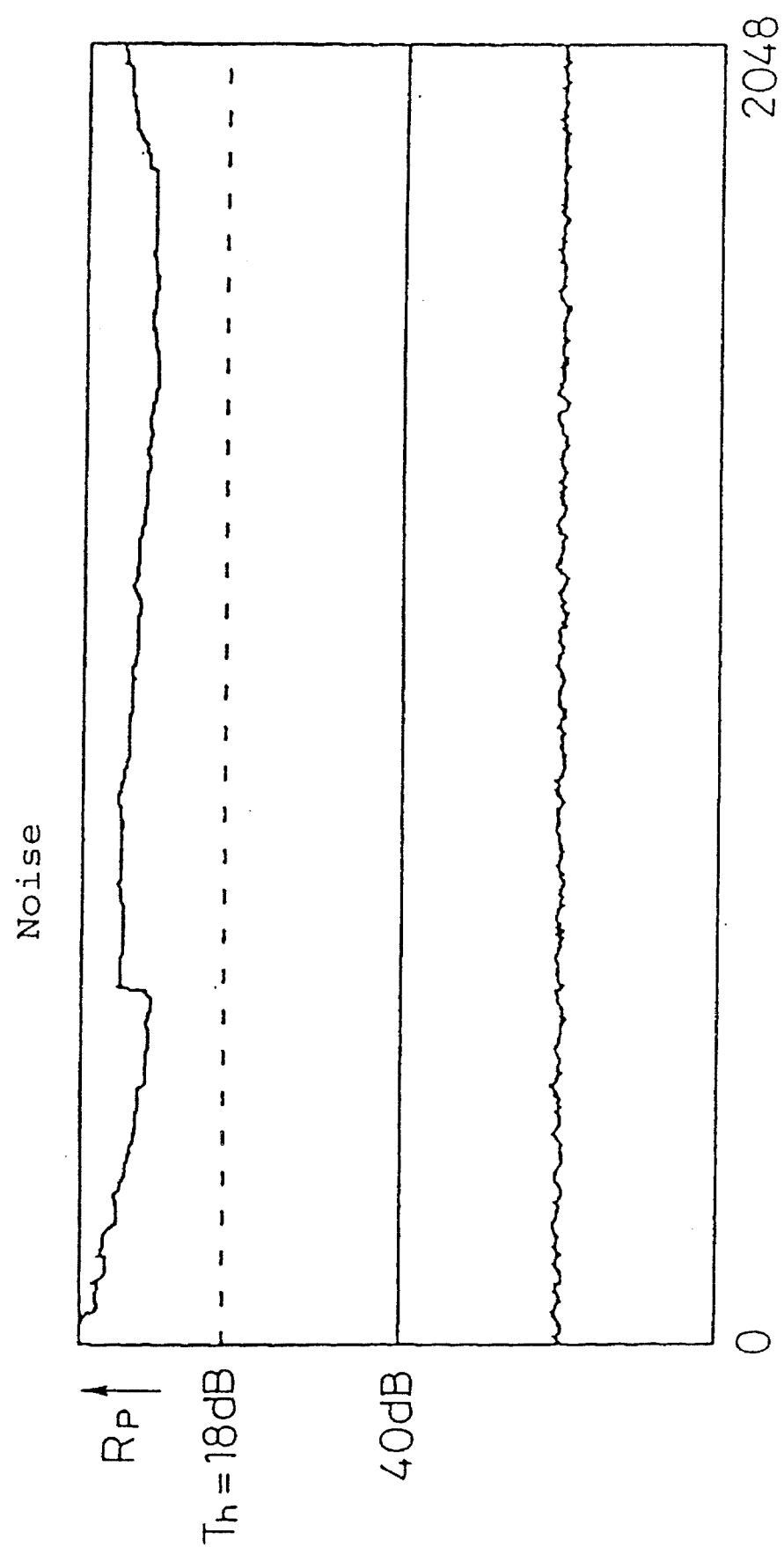
FIG. 26 is a view showing the locus of the power ratio with respect to noise in the conventional method (b)
Figure 27:
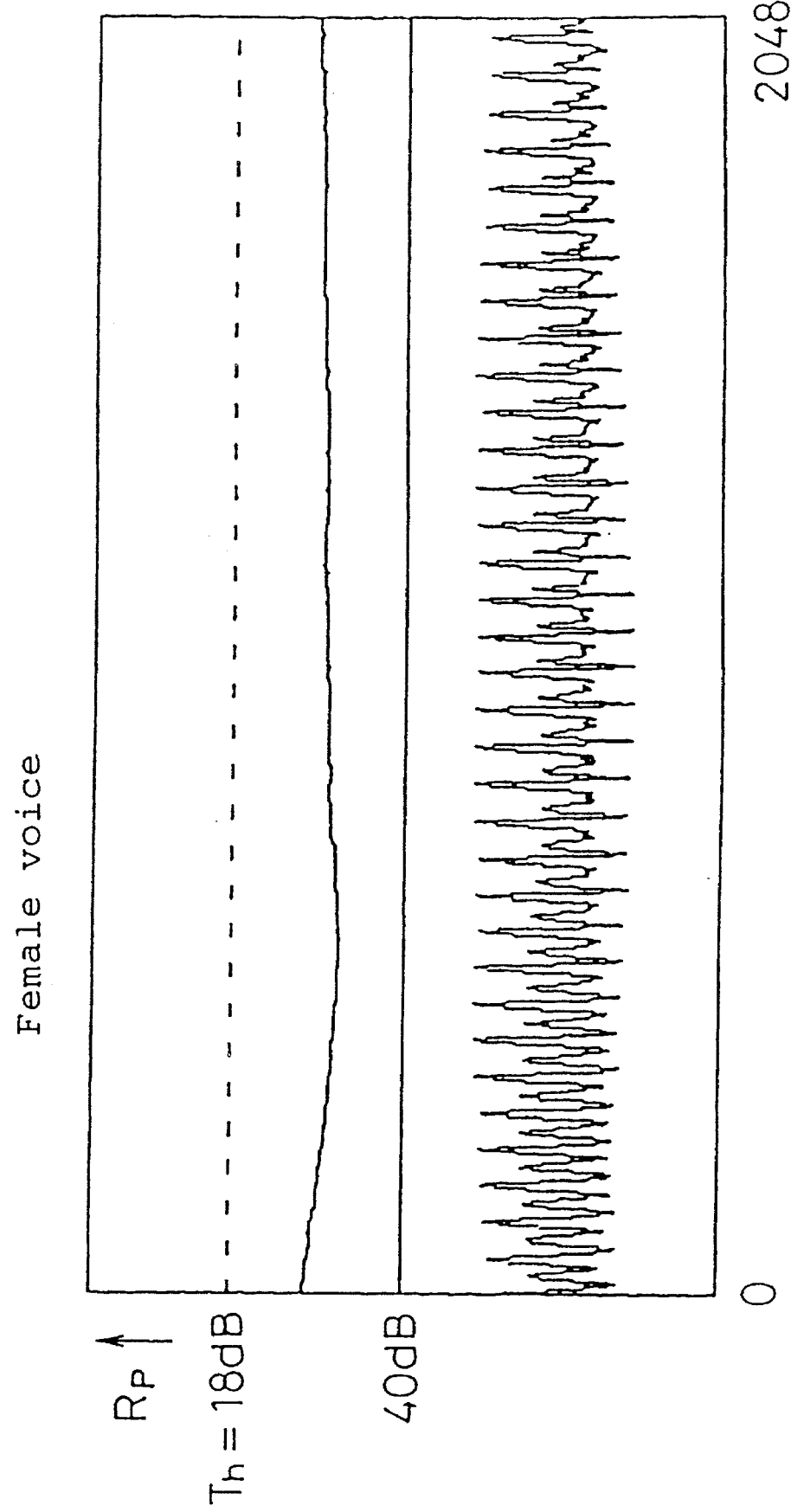
FIG. 27 is a view showing the locus of the power ratio with respect to a female voice in the conventional method (b)
Figure 28A:
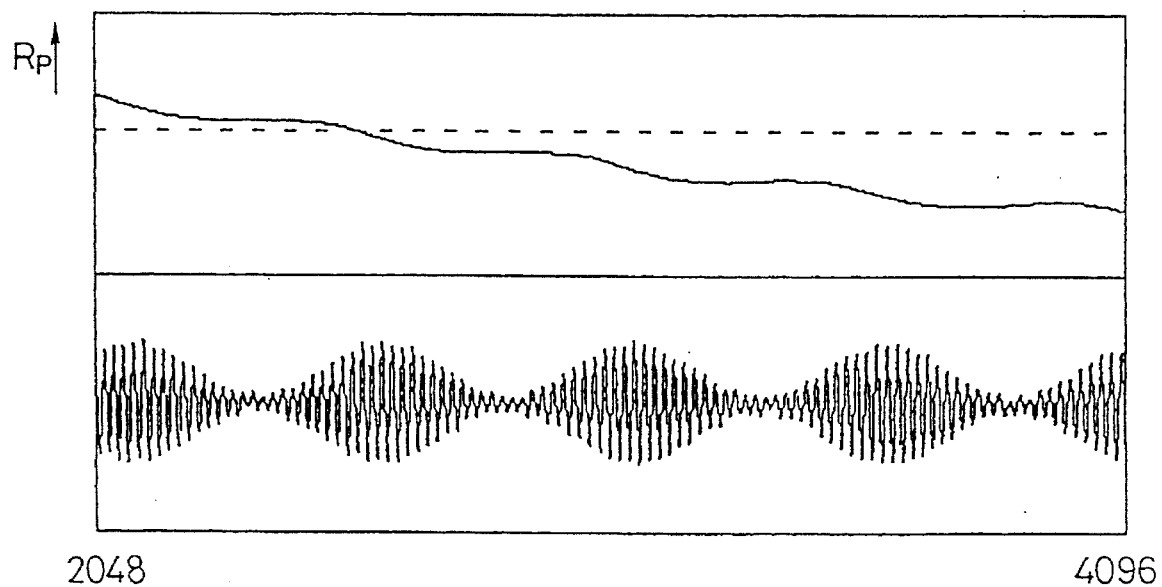
FIG. 28A and FIG. 28B are views showing the locus of the power ratio with respect to a calling tone in the conventional method (b)
Figure 28B:
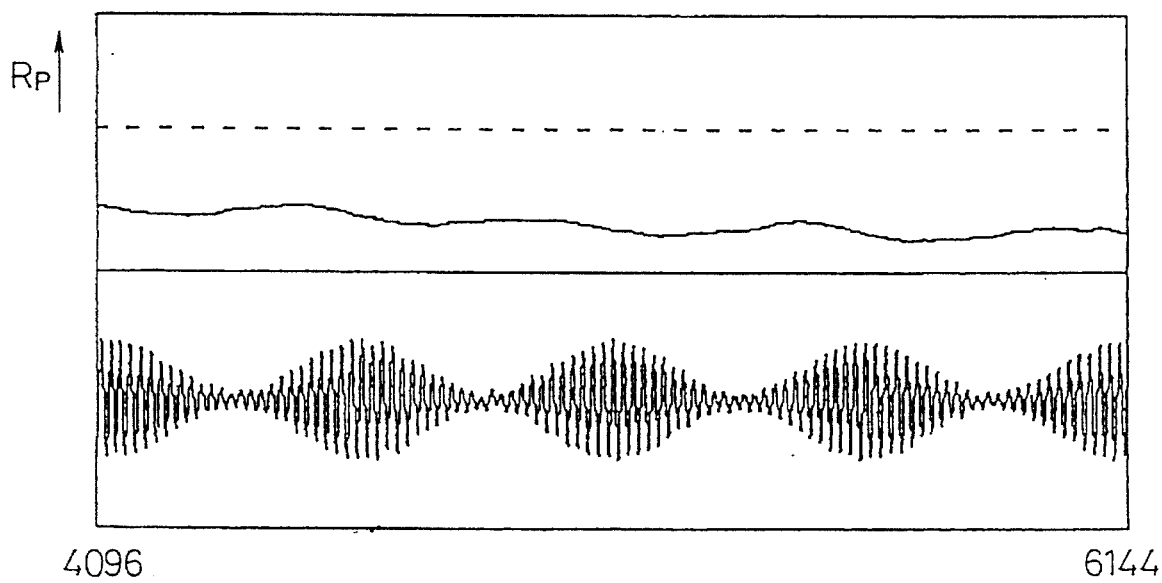

On the other hand, in the conventional system (b), at a threshold $T_h$ of 18 dB, as shown in the example of FIG. 26 (K=1), $R_p > T_h$, there is no risk of the noise being judged as a narrow band signal. However, with a female voice as shown in FIG. 27, the power ratio $R_p$ falls far under the threshold $T_h$=18 dB and the voice is judged as a narrow band signal. FIG. 28A and FIG. 28B show the locus of the power ratio with respect to a calling tone. However, the correction coefficient is made 1 and the time constant of the integration low pass filter for power detection is made 128 msec so as to enable fluctuations in the amplitude of the calling tone to be absorbed. Comparing FIG. 27 and FIGS. 28A and 28B, it is pointed out or observed that it is necessary to make the threshold $T_h$ less than 30 dB so that the voice shown in FIG. 27 is not erroneously judged as a narrow band signal. Even so, the difference between the power ratios obtained in speech and a narrow band signal is only about 2 dB and there is an extremely high risk of judgement of speech as a narrow band signal. This is also true for the conventional method (a).

Further, the delay in detection is greater in the conventional method (b) and becomes over 750 msec. This delay is higher than the about 700 msec convergence time which reaches 20 dB at K=0.0625 of the echo canceler, and the meaning or purpose in providing the detector is completely lost.

Also, a common problem in the conventional systems (a) and (b) is the "stopping of the coefficient estimation operation due to howling being judged as a narrow band signal". If the coefficient estimation operation is stopped when howling occurs, the howling will not stop and the handfree telephone will become unusable.

The object of the third embodiment of the present invention is to provide, in an echo canceler in a handfree telephone, a narrow band signal detector with a small risk of judgement of speech as a narrow band signal and with a small detection delay and to provide a narrow band signal detector which has the function of eliminating howling in the case of application to equipment where the judgement of howling as a narrow band signal is not desirable.

In the third embodiment of the present invention, any one of the following functions (1) to (8) is added to the conventional method (a) or (b) as a means for making maximum use of the differences in the "nonsteady state" and "occupied bandwidth" of speech and a narrow band signal:

(1) Reduction of the correction constant;
(2) Reset every certain time;
(3) Making continuous detection a condition of the narrow band signal;
(4) Addition of a first order recursive filter;
(5) Addition of a second order recursive filter;
(6) Section addition of power integration (truncating the power);
(7) Fixing the filter coefficient b at 1; or
(8) Renewing the coefficients in block units.

By this, a narrow band signal detector is constructed with a small detection delay and little error of considering speech to be a narrow band signal.

Listing the differences in characteristics which can be used for discrimination of the speech and narrow band signal, mention may be made of two points:

(1) Speech is a non-steady state signal seen over a long period of time; and
(2) The frequency band of speech is wider than a narrow band signal.

Further, as a specific means for making maximum use of these differences and improving the degree of separation in the conventional methods (a) and (b), the following methods may be considered. First, as methods for using the non-steady state of speech, there are:

(1) Reduction of the step gain;
(2) Reset every certain time; and
(3) Making continuous detection a condition of a narrow band signal.

As methods using the difference in the occupied bandwidth of speech and a narrow band signal, there are:

(4) Addition of a primary cyclic type filter; and
(5) Addition of a secondary cyclic type filter.

Another problem of the conventional methods is the large detection delay. As a method for reducing the detection delay, consideration may be made of:

(6) Sectional addition of power integration (truncating the power).

Of course, it is impractical to enlarge the degree of separation and improve the discrimination performance if the amount of arithmetic operations is large. As methods for cutting the amount of arithmetic operations, there may be considered:

(7) Fixing the filter coefficient b to 1; and
(8) Renewing the coefficients in block units.

An explanation will be made of the effects of improvement of the conventional methods (a) and (b) using the above techniques.

Reduction of Step Gain (Effective for Conventional Methods (a) and (b))

Now, if the correction constant is made smaller in the learning identification method, the convergence becomes smaller, as is well known. Therefore, considering the fact that a narrow band signal is a steady one, the correction constant is assigned a value sufficiently small so that the coefficient b cannot converge to 1 in the section of occurrence even with a phoneme where the coefficient b becomes 1 has made the correction constant. In this case, the coefficient estimation operation cannot catch up with the fluctuation and it is possible to reduce the errors of judgement of speech as a narrow band signal in the conventional method (a). This may be applied to the conventional method (b) as well, where the amount of attenuation by the adaptive filter will become smaller and the power ratio will rise even with a phoneme with a narrow frequency band where the coefficient b becomes 1.

Figure 29:
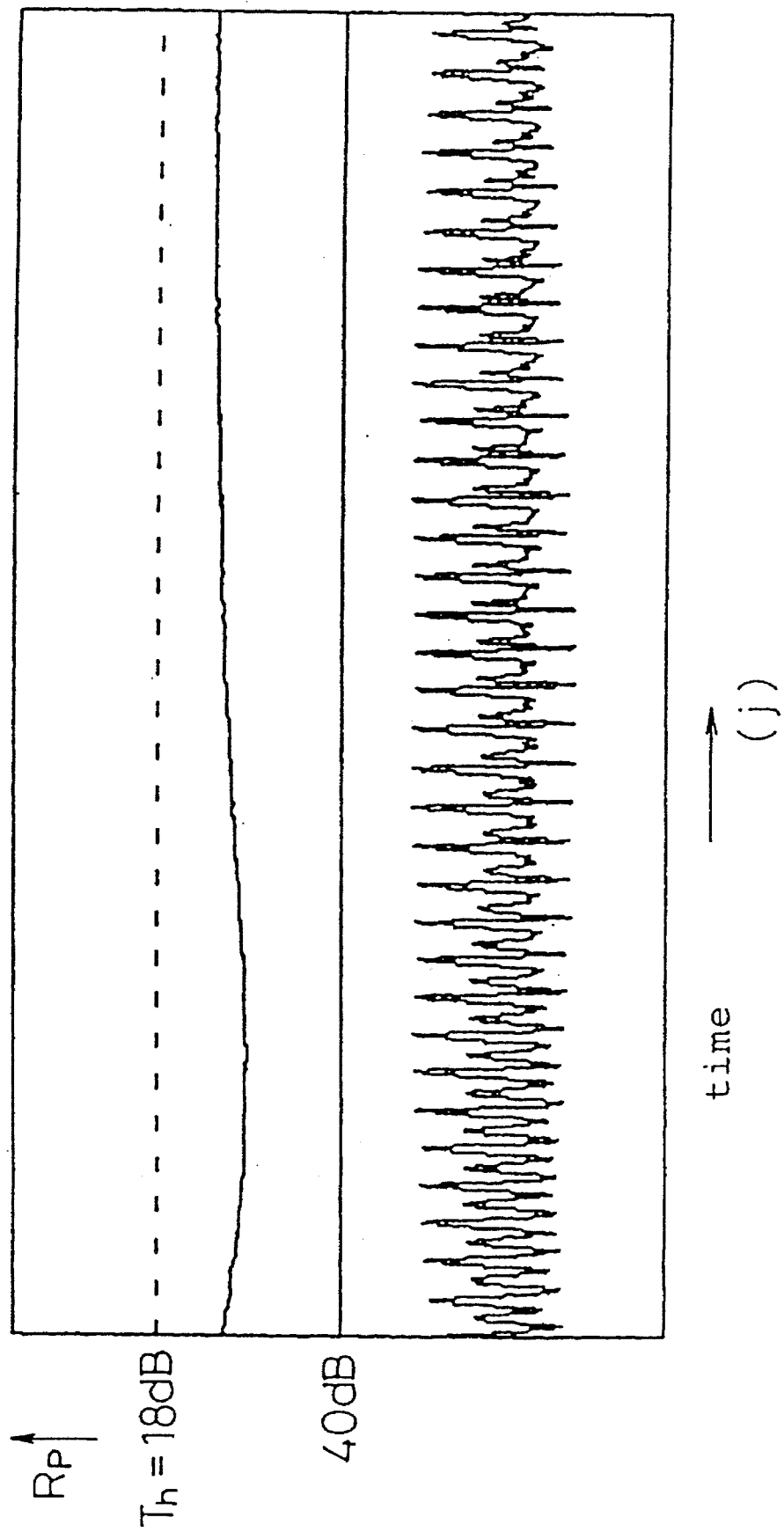
FIG. 29 is a view showing the locus of the power ratio in the case of K=0.05 in the conventional method (b)

FIG. 29 is a view showing the locus of a power ratio with respect to a female voice in the case of a correction coefficient K of 0.05 in the conventional method (b). In the figure, the power ratio $R_p$ of speech rises about 4 dB compared with the result of FIG. 27, it is learned or observed. The difficulty in this method is that the smaller the value of the correction constant and the larger the degree of separation of the narrow band signal and voice, the larger the detection delay becomes. In this method, it is necessary to determine the correction constant in consideration of the allowable detection delay.

Figure 30:
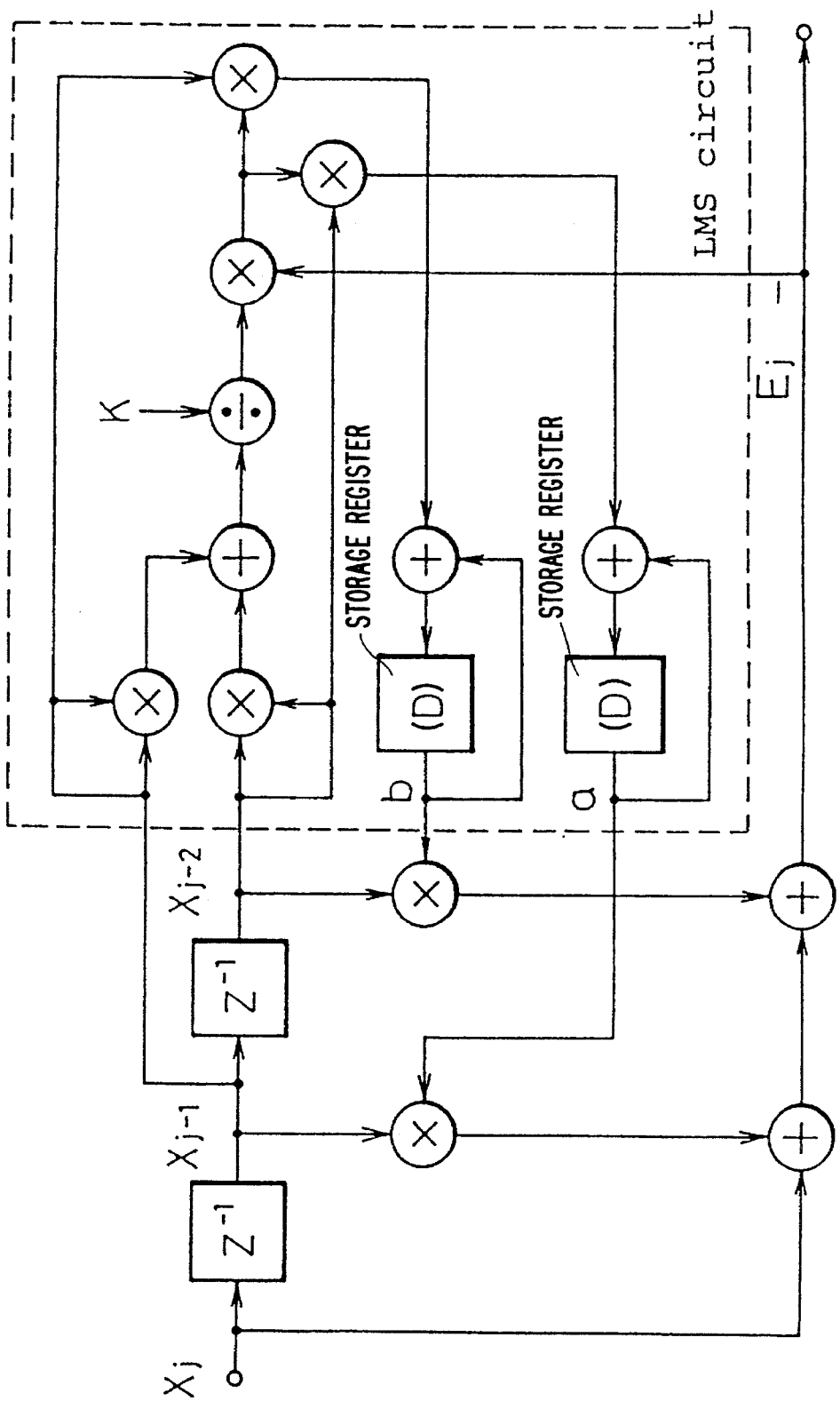
FIG. 30 is a view showing an LMS circuit using the learning identification method by the third embodiment of the present invention.

FIG. 30 shows an embodiment of the present invention where use is made of the learning identification method (above-mentioned equations (13) and (14)) as the LMS circuit. In the LMS circuit shown in the figure, D is a register which stores the filter coefficient.

Reset at Regular Intervals (Effective for Conventional Method (b))

In the conventional method (b), the narrow band signal is made 1, so there is no need for estimating the same. Conversely, if this is fixed to 1 (or −1) for wide band signals such as speech, no estimation corresponding to the coefficient b is performed and the residual echo $E_j$ increases only by the amount not estimated. That is, if the filter coefficient b is made 1, then the arithmetic operation required for the coefficient estimation becomes unnecessary, and at the same time, the power ratio at the wide band signal can be expected to rise.

Figure 31:
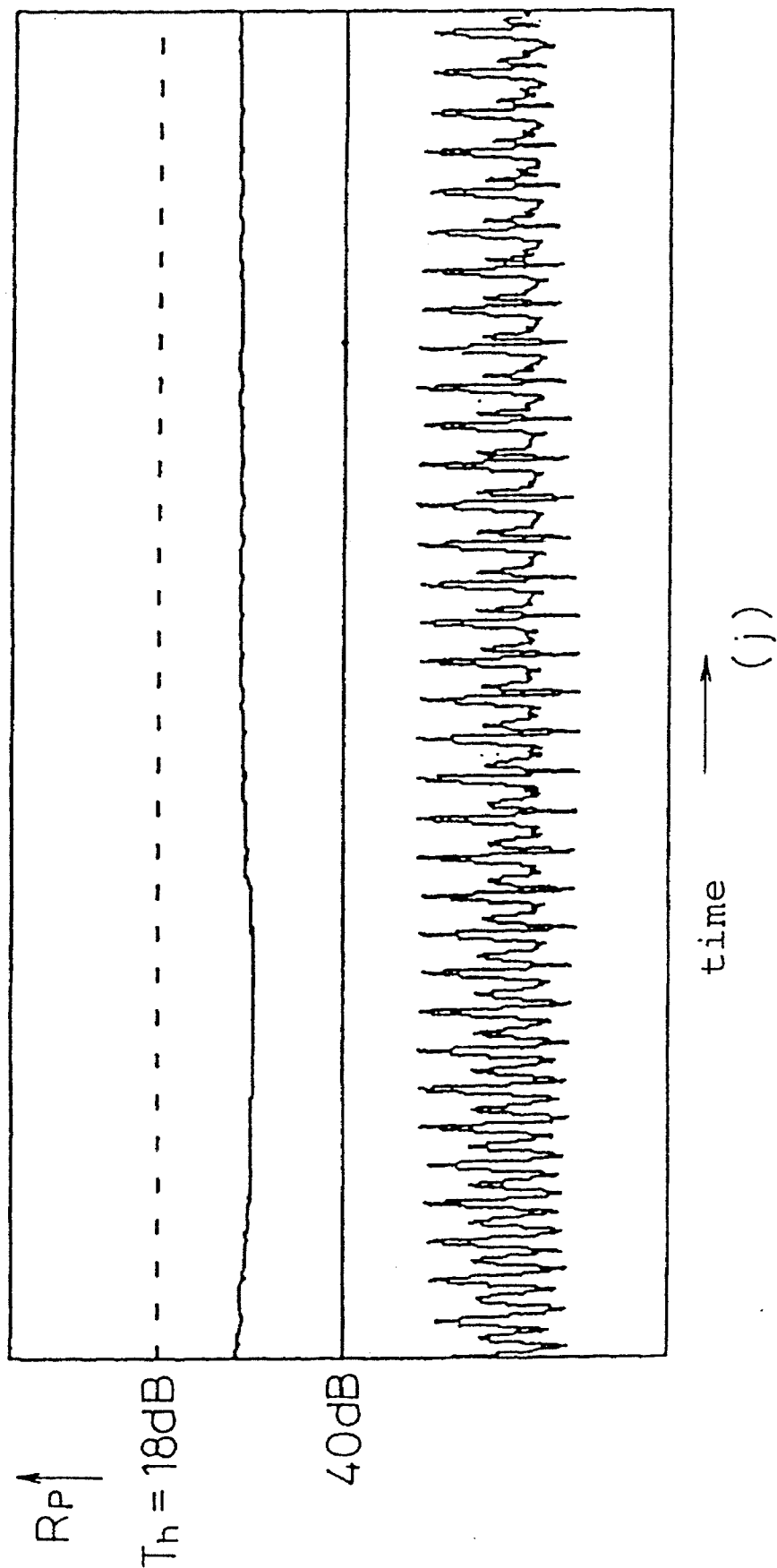
FIG. 31 is a view showing the locus of the power ratio by the circuit of FIG. 30 in the case of K=1.0 and b=1.
Figure 32:
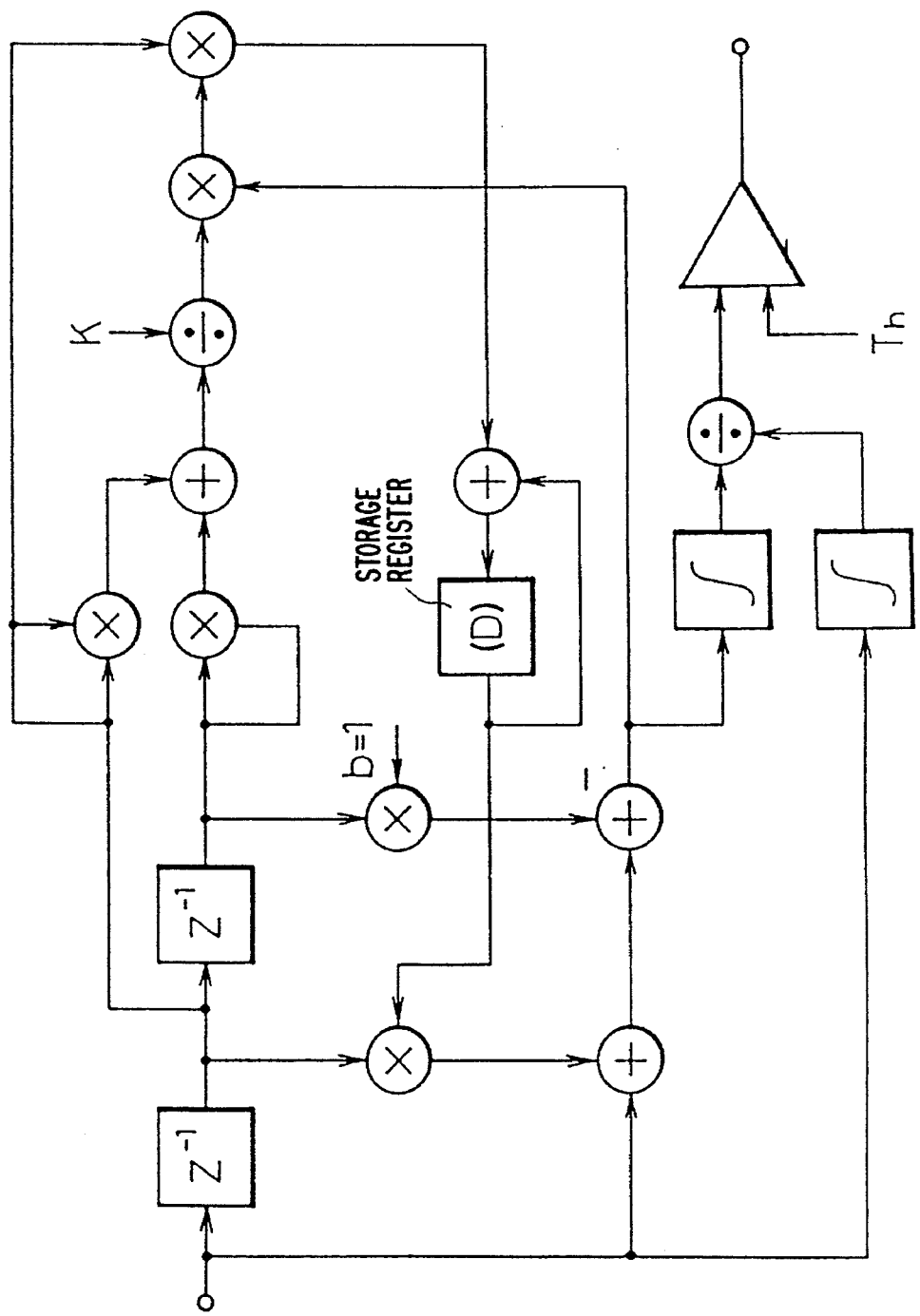
FIG. 32 is a view showing the circuit of FIG. 30 in the case of b=1 in the circuit.

FIG. 31 shows the results of a simulation when the filter coefficient b is 1 and the correction coefficient K is 1. Compared with FIG. 27 (K=1), it is learned that the power ratio of speech rises about 2 dB. Naturally, with a narrow band signal, there is no change in the power ratio. That is, this method gives rise to the dual effects of a reduction of the amount of processing and an enlargement of the power ratio. Of course, this method is independent from the method of reduction of the correction constant, so it is possible to use the two at the same time. An embodiment using the present invention for an LMS circuit is shown in FIG. 32.

Power Integration (Truncating of Power Integration) (Effective for Conventional Method (b))

The conventional method (b), compared with (a), has a high degree of separation between speech and a narrow band signal, but is weak in the point that the detection delay almost doubles. The reason is that use is made of the power ratio for the detection parameter. In so far as the adaptive filter makes its judgement by the power integration after convergence, naturally there will only be a delay by the amount of the time constant of the power integration filter. Further, the power integration filter necessarily keeps the power before the completion of the coefficient estimation (before attenuation) longer in proportion to the time constant, so that much more of a detection delay occurs. To reduce this influence, it is necessary to shorten the time constant of the low pass filter. However, there is the limitation that the time constant must be made of a long enough length to absorb the fluctuation of amplitude of the calling tone.

Therefore, it has been considered to perform cumulative addition in separate sections to perform the power detection. In this method, the effects before completion of the coefficient estimation caused by the movement of the addition zones are simply eliminated. The integration zones, further, need only be a length able to absorb the fluctuations in amplitude of the calling tone, or over 512 sample points.

FIG. 33A, FIG. 33B, FIG. 34A, and FIG. 34B shows the results of this (K=0.05, b=1). The detection delay is only 128 msec. FIG. 35 shows an example of the power detection circuit. Here, the reset signal occurs every 512 samples, and the cumulative added value stored in the register is made 0. The results of the judgement or determination of the circuit are stored in the register D by the set signal. The results are held until after 512 samples, when the next set signal occurs.
Reset at Regular Intervals (Effective for Conventional Methods (a) and (b))

Figure 36A:
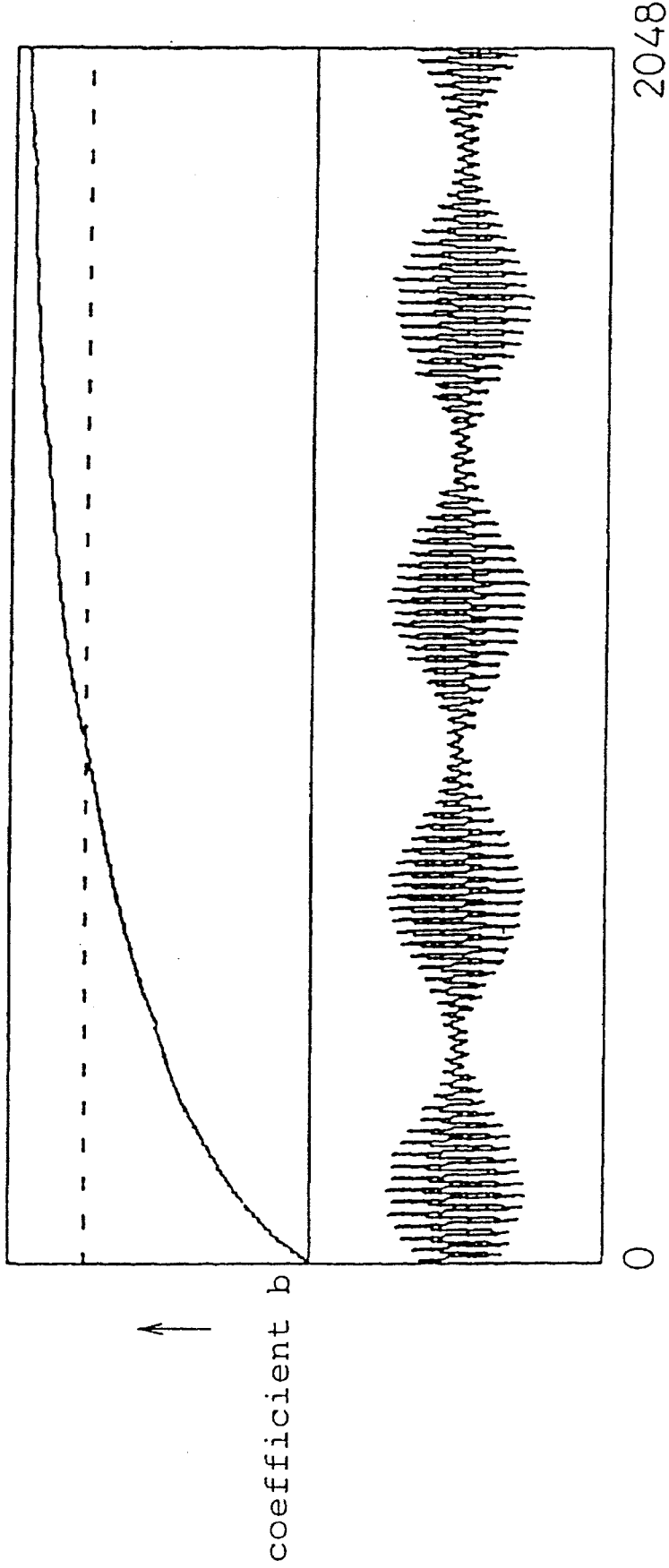
Figure 36C:
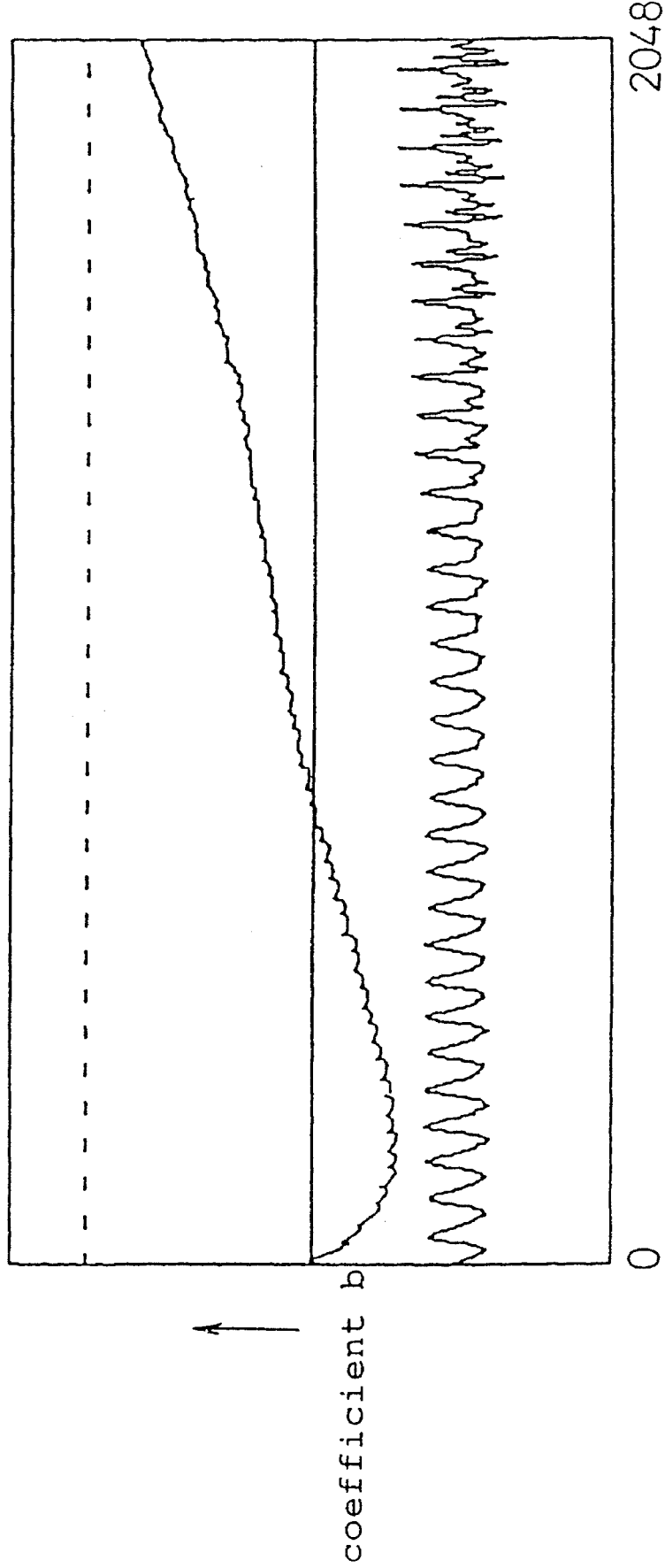
Figure 38A:
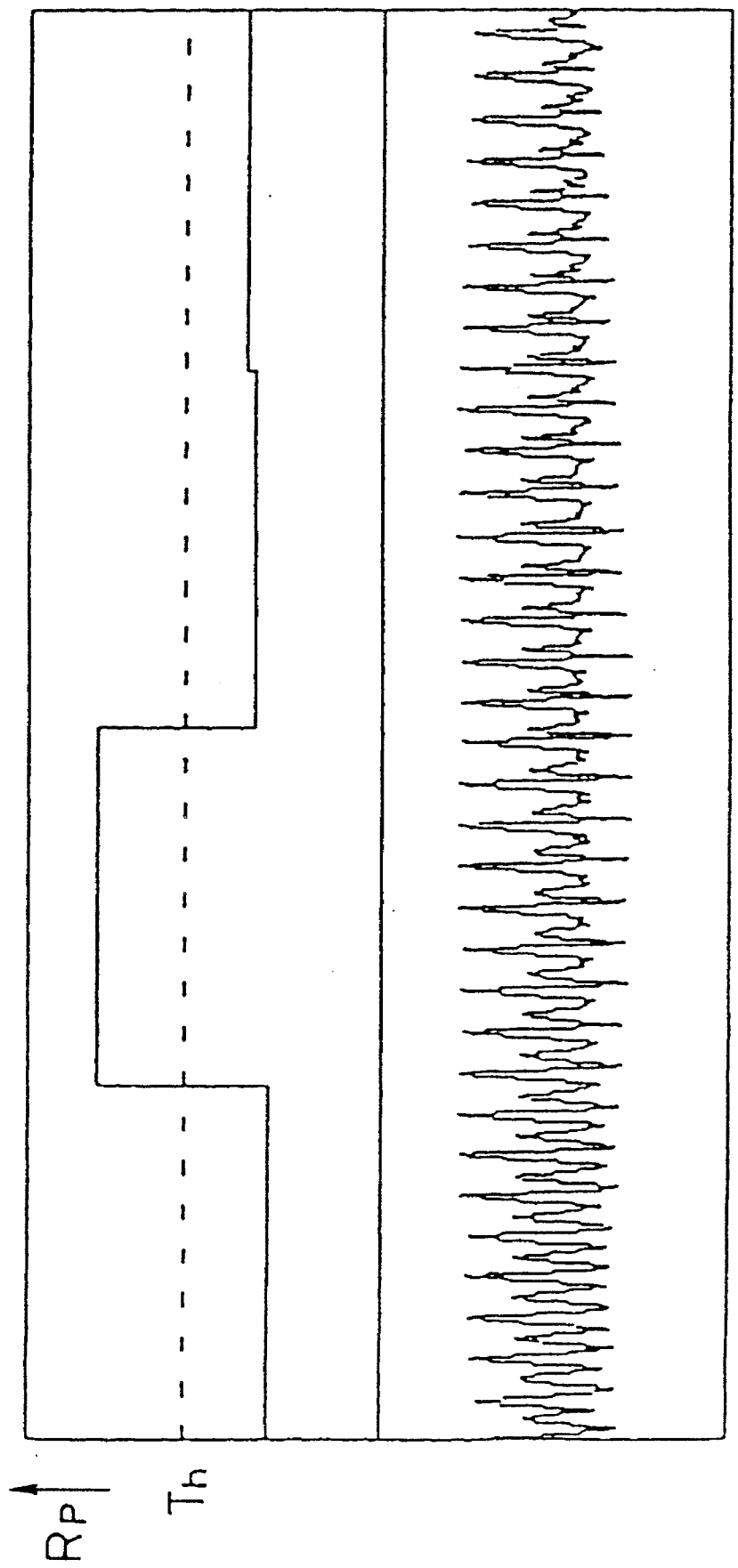

A narrow band signal is stabler than speech, and the convergence can be expected to be faster during the coefficient estimation operation in proportion to the amount of stability of the narrow based signal. Therefore, if a construction is adopted in which the coefficient estimation value is reset every fixed interval, then even with speech where there is a danger of judgement or its being determined as a narrow band signal, the coefficient estimation value b or the power ratio return to their original states before the detection threshold is reached. Thus, it is expected that the difference occurring between the speech and narrow band signal will become larger. As a method of giving this predetermined time, consideration may be given to two methods: a method of counting from after the signal is detected and a method of counting independent of the signal. FIG. 36A to FIG. 36C show the locus of the coefficient b in the case of a construction resetting every 2048 samples independent of the signal. It is learned or observed that this difference grows larger and separation becomes possible by making the threshold near 0.9. In addition, separation also becomes possible by making the threshold near 0.6 if the resetting occurs every 1024 samples. This construction is simple and it is sufficient to reset the register D of the LMS circuit shown in FIG. 30 at this interval.

This technique can also be applied in the conventional method (a) as well. FIG. 37A, FIG. 37B, FIG. 38A, and FIG. 38B show the results of resetting every 2048 samples at K=0.05 and b=1. This technique is realized by the construction adding the function of resetting at a certain interval to the register D in the LMS circuit shown in FIG. 32.
Suppression of Howling Now, if the narrow band signal is detected and an operation of stopping the coefficient estimation operation is added to the echo canceler, then there is the danger that the howling will be judged or considered as a narrow band signal. Thus, the coefficient estimation operation will continue to be suspended, and the howling will not stop. Therefore, when a narrow band signal is detected, if a secondary noncyclic type filter having the extracted coefficient is inserted in the speaking circuit to remove the narrow band signal, the howling will be suppressed by the inserted secondary noncyclic type filter. In this case, judgement of speech as a narrow band signal would result in the insertion of a secondary noncyclic type filter into the conversation, which would invite a deterioration of the speaking quality. Thus, it is essential to minimize such erroneous judgements.
Addition of First Order Recursive Filter (Effective for Conventional Method (b))

Figure 39:
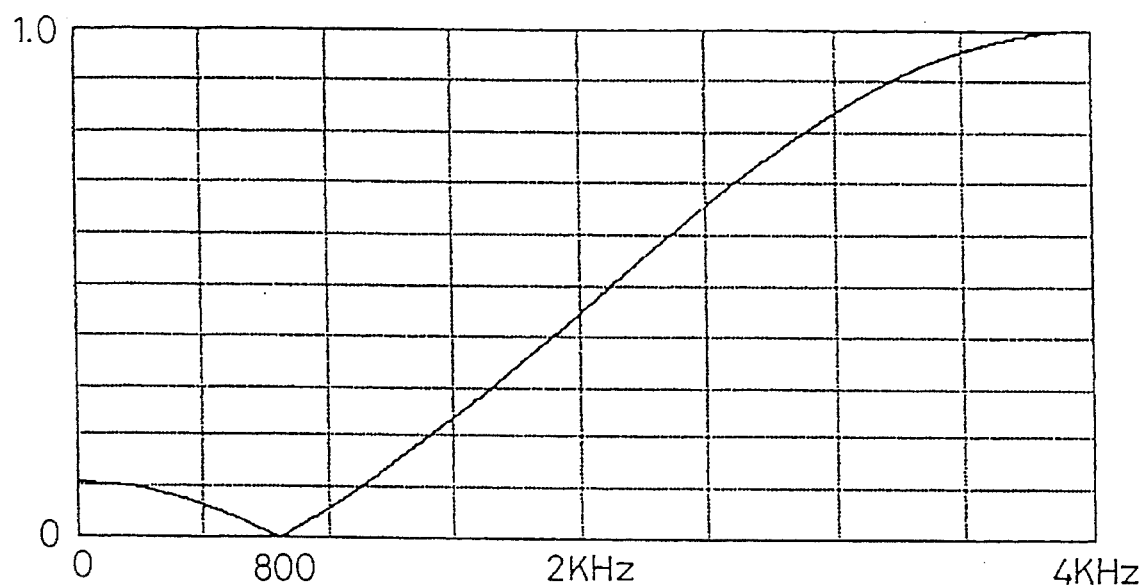
FIG. 39 is a view showing the frequency characteristic of the noncyclic type secondary filter used in the conventional methods (a) and (b)
Figure 40:
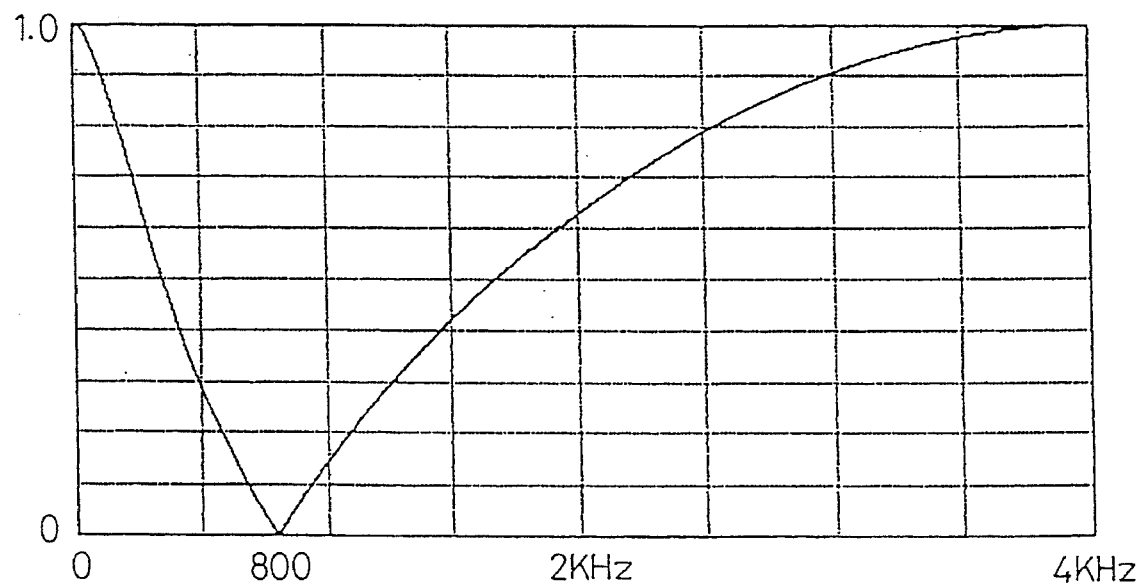
FIG. 40 is a view showing a frequency characteristic which can separate speech and a narrow band signal.
Figure 41:
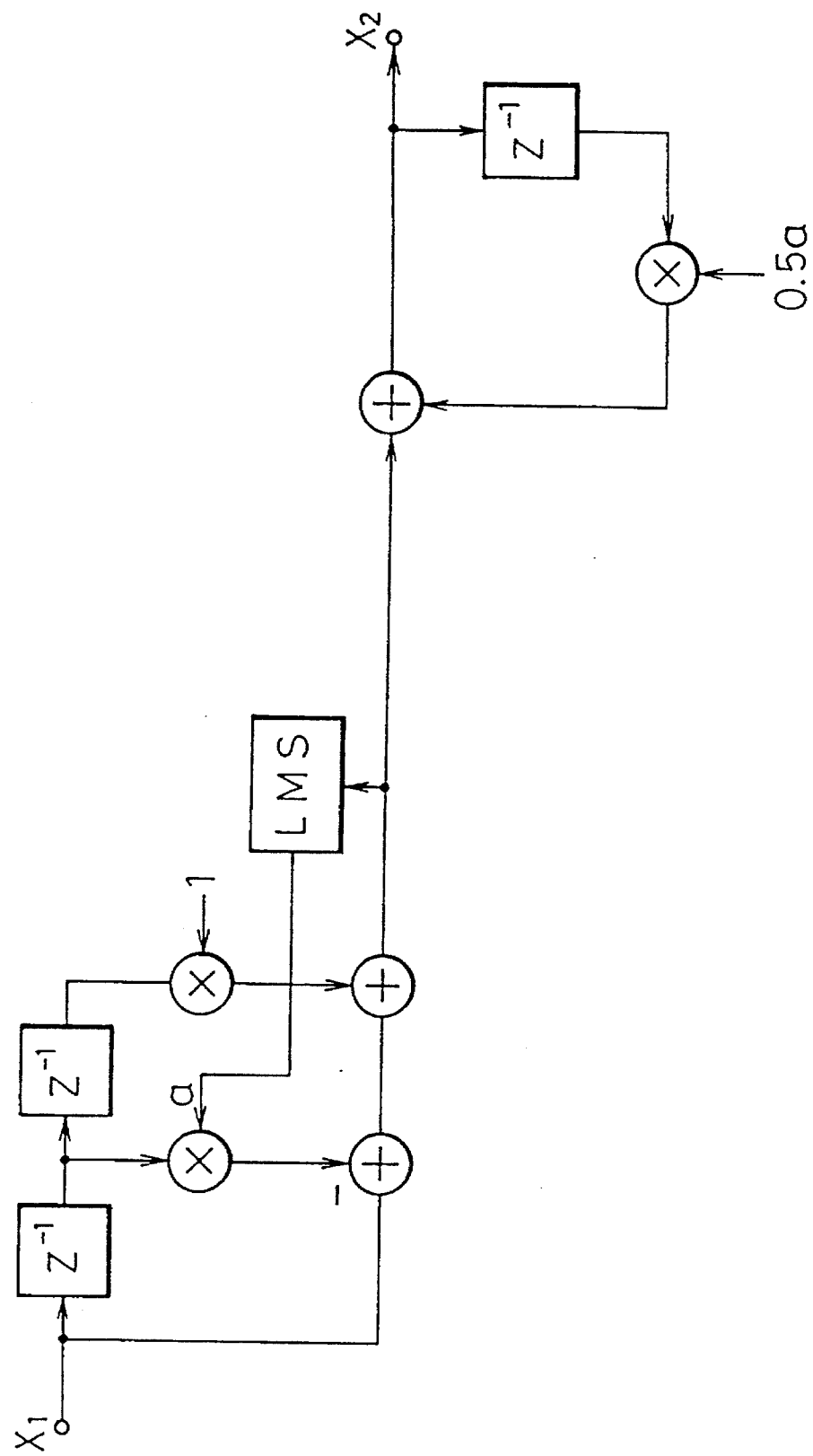
FIG. 41 is a circuit diagram showing the construction of an echo canceler with an additional primary cyclic type filter in the third embodiment of the present invention.

To improve the discrimination ability of speech and a narrow band signal, one means or method is to make maximum use of the difference in the occupied frequency band. Specifically, this may be realized by making the frequency characteristic of the discrimination filter acute. FIG. 39 shows an example of the frequency characteristic of a noncyclic type secondary filter which can separate or differentiate between a narrow band signal and speech as used in the conventional methods (a) and (b). It is difficult to say that the performance as a band elimination filter is good. However, if this is modified, for example, as shown in FIG. 40, then the separation between speech and a narrow band signal should become much better. To realize the frequency characteristic of FIG. 40, a primary cyclic type low pass or high pass filter may be added to the output of the adaptive filter. In this method, however, insertion of a cyclic type filter into the learning loop would pose problems in stability, so the filter is placed outside the loop. FIG. 41 shows this construction.

Figure 42A:
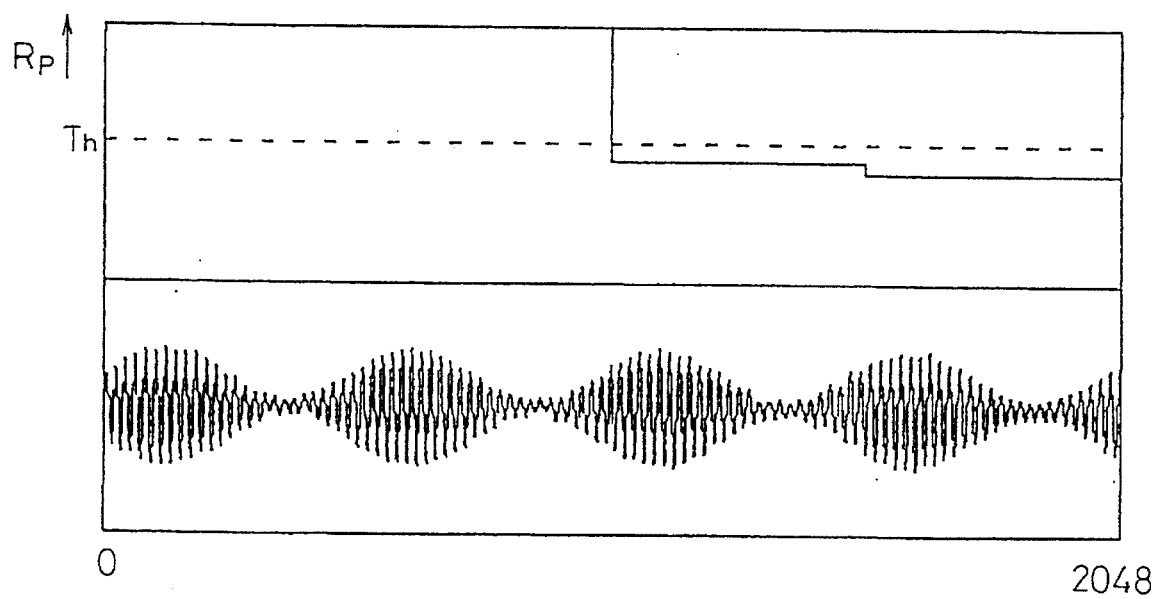
FIG. 42A and FIG. 42B are views showing the locus of the power ratio with respect to the calling tone by the circuit of FIG. 41 in the case of K=1.0.
Figure 42B:
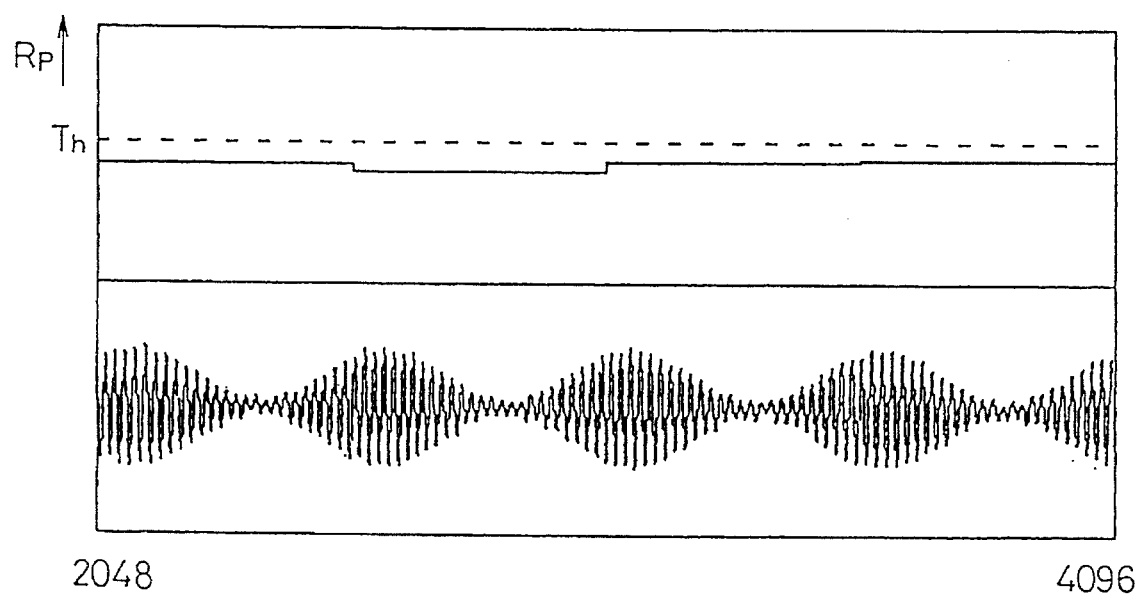
Figure 43:
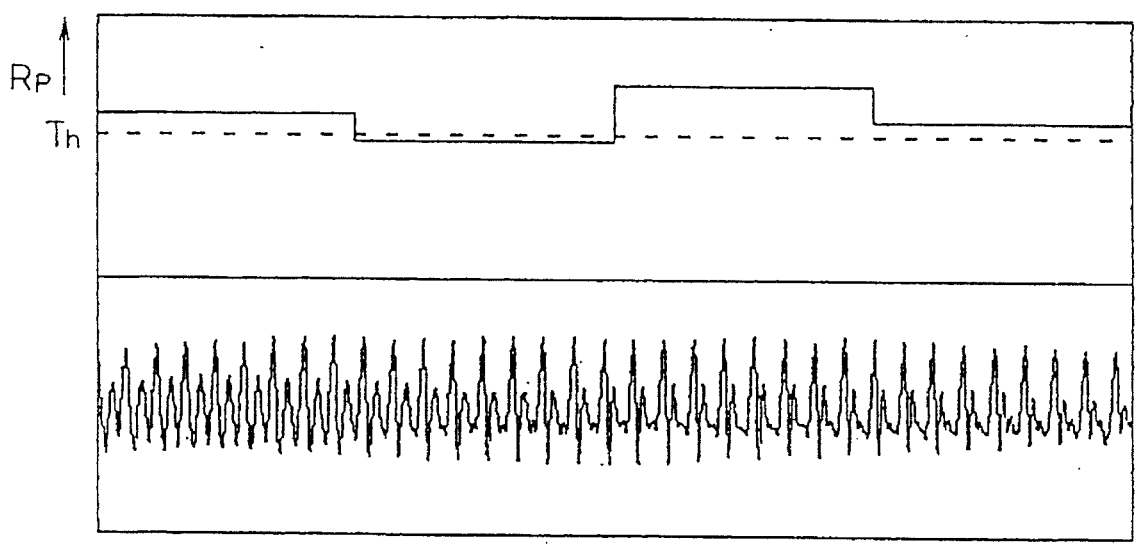
FIG. 43 is a view showing the locus of the power ratio with respect to a calling tone by the circuit of FIG. 41 in the case of K=0.1.
Figure 44:
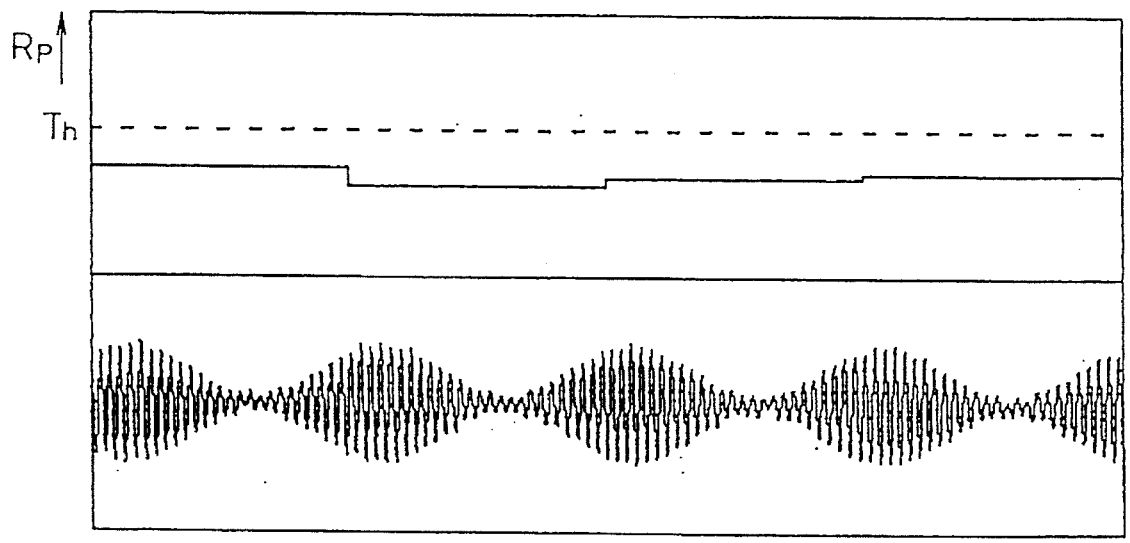
FIG. 44 and FIG. 45 are views showing the locus of the power ratio with respect to speech by the circuit of FIG. 41 in the case of K=0.1.
Figure 45:
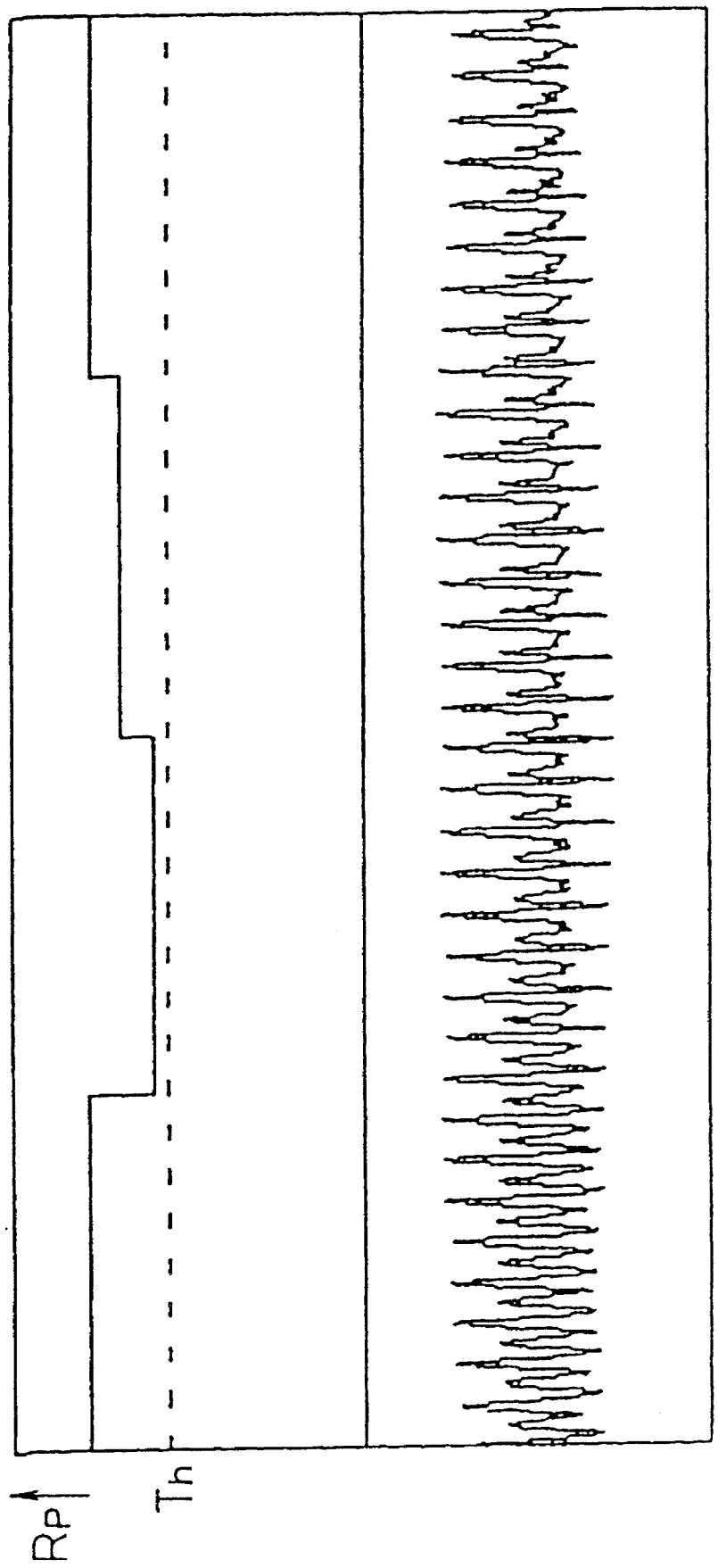

FIG. 42A and FIG. 42B show the locus of the power ratio with respect to a calling tone and speech in the case of K=1.0 (power integration section of 512 samples, coefficient b=1), while FIG. 43, FIG. 44 and FIG. 45 show locus of the power ratio with respect to a calling tone and speech in the case of K=0.1. It is learned that the difference is greater even when compared with FIG. 33A, FIG. 33B, FIG. 34A, and FIG. 34B (K=0.05, power integration section of 512 samples, coefficient b=1), which displayed the highest degree of separation or distinction between speech and a calling tone up to now.
Renewal of Coefficient in Block Units (Effective for Conventional Methods (a) and (b))

The simulation used for the above explanation had the calculation of the normalization power set up in the same way as the case of estimating the two coefficients a and b even in the method which fixed b=1. The reason is that if there is only one coefficient a, the probability of the normalization power becoming zero becomes higher and the coefficient estimation can no longer be performed. If the construction is adopted in which the coefficient a is corrected after several are collected, the probability of the normalization power becoming zero becomes smaller or is reduced. Further, with this method, the construction is simple and the amount of processing becomes smaller.

Figure 46:
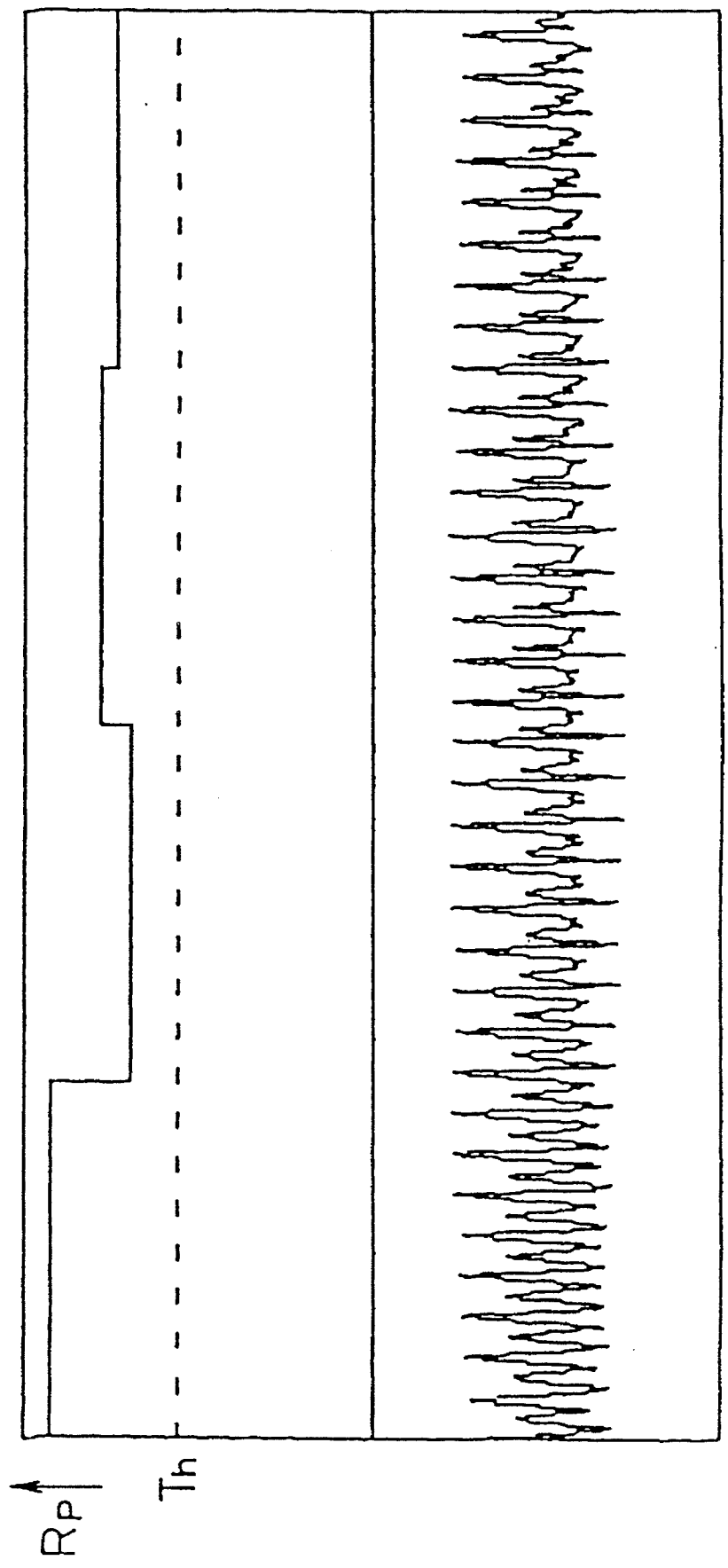
FIG. 46 is a view showing the locus of the power ratio with respect to speech in the case of a block unit of 8 in the third embodiment of the present invention.
Figure 47B:
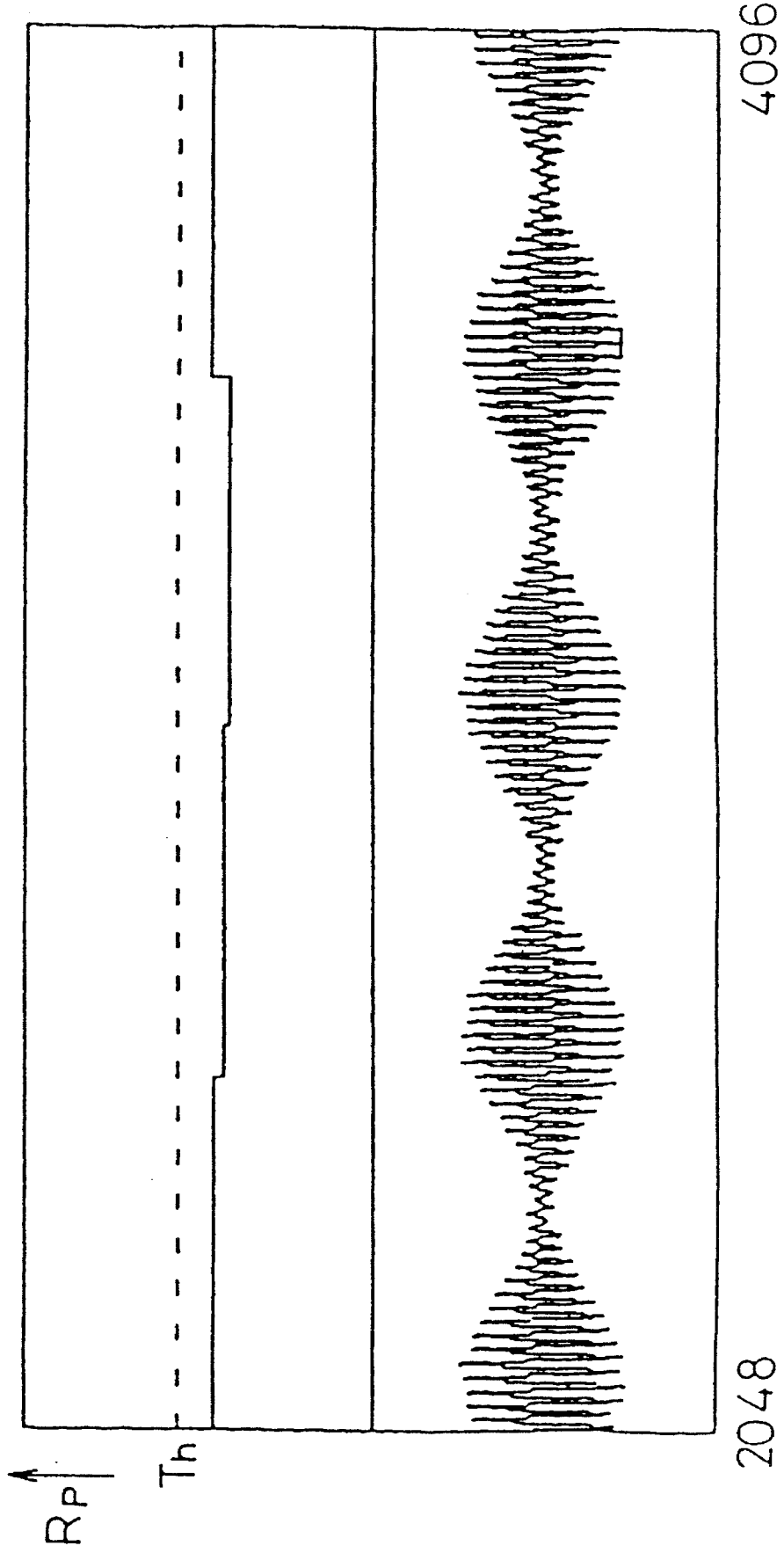
Figure 48:
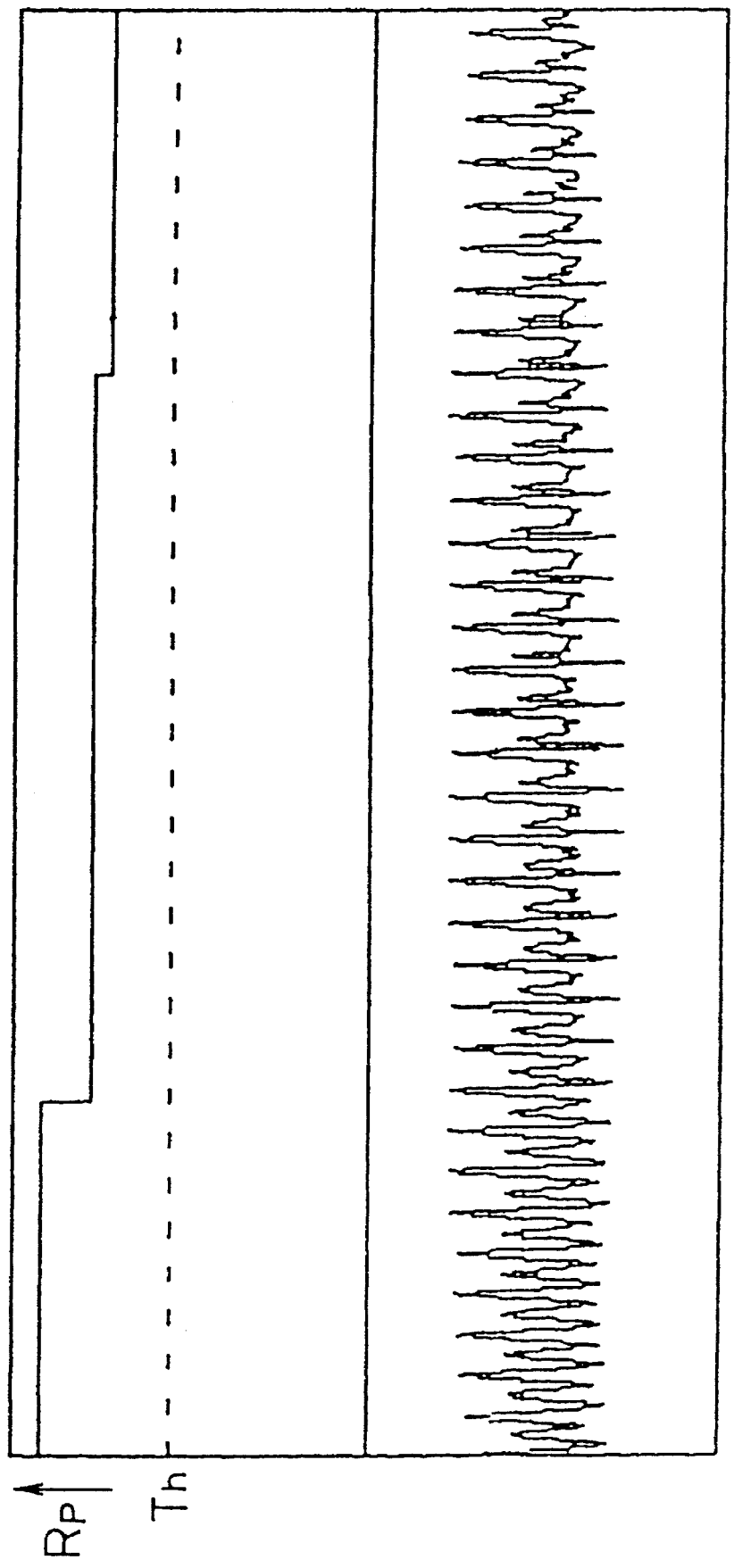
FIG. 48 is a view showing the locus of the power ratio in the case of resetting the coefficient every fixed interval in the case of FIG. 46 according to the third embodiment of the present invention.
Figure 49:
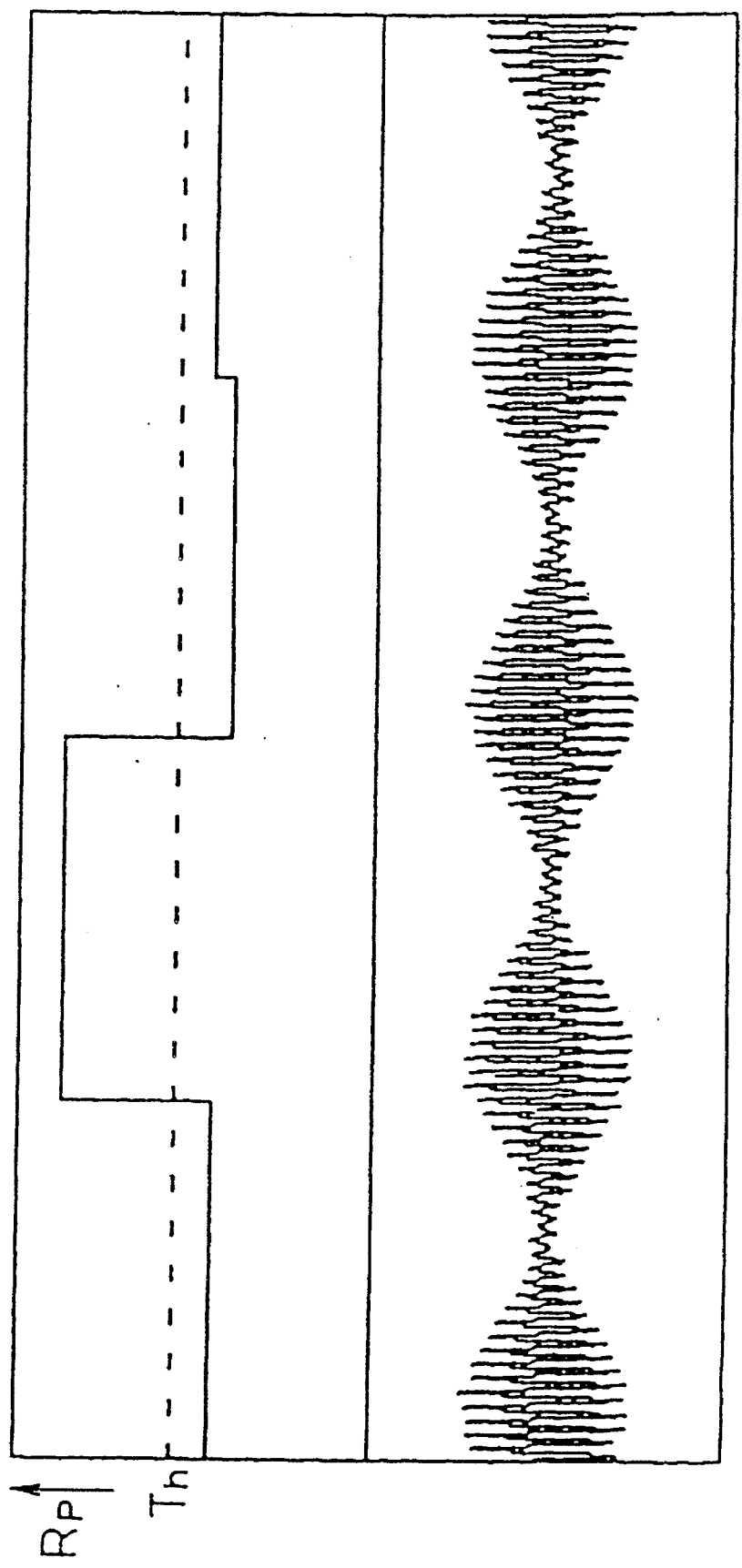
FIG. 49 is a view showing the locus of the power ratio with respect to a calling tone in the case of joint use of the case of resetting the coefficient every fixed interval in the third embodiment of the present invention.
Figure 50:
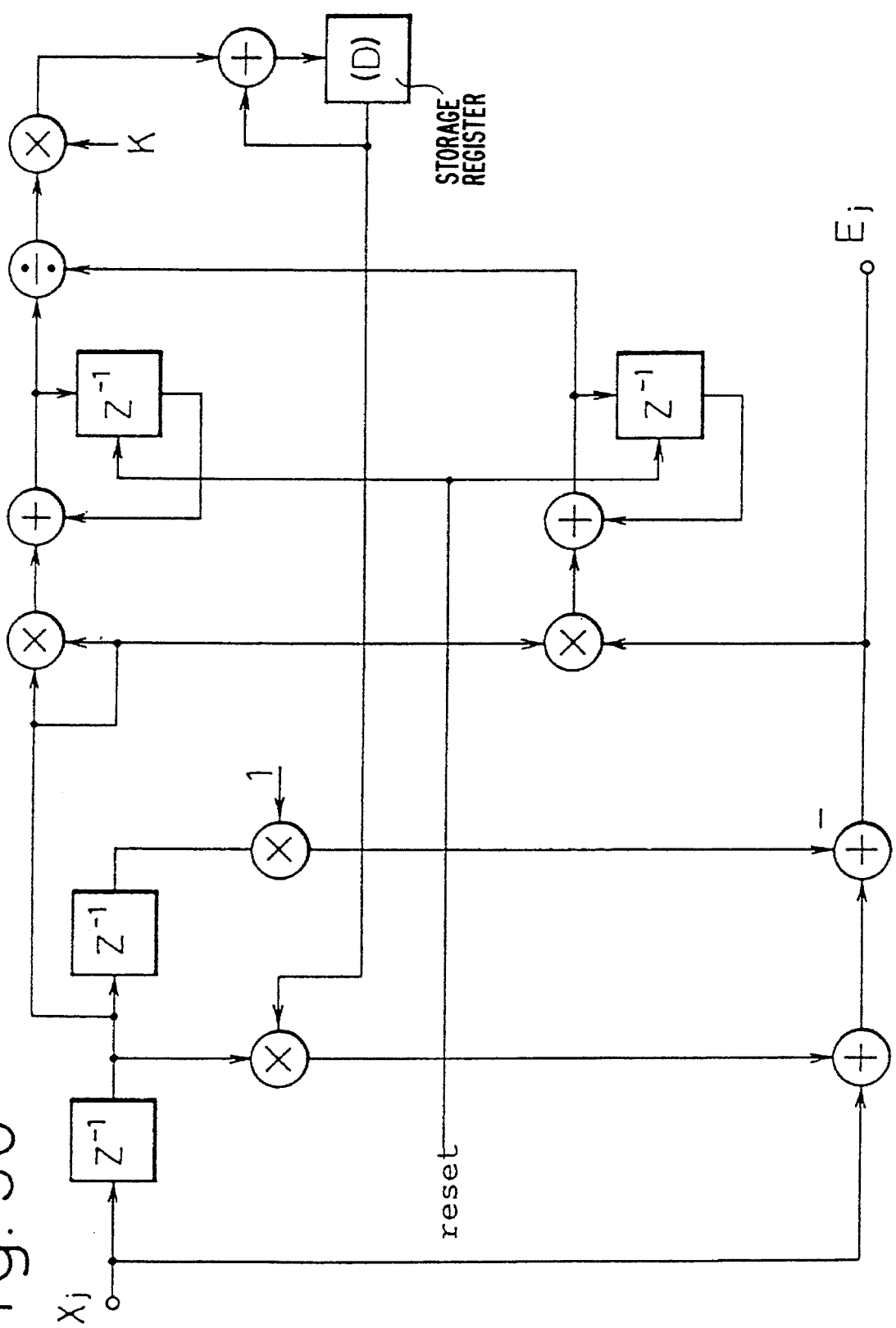
FIG. 50 is a block diagram showing the construction of an LMS circuit in the case of the addition of a function for renewing the coefficient in block units in the conventional method (b) according to the third embodiment of the present invention.

As an example, the results obtained in a construction having an additional primary cyclic type filter wherein the block unit is 8, K=1.0, b=1, and there are 512 samples in a power integration section, are shown in FIG. 46 and FIGS. 47A and 47B. This degree of separation or distinction obtained between speech and the calling tone is the largest up to now being about 10 dB. FIG. 48 and FIG. 49 show the results in the case of joint use of the method of resetting at every certain or specific interval. The spread of the power ratio is about 11 dB. FIG. 50 shows the construction of an LMS circuit when using this technique in conjunction with the conventional method (b). In the conventional method (a), it is sufficient if a similar function is added for the coefficient b.
Addition of Second Order Recursive Filter (Effective for Conventional Method (b))

Further, it is possible to make the frequency characteristic acute by construction with or including a secondary cyclic type band pass filter. Inclusion of a secondary cyclic type filter in a learning loop is difficult in some respects at the present, so this construction must be made by including a first filter for coefficient extraction and a second filter for detection of the narrow band signal. This is shown in FIG.

Figure 51:
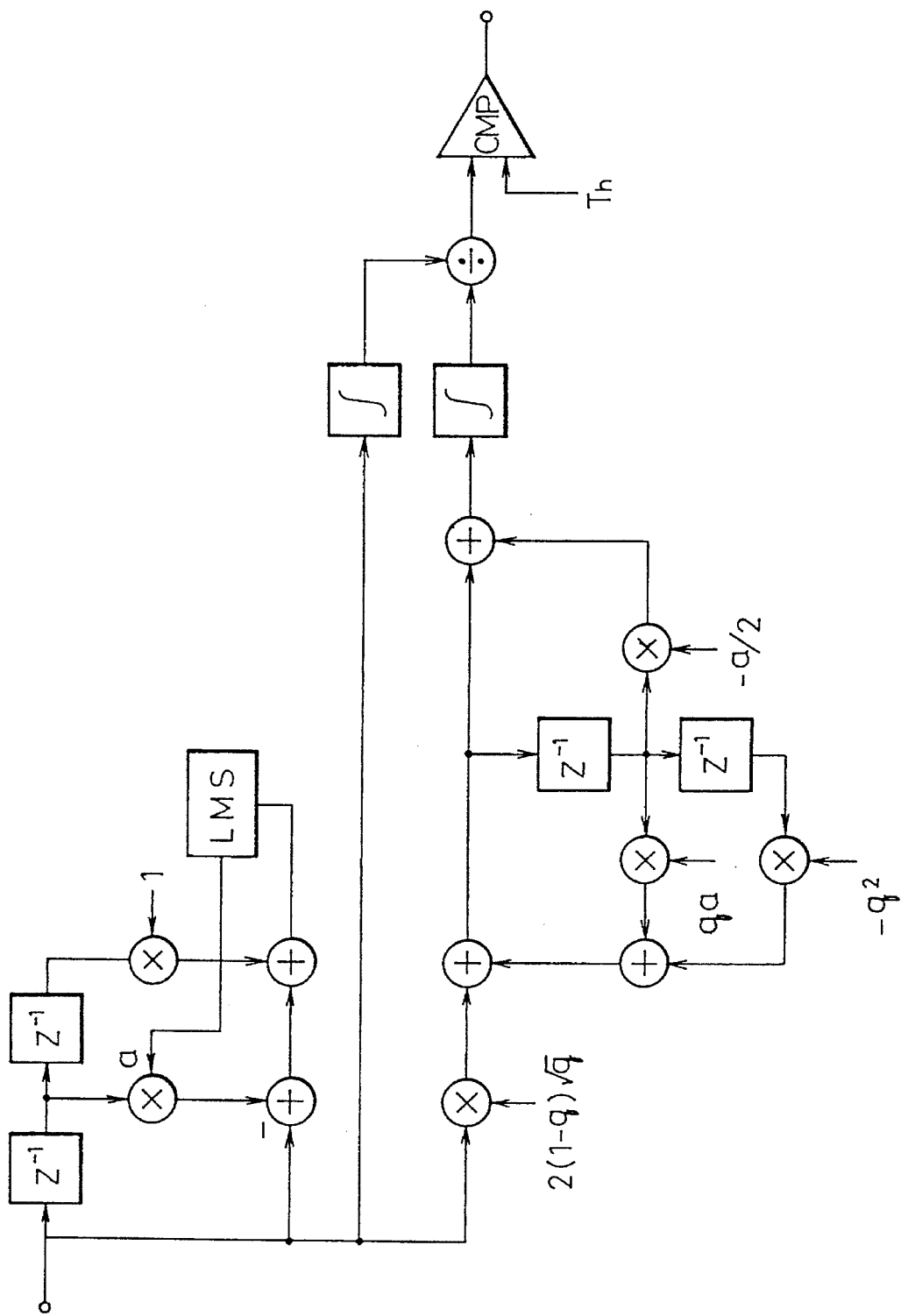
FIG. 51 is a block diagram showing an echo canceler in the case of constructing the secondary cyclic type filter using a band pass filter in the third embodiment of the present invention.

51. The amount of processing is thereby increased by the amount of the band pass filter inserted in a lower stage compared with the conventional method (b). However, the bandwidth may be freely set as in FIG. 52 or FIG. 53. In FIG. 51, q is a constant determined by the time constant (detection delay) or the required bandwidth (bandwidth of narrow band signal or frequency fluctuation) and determines the gain of the filter. In this construction, the filter coefficient of the noncyclic portion is $q/2$ and not $qa/2$ to make constant the filter gain across a wide frequency band. In this case, the gain correction constant required for making the filter gain 1 is:

$$2(1-q)\sqrt{q}$$

Figure 54B:
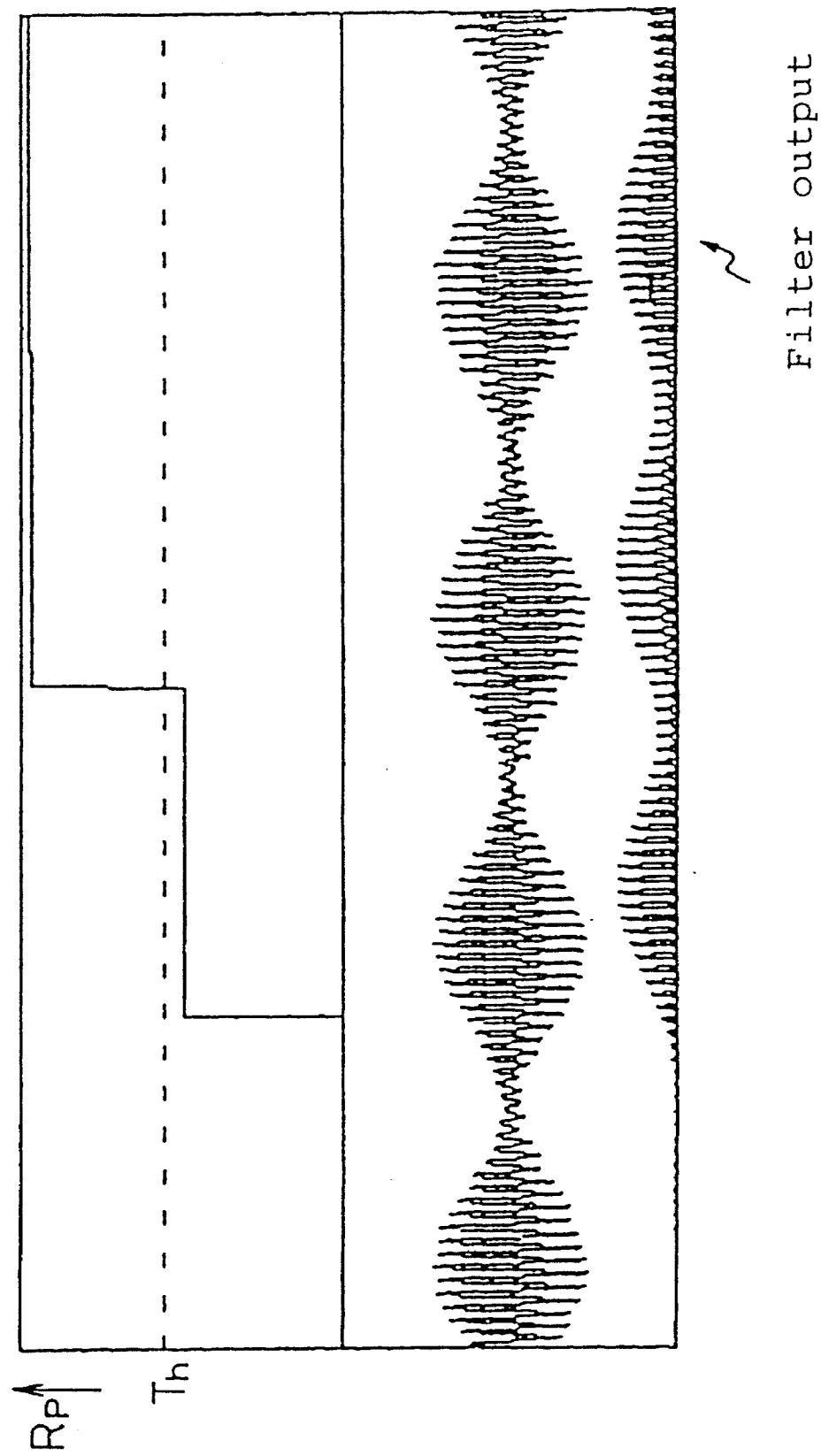
Figure 56A:
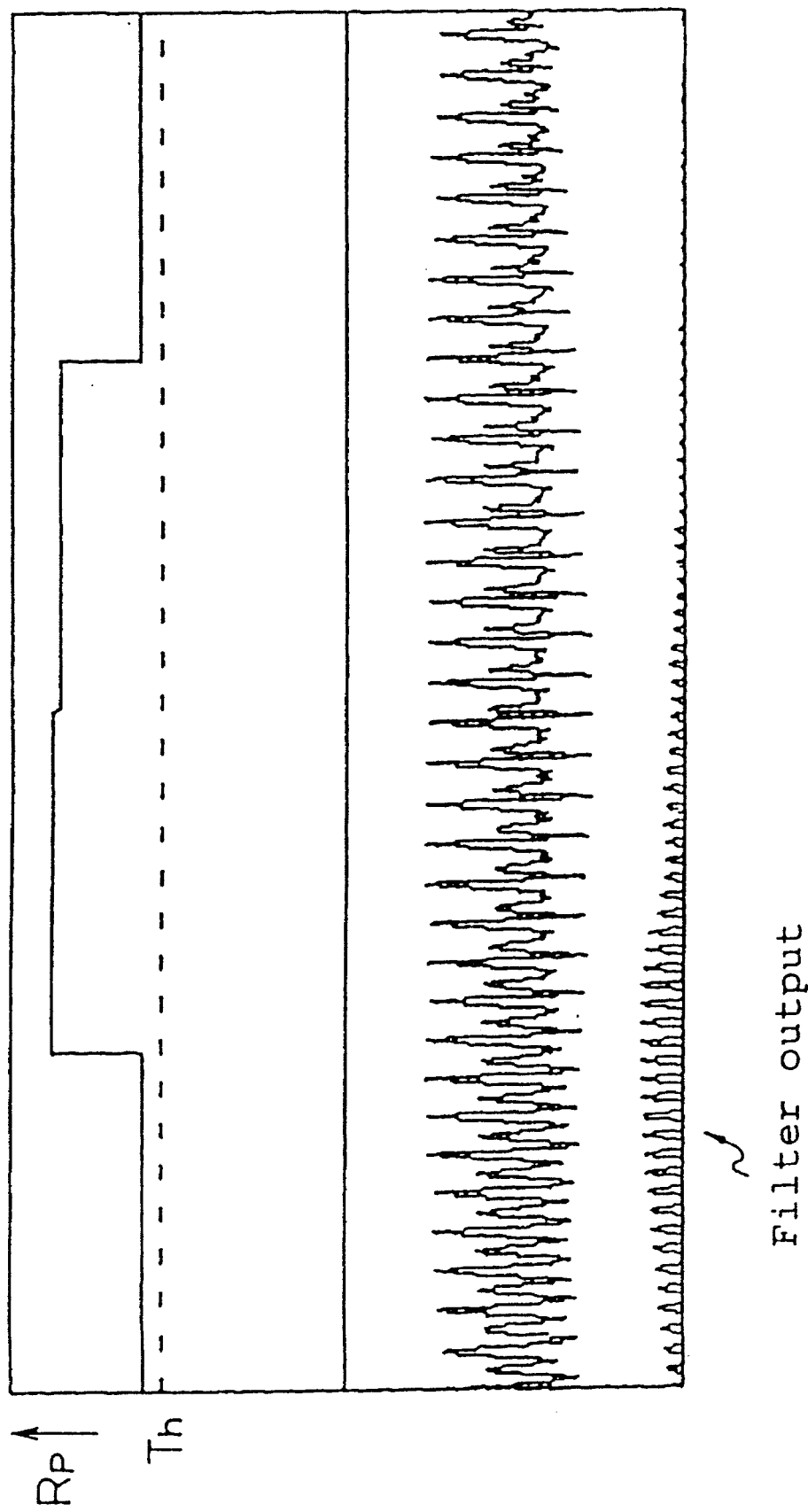
Figure 64C:
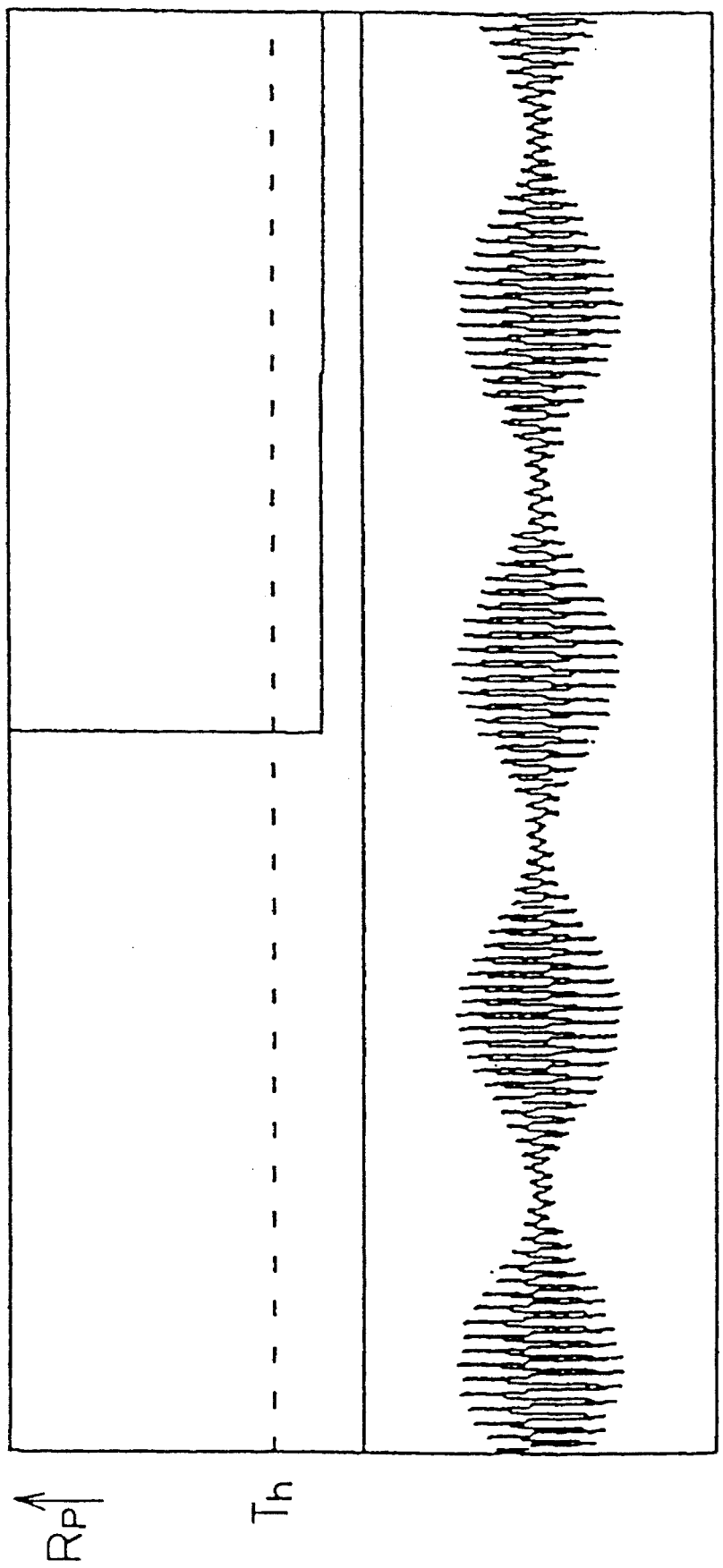
FIG. 64C is a view showing the locus of the power ratio with respect to the calling tone in the case of a coefficient renewal block unit of 128 in the circuit of FIG. 51.

This q is most desirably set to just about or approximately the bandwidth of the narrow band signal. In addition, the secondary filter output was observed using a value converted or given by $$q=0.1^{(1/N)}$$

from the time constant N with K=1 and a coefficient renewal block unit of 8. FIGS. 54A and 54B show the results in the case of a time constant of 32 msec (N= 32×8 samples), FIG. 55A and FIG. 55B the case of 64 msec (N=64×8 samples), FIGS. 56A and 56B the case of 128 msec (N=128×8 samples), and FIGS. 57A and 57B the case of 256 msec (N=256×8 samples). As a result, it is learned that the bandwidth required to pass the calling tone is obtained in the case of a q of the secondary filter of a time constant of 32 msec and that the side band wave is substantially removed at 128 msec. Further, it is learned that almost no difference is found in the occupied bandwidth of the speech and calling tone shown in the figure in a comparison of the filter output or power ratio. This shows that there are limits to discriminating between speech and the calling tone when making the band of the filter narrower.

The results when making or assigning the correction constant a small value of 0.01 as an example of use of the nonsteady state, or other characteristics enabling discrimination between speech and a narrow band signal are shown in FIGS. 58A and 58B. The detection delay is large, but the degree of separation is remarkably improved, as it will be observed or learned. This is an extremely effective method for systems where a large detection delay is allowed or acceptable.

Making a Series of or Continuous Detections a Condition of a Narrow Band Signal (Effective for Conventional Methods (a) and (b)

In the suspension of the coefficient correction operation, due to the need to keep the disturbance of the coefficient estimation value small, the detection delay must be as small as possible. In addition, there must be as little or few detection mistakes as possible so as to prevent deterioration of the speaking quality caused by the band elimination filter inserted to reduce the effect caused by mistaking howling as a narrow band signal. However, as mentioned earlier, there are limits to the discrimination between speech and a narrow band signal by referring to just the difference of the bandwidth which each signal occupies. To eliminate this, it is necessary to make maximum use of the unsteadiness of speech. This nonsteady state can be effectively utilized by making the correction constant smaller. Of course, there is the accompanying defect or disadvantage of creating a larger detection delay. Therefore, the construction is made so that the coefficient estimation is just or only suspended when the first time a narrow band signal is detected. A band inhibiting filter is inserted for the first time with continuous detection. At this time, with infrequent errors caused by speech, a band elimination filter is not inserted, and therefore, the speaking quality does not deteriorate. That is, the effects of mistaking of speech as a narrow band signal become smaller or less. Conversely, for a narrow band signal that is steady, the detection results can be considered continuous. Therefore, it is possible to make the detection reliable by judging something is a narrow band signal upon or during continuous detection. By making the detection a two stage process, it is possible to achieve both an improvement of the detection speed and a reduction of erroneous detection.

Here, the values of the parameters to be set for improving the conventional method (b) are specifically given and an explanation made of an embodiment. The proposed improvements all assume the following:

(1) Fixing the coefficient b at 1.
(2) Section addition of power detection (512 samples).
(3) Renewal of the coefficients in block units.

Power Ratio Method Using a Second Order Nonrecursive Filter Output

Figure 66B:
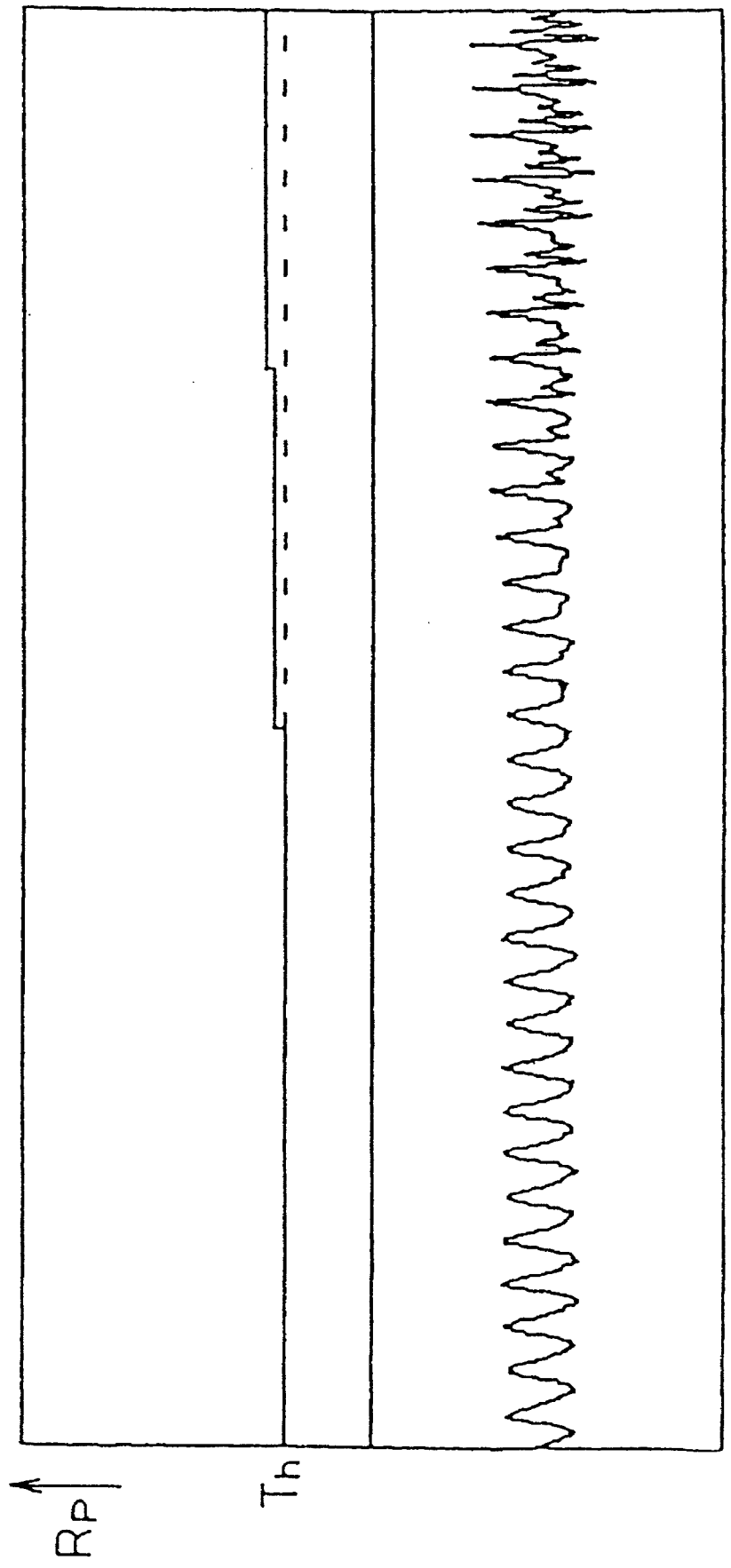

The parameters which must be decided on or determined are the units of the coefficient renewal blocks and the value of the correction constant. First, considering FIGS. 59A to 66C, the results are illustrated in the case of K=1 and block units ranging from 4 to 512, it is observed that the power ratios given by a narrow band signal and speech are largest at a block unit of 4 of FIGS. 59A to 59D. The power ratio of the narrow band signal is saturated at a block unit of 16 in FIGS. 61A to 61C and the power ratio of speech is saturated at a block unit of 64 in FIGS. 61A to 63C. Judging from the nonsteady state of speech, it was expected that the opposite results would appear, but in the section of less than 512 samples, judging from the speech waveform shown in FIGS. 66A to 66C, the speech is substantially steady in that interval. Therefore, with this degree of block unit, the unsteadiness does not become a problem and the error included in the correction value as the block unit is conversely large. Thus, the greater the number of the block unit, the smaller the error included in the correction value, so the smaller the power ratio, it may be deduced. It may be said that the most desirable block unit is a block unit of 16, where saturation is obtained with a calling tone, and the power ratio in speech is also high.

Figure 67A:
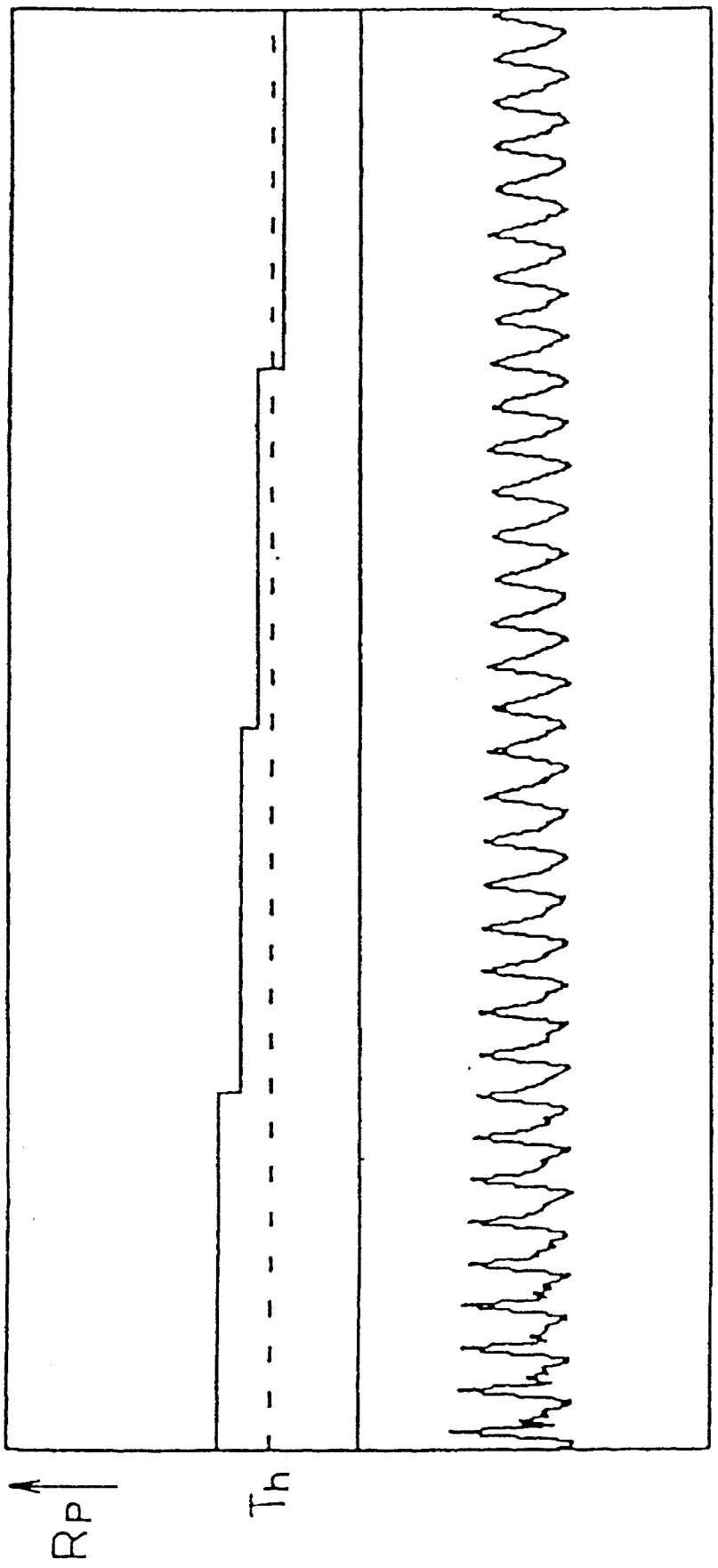
FIG. 67A and FIG. 67B are views showing the locus of the power ratio with respect to speech in the case of $K=0.1$ and a coefficient renewal block unit of 8 in the circuit of FIG. 51.
Figure 67B:
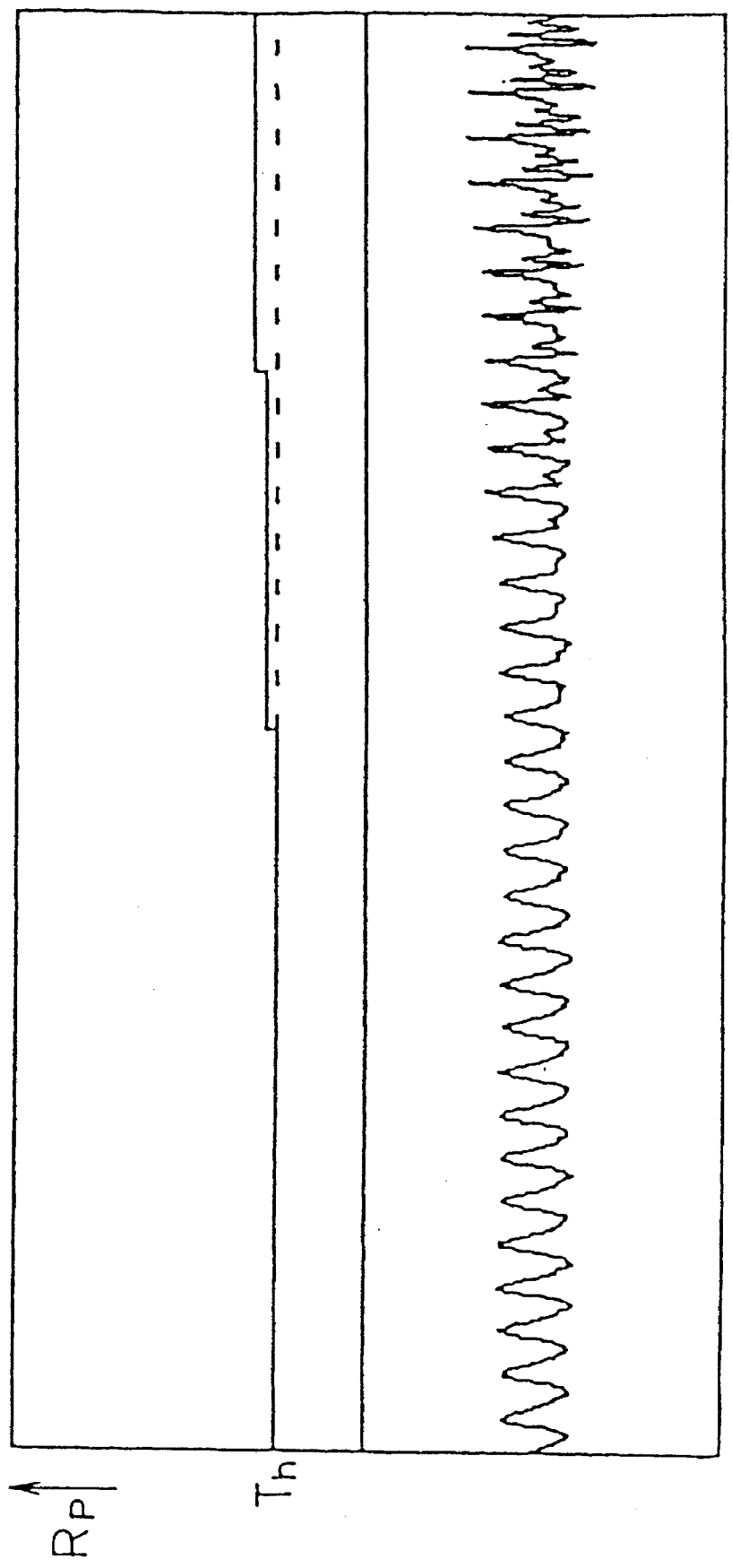
Figure 70A:
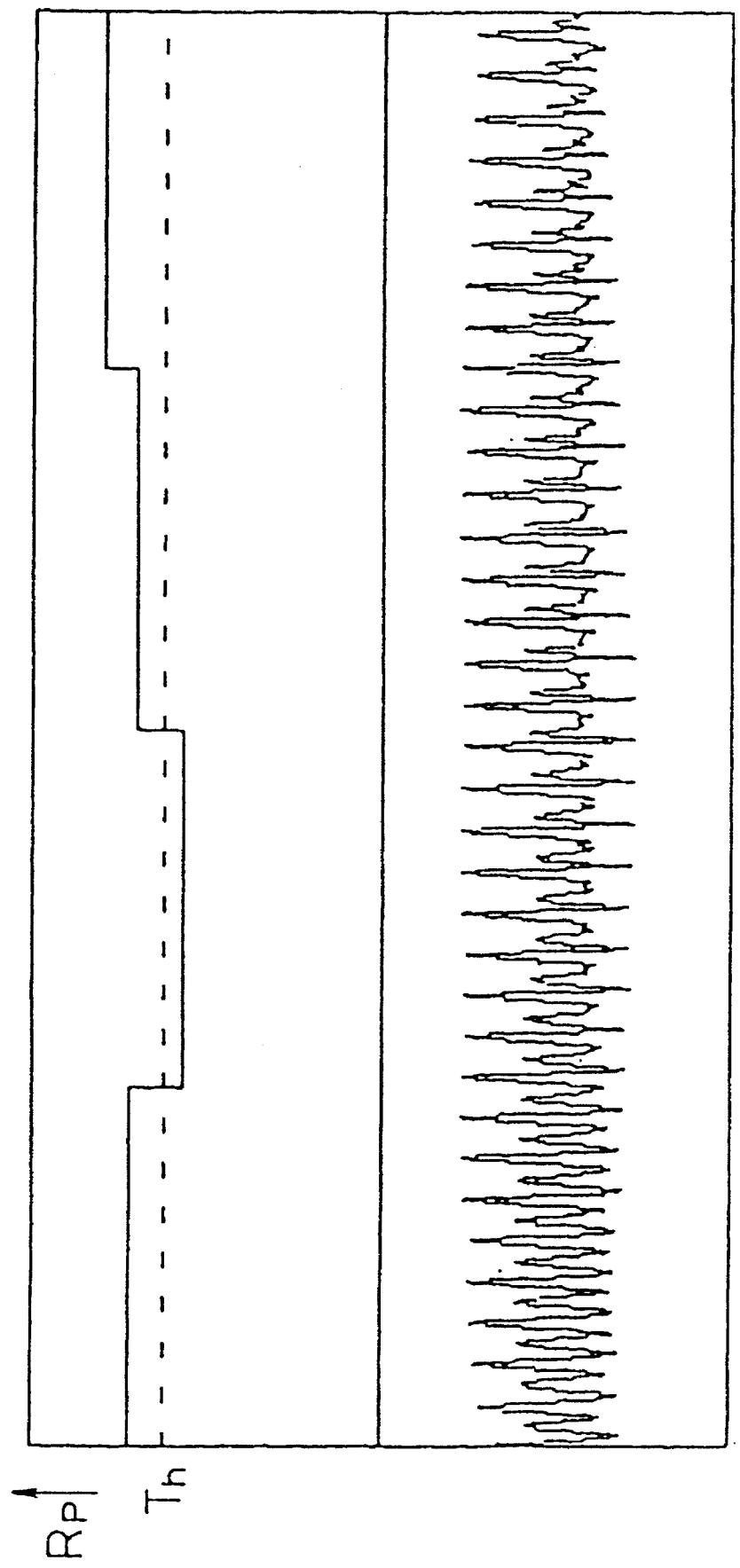
Figure 71B:
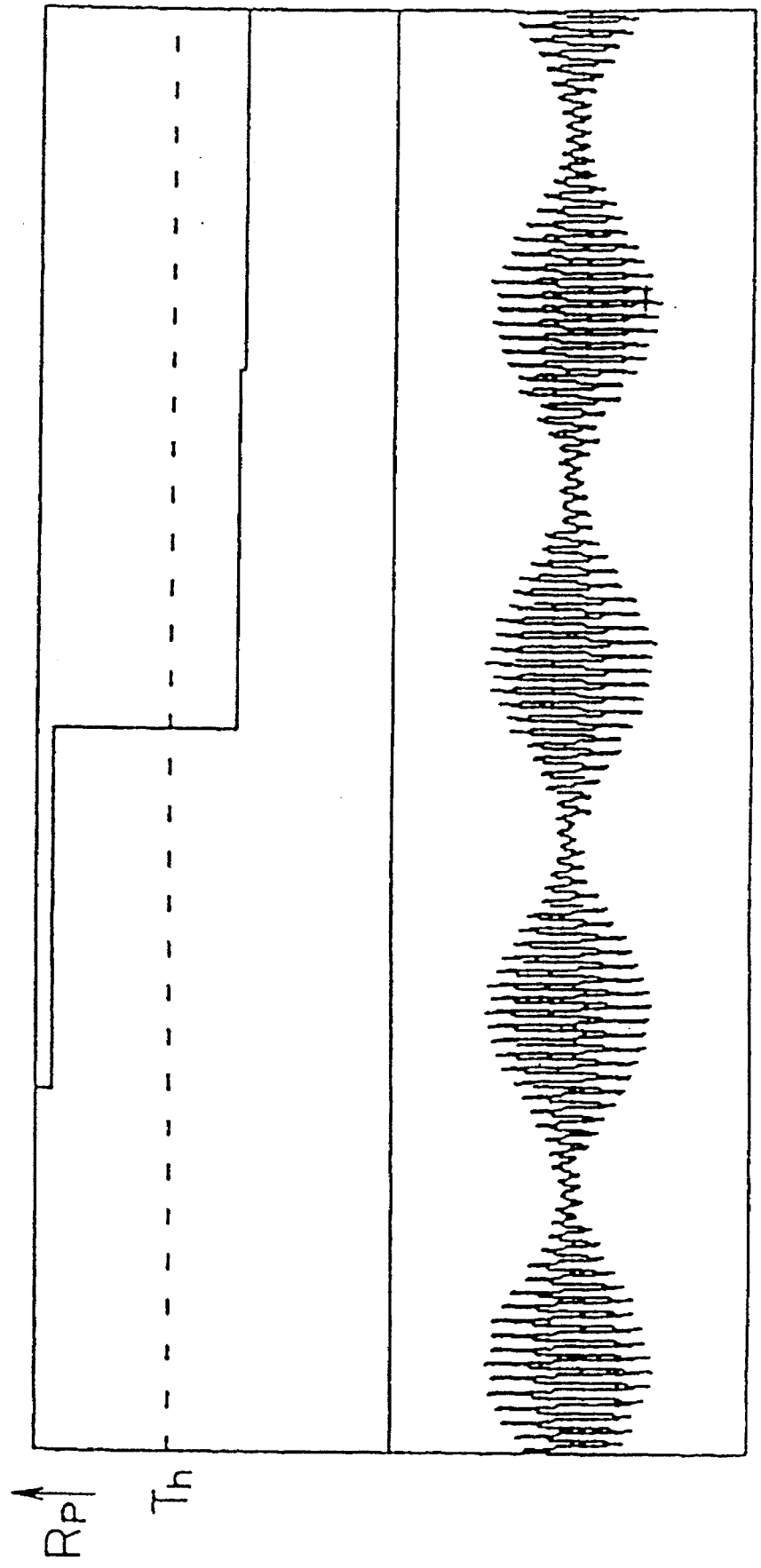
Figure 72A:
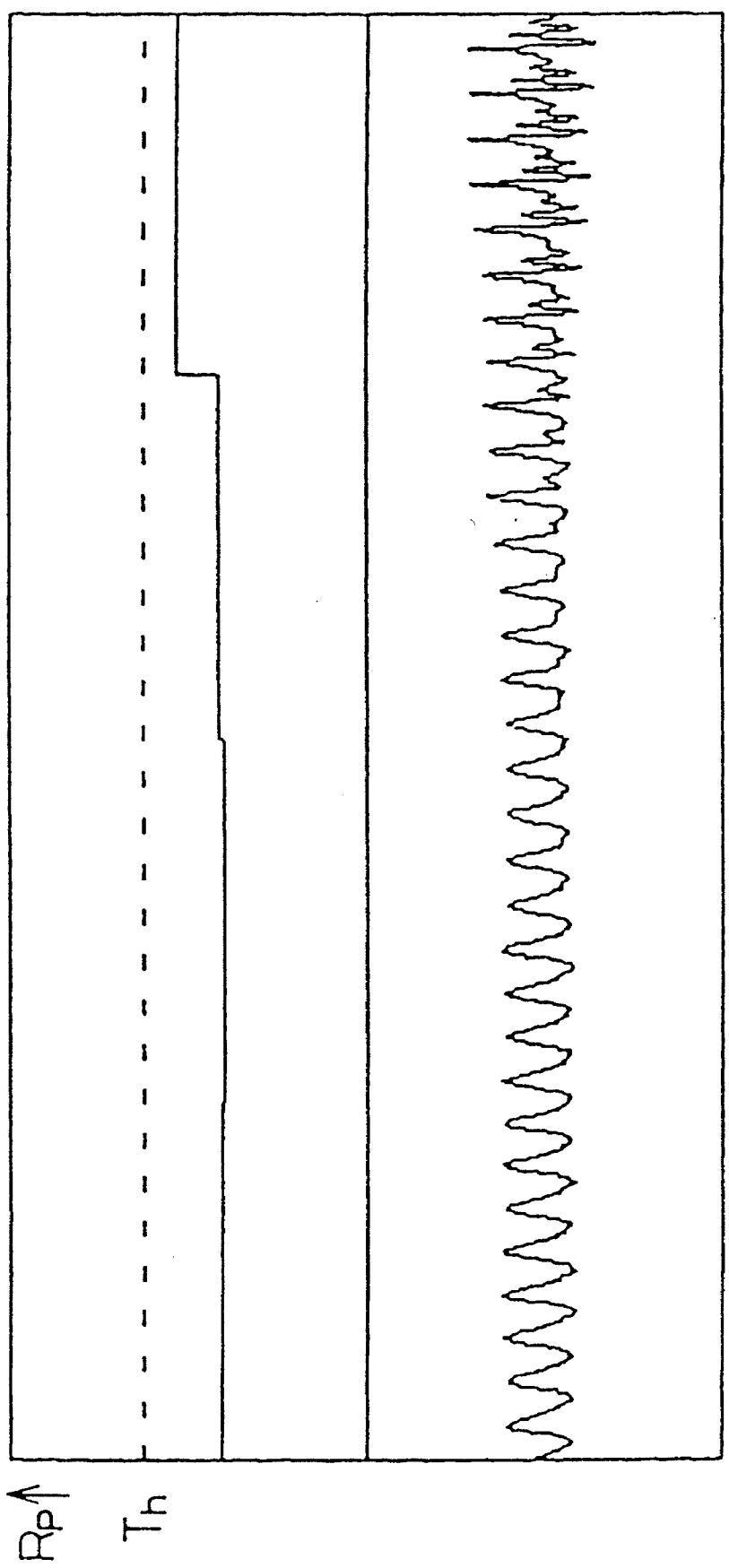
FIG. 72A and FIG. 72B are views showing the locus of the power ratio with respect to speech and the calling tone in the case of a coefficient renewal block-unit of 128 in the echo canceler with an additional primary cyclic type filter of FIG. 41.
Figure 72B:
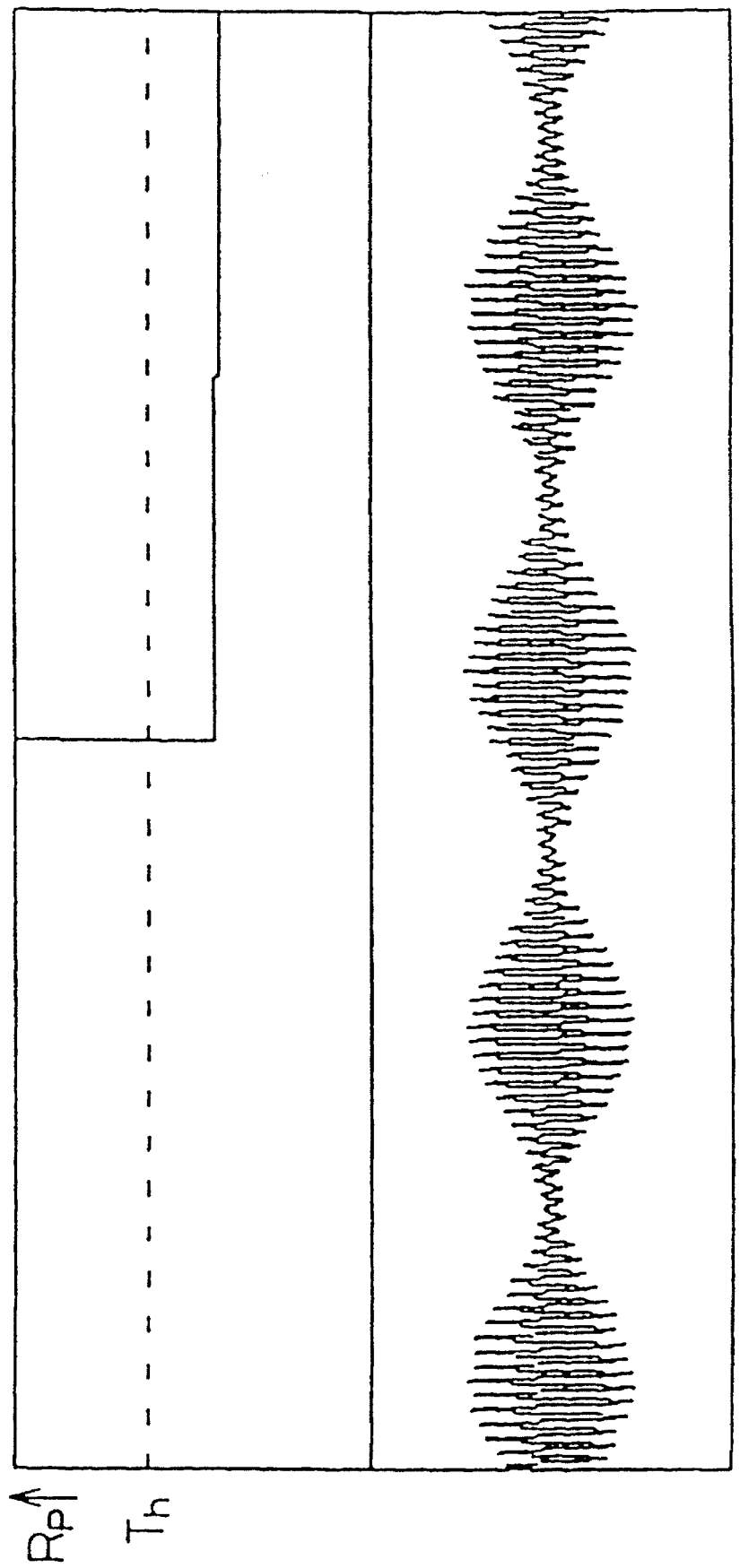
Figure 73B:
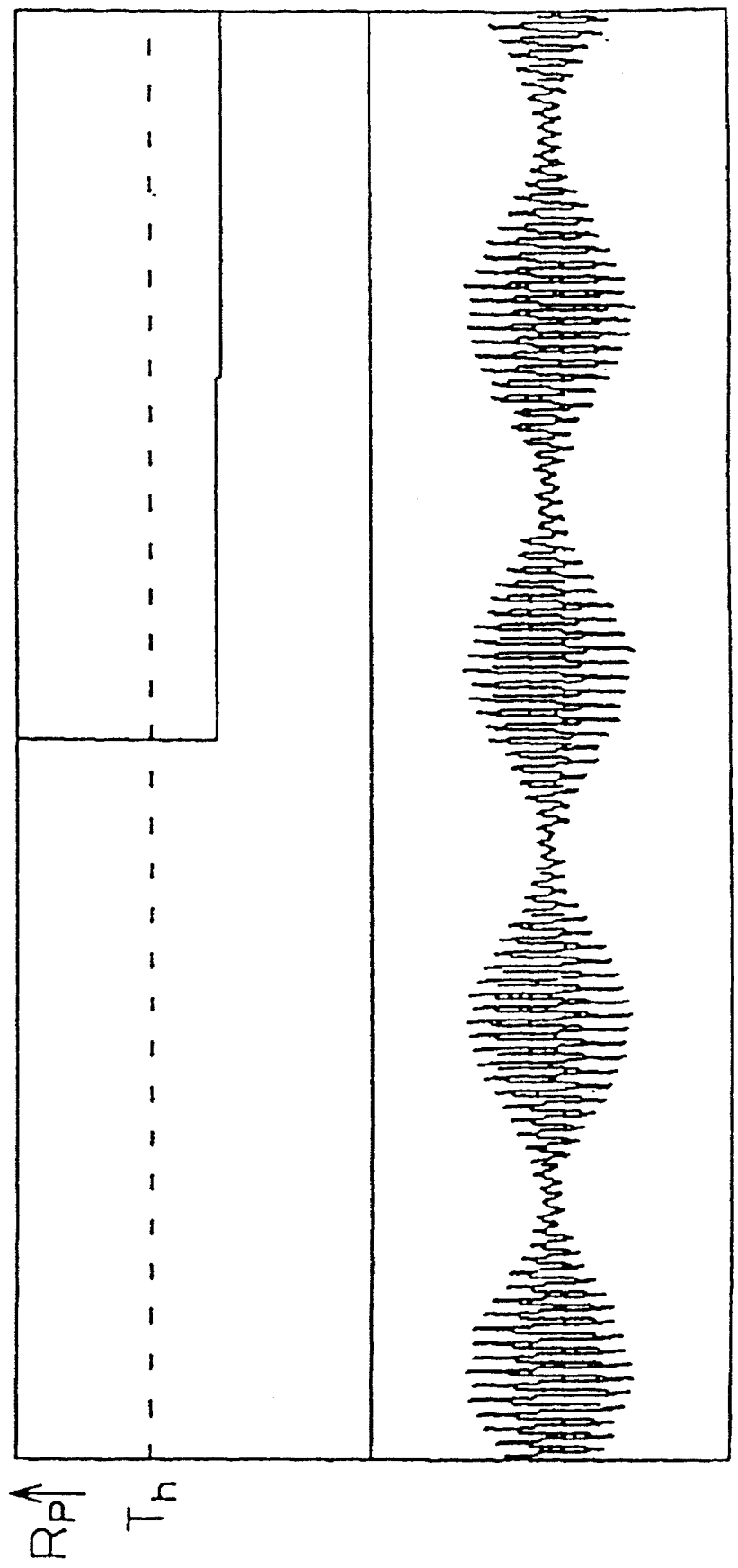

FIGS. 67A and 67B show the power ratios in speech in the case of a block unit of 8 and a correction constant of 0.1. The results are no different from the results in the case of K=1 and 64 or more blocks per unit. With K=0.1, it appears that the section of over 512 samples is not reached. In this method, it is learned that the correction constant K may be made or assigned a value of 1 (multiplication unnecessary), the number of block unit may be 16, where saturation is reached with the calling tone, and the number of times of continuous detection determining the insertion of the band elimination filter may be four or more.

First Order Recursive Filter Method

Figure 74B:
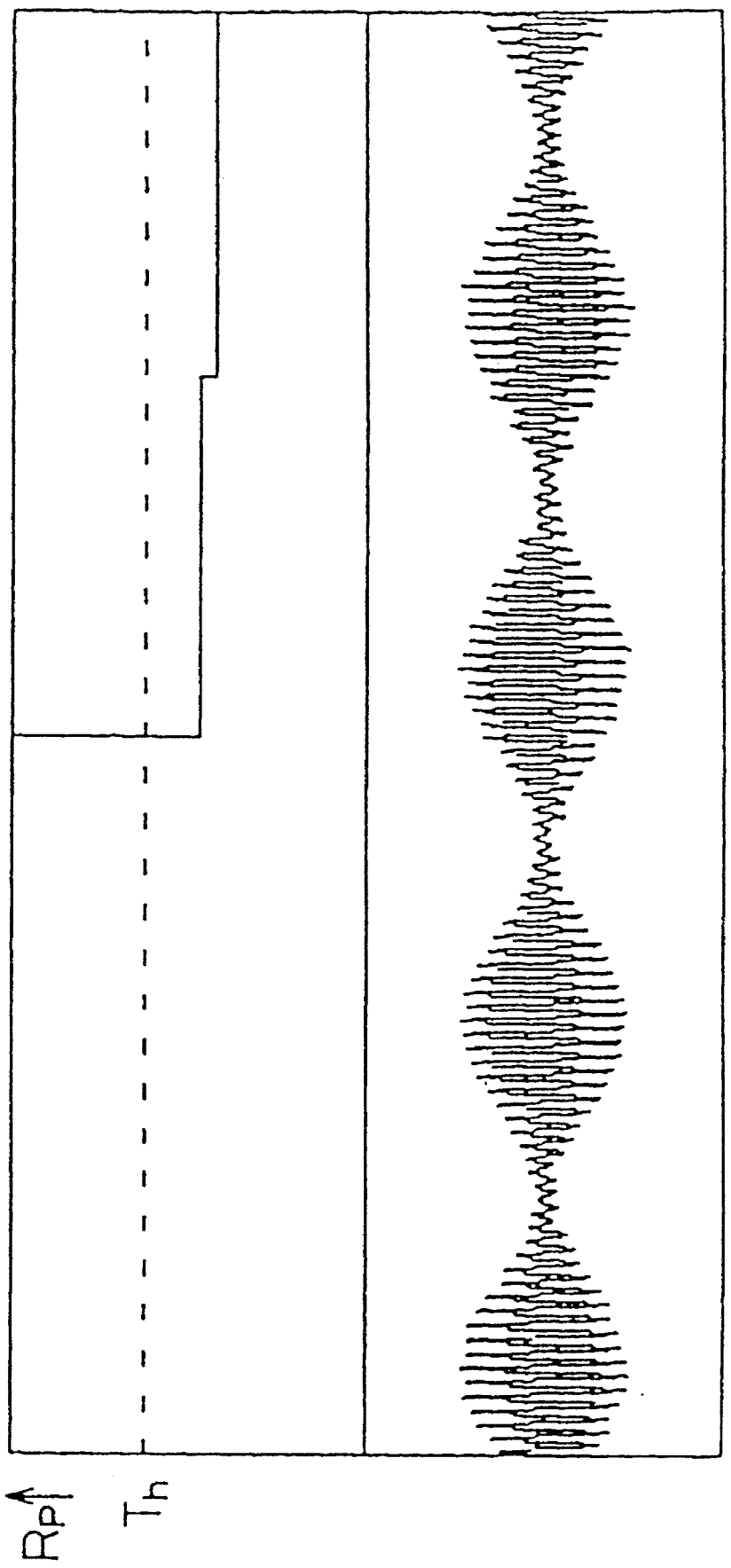
Figure 77A:
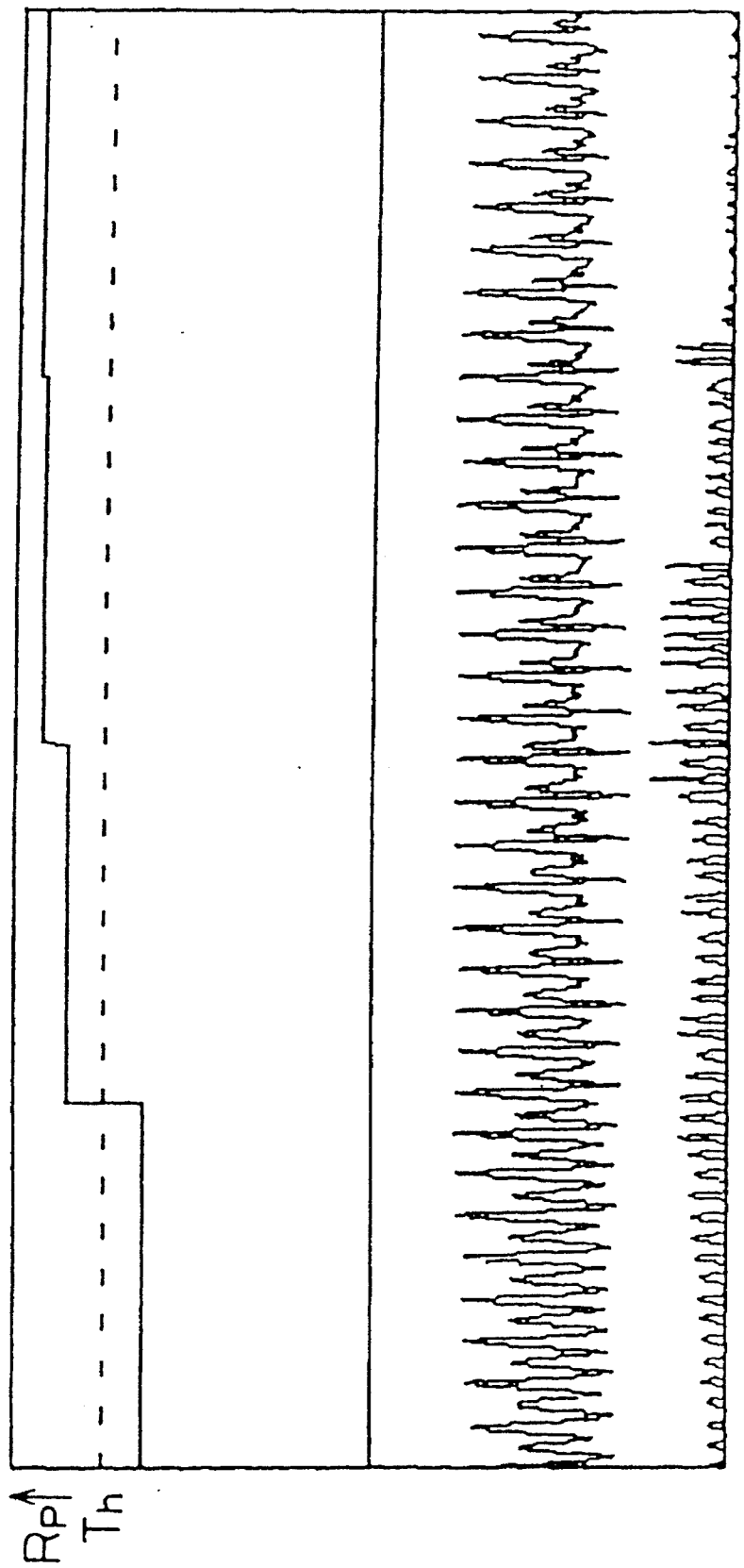
FIG. 77A and FIG. 77B are views showing the locus of the power ratio with respect to speech and the calling tone in the case of a coefficient renewal block unit of 16 in the echo canceler with an additional secondary cyclic type filter of FIG. 51.
Figure 77B:
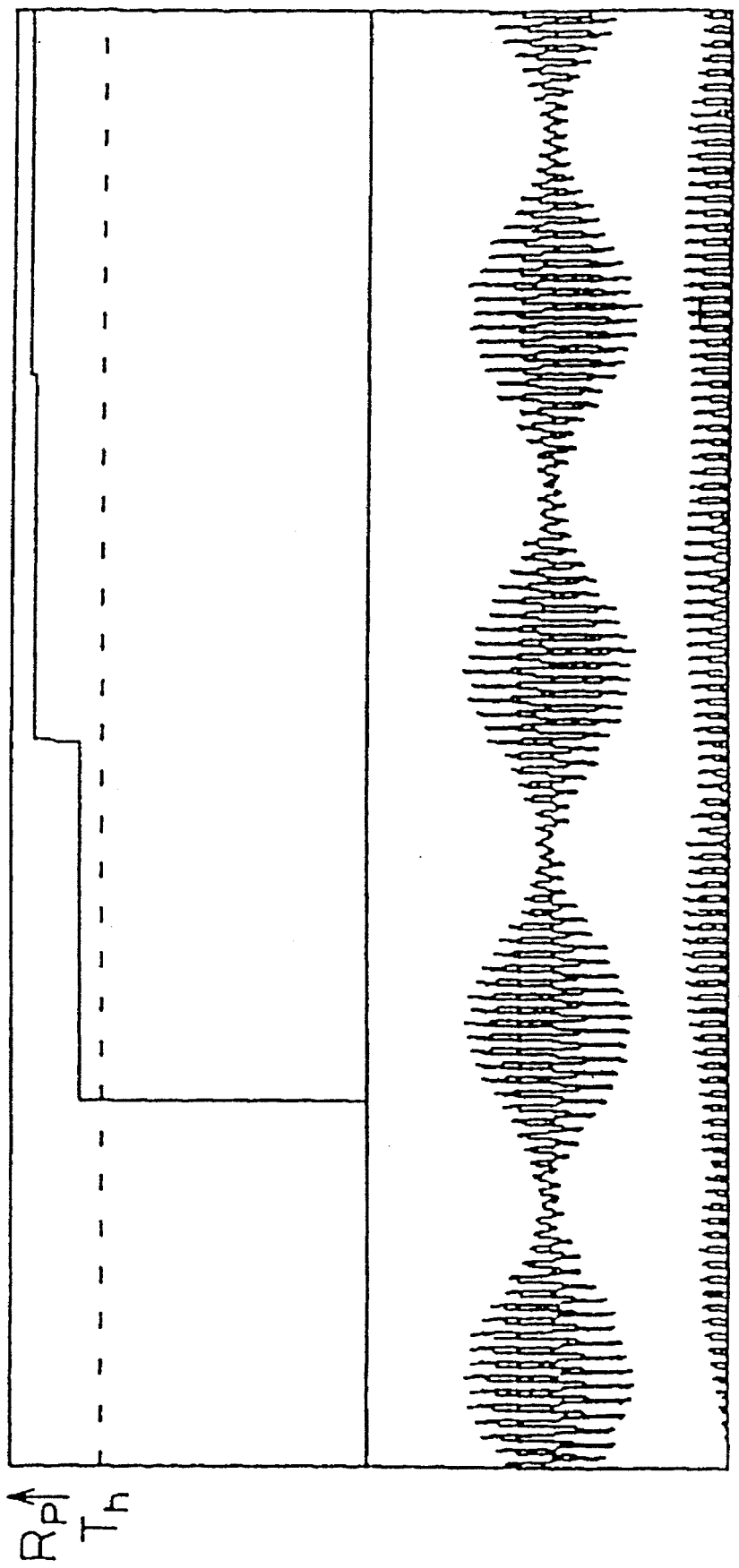
Figure 80A:
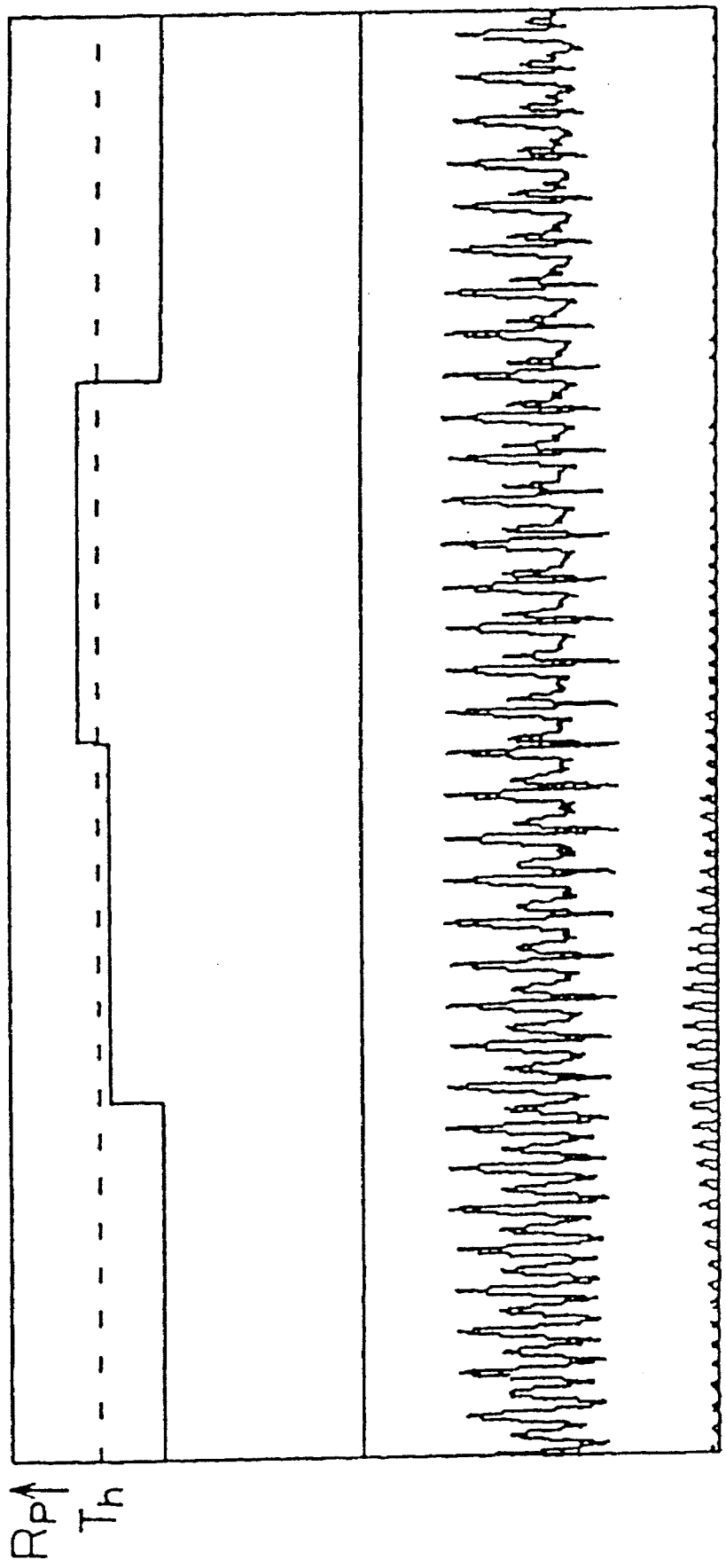
Figure 83A:
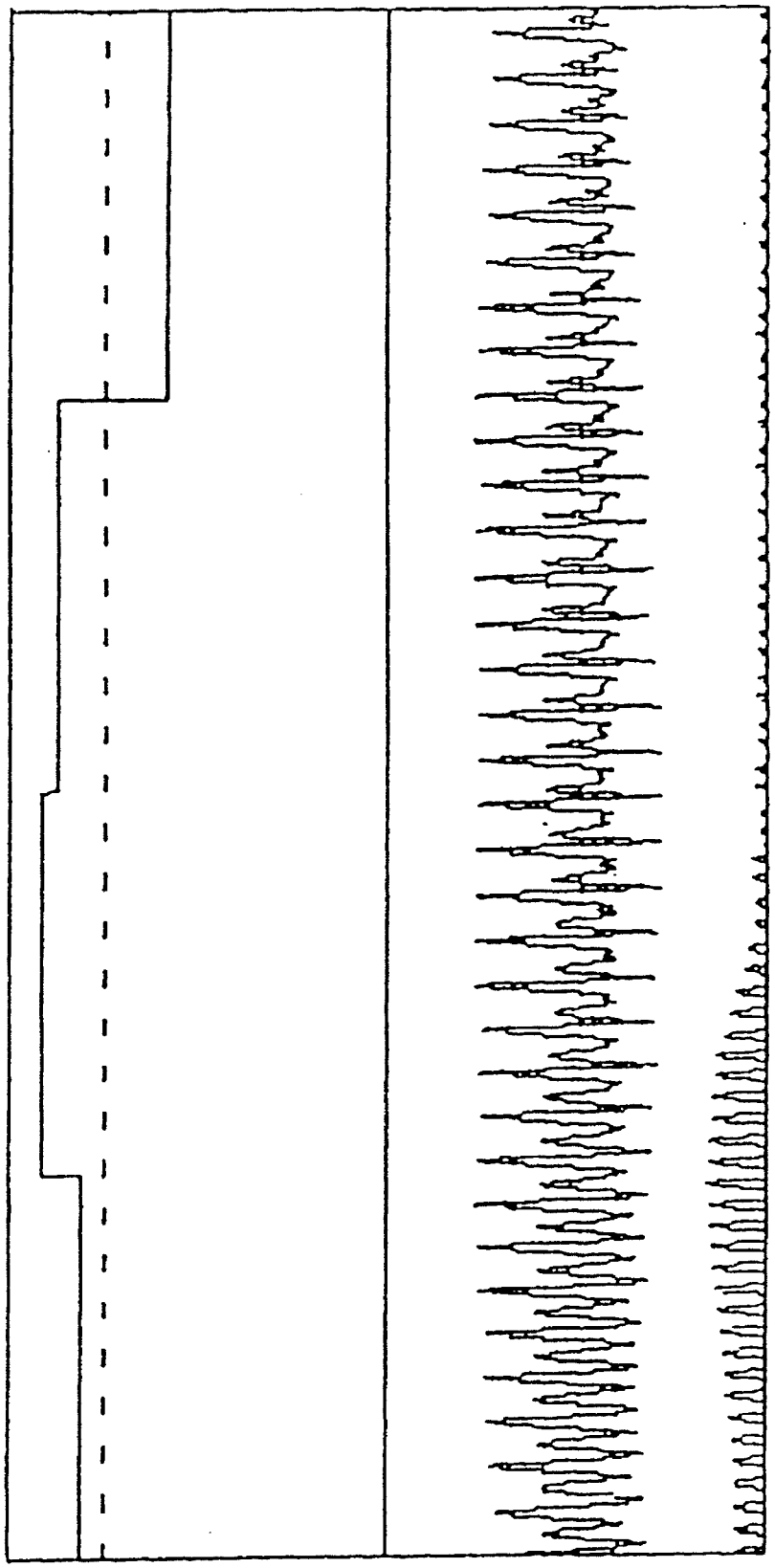
Figure 84A:
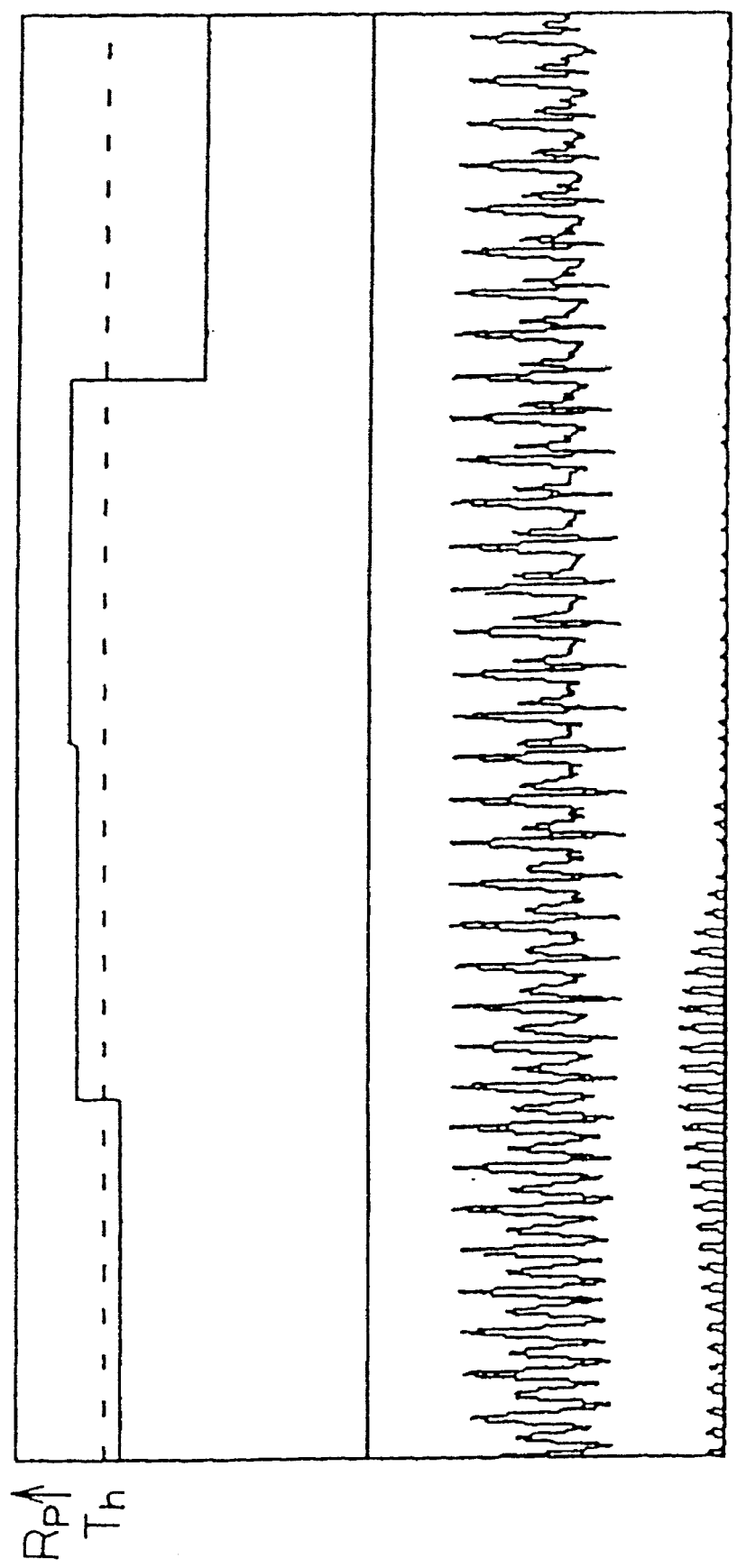

In this method it is also necessary to decide on the coefficient renewal block unit and the value of the correction constant. From the results of FIGS. 68A and 6&B and FIGS. 74A and 74B, for a calling tone, saturation is reached with a block unit of 16 in the same way as the above-mentioned method, while for speech, erroneous detection results up to a block unit of 32, and, with a nasal sound, at a block unit of 64. The reason is that if the number of the block units were to become larger, the estimation precision rises and the maximum amplitude format of a nasal sound is near 100 Hz. Thus, the effect of improvement of the frequency characteristic shown in FIG. 27 ends up becoming weaker. However, if the number of block units is made 16, where saturation is reached with a calling tone, in the same way as in the above method, this problem can be ignored.

Regarding the correction constant, the results in the case of K=0.5 and 0.1 were calculated using a block unit of 8 in FIG. 75 and FIG. 76. In this method, making the correction coefficient small has the same effect as making the block unit large, and rather than improving the estimation using the nonsteady state of the speech, the improvement of the estimation precision by leveling has a greater effect. Above, discussion was made of a correction coefficient K of 1, a block unit of 16, where saturation is reached with a calling tone, and consecutively detecting and determining the insertion of the band elimination filter, at two or more continuous detections. In addition, the addition of a primary cyclic type filter has the effect of continuously detecting the narrow band signal two times.

Second Order Recursive Filter Method

The value of the correction constant K=1 is judged optimum from the results of the above two methods conditional on the detection delay being kept small. Therefore, here the optimum block units are decided on. FIGS. 77A and 77B to FIGS. 82A and 82B show the power ratios for each unit of blocks obtained with a q of a time constant of 128 ms. From the secondary filter output waveforms shown in FIGS. 77A and 77B, FIGS. 78A and 78B, and FIGS. 79A and 79B, it is learned that the operation is unstable up to a unit of 32 since the coefficient estimation precision is low. Further, from the power ratio given by speech, it is judged that 128 or 256 is optimum.

Here, the optimum block unit is found, so this is used to check on the optimum time constant once more. From FIGS. 83A and 83B to FIGS. 86A and 86B, it can be confirmed that the time constant is 128 msec. Compared with FIGS. 85A and 85B and FIGS. 86A and 86B, the time constant of 256 msec is optimum, but if the threshold is made slightly higher, for the same reason, the difference between the power ratios of speech and a calling tone is equal.

FIGS. 87A and 87B are examples of the case of making the correction constant smaller with an awareness of the detection delay. However, the time constant is made 64 msec, K=0.01, and the block unit is 8. The detection delay becomes 640 msec, but complete separation or distinguishing the calling tone from speech is possible, it is learned.

Figure 88:
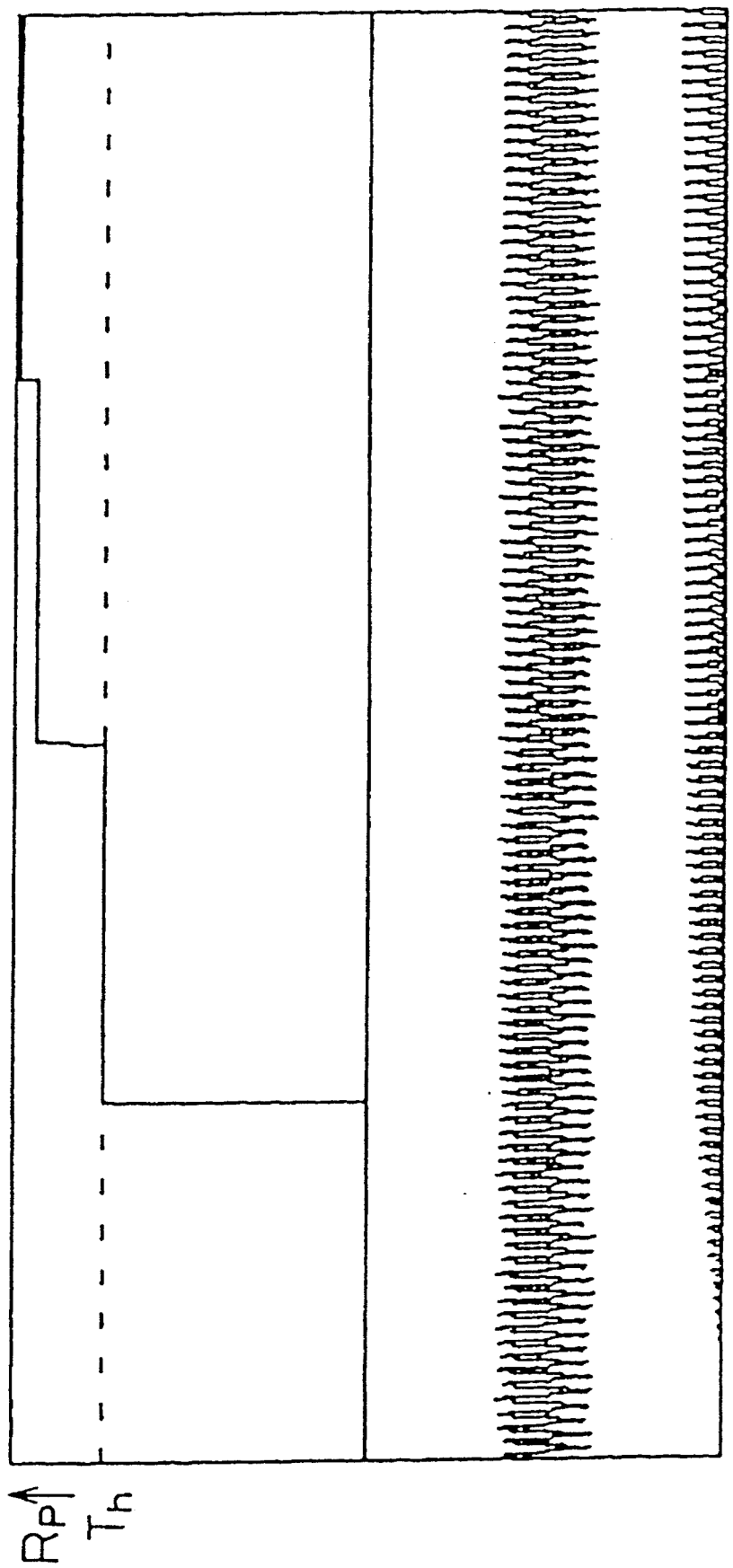
FIG. 88 is a view showing the locus of the power ratio with respect to a single frequency signal in the case of $K=1$, a coefficient renewal block unit of 128, a time constant of 128 msec, and an SIN=21.4203 dB in the echo canceler with an additional secondary cyclic type filter of FIG. 51.
Figure 89:
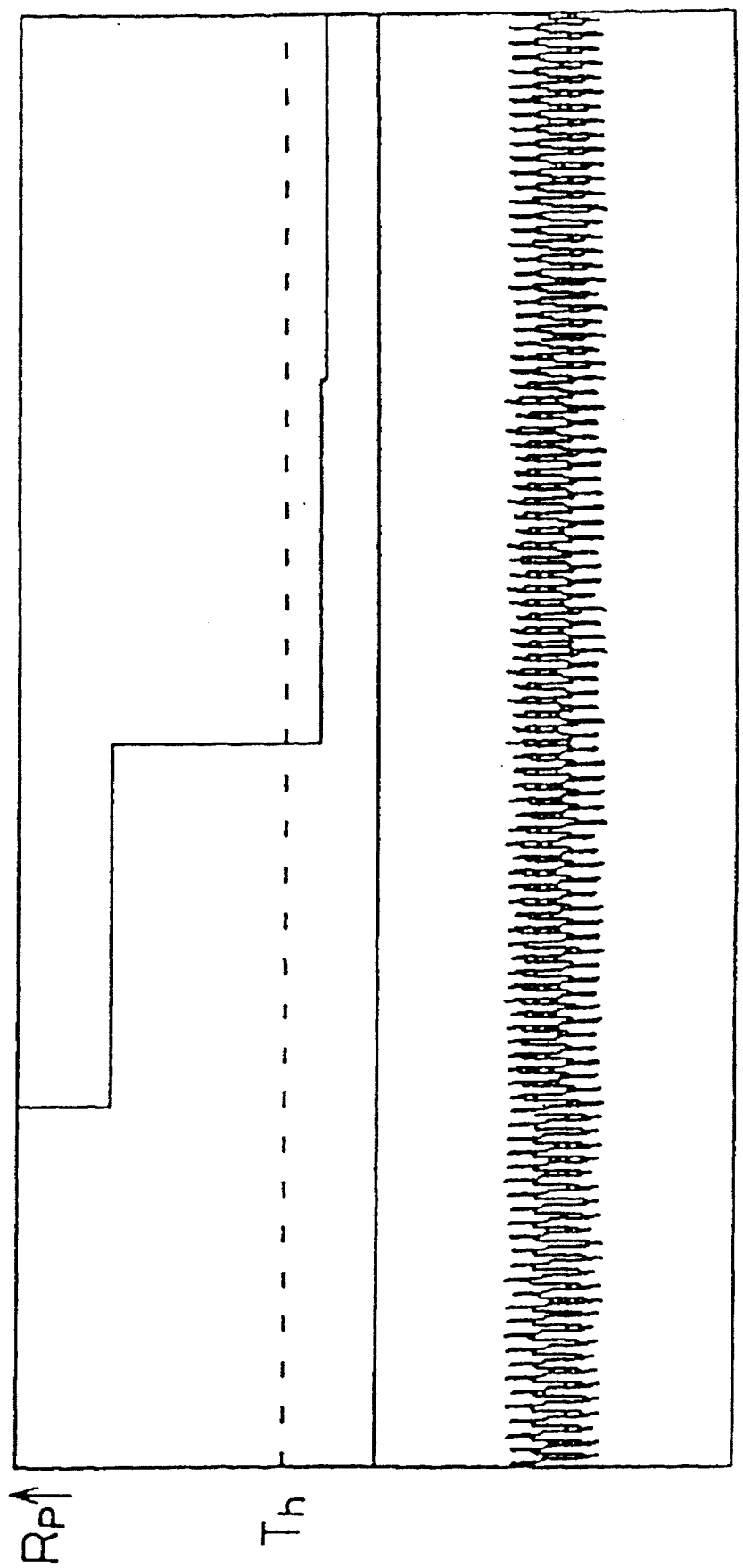
FIG. 89 is a view showing the locus of the power ratio in the case of a coefficient renewal block unit of 16 in the conventional method (b)
Figure 90:
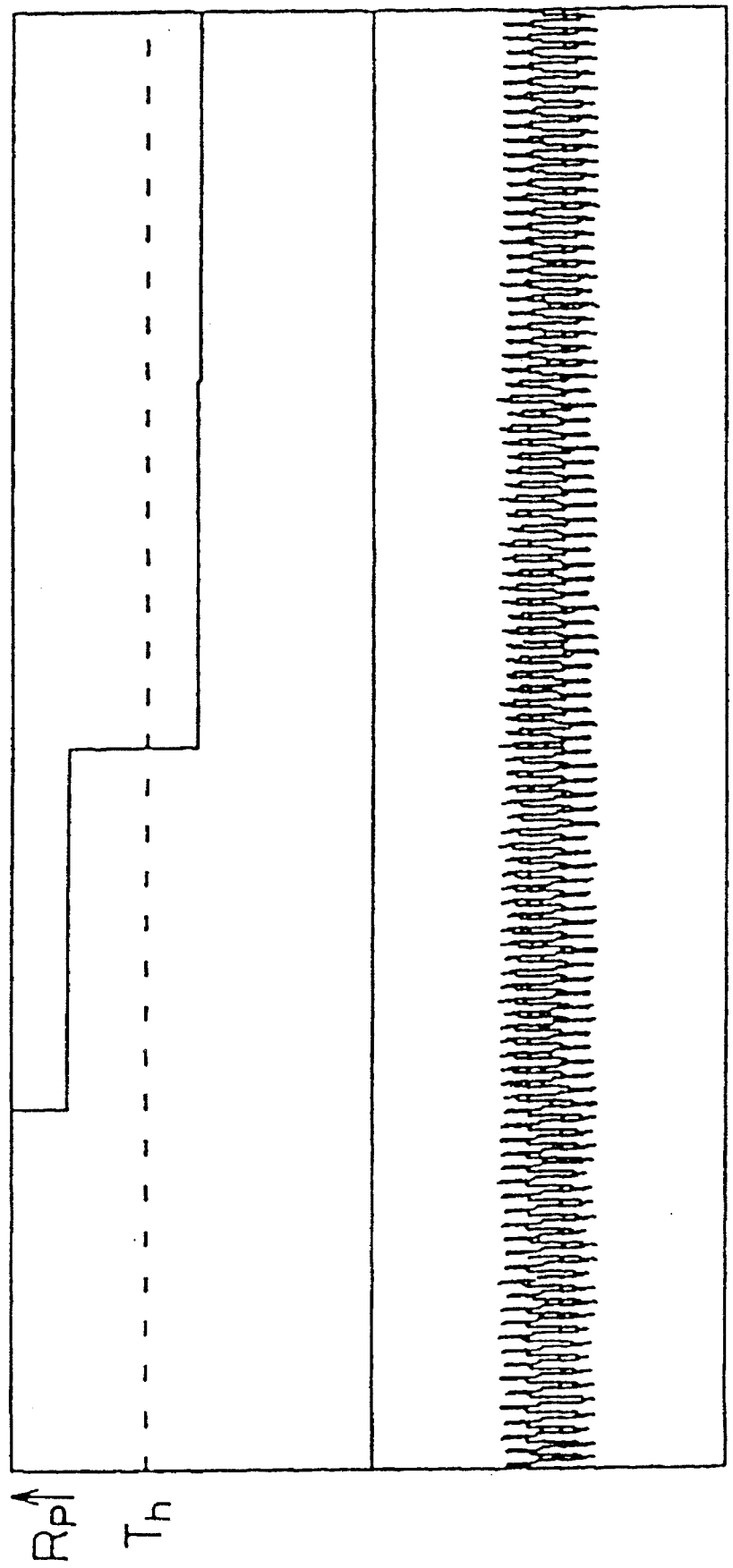
FIG. 90 is a view showing the locus of the power ratio in the case of a coefficient renewal block unit of 16 in an echo canceler of the primary cyclic type in the third embodiment of the present invention.

The above simulations were all performed using calling tones. It is interesting to see how the detection characteristic changes if this is changed to a single frequency (400 Hz). FIG. 88 shows the changes in the power ratio in an example of detection using a secondary filter type with K=1, a block unit of 128, a time constant of 128 msec, and an S/N of 21.4, and 203 dB. In this method, if continuous detection is not used, and a judgement can be made with a power ratio of 1, then the results show the effect with respect to a single frequency is extremely large. FIG. 89 is an example of detection with the conventional method (b) with a block unit of 16. There is no difference with the calling tone. This is because the band of the detection filter is sufficiently broad. The same is true of the primary cyclic type method (FIG. 90). Finally, the conventional method (a) is shown in FIG. 91. The same effect is obtained as with the calling tone.

The parameters for the above four types of methods will be summarized below:

Conventional Method (a)

A correction constant K of 0.01, resetting every 256 ms (128 ms), and a detection threshold of 0.85 to 0.9.

Conventional Method (b)

A correction constant K of 1, a sectional integration of 512 points, a coefficient b of 1, a renewal block unit of 16, a detection threshold of 30 dB, and two stage detection. In addition, in the case of resetting every 256 ms, insertion of a band elimination filter at two continuous detections, and, in the case of no resetting, insertion of a band elimination filter at five continuous detections.

First Order Recursive Type

A correction constant K of 1, a zone integration of 512 points, a coefficient b of 1, a renewal block unit of 16, a detection threshold of 18 dB, and a two stage detection. In addition, in the case of resetting every 256 ms, insertion of a band elimination filter at two continuous detections, and, in the case of no resetting, insertion of a band elimination filter at two continuous detections.

Second Order Recursive Type

A correction constant K of 1, a zone integration of 512 points, a coefficient b of 1, a renewal block unit of 128, a detection threshold of 18 dB, and a two stage detection. Further, in the case of resetting every 256 ms, insertion of a band elimination filter at two continuous detections, and, in the case of no resetting, insertion of a band elimination filter at two continuous detections or insertion of a band inhibiting filter at over a power ratio of 3 dB.

Above, according to the third embodiment of the present invention, it is possible to construct a narrow band signal detector with a small detection delay and a low possibility of erring or mistaking speech as a narrow band signal. Further, it is possible to construct an echo canceler which can suppress howling when it occurs and to return to the coefficient estimation operation.

Speaking with a handfree conversation function in the first to third embodiments may be applied not only to so-called handfree telephones, but also to telephone terminals for television telephones and speaking apparatus similar to the same.

CAPABILITY OF EXPLOITATION IN INDUSTRY

As explained in detail above, according to the handfree telephone of the first embodiment of the present invention, there is the advantage that by combining an echo canceler and speech switching circuit and giving these circuits the optimum functions to share, an excellent speaking quality can be obtained by an inexpensive and small sized processing circuit.

According to the second embodiment of the present invention, by suspending the coefficient estimation processing of the echo canceler at a frequency in accordance with a preset rule, it is possible to effectively cut the amount of arithmetic operation processing while maintaining the ability to suppress external disturbance and thereby it is possible to make the echo canceler small in size and fit it on one chip and also possible to tremendously reduce the price.

Further, according to a third embodiment of the present invention, it is possible to construct a narrow band signal detector with a small detection delay and a low possibility of erring or mistaking speech as a narrow band signal. Further, it is possible to make an echo canceler which can suppress howling when it occurs and return to the coefficient estimation operation.

We claim:

1. A speaking apparatus having a handfree conversation function enabling speaking without holding a receiver in a hand by providing a microphone and a speaker in a casing of a system, said speaking apparatus having the handfree conversation function, comprising:

a first echo canceler which cancels an echo caused by direct acoustic coupling between the speaker and the microphone positioned in the system comprised of the casing and a surface on which the casing is then emplaced;

a speech switching circuit, connected to said first echo canceler, in which an insertion attenuation amount of a transmitted and received signal is set having an upper limit of an attenuation amount sufficient for cancellation of an indirect echo generated by indirect acoustic coupling caused by a location where the speaking apparatus is used, wherein the upper limit of the insertion attenuation amount of the speech switching circuit is set enabling two-way speaking; and a second echo canceler connected to said speech switching circuit which cancels a tone echo generated by an anti-side tone circuit, wherein at least one of the first echo canceler and the second echo canceler comprises:

an adaptive filter, wherein said adaptive filter comprises taps, coefficient correcting means, connected to said adaptive filter, for estimating, based on a difference between an input signal obtained at an input terminal receiving a reply and a pseudo echo generated based on an output signal using the adaptive filter, the adaptive filter using a filter input, and a coefficient of the adaptive filter to generate the pseudo echo, and coefficient selecting means for suspending a coefficient correction processing having a processing amount performed during a sampling period for the adaptive filter at a frequency in accordance with a predetermined rule reducing the processing amount performed during the sampling period, said coefficient selecting means comprises suspending means for suspending the coefficient correction processing for each of the taps of the adaptive filter.

2. The speaking apparatus having a handfree conversation function as set forth in claim 1, wherein:

said adaptive filter comprises sets of taps; and said coefficient selecting means comprises suspending means for suspending the coefficient correction processing in units of sets of taps of the adaptive filter.

3. The speaking apparatus having a handfree conversation function as set forth in claim 1, further comprising a secondary noncyclic type filter having an output, connected to said speech switching circuit, and including a shift register and multiplier; and wherein said coefficient selecting means comprises:

transmitting means, provided in the speaking apparatus for transmitting the output signal to the unknown system with the unknown characteristics, and estimating a transmission function which the unknown system provides in a response, and forming an equivalent transmission function equivalent to the transmission function, and detecting that the output signal transmitted to the unknown system comprises a narrow band signal for indicating suspension of the estimation of the transmission function; and coefficient calculating means for calculating a coefficient value of the coefficient producing a minimum difference between the output of the secondary noncyclic type filter comprised of the shift register producing a delay of one sampling period and the multiplier which multiplies a separately determined coefficient by the filter input, the coefficient correcting means using a correction constant in the coefficient calculating means having a value corresponding to a detection delay allowable in the detecting of the narrow band signal.

4. The speaking apparatus having a handfree conversation function as set forth in claim 1, further comprising a secondary noncyclic type filter having an output, connected to said speech switching circuit, and including a shift register and multiplier; and wherein the coefficient selecting means comprises:

transmitting means, provided in the speaking apparatus for transmitting the output signal to the unknown system with the unknown characteristics, and estimating a transmission function which the unknown system provides in a response, and forming an equivalent transmission function equivalent to the transmission function, and detecting that the output signal transmitted to the unknown system comprises a narrow band signal for indicating suspension of the estimation of the transmission function; and coefficient calculating means for calculating a coefficient value of the coefficient producing a minimum difference between the output of the secondary noncyclic type filter comprised of the shift register producing a delay of one sampling period and the multiplier which multiplies a separately determined coefficient by the filter input, the coefficient correcting means uses a fact indicating that a ratio between a level of difference and a filter level of the filter input becomes less than a fixed value determined in advance and produces in a fixed manner a secondary coefficient of the secondary noncyclic circuit filter at one of 1 and −1.

5. The speaking apparatus having a handfree conversation function as set forth in claim 1, further comprising a secondary noncyclic type filter having an output, connected to said speech switching circuit, and including a shift register and multiplier; and wherein said coefficient selecting means comprises:

transmitting means, provided in the speaking apparatus for transmitting the output signal to the unknown system with the unknown characteristics, and estimating a transmission function which the unknown system provides in a response, and forming an equivalent transmission function equivalent to the transmission function, and detecting that the output signal transmitted to the unknown system is a narrow band signal for indicating suspension of the estimation of the transmission function; and coefficient calculating means for calculating a coefficient value of the coefficient producing a minimum difference between the output of the secondary noncyclic type filter comprised of the shift register producing a delay of one sampling period and the multiplier which multiplies a separately determined coefficient by the filter input, the coefficient correcting means uses a fact indicating that a ratio between a level of difference and a filter level of the filter input becomes less than a fixed value determined in advance and calculates a signal level of the narrow band signal by cumulative addition divided into sections.

6. The speaking apparatus having a handfree conversation function as set forth in claim 1, further comprising a secondary noncyclic type filter having an output, connected to said speech switching circuit, and including a shift register and multiplier; and wherein said coefficient selecting means comprises:

transmitting means, provided in the speaking apparatus for transmitting the output signal to the unknown system with the unknown characteristics, and estimating a transmission function which the unknown system provides in a response, and forming an equivalent transmission function equivalent to the transmission function, and detecting that the output signal transmitted to the unknown system is a narrow band signal for indicating suspension of the estimation of the transmission function; and coefficient calculating means for calculating a coefficient value of the coefficient producing a minimum difference between the output of the secondary noncyclic type filter comprised of the shift register producing a delay of one sampling period and the multiplier which multiplies a separately determined coefficient by the filter input, the coefficient correcting means resets the coefficient value at each fixed interval.

7. The speaking apparatus having a handfree conversation function as set forth in claim 1, further comprising a secondary noncyclic type filter having an output, connected to said speech switching circuit, and including a shift register and multiplier; and wherein said coefficient selecting means comprises:

transmitting means, provided in the speaking apparatus for transmitting the output signal to the unknown system with the unknown characteristics, and estimating a transmission function which the unknown system provides in a response, and forming an equivalent transmission function equivalent to the transmission function, and detecting that the output signal transmitted to the unknown system is a narrow band signal for indicating suspension of the estimation of the transmission function; and coefficient calculating means for calculating a coefficient value of the coefficient producing a minimum difference between the output of the secondary noncyclic type filter comprised of the shift register producing a delay of one sampling period and the multiplier which multiplies a separately determined coefficient by the filter input, the coefficient correcting means uses a fact indicating that a ratio between a level of difference and a filter level of filter input becomes less than a fixed value determined in advance and resets the coefficient value at each fixed interval.

8. The speaking apparatus having a handfree conversation function as set forth in claim 1, further comprising a secondary noncyclic type filter having an output, connected to said speech switching circuit, and including a shift register and multiplier; and wherein said coefficient selecting means comprises:

transmitting means, provided in the speaking apparatus for transmitting the output signal to the unknown system with the unknown characteristics, and estimating a transmission function which the unknown system provides in a response, and forming an equivalent transmission function equivalent to the transmission function, and detecting that the output signal transmitted to the unknown system is a narrow band signal for indicating suspension of the estimation of the transmission function; and narrow band signal detecting means connected to the secondary noncyclic type filter comprised of the shift register producing a delay of one sampling period and the multiplier which multiplies a separately determined coefficient by the filter input, the narrow band signal detecting means for inserting into a telephone circuit a filter equivalent to the secondary noncyclic type filter when determining that the output signal is a narrow band signal.

9. The speaking apparatus having a handfree conversation function as set forth in claim 1, further comprising a secondary noncyclic type filter having an output, connected to said speech switching circuit, and including a shift register and multiplier; and wherein said coefficient selecting means comprises:

transmitting means, provided in the speaking apparatus for transmitting the output signal to the unknown system with the unknown characteristics, and estimating a transmission function which the unknown system provides in a response, and forming an equivalent transmission function equivalent to the transmission function, and detecting that the output signal transmitted to the unknown system is a narrow band signal for indicating suspension of the estimation of the transmission function; and narrow band signal detecting means connected to the secondary noncyclic type filter comprised of the shift register producing a delay of one sampling period and the multiplier which multiplies a separately determined coefficient by the filter input, the narrow band signal detecting means for performing in block units a coefficient renewal processing during arithmetic operations for estimating the coefficient.

10. The speaking apparatus having a handfree conversation function as set forth in claim 1, further comprising a secondary noncyclic type filter having an output, connected to said speech switching circuit, and including a shift register and multiplier; and wherein said coefficient selecting means comprises:

transmitting means, provided in the speaking apparatus for transmitting the output signal to the unknown system with the unknown characteristics, and estimating a transmission function which the unknown system provides in a response, and forming an equivalent transmission function equivalent to the transmission function, and detecting that the output signal transmitted to the unknown system is a narrow band signal for indicating suspension of the estimation of the transmission function; and narrow band signal detecting means connected to the secondary noncyclic type filter comprised of the shift register producing a delay of one sampling period and the multiplier which multiplies a separately determined coefficient by the filter input, the narrow band signal detecting means inserts into a telephone circuit the secondary noncylic type filter for a first time after the detection results continue a number of times.

11. The speaking apparatus having a handfree conversation function as set forth in claim 1, wherein at least one of the first echo canceler and the second echo canceler comprises:

an adaptive filter connected to said speech switching circuit;

coefficient correcting means for receiving an output signal generated by said speech switching circuit, said output signal being teansmitted to an unknown system with unknown characteristics and for estimating a filter input, based on a difference between an input signal obtained at an input terminal receiving a reply and a pseudo echo generated by the adaptive filter provided in the speaking apparatus using said output signal, the filter input being transmitted to the adaptive filter by said coefficient correcting means; and coefficient selecting means for suspending a coefficient correction processing having a processing amount performed during a sampling period for the adaptive filter at a frequency in accordance with a predetermined rule reducing the processing amount performed during the sampling period.

12. The speaking apparatus having a handfree conversation function as set forth in claim 1, further comprising a secondary noncyclic type filter having an output, connected to said speech switching circuit, and including a shift register and multiplier; and wherein said coefficient correction means comprises:
receiving means, provided in the speaking apparatus for receiving an output signal generated by said speech switching circuit, said output signal being transmitted to an unknown system with unknown characteristics, and estimating a transmission function which the unknown system provides in a response, and forming an equivalent transmission function equivalent to the transmission function, and detecting that the output signal transmitted to the unknown system comprises a narrow band signal for indicating suspension of the estimation of the transmission function; and coefficient calculating means for calculating a coefficient value of the filter input having a minimum difference between an output of the secondary noncyclic type filter comprised of the shift register having a delay of one sampling period and the multiplier which multiplies a separately determined coefficient by the filter input, the coefficient correcting means using a correction constant in the coefficient calculating means having a value corresponding to a detection delay allowable in the detecting of the narrow band signal.

13. A speaking apparatus having a handfree conversation function enabling speaking without holding a receiver in a hand by providing a microphone and a speaker in a casing of a system, said speaking apparatus having the handfree conversation function, comprising:

a first echo canceler which cancels an echo caused by direct acoustic coupling between the speaker and the microphone positioned in the system comprised of the casing and a surface on which the casing is then emplaced;

a speech switching circuit, connected to said first echo canceler, in which an insertion attenuation amount of a transmitted and received signal is set having an upper limit of an attenuation amount sufficient for cancellation of an indirect echo generated by indirect acoustic coupling caused by a location where the speaking apparatus is used,
wherein the upper limit of the insertion attenuation amount of the speech switching circuit is set enabling two-way speaking;

a second echo canceler connected to said speech switching circuit which cancels a tone echo generated by an anti-side tone circuit, wherein at least one of the first echo canceler and the second echo canceler comprises:
an adaptive filter, wherein said adaptive filter comprises taps, coefficient correcting means, connected to said adaptive filter, for estimating, based on a difference between an input signal obtained at an input terminal receiving a reply and a pseudo echo generated based on an output signal using the adaptive filter, the adaptive filter using a filter input, and a coefficient of the adaptive filter to generate the pseudo echo, and coefficient selecting means for suspending a coefficient correction processing having a processing amount performed during a sampling period for the adaptive filter at a frequency in accordance with a predetermined rule reducing the processing amount performed during the sampling period, wherein said coefficient selecting means comprises suspending means for suspending the coefficient correction process for each of the taps of the adaptive filter; and a low pass filter having a low pass filter coefficient connected to said suspending means,
wherein the suspending means for suspending the coefficient correction processing for each of the taps, comprises assumption means for assuming that an amplitude characteristic of an impulse response falls exponentially with respect to a predicted reverberation time of the unknown system and, when inputting a step input to the low pass filter having the low pass filter coefficient for suppressing an external disturbance, the suspending means suspends an estimation operation for each of the taps of the adaptive filter having a small response.

14. A speaking apparatus having a handfree conversation function enabling speaking without holding a receiver in a hand by providing a microphone and a speaker in a casing of a system, said speaking apparatus having the handfree conversation function, comprising:

a first echo canceler which cancels an echo caused by direct acoustic coupling between the speaker and the microphone positioned in the system comprised of the casing and a surface on which the casing is then emplaced;

a speech switching circuit, connected to said first echo canceler, in which an insertion attenuation amount of a transmitted and received signal is set having an upper limit of an attenuation amount sufficient for cancellation of an indirect echo generated by indirect acoustic coupling caused by a location where the speaking apparatus is used,
wherein the upper limit of the insertion attenuation amount of the speech switching circuit is set enabling two-way speaking;

a second echo canceler connected to said speech switching circuit which cancels a tone echo generated by an anti-side tone circuit, wherein at least one of the first echo canceler and the second echo canceler comprises:
an adaptive filter, wherein said adaptive filter comprises sets of taps, coefficient correcting means, connected to said adaptive filter, for estimating, based on a difference between an input signal obtained at an input terminal receiving a reply and a pseudo echo generated based on an output signal using the adaptive filter, the adaptive filter using a filter input, and a coefficient of the adaptive filter to generate the pseudo echo, and coefficient selecting means for suspending a coefficient correction processing having a processing amount performed during a sampling period for the adaptive filter at a frequency in accordance with a predetermined rule reducing the processing amount performed during the sampling period, wherein said coefficient selecting means comprises suspending means for suspending a coefficient correction processing in units of sets of taps of the adaptive filter; and a low pass filter having a low pass filter coefficient connected to said suspending means,
wherein the suspending means for suspending an operation in the units of sets of taps comprises assumption means for assuming that an amplitude characteristic of an impulse response falls exponentially with respect to a predicted reverberation time of the unknown system, said suspending means inputting a step input to the low pass filter having the low pass filter coefficient for suppressing external disturbances, the step input having one of an average value of one of the sets of taps of the adaptive filter and one of values in one of the sets of taps having an amplitude value, and suspends an estimation operation for the units of sets of taps having a small response.

15. A speaking apparatus having a handfree conversation function enabling speaking without holding a receiver in a hand by providing a microphone and a speaker in a casing of a system, said speaking apparatus having the handfree conversation function, comprising:

a first echo canceler which cancels an echo caused by direct acoustic coupling between the speaker and the microphone positioned in the system comprised of the casing and a surface on which the casing is then emplaced;

a speech switching circuit, connected to said first echo canceler, in which an insertion attenuation amount of a transmitted and received signal is set having an upper limit of an attenuation amount sufficient for cancellation of an indirect echo generated by indirect acoustic coupling caused by a location where the speaking apparatus is used,
wherein the upper limit of the insertion attenuation amount of the speech switching circuit is set enabling two-way speaking;

a second echo canceler connected to said speech switching circuit which cancels a tone echo generated by an anti-side tone circuit, wherein at least one of the first echo canceler and the second echo canceler comprises: an adaptive filter,
coefficient correcting means, connected to said adaptive filter, for estimating, based on a difference between an input signal obtained at an input terminal receiving a reply and a pseudo echo generated based on an output signal using the adaptive filter, the adaptive filter using a filter input, and a coefficient of the adaptive filter to generate the pseudo echo, and
coefficient selecting means for suspending a coefficient correction processing having a processing amount performed during a sampling period for the adaptive filter at a frequency in accordance with a predetermined rule reducing the processing amount performed during the sampling period; and a secondary noncyclic type filter having an output, connected to said speech switching circuit, and including a shift register and multiplier,
wherein said coefficient selecting means comprises:
transmitting means, provided in the speaking apparatus for transmitting the output signal to the unknown system with the unknown characteristics, and estimating a transmission function which the unknown system provides in a response, and forming an equivalent transmission function equivalent to the transmission function, and detecting that the output signal transmitted to the unknown system is a narrow band signal for indicating suspension of the estimation of the transmission function, and
coefficient calculating means for calculating a coefficient value of the coefficient producing a minimum difference between the output of the secondary noncyclic type filter comprised of the shift register producing a delay of one sampling period and the multiplier which multiplies a separately determined coefficient by the filter input,
the coefficient correcting means uses a fact indicating that a ratio between a level of a difference and a filter level of the filter input becomes less than a fixed value determined separately, adds to a differential output a primary cyclic filter having as a cyclic coefficient ½ of a primary coefficient of a secondary noncyclic type filter which is extracted, and uses an output for a calculation of a level ratio.

16. A speaking apparatus having a handfree conversation function enabling speaking without holding a receiver in a hand by providing a microphone and a speaker in a casing of a system, said speaking apparatus having the handfree conversation function, comprising:

a first echo canceler which cancels an echo caused by direct acoustic coupling between the speaker and the microphone positioned in the system comprised of the casing and a surface on which the casing is then emplaced;

a speech switching circuit, connected to said first echo canceler, in which an insertion attenuation amount of a transmitted and received signal is set having an upper limit of an attenuation amount sufficient for cancellation of an indirect echo generated by indirect acoustic coupling caused by a location where the speaking apparatus is used,
wherein the upper limit of the insertion attenuation amount of the speech switching circuit is set enabling two-way speaking;

a second echo canceler connected to said speech switching circuit which cancels a tone echo generated by an anti-side tone circuit, wherein at least one of the first echo canceler and the second echo canceler comprises: an adaptive filter,
coefficient correcting means, connected to said adaptive filter, for estimating, based on a difference between an input signal obtained at an input terminal receiving a reply and a pseudo echo generated based on an output signal using the adaptive filter, the adaptive filter using a filter input, and a coefficient of the adaptive filter to generate the pseudo echo, and
coefficient selecting means for suspending a coefficient correction processing having a processing amount performed during a sampling period for the adaptive filter at a frequency in accordance with a predetermined rule reducing the processing amount performed during the sampling period;

a secondary noncyclic type filter having an output, connected to said speech switching circuit, and including a shift register and multiplier,
wherein said coefficient selecting means comprises:
transmitting means, provided in the speaking apparatus for transmitting the output signal to the unknown system with the unknown characteristics, and estimating a transmission function which the unknown system provides in a response, and forming an equivalent transmission function equivalent to the transmission function, and detecting that the output signal transmitted to the unknown system is a narrow band signal for indicating suspension of the estimation of the transmission function, and coefficient calculating means for calculating a coefficient value of the coefficient producing a minimum difference between the output of the secondary noncyclic type filter comprised of the shift register producing a delay of one sampling period and the multiplier which multiplies a separately determined coefficient by the filter input, the coefficient correcting means uses a fact indicating that a ratio of a level of a difference and a filter level of the filter input becomes less than a fixed value determined separately, and constitutes the secondary cyclic type filter from a separately determined constant determining a bandwidth, connects an input of the secondary noncyclic type filter to the filter input generating a resultant output, and uses the resultant output for a calculation of the ratio.

* * * * *